(12) United States Patent
Klaric et al.

(10) Patent No.: US 8,250,481 B2
(45) Date of Patent: Aug. 21, 2012

(54) VISUALIZING GEOGRAPHIC-AREA CHANGE DETECTED FROM HIGH-RESOLUTION, REMOTELY SENSED IMAGERY

(75) Inventors: Matthew Nicholas Klaric, Columbia, MO (US); Curtis Herbert Davis, Columbia, MO (US); Grant Jason Scott, Columbia, MO (US); Chi-Ren Shyu, Columbia, MO (US); Brian Christopher Claywell, Columbia, MO (US)

(73) Assignee: The Curators of the University of Missouri, Columbia, MO (US)

( * ) Notice: Subject to any disclaimer, the term of this patent is extended or adjusted under 35 U.S.C. 154(b) by 781 days.

(21) Appl. No.: 12/254,654

(22) Filed: Oct. 20, 2008

(65) Prior Publication Data

US 2010/0100835 A1    Apr. 22, 2010

Related U.S. Application Data

(60) Provisional application No. 61/106,803, filed on Oct. 20, 2008, provisional application No. 61/105,955, filed on Oct. 16, 2008.

(51) Int. Cl.
*G06F 3/048* (2006.01)
*G06K 9/46* (2006.01)
*G01C 11/02* (2006.01)

(52) U.S. Cl. ......... 715/765; 715/810; 345/473; 382/219
(58) Field of Classification Search .................. 715/765, 715/810; 382/219; 473/810
See application file for complete search history.

(56) References Cited

U.S. PATENT DOCUMENTS 5,719,949 A    2/1998  Koeln et al.
6,115,481 A *  9/2000  Wiens ........................... 382/113
6,243,483 B1   6/2001  Petrou et al.
6,756,207 B1 * 6/2004  Giuliano et al. ............... 435/7.2

(Continued)

OTHER PUBLICATIONS

Chi-Ren Shyu, et al., "GeoIRIS: Geospatial Information Retrieval and Indexing System—Content Mining, Semantics Modeling, and Complex Queries," IEEE Transactions on Geoscience and Remote Sensing, vol. 45, No. 4, Apr. 2007, 14 pp.*

(Continued)

*Primary Examiner* — Weilun Lo
*Assistant Examiner* — Amy M Levy
(74) *Attorney, Agent, or Firm* — Shook, Hardy & Bacon L.L.P.

(57) ABSTRACT

A method, system, and medium are provided for presenting aspects of change associated with a geographic area that has been captured by high-resolution, remotely sensed imagery. One embodiment of the method includes receiving a query directed at the geographic area that includes one or more inputs, the query seeking an identification of regions associated with the geographic area that are characterized by aspects of change based on the one or more inputs; applying the query to a dataset of geospatial information that stores imagery associated with the geographic area, wherein the dataset includes information that is sufficient to identify the regions, and wherein the imagery is derived from the high-resolution, remotely sensed imagery, which is characterized by having a resolution of three meters or less per pixel; receiving a first results set that includes a first plurality of keys and corresponding change scores, wherein, (1) each key is useable to identify a certain region, and (2) each change score indicates an amount of change in the certain region from a first state to a second state; and presenting at least a portion of the results set in a viewing application.

22 Claims, 75 Drawing Sheets
(1 of 75 Drawing Sheet(s) Filed in Color)

U.S. PATENT DOCUMENTS

| | | | |
|---|---|---|---|
| 7,571,146 | B2 | 8/2009 | Dalton |
| 7,917,458 | B2 | 3/2011 | Dalton |
| 2003/0081812 | A1 | 5/2003 | Yamamoto et al. |
| 2006/0228019 | A1* | 10/2006 | Rahmes et al. ............... 382/154 |
| 2007/0162195 | A1* | 7/2007 | Garceau et al. .................. 701/3 |
| 2008/0052638 | A1* | 2/2008 | Frank et al. .................... 715/808 |
| 2008/0147366 | A1* | 6/2008 | Schutz et al. ..................... 703/8 |
| 2008/0276201 | A1* | 11/2008 | Risch et al. .................... 715/853 |
| 2009/0055719 | A1* | 2/2009 | Cossins et al. ................ 715/204 |
| 2009/0214084 | A1* | 8/2009 | Asner ........................... 382/110 |

OTHER PUBLICATIONS

Roth, LuAnne. "Googling" for Biomedical and Geospatial Informatics. A visit with Chi-Ren Shyu, Assistant Professor, Computer Science and ComputerEngineering. Published May 12, 2006, available at http://syndicate.missouri.edu/media/show/45—accessed May 10, 2011.*

Grant J. Scott, et al., "EBS k-d tree: An Entropy Balanced Statistical k-d Tree for Image Databases with Ground-Truth Labelling," Department of Computer Engineering and Computer Science, University of Missouri-Columbia, Columbia, Missouri 65211-2060, USA., pp. 1-12.

Aaron K. Shackelford, et al., "A Hierarchical Fuzzy Classification Approach for High-Resolution Multispectral Data Over Urban Areas," IEEE Transactions on Geoscience and Remote Sensing, vol. 41, No. 9, Sep. 2003, 13 pp.

Aaron K. Shackelford, et al., "A Combined Fuzzy Pixel-Based and Object-Based Approach for Classification of High-Resolution Multispectral Data Over Urban Areas," IEEE Transactions on Geoscience and Remote Sensing, vol. 41, No. 10, Oct. 2003, 10 pp.

C.R. Shyu, et al., "Automatic Object Extraction From Full Differential Morphological Profile in Urban Imagery for Efficient Object Indexing and Retrievals," Department of Computer Science, Department of Electrical and Computer Engineering, University of Missouri-Columbia, Columbia, Missouri 65211-2060, USA., 6 pp.

Matt Klaric, et al., "Automated Object Extraction Through Simplification of the Differential Morphological Profile for High-Resolution Satellite Imagery," IEEE, Department of Computer Science, Department of Electrical and Computer Engineering, Center for Geospatial Intelligence, University of Missouri-Columbia, Columbia, Missouri 65211., 2005, 4 pp.

Chi-Ren Shyu, et al., "Mining Image Content Associations for Visual Semantic Modeling in Geospatial Information Indexing and Retrieval," Department of Computer Science, Department of Electrical and Computer Engineering, Center for Geospatial Intelligence, University of Missouri-Columbia, Columbia, Missouri 65211, USA., 2005, 4 pp.

Grant Scott, et al., "Modeling Multi-Object Spatial Relationships for Satellite Image Database Indexing and Retrieval," Department of Computer Science, University of Missouri-Columbia, 10 pp.

Chi-Ren Shyu, et al., "Knowledge Discovery by Mining Association Rules and Temporal-Spatial Information from Large-Scale Geospatial Image Databases," Department of Computer Science, Center for Geospatial Intelligence, University of Missouri, Columbia, Missouri, 65211, USA, 4 pp.

Matt Klaric, et al., "A Framework for Geospatial Satellite Imagery Retrieval Systems," Department of Computer Science, Department of Electrical and Computer Engineering, Center for Geospatial Intelligence, University of Missouri-Columbia, Columbia, Missouri 65211, 4 pp.

Matt Klaric, et al., "Mining Visual Associations from User Feedback for Weighting Multiple Indexes in Geospatial Image Retrieval," Department of Computer Science, Center for Geospatial Intelligence, University of Missouri-Columbia, Columbia, Missouri 65211, 4 pp.

Brian C. Claywell, et al., "Fusion of Spectral and Spatial Information for Automated Change Detection in High Resolution Satellite Imagery," Department of Electrical and Computer Engineering, Department of Computer Science, Center for Geospatial Intelligence, University of Missouri-Columbia, Columbia, Missouri 65211, USA, 4 pp.

Grant Scott, et al., "Knowledge-Driven Multidimensional Indexing Structure for Biomedical Media Database Retrieval," IEEE, Medical and Biological Digital Library Research Lab, Department of Computer Science, University of Missouri-Columbia, 2007, 12 pp.

O. Sjahputera, et al., "GeoCDX: An Automated Change Detection & Exploitation System for High Resolution Satelite Imagery," Center for Geospatial Intelligence, College of Engineering, University of Missouri-Columbia, 4 pp.

Yonghong Li, et al., "A Combined Global and Local Approach for Automated Registration of High-Resolution Satellite Images Using Optimum Extrema Points," Department of Electrical and Computer Engineering, University of Missouri-Columbia, U.S.A., 4 pp.

Grant J. Scott, et al., "Knowledge-Driven Multidimensional Indexing for Content-Based Information Retrieval," May 2008, 173 pp.

Matt Klaric, et al., "Multi-Index, Multi-Object Content-Based Retrieval," 14 pp.

Grant Scott, et al. "Entropy Balanced Bitmap Tree for Shape-Based Object Retrieval from Large-Scale Satellite Imagery Databases," 14 pp.

"GeoCDX v1," Center for Geospatial Intelligence, University of Missouri-Columbia, 2 pp.

"GeoIRIS v4," Center for Geospatial Intelligence, University of Missouri-Columbia, 2 pp.

Curt Davis, Ph.D., "Geospatial Imagery Retrieval & Indexing System," Apr. 30, 2008, 46 pp.

Office Action mailed Jan. 25, 2011 in U.S. Appl. No. 12/254,610, 30 pages.

Office Action mailed Dec. 21, 2010 in U.S. Appl. No. 12/254,638, 18 pages.

Final Office Action mailed May 18, 2011 in U.S. Appl. No. 12/254,638, 17 pages.

Notice of Allowance and Fees mailed Jun. 1, 2011 in U.S. Appl. No. 12/254,610, 20 pages.

Notice of Allowance and Fee(s) Due for U.S. Appl. No. 12/254,673, mailed Jan. 20, 2012, 15 pages.

* cited by examiner

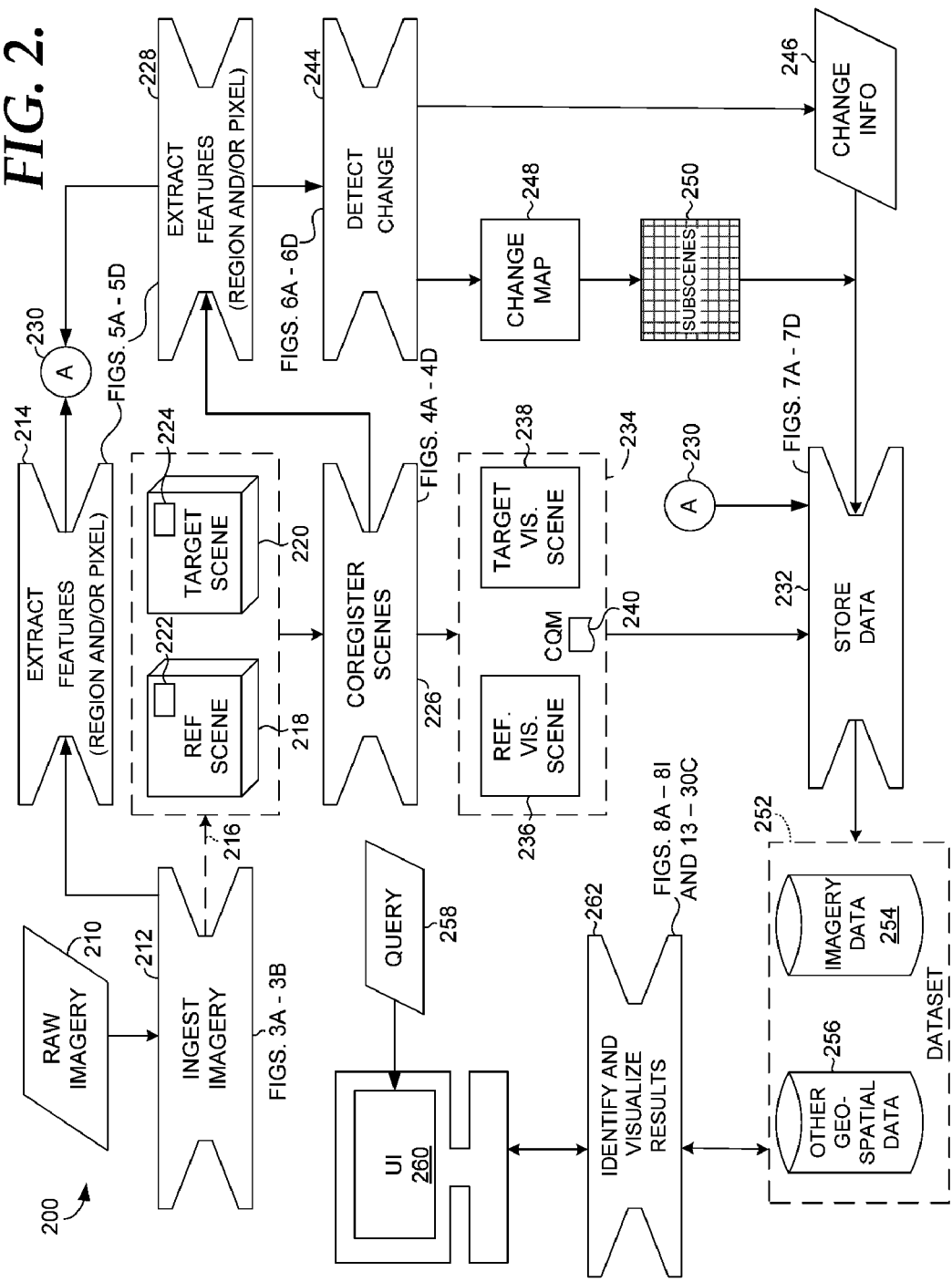

```
FUNCTION CQM(LAT, JDOY1, JDOY2, TOD1,
TOD2, THETA1, THETA2, PHI1, PHI2, SATFLAG)

IF (SATFLAG = 1) THEN
    SF1 = 5
    SF2 = 5
    SF3 = 0
ELSE
    SF1 = 2
    SF2 = 4
    SF3 = 4
ENDIF

LAT=ABS(LAT)
THAVG = 0.5 * (THETA1 + THET2)
DT = ABS(TOD1 - TOD2)
DD = ABS(JOD2 - JOD1)

IF (DD > 182.5) THEN DD = ABS(DD - 365)

IF (PHI1 > 180) THEN PHI1 = -(360 - PHI1)
IF (PHI2 > 180) THEN PHI2 = -(360 - PHI2)
D_PHI = ABS(PHI2 - PHI1)

IF (D_PHI > 180) THEN D_PHI = 360 - D_PHI

CQ_S = 1 - S(LAT, 0, 20, 40) * S(DD, 0, 90, 182.5)

CQ_G = 1 - ((1 - S(THAVG, 60, 75, 90)) * S(D_PHI, 0, 90, 180))

CQ_T = 1 - S(DT, 0, 240, 480)

CQM = SF1 * CQ_S + SF2 * CQ_G + SF3 * CQ_T

END FUNCTION
```

VARIABLE DEFINITIONS:

LAT: SCENE LATITUDE
JDOY1, JDOY2: JULIAN DAY OF YEAR, SCENE 1 AND SCENE 2
TOD1, TOD2: TIME OF DAY, SCENE 1 AND SCENE 2
THETA1, THETA2: SENSOR ELEVATION ANGLE, SCENE 1 AND SCENE 2
PHI1, PHI2: SENSOR AZIMUTH ANGLE, SCENE 1 AND SCENE 2
SATFLAG: 1 FOR SATELLITE, 0 FOR AIRBORNE

S: ESS-FUNCTION

CQ_S: SEASONAL CQM COMPONENT
CQ_G: SENSOR GEOMETRY CQM COMPONENT
CQ_T: TIME OF DAY CQM COMPONENT
SF1, SF2, SF3: WEIGHTING FACTORS FOR CQM COMPONENTS

CQM: AGGREGATE CQM

*FIG. 5G.*

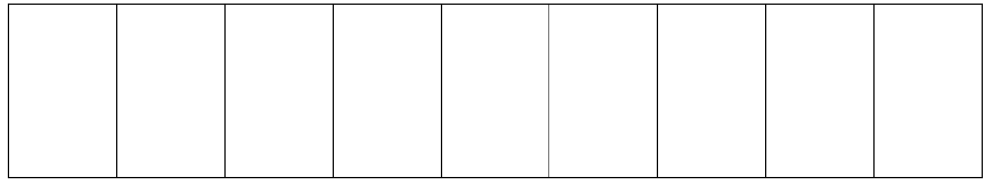

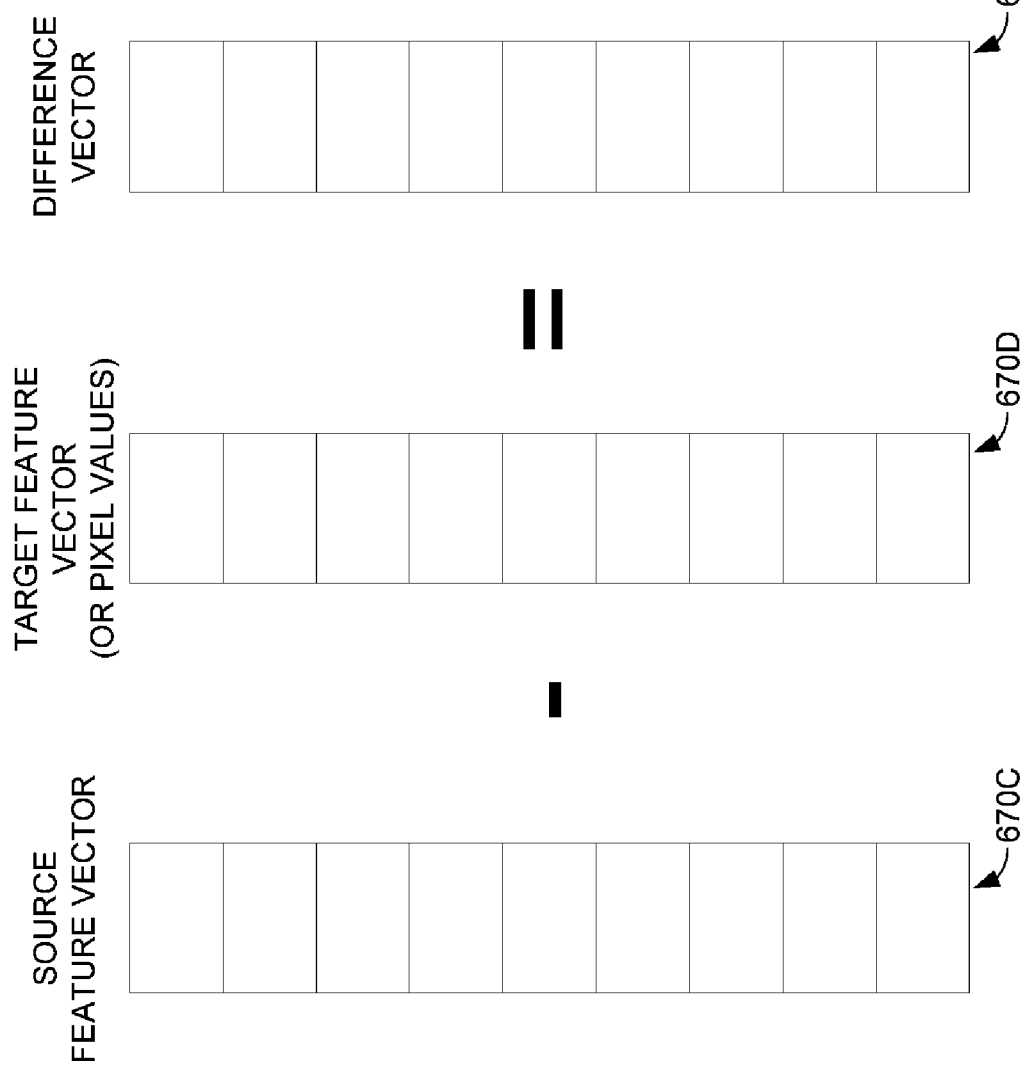

| | REFERENCE PIXEL-LEVEL FEATURE VECTOR 680E | PIXELS IN CLOSE PROXIMITY TO SUPPOSED TARGET PIXEL 680B | | | | | CHANGE (DIFFERENCE) VECTOR |
|---|---|---|---|---|---|---|---|
| FIRST BAND: 680D | 5 | ⑤ | 1 | 9 | 6 | 6 | 0 |
| SECOND BAND: | 6 | ⑦ | 4 | 11 | 15 | 8 | 1 |
| THIRD BAND: | 7 | 15 | ⑤ | 12 | 20 | 12 | 2 |
| FOURTH BAND: | 8 | 11 | 3 | 13 | 18 | ⑨ | 1 |
| FIFTH BAND: | 9 | 12 | 1 | 14 | 18 | ⑩ | 1 |
| SIXTH BAND: | 1 | 4 | ② | 5 | 19 | 3 | 1 |
| SEVENTH BAND: | 2 | 6 | ① | 9 | 10 | 9 | 1 |
| EIGHT BAND: | 3 | ⑦ | 9 | 8 | 11 | 9 | 4 |
| NINTH BAND: | 4 | 8 | 2 | 6 | 13 | ④ | 0 |
| | ⋮ | ⋮ | ⋮ | ⋮ | ⋮ | ⋮ | ⋮ |
| NTH BAND: | 14 | ⑯ | 11 | 18 | 19 | 11 | 2 |

680A → 680F, 680C (IDENTICALLY CO-LOCATED PIXEL), 680G → EMBODIMENT: PROXIMITY SELECTION

FIG. 6G.

|  | REFERENCE PIXEL-LEVEL FEATURE VECTOR | PIXELS IN CLOSE PROXIMITY TO SUPPOSED TARGET PIXEL | | | | | CHANGE (DIFFERENCE) VECTOR |
|---|---|---|---|---|---|---|---|
| FIRST BAND: | 5 | 5 | 1 | (9) | 15 | 6 | 4 |
| SECOND BAND: | 6 | 7 | 4 | (11) | 20 | 8 | 5 |
| THIRD BAND: | 7 | 15 | 5 | (12) | 18 | 12 | 5 |
| FOURTH BAND: | 8 | 11 | 3 | (13) | 18 | 9 | 5 |
| FIFTH BAND: | 9 | 12 | 1 | (14) | 19 | 10 | 5 |
| SIXTH BAND: | 1 | 4 | 2 | (5) | 10 | 3 | 4 |
| SEVENTH BAND: | 2 | 6 | 1 | (9) | 11 | 9 | 7 |
| EIGHT BAND: | 3 | 7 | 9 | (8) | 13 | 9 | 5 |
| NINTH BAND: | 4 | 8 | 2 | (6) | 14 | 4 | 2 |
|  | ... | ... | ... | ... | ... | ... |  |
| NTH BAND: | 14 | 16 | 11 | (18) | 19 | 15 | 4 |

668B ← 668A: IDENTICALLY CO-LOCATED PIXEL

668C: EMBODIMENT: IDENTICALLY CO-LOCATED PIXEL

*FIG. 6H.*

| | REFERENCE PIXEL-LEVEL FEATURE VECTOR | ACTUAL CORRESPONDING PIXEL | PIXELS IN CLOSE PROXIMITY TO SUPPOSED TARGET PIXEL | | | | CHANGE (DIFFERENCE) VECTOR |
|---|---|---|---|---|---|---|---|
| FIRST BAND: | 5 | (5) | 1 | 9 | 15 | 6 | 0 |
| SECOND BAND: | 6 | (7) | 4 | 11 | 20 | 8 | 1 |
| THIRD BAND: | 7 | (15) | 5 | 12 | 18 | 12 | 8 |
| FOURTH BAND: | 8 | (11) | 3 | 13 | 18 | 9 | 3 |
| FIFTH BAND: | 9 | (12) | 1 | 14 | 19 | 10 | 3 |
| SIXTH BAND: | 1 | (4) | 2 | 5 | 10 | 3 | 3 |
| SEVENTH BAND: | 2 | (6) | 1 | 9 | 11 | 9 | 4 |
| EIGTH BAND: | 3 | (7) | 9 | 8 | 13 | 9 | 4 |
| NINTH BAND: | 4 | (8) | 2 | 6 | 14 | 4 | 4 |
| | ⋮ | ⋮ | ⋮ | ⋮ | ⋮ | ⋮ | |
| NTH BAND: | 14 | (16) | 11 | 18 | 19 | 15 | 2 |

684C REFERENCE CORRESPONDING PIXEL
684B ACTUAL CORRESPONDING PIXEL
684A IDENTICALLY CO-LOCATED PIXEL
684D EMBODIMENT: SMART DETERMINATION OF CORRESPONDING PIXEL

FIG. 6I.

| FEATURE | DATABASE OBJECT REFERENCE KEYS (E.G. IMAGE/LOCATION) | | | | |
|---|---|---|---|---|---|
| | KEY 1 | KEY 2 | KEY 3 | ... | KEY N |
| BLUE BAND SPECTRAL HISTOGRAM BUCKET 1 | 0 | 0 | 0.02378119 | | 0.07487564 |
| BLUE BAND SPECTRAL HISTOGRAM BUCKET 2 | 0 | 0 | 0.080799 | | 0.10348875 |
| BLUE BAND SPECTRAL HISTOGRAM BUCKET 3 | 0.00010969 | 0 | 0.1275332 | | 0.07285182 |
| ... | | | | | |
| BLUE BAND SPECTRAL HISTOGRAM BUCKET K | 1.10E-05 | 0.0791626 | 0 | | 0.00207866 |

743

SIMILAR FORMAT FOR DIFFERENCE-FEATURE VECTORS

FIG. 7D.

| SERVICE_NAME | DIM | DESCR |
|---|---|---|
| SPECTRAL_RED | 16 | SPECTRAL RESPONSE RED BAND |
| SPECTRAL_BLUE | 16 | SPECTRAL RESPONSE BLUE BAND |
| SPECTRAL_PAN | 16 | SPECTRAL RESPONSE PANCHROMATIC BAND |
| SPECTRAL_NIR | 16 | SPECTRAL RESPONSE NEAR-INFRARED BAND |
| SPECTRAL_NDVI | 16 | SPECTRAL RESPONSE NORMALIZED DIFFERENCE VEGETATION INDEX BAND |
| SPECTRAL_GREEN | 16 | SPECTRAL RESPONSE GREEN BAND |
| TEXTURAL_PAN | 9 | TEXTURAL FEATURES OF PANCHROMATIC BAND |
| TEXTURAL_RED | 9 | TEXTURAL FEATURES OF RED BAND |
| TEXTURAL_BLUE | 9 | TEXTURAL FEATURES OF BLUE BAND |
| TEXTURAL_NIR | 9 | TEXTURAL FEATURES OF NEAR-INFRARED BAND |
| TEXTURAL_NDVI | 9 | TEXTURAL FEATURES OF NORMALIZED DIFFERENCE VEGETATION INDEX BAND |
| TEXTURAL_GREEN | 9 | TEXTURAL FEATURES OF GREEN BAND |
| AGG_DMP_CLOSE | 9 | AGGREGATE DMP CLOSING PROFILE |
| AGG_DMP_OPEN | 9 | AGGREGATE DMP OPENING PROFILE |
| LINEAR_LIN | 19 | LINEAR LINEARITY FEATURES |
| LINEAR_DIR | 18 | LINEAR DIRECTIONAL FEATURES |

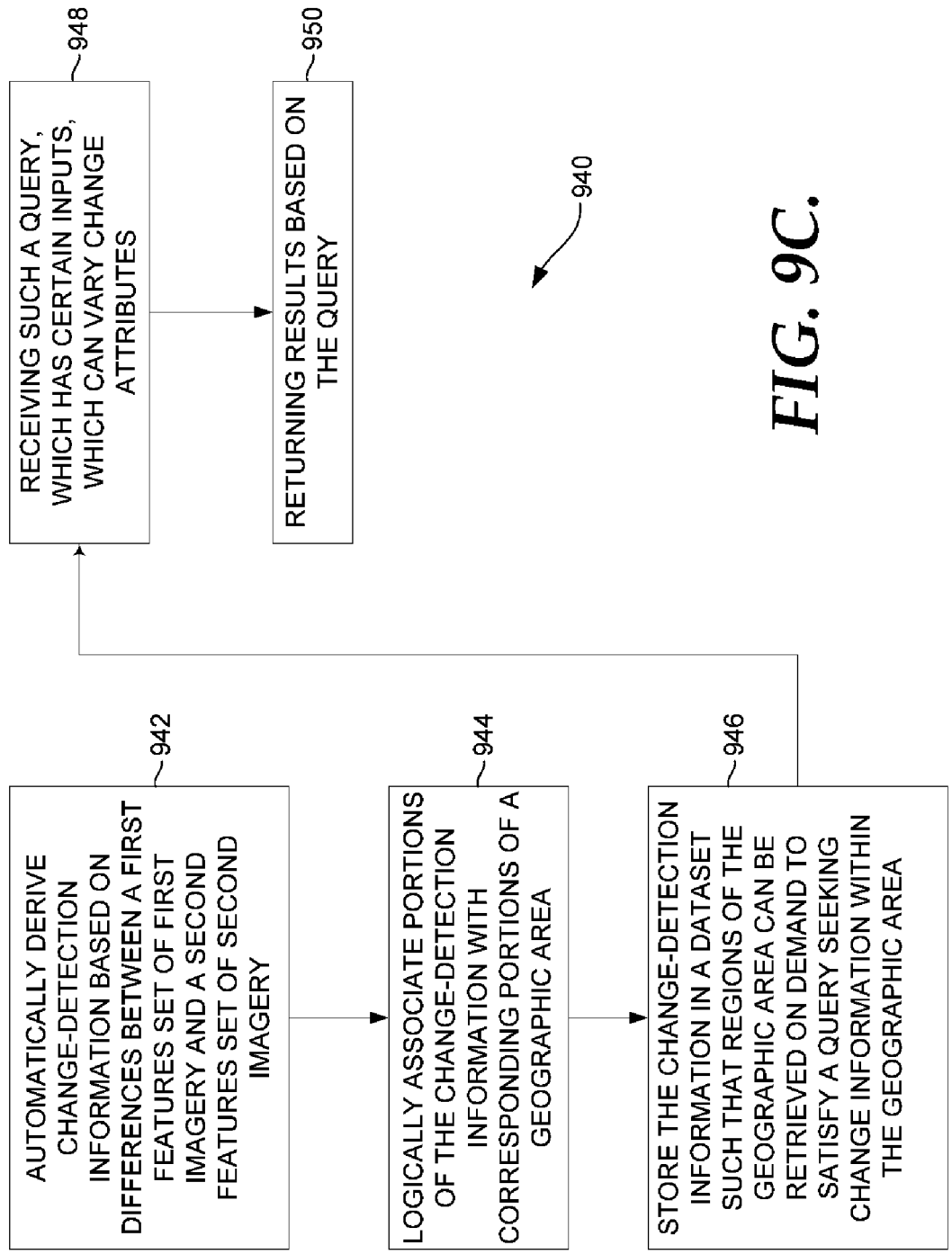

*FIG. 11A.*

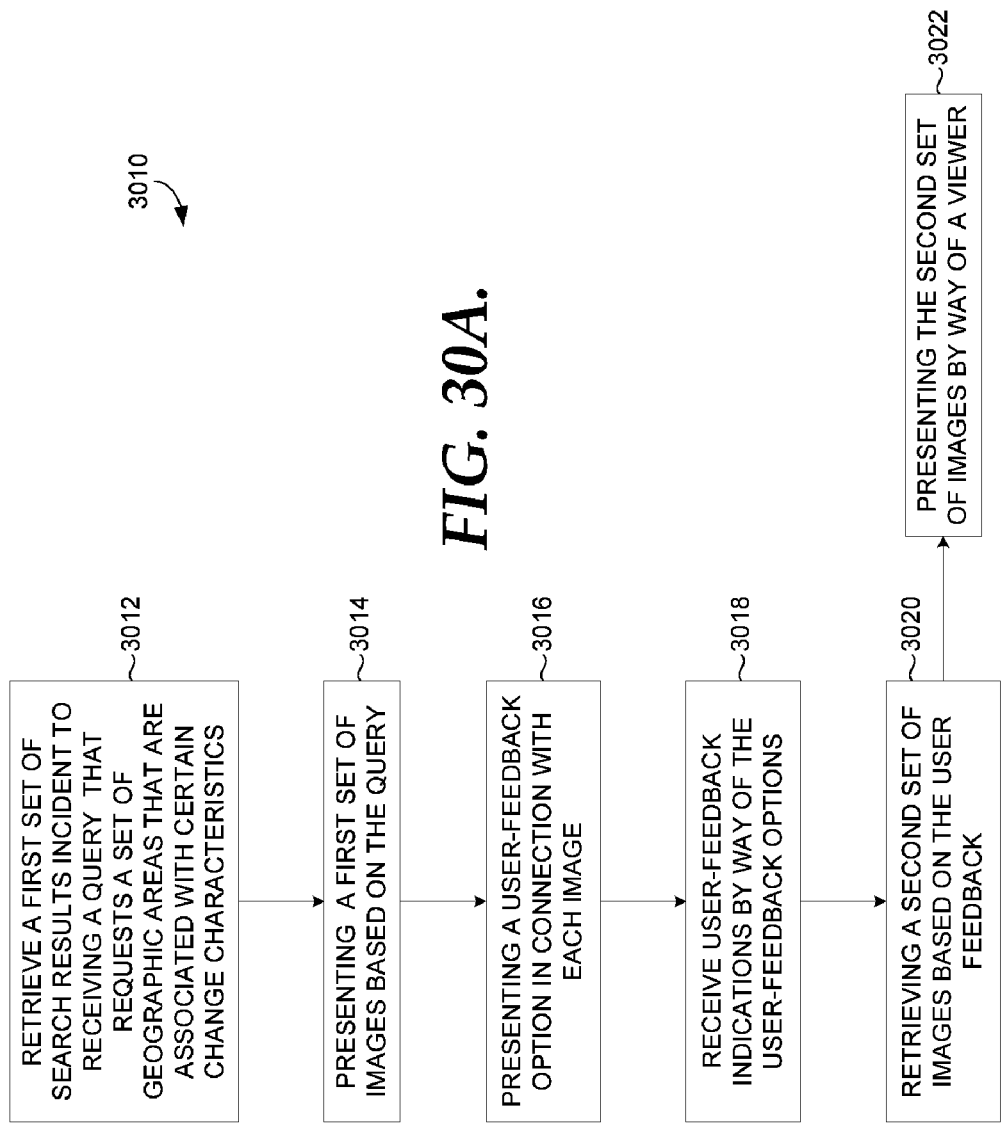

VISUALIZING GEOGRAPHIC-AREA CHANGE DETECTED FROM HIGH-RESOLUTION, REMOTELY SENSED IMAGERY

CROSS REFERENCE TO RELATED APPLICATIONS

This application claims the benefit of U.S. Provisional Application No. 61/106,803, filed Oct. 20, 2008 and U.S. Provisional Application No. 61/105,955, filed Oct. 16, 2008, which are both expressly incorporated by reference herein in their entirety.

Also, much of this disclosure is shared with the following U.S. patent applications, filed on even date herewith, one of which is this application:

| Title | Filing Date |
| --- | --- |
| DETECTING GEOGRAPHIC-AREA CHANGE USING HIGH-RESOLUTION, REMOTELY SENSED IMAGERY | Oct. 20, 2008 |
| IDENTIFYING GEOGRAPHIC AREAS BASED ON CHANGE PATTERNS DETECTED FROM HIGH-RESOLUTION, REMOTELY SENSED IMAGERY | Oct. 20, 2008 |
| STORING CHANGE FEATURES DETECTED FROM HIGH-RESOLUTION, REMOTELY SENSED IMAGERY | Oct. 20, 2008 |
| VISUALIZING GEOGRAPHIC-AREA CHANGE DETECTED FROM HIGH-RESOLUTION, REMOTELY SENSED IMAGERY | Oct. 20, 2008 |
| REVISING IMAGERY SEARCH RESULTS BASED ON USER FEEDBACK | Oct. 20, 2008 |

STATEMENT REGARDING FEDERALLY SPONSORED RESEARCH

This invention was made with U.S. Government support by way of Grant Numbers HM1582-04-1-2028 and HM1582-6-C-0018 awarded by the National Geospatial Intelligence Agency. The Government has certain rights in the invention. See 35 U.S.C. §202(c)(6).

INTRODUCTION

Generally, this disclosure (patent/patent application) is directed to systems and methods for processing geospatial information. Our technology includes many facets that can be used in a variety of settings. In one illustrative setting, our technology helps locate areas of change in a given geographic area. Our technology facilitates automatic change detection (at the region or item level), which is able to utilize high-resolution remotely sensed imagery to detect changes associated with a geographic area. The remotely sensed imagery might be obtained by way of a satellite, an airplane, a UAV or other method.

An illustrative use of our technology, as will be expanded upon below, might be, for example, to detect the presence of a new road that has recently appeared over some period of time. Perhaps this road was constructed over the course of a year in a remote geographic area. If a person were armed only with images that depicted the area at various states, the individual might not know where to even begin looking for the road. That is, assume that a satellite photographed a given area of land. This given area of land (not to exclude water) might be vast, such that an individual would not even know where to start looking.

Moreover, even if an individual did know where to look, the individual might only see the constructed road, which might not be relevant because the road might have been present for any number of years (assuming that the individual is interested in finding areas that have changed over time). Our technology enables an automatic detection of a feature such as the recently constructed road. It enables an automatic analyzing and comparing imagery associated with a given geographic area in multiple states to identify aspects of change associated with that geographic area. Still further, other constraints unrelated to the imagery can also be levied by way of a query so that even more specific items of interest can be found. For example, one might wish to search for all rectangular objects within a certain distance of a school within a given area.

Still further, our technology enables not only a searching for objects, as well as identifying change associated with objects, it also enables an identification of geographic areas that exhibit change characteristics that are similar to a provided set of change characteristics. For example, consider a desert. Now assume that a road has been constructed in the desert. This geographic area has changed in a certain way over a certain amount of time. Now, assume that a user wishes to locate other geographic areas that have exhibited similar change. For example, assume that a user wishes to locate other roads that have been constructed in a desert. This is not the same as merely searching for roads in a desert, for that would only take into account an "after" state; that is, that search would only find roads in deserts. But what our technology allows is a location of a geographic area that has changed in a manner similar to an indicated type of change. Thus, for example, only roads in deserts that have recently been constructed can be returned as a result incident to receiving a query in one embodiment of our technology.

We are providing very high level examples to help introduce concepts of our technology before we begin describing it in detail. Although we mentioned roads by way of introduction, it will become clear that many types of features common, including change in general, can be identified by employing aspects of our technology. Generally, our technology is employed in connection with high-resolution remotely sensed imagery. One form of this includes commercial satellite imagery (CSI). Generally, when we speak of "high-resolution" we are speaking of those resolutions that have a ground sample distance (GSD) of 3 meters or less; that is, 3 meters or less per pixel. Processes described herein can utilize imagery on the order of one meter per pixel, 0.6 meters per pixel, or even higher resolutions.

Our technology includes storing change-detection information, and moreover, storing it in such a manner and in such a data structure that scaling is efficient. Our data is stored in such a way that it lends itself to high scalability and efficient organization as well as searching. We will describe ways of fusing together results from several individual feature indexes to ultimately rank tiles that depict different geographic areas. This automatic ranking enables a user to rapidly identify areas of interest and depict them on a viewer, which, as we will describe in much greater detail below, enables the identified geographic areas to be viewed in context, among their surroundings. This enables a user's eye to be quickly directed to relevant areas instead of having to laboriously, and often fruitlessly, search a mass of information. In many situations today, a great deal of remotely sensed imagery sits idle, unsearched, and unused because there is simply too much information to even start analyzing. But aspects of our technology enable not only a beginning process to analyze such imagery, but also a methodical storing, analyzing, rapidly searching, and visual depiction of relevant data within the massive imagery.

SUMMARY

We describe various technological aspects associated with processing high-resolution satellite imagery.

The claims define embodiments of our invention, not this summary. This summary is provided to introduce a selection of concepts in a simplified form that are further described below in the Detailed Description. This Summary is not intended to identify key features or essential features of the claimed subject matter, nor is it intended to be used to limit the scope of the claimed subject matter. In brief, we describe illustrative ways of visualizing aspects of change associated with a geographic area that has been captured by high-resolution remotely sensed imagery.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee. Illustrative embodiments of our technology are described in detail below with reference to the attached drawing figures, which depict certain embodiments, which figures are incorporated by reference herein, and wherein:

FIG. 2 depicts an overall process flow that depicts various aspects of our technology;

FIGS. 5E-5G depict illustrative aspects associated with calculating a change-quality measurement;

FIG. 6E depicts an illustrative feature vector;

FIG. 6F depicts a high-level overview of calculating a difference vector by differencing a source feature vector and a target feature vector;

FIGS. 6G-6I depict embodiments for determining values of a target pixel-level feature vector;

FIG. 7D depicts an illustrative multidimensional feature vectors;

FIG. 7E depicts illustrative feature bands and corresponding dimensions associated with each;

FIGS. 9A-9C depict illustrative methods for automatically detecting change associated with a geographic area;

FIG. 11A depicts a set of illustrative user-input options that can be used to form a query;

FIGS. 30A-30C depict illustrative methods for revising a set of search results based on feedback provided.

DETAILED DESCRIPTION

Figure 1A:
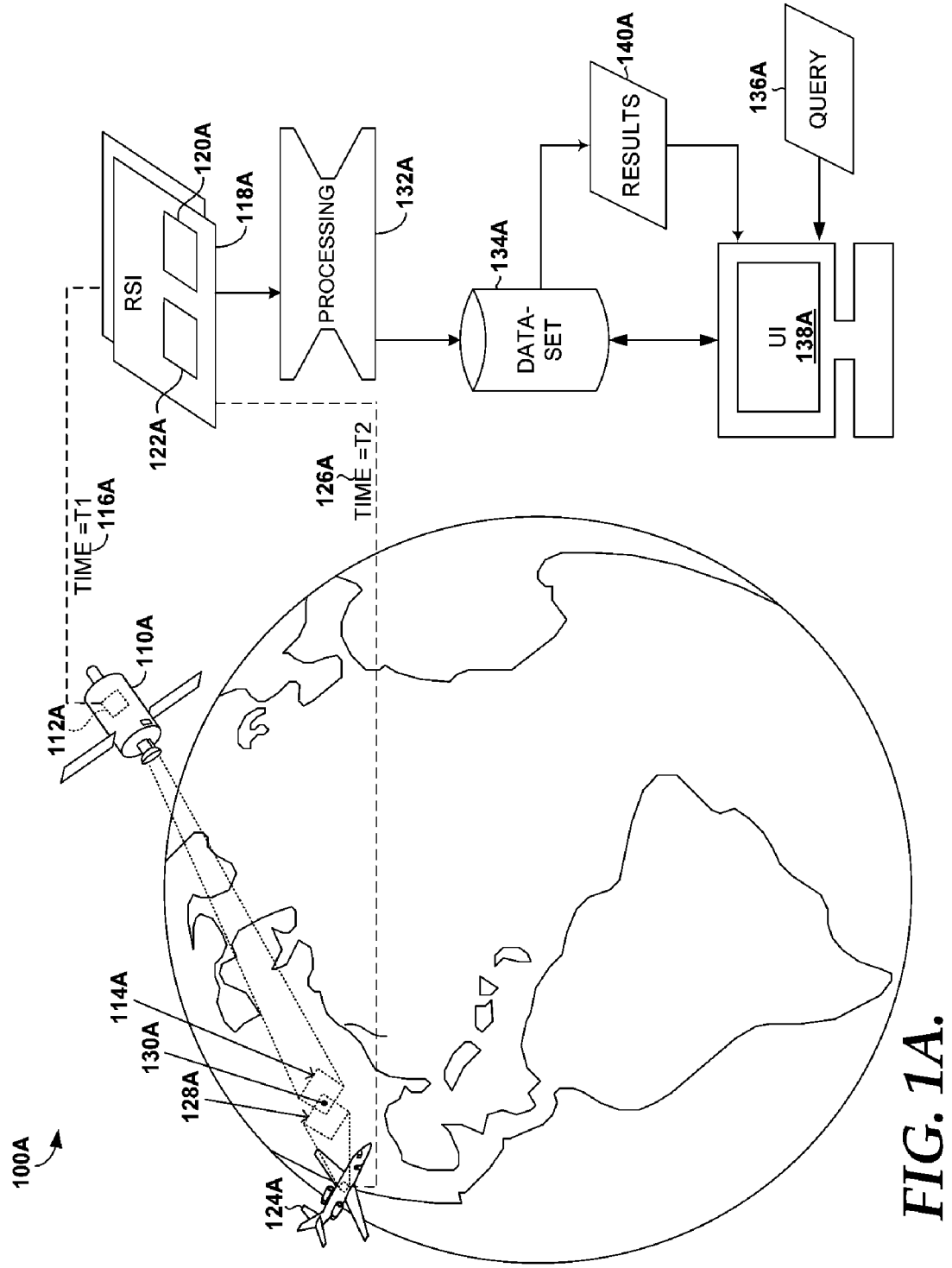
FIG. 1A depicts a first illustrative operating environment suitable for utilizing the described technology.

Throughout the description of our technology, several acronyms, shorthand notations, and terms are used to aid the understanding of certain concepts pertaining to the associated system and services. These acronyms and shorthand notations are intended to help provide an easy methodology of communicating the ideas expressed herein and are not meant to limit the scope of our technology unless we clearly say so. The table below does not include a full definition. A full definition of any term can only be gleaned by giving consideration to the full breadth of this patent.

Sometimes, we use different terms to refer to similar or the same things. We do not necessarily mean to implicate a difference per se; but are constrained by certain statutory requirements that apply to patents and patent applications. For example, claims must use proper antecedent basis. Sometimes, satisfying this rule can lead to wordiness, whereas using a different word helps make referring to prior terms easier. Thus, we might use different words in that regard. The following is a list of these terms:

| Term | Short Reference |
| --- | --- |
| chip | image portion reflected in a viewer application |
| destination/target/after | used interchangeably and generally, refers to a subsequent thing; e.g., "an after image" |
| DMP | Differential Morphological Profile |
| EBB | Entropy Balanced Bitmap |
| EBS | Entropy Balanced Statistical |
| geographic | used interchangeably with "terrestrial" to refer to the surface of a body, such as a planet, and is not intended to be limited to a land context (to the exclusion of water) |
| GSD | Ground Sample Distance |
| high resolution | Generally, resolutions at a GSD higher than about 3 m; that is resolutions of 3 meters or less per pixel (e.g., 1 m/pixel and fractions of meters per pixel) |
| image | generally, a picture as well as metadata associated with the picture, though distinguishing from "picture" is not intended |
| imagery | a collection of images or image data |
| KML | Keyhole Markup Language |
| MS | Multispectral |
| NDVI | Normalized Difference Vegetation Index |
| NIR | Near-Infrared |
| Pan | Panchromatic |
| region | generally, used interchangeably with "scene" and refers to all or a portion of an image; sometimes a geographic area |
| RSI | Remotely Sensed Imagery (imagery received by way of satellites or aircraft for example) |
| scene | generally, used interchangeably with "region" and refers to all or a portion of an image |
| source/reference/before | used interchangeably and generally, refers to an initial or base thing, e.g., "a before image" |

-continued

| Term | Short Reference |
| --- | --- |
| subscene | generally, a portion of an image, used interchangeably with "tile" or "image portion" |
| terrestrial | used interchangeably with "geographic" to refer to the surface of a body, such as a planet, and is not intended to be limited to a land context (to the exclusion of water) |
| tile | generally, a portion of an image, used interchangeably with "subscene" or "image portion"; sometimes used synonymously with "chip" when referring to an image in a viewer; (can be logical, not necessarily individually stored) |
| UAV | Unmanned Aerial Vehicle |
| UTM | Universal Transverse Mercator |

Regarding the use of singular and plural, we do not mean to intend any sort of strict numerical implication by using the singular or plural of a term; similar to our lack of intent to imply the singular by using "a" or "the." Trying to capture the plural in words or in the FIGs. would often lead to wordiness. For example, though we might refer to "a database," clearly we fully anticipate that such reference would be equally applicable to multiple databases. By way of another example "a memory" does not imply one single memory device.

We do not intend for inferences to be made by way of negative implication. That is, just because we say that some certain thing might be optional, for example, we don't mean to imply that anything not mentioned as optional is required. Also, we do not mean to imply an actual first in a sequence when we use the term "first." A first does not mean the first. We are simply referring to a particular thing, and use the terms "first," "second," and the like to keep things separate and make referencing easier.

Embodiments of our technology may be embodied as, among other things: a method, system, or set of computer-useable instructions embodied on one or more computer-readable media. Computer-readable media include both volatile and nonvolatile media, removable and non-removable media. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Turning now to FIG. 1A, an illustrative operating environment suitable for practicing an embodiment of our technology is provided and referenced generally by the numeral 100A. A satellite 110A is shown taking an image 112A of a first geographic area 114A at a first time 116A. The first time 116A is indicated as "T1." The imagery 112A is doubly represented by the remotely sensed imagery item having reference number 118A. This is an example that might occur more than once in this disclosure where different numerals do not necessarily implicate different items. As previously mentioned, we are somewhat constrained by various technical requirements of a patent. Therefore, we will use multiple numerals to refer to a potentially common physical item to help the reader follow along when referencing the drawings and reading this specification. Remotely sensed imagery ("RSI") includes pictures 120A as well as metadata 122A. Even though we use the term "pictures" separate from "metadata," we do not mean to imply that other references to pictures in this disclosure do not include metadata. Again, to help explain aspects of the invention, we are conveying that metadata 122A is included as part of remote imagery 118A. We will refer to RSI variously as "imagery," "remote imagery," or variations thereof.

FIG. 1A also depicts an airplane 124A as an illustrative vehicle for capturing aerial photography. At a second time, 126A, a second geographic area 128A is captured. Note that an overlapping region 130A intersects areas 128A and 114A. The imagery associated with geographic area 128 becomes part of what is schematically shown as remotely sensed imagery 118A. RSI 118A could include a multitude of imagery received by the same or other source and is generally shown here to include a mere two illustrative examples. In fact, RSI 118A might take the form of several gigabytes, terabytes, or even petabytes of imagery information.

As will be explained, a processing step 132A processes the remotely sensed imagery 118A resulting in modified imagery being stored as part of a dataset 134A. Of course dataset 134A might actually be several datasets across several types of computer-readable media, but it's depicted as shown so as to not obscure other aspects of the technology we are describing. Dataset 134A provides information upon which to search incident to receiving a query 136A. In some embodiments, query 136A is received by way of user interface 138A, which interacts with dataset 134A to provide a set of results 140A. Generally, results 140A include a list of geographic areas that are relevant based on query 136A. These results can be refined by way of user feedback or other inputs, as will be explained below.

Turning now to FIG. 2, a somewhat more detailed flow chart is provided that depicts an illustrative method for practicing various aspects of our technology. We make reference to other figures in FIG. 2, and do so to help the reader, but do not intend such other references to mean that these are the only places in this disclosure that a certain aspect is discussed. Moreover, although it should go without saying, we do not mean to convey that certain processes have discrete starting and stopping points. That is, we do not mean to imply that an imagery-ingestion process starts or stops precisely where shown, nor a co-registration process, nor any process shown. In reality, the process boundaries, to the extent they exist at all, are fuzzy, gray areas rather than defined by crisp black and white lines. Again, we are merely trying to provide the reader with an illustration that helps convey various aspects of our technology. We do not mean to limit our technology beyond what we say. Moreover, those of ordinary skill in the art might refer to processes that we refer to herein by different names. What one calls an "ingestion process" another might refer to as an image-acquiring process. Further, what one calls an image "co-registration process" another might refer to as a scene-matching process. We do not mean to convey by our terms specific processes but need to use some terms in order to even discuss the technology.

A set of raw imagery 210 serves as input to an imagery-ingestion process 212. Raw imagery 210 might be remotely sensed imagery 118A of FIG. 1A in one embodiment. In other embodiments, raw imagery might either not be received or start off as what we refer to later as modified imagery. That is, in some embodiments, imagery 210 is truly at a raw state, meaning untouched or uncorrected; but in other embodiments, it takes the form of initial imagery that might have already been subjected to one or more image-correction processes.

After imagery 210 is ingested at a step 212, features associated with the ingested imagery are extracted at 214. The types of features that can be extracted at step 214 can either be region based (that is, area based), or pixel based. In one embodiment, pixel-level features are extracted at this point for the whole area that imagery 210 relates to. In other embodiments, features at the region level only are extracted. We will describe later that generally, region level features represent aggregations of pixel-level features. In one embodiment of our technology, pixel-level features are utilized to facilitate change detection, which is only implicated when overlapping imagery is present; that is, multiple sets of imagery related to the same geographic area but at different times. Thus, in one embodiment, pixel-level features are stored after a determination is made that overlapping imagery exists; but, as mentioned, in other embodiments, pixel-level features can be stored initially.

Dashed line 216 indicates that output from the image-ingestion process 212 can take the form of a reference scene 218 as well as a target scene 220. Reference scene 218 is a depiction of a geographic area at a first, or "reference," state. Reference scene 218 includes corresponding metadata 222. Target scene 220 also includes metadata, 224, and depicts the same geographic area but in a second state. In some embodiments, reference scene 218 was previously stored, and target scene 220, was recently stored. In other embodiments, both reference scene 218 and target scene 220 were processed simultaneously and recently stored. Upon storing the imagery associated with target scene 220, reference scene 218 is identified as imagery of the same geographic area as that of target scene 220; hence overlapping imagery.

Reference scene 218 and target scene 220 can provide inputs to a co-registration process 226. We will describe co-registering the scenes in greater detail below. A first output of co-registration process 226 is received by a feature-extraction process 228. If, certain features were not extracted at step 214, they will be extracted here. On-page reference A, referred to by numeral 230, indicates that the features extracted from process 214 and/or 228 are stored as part of one or multiple storing processes, which are generally referenced by numeral 232.

Another outflow from co-registration process 226 includes visualization imagery 234. Visualization imagery 234 refers to imagery that has been optimized for presentation in a viewer application. In some embodiments, imagery might be 11 bits for example, whereas 8-bit imagery support is more pervasive in imagery viewing applications, for example, web browsers. Accordingly, in one embodiment, 8-bit visualization imagery is created so that it can easily be recalled and sent to a viewer application on demand. In other embodiments, visualization imagery 234 can be generated on the fly and presented in a viewer application. As shown, visualization imagery 234 includes a reference visualization scene 236 as well as a target visualization scene 238. In this disclosure, we will generally use the term "reference" to refer to a first or initial state. We will generally use the term "target" to refer to either a subsequent state of an object or area or to refer to a set of objects that are sought by way of a query. For example, if the user is seeking a specific object, we might refer to that object as a target object.

Also shown in FIG. 2 is a small item having the initials "CQM" that is referred to by reference numeral 240. Reference numeral 240 refers to a change-quality measure. CQM 240 does not necessarily have a strong relationship to visualization imagery 234. Rather, it is illustratively shown in this context to convey that it is associated with two or more scenes that correspond to a given geographic area. CQM 240 is a change-quality measure. That is, it measures a suitability of comparison of a reference scene and a target scene. We will explain this in greater detail below, but in brief, one aspect of our technology seeks to minimize detecting change that is not of the sort that indicates what might be referred to as true change or real change. For example, a snow-covered ground doesn't necessarily reflect an actual change in the ground per se. This is what might be referred to as seasonal differences. Other issues with analyzing imagery includes accounting for shadows, sensor geometry, sun position, and the like. CQM 240 accounts for these various effects and quantifies a suitability that some target scene could be compared against some reference scene. This data can be stored by way of process 232.

Returning to feature-extraction process 228, processing advances to a change-detection process 244. The change-detection process utilizes, among other things, the features previously extracted from the imagery to detect change between two or more scenes, resulting in change information 246 (variously referred to herein as "change-detection information"). Another outflow from the change-detection process 244 includes what we refer to as a change map 248. A change map, as will also be explained, provides a visual indication of both an intensity and areas of change within a region. This is different than merely indicating whether a given pixel has changed or not, a binary-type solution. To the contrary, change map 248 is somewhat akin to a weather map or a radar map. A storm depicted on a radar map has certain degrees of intensity that are reflected by color such that areas of greater disturbance are color-coded and easily visually perceptible.

Our technology is, of course, very different. But in one embodiment, the change map that a user sees looks somewhat akin to such a radar map in that areas of change are color-coded (or grayscale coded) and shaded such that areas of intense change are contrasted against areas of relatively small change. In one embodiment, change map 248 can be subdivided into a set of subscenes 250. Dividing an area into subscenes can also be done in connection with the visualization imagery. What we mean here is that a scene might be of a large geographic area, which might be difficult to present on a viewer. Accordingly, a scene might be subdivided into smaller regions, or what we might refer to herein as tiles. By way of illustration, a tile might correspond to a geographic area on the order of 256 square meters. Of course, this unit of area is not meant to be limiting, but is provided by way of illustration. This information is stored by way of data-storage process 232.

An outflow from data-storage process 232 includes a dataset 252. Dataset 252 might actually be what some refer to as multiple sets of data. By way of illustration, we indicate that dataset 252 might include imagery data 254 as well as other geospatial data 256. Imagery data 254 might take the form of the features and change information that were previously extracted in processes 214, 228, 244, and 246 as well as information derived from interacting with the imagery 210.

Other geospatial data 256 includes data from heterogeneous databases; that is, databases that stored disparate types of information. For example, a first type of information could include areas of interest, such as fun parks or historical sights. Other types of information might include information related to military institutions, or other buildings such as schools and churches. We will mention more examples later, they are almost without limit, and these provide a way to include additional constraints of a query 258 that seeks certain types of information.

Query 258, as with almost all of these components, will also be described in greater detail below. Briefly, it can include multiple inputs seeking geographic areas that exhibit certain traits; for example, as having certain features, or having exhibited a certain change signature, and more.

Illustrative viewers include an image viewer, a mapping component, a web page, and more, as will be discussed in greater detail below. Image viewers can include virtual-globe viewers like Google Earth, Microsoft's Virtual Earth, ESRI's ArcGlobe and others.

Figure 3A:
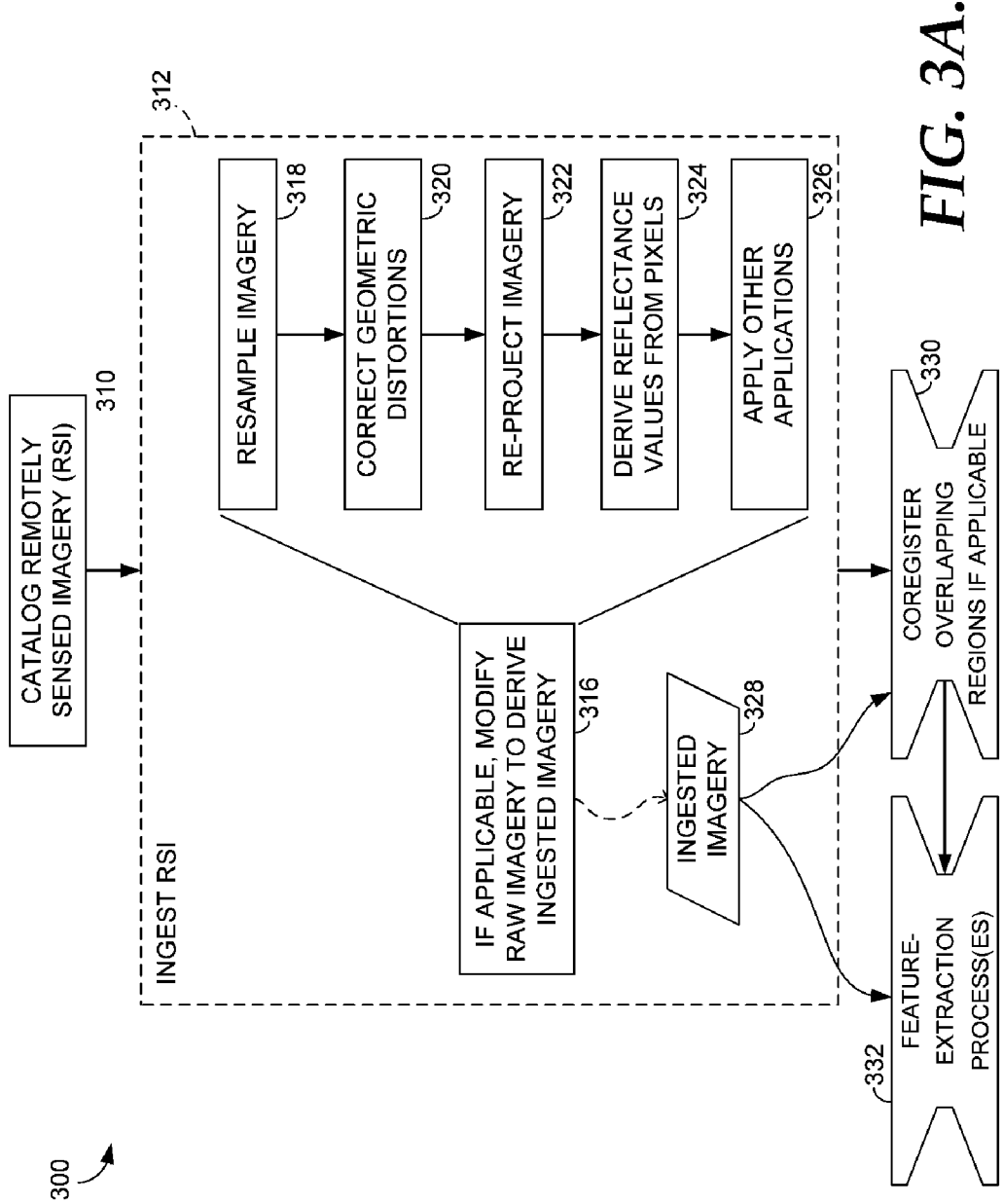
FIG. 3A depicts an illustrative image-ingestion process.

Turning now to FIG. 3A, an illustrative method for ingesting remotely sensed imagery is provided in reference generally by the numeral 300. At a step 310, the remotely sensed imagery is cataloged. In one embodiment, the remotely sensed imagery of step 310 includes remotely sensed imagery 118A of FIG. 1A. Imagery 118A may be obtained in a variety of ways. In one embodiment, the imagery is communicated from satellite 110 or air vehicle 124 directly. In other embodiments, imagery 118A arrives by way of a data store on one or more computer-readable media. Cataloging the imagery includes storing the imagery in a database so that it can be accessed. The metadata is also stored in the database such that the imagery can be referenced and operated on. Illustrative metadata includes an image date, source information, calibration data, orientation data describing the geometry at which a picture is taken, a latitude and/or longitude indication, a UTM indication, or other geo-reference location information, and the like. Imagery can be received in multiple resolutions. For example, a first set of imagery may be received at a resolution of 0.6 meters while other imagery is received at a resolution of one meter. By way of illustration, an illustrative scene might include an area on the order of tens or hundreds of square kilometers. Illustrative formats of imagery 118A include GeoTIFF and NITF. Sometimes multiple images are associated with what we refer to as a scene. The multiple images might be images associated with different wavelengths. For example, a first image might be a certain spectral band while another image might be of the same geographic area but in the near-infrared (NIR) band.

Figure 3B:
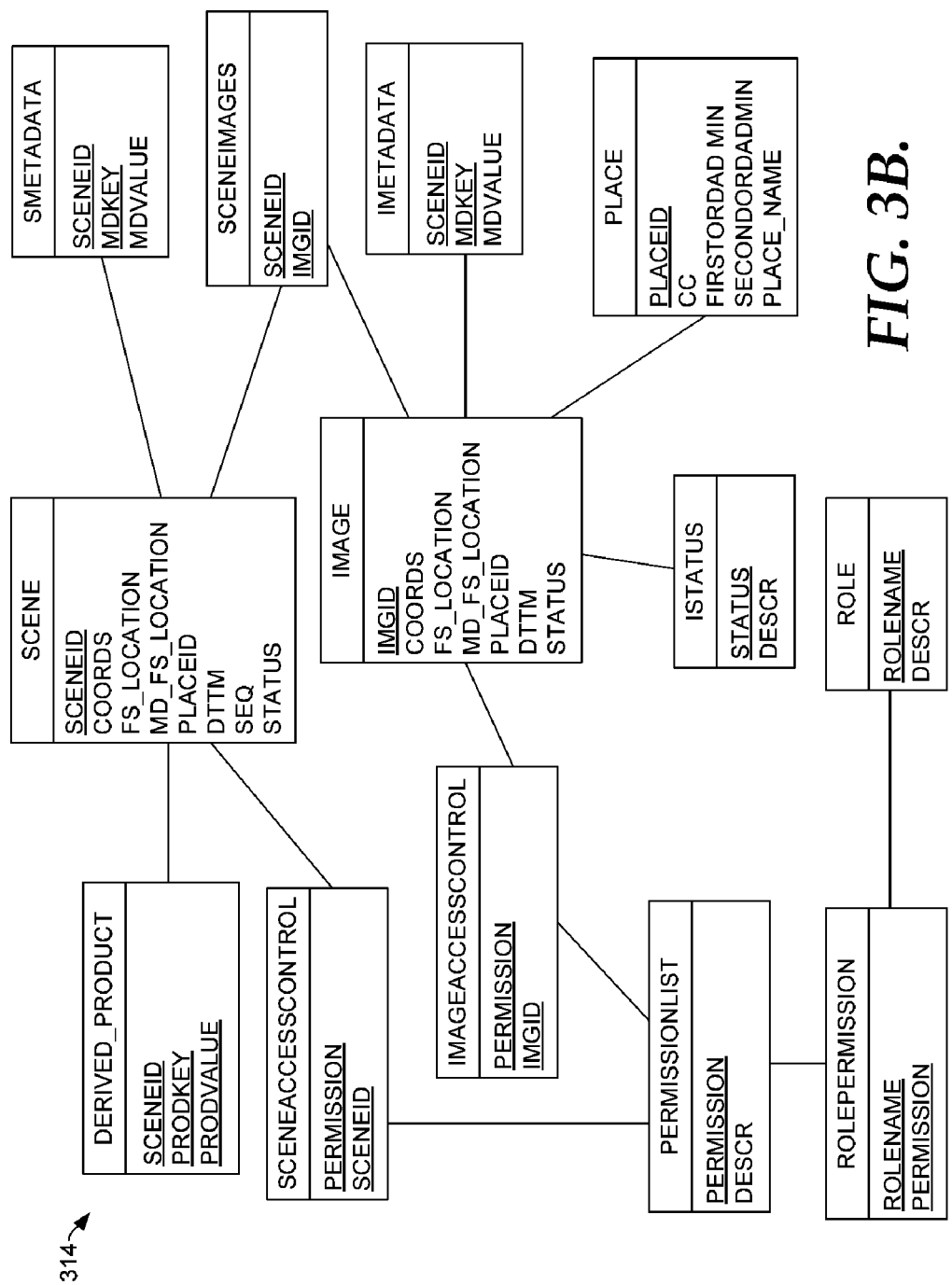
FIG. 3B depicts an illustrative data structure for cataloging imagery.

Turning briefly to FIG. 3B, an illustrative data structure associated with cataloging remote imagery 118A is provided and referenced by the numeral 314. Those skilled in the art will appreciate other ways of cataloging imagery 118A as well as alternative data structures. Data structure 314 is provided by way of illustration.

Returning to FIG. 3A, reference numeral 312 refers to the start of an illustrative ingestion process. Process 312 could operate on multiple sets of imagery, depicting the same or different regions, at the same or different times. The illustrative flow 312 will describe an example of ingesting a set of new imagery.

At a step 316, raw imagery 118A is modified to derive modified imagery if applicable. As previously mentioned, in some cases it might not be necessary to modify the imagery received at step 312. In other embodiments, raw imagery 118A might benefit from being modified according to an illustrative process as we will describe. We refer to the modified imagery as ingested imagery. An illustrative modification process 316 is shown by way of reference numerals 318-326. At a step 318, imagery 118A is resampled if applicable. This is one example of a way to deal with imagery at multiple resolutions. In one embodiment, imagery is resampled to a nominal resolution. As is almost always the case with the various processes described herein, these steps do not need to be performed in the order shown. Generally, some order must be shown in order to be able to discuss the various steps, but one should not draw from the order in which the different steps of the various processes of all the different flow charts appear that the steps need to appear in the order shown.

At a step 320, geometric distortions in the imagery are corrected. This geometric-correction process may be useful when the 3D topography of a geographic area causes distortions of the 2D pixel locations within the imagery. Thus, one way of facilitating the geometric-correction process of step 320 is to reference a set of information that describes elevation data, such as a Digital Elevation Model (DEM), that is associated with the geographic area. This data can be used along with other metadata, such as sensor-pointing geometry, to correct for geometric displacements in the pixels associated with the geographic area's topography. For example, a given hill might appear in a different image location in a first scene than in a second scene because the first scene was derived from a camera that took a picture of a hill at a first angle while the same hill that appears in the second scene was shot at a different angle. Because the hill has height, taking pictures of the hill at different angles might make the hill appear in different locations in the two scenes even though it has not changed at all. If the elevation aspects were not accounted for, then during the change detection process, false positives could be presented because our algorithms would detect change in imagery that does not reflect real-world change. It could show change when there actually was none. Thus, in one embodiment, pixel locations in the scene are relocated to correct for the 3D topography.

At a step 322 the imagery is re-projected. Re-projection includes re-projecting to a common coordinate system such as UTM, state plane, geographic (latitude/longitude), military-grid-reference systems, or any other coordinate system. The general idea is to re-project onto a coordinate system that is the same as the coordinate system that prior imagery is mapped to so that a good comparison can be made. Re-projection can also help mitigate the effects of a planet's curvature.

At a step 324, reflectance values are derived from the sensor's digital numbers (DNs) that represent the intensity of the pixels that make up the imagery. For many analysis techniques that utilize spectral data in the imagery, it is beneficial to convert the sensor DNs to reflectance before further processing. This is useful to correct for various sensor characteristics that cause fluctuations in the DNs that are not due to real-world changes in geographic area. For example, exposure settings can be part of the metadata associated with the imagery and the exposure level may vary between a first scene and a second scene. That is, exposure settings across imagery taken at different times might not be the same. In order to accommodate for this potential discrepancy, an illustrative solution is to convert pixel values to reflectance using sensor calibration information and other information from the image metadata. Then, the reflectance values may be used when comparing pixels in subsequent change detection procedures.

A result of completing process 316 includes producing ingested imagery 328. This ingested imagery, which we also refer to as modified imagery if it was modified, can serve as inputs to co-registration process 330 as well as feature-extraction process 332. As previously mentioned, we might use different reference numerals to refer to the same process. Thus co-registration process 330 might be the same as co-registration process 226 of FIG. 2. But by using unique reference numerals, it is easier to refer to the various components of the drawings.

Ingested imagery 328 can serve as input to co-registration process 330 if any or all portions of ingested imagery 328 overlaps with previously stored imagery. Or, in the case of an on-demand embodiment, two scenes can be compared in real time and, to the extent they are modified, can provide input to co-registration process 330.

Ingested imagery 328 might serve as input to feature-extraction process 332 if features are to be extracted at this time. As previously mentioned, region and/or pixel features can be extracted at this time. In one embodiment, region type features are extracted. That is, features associated at a region or tile level. This does not need to be done to the exclusion of extracting pixel-level features, which can also be done in one embodiment. That is, at this stage pixel-level features can be extracted from all imagery ingested irrespective of whether that imagery overlaps with previously stored imagery. Extracting pixel-level features at this stage would avoid having to extract the pixel-level features at a later stage. But if one desires to conserve storage space, then extracting pixel-level features can wait until a determination that overlapping imagery exists.

Figure 4A:
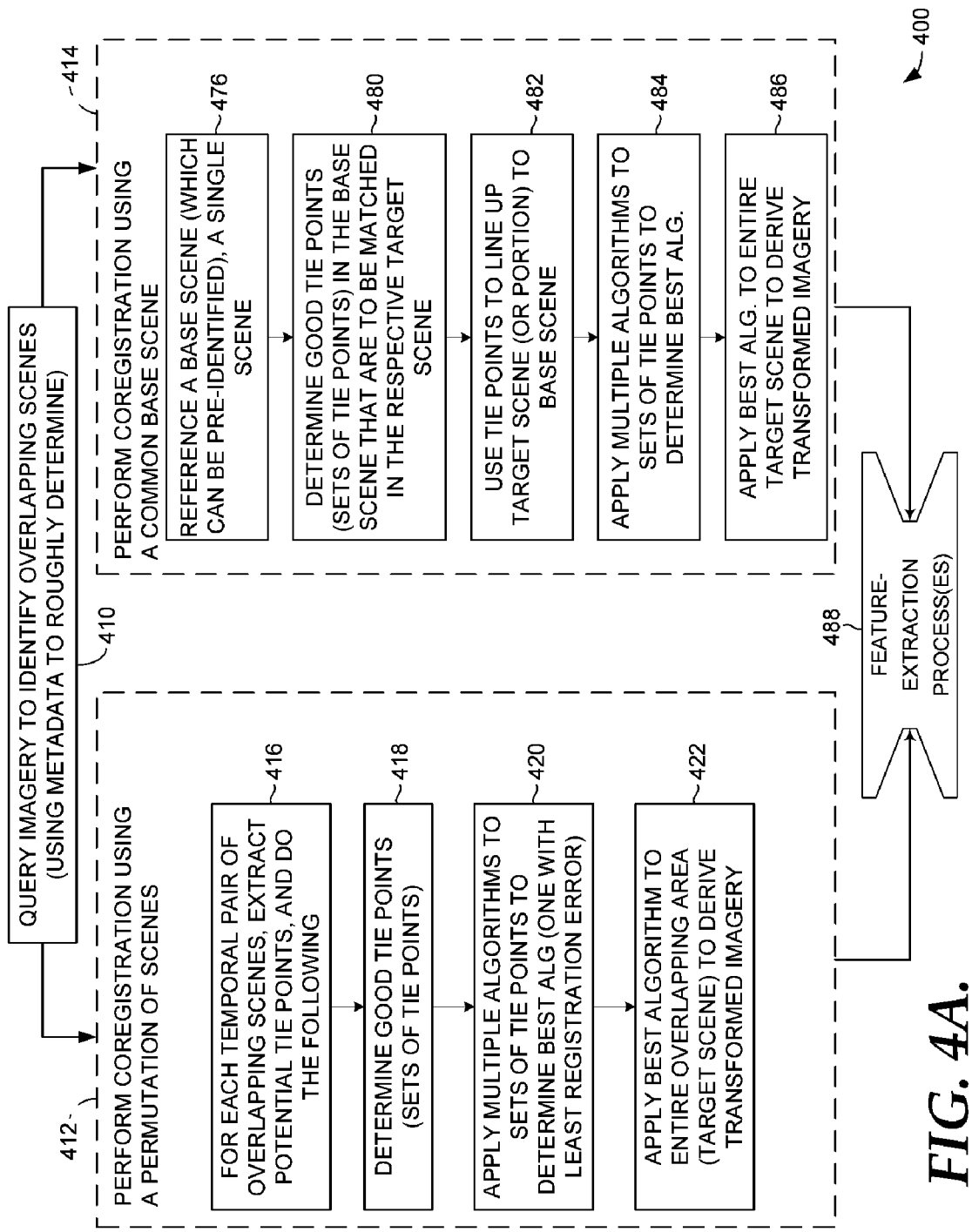
FIG. 4A depicts illustrative co-registration processes.

Turning now to FIG. 4A, an illustrative co-registration process is provided in reference generally by the numeral 400. At a step 410, imagery is queried to identify overlapping scenes. In one embodiment, metadata is used to roughly determine whether overlapping imagery exists. The imagery queried can be that stored in catalog 314 in one embodiment. Two illustrative processes for performing co-registration are provided in reference by numerals 412 and 414. As briefly mentioned, co-registration involves lining up images of a geographic region. To properly detect change, two images of the same area should be properly lined up so that corresponding pixels can be compared.

Consider a first image that depicts a given geographic area in a first state. If a second image depicts the same geographic area in a second state, then co-registration will result in the second image being lined up with the first image. We use the term "line up" loosely because what actually happens is that each pixel in a target image is run through a transformation algorithm so that it is mapped to a location that corresponds to a sister pixel in the source image. Thus one can think of co-registration as co-registering a target scene to a source scene. But a question arises as to what should serve as the base scene. In one embodiment, the base scene is simply the first image. This process is described by numeral 412. In a second embodiment, the base scene is some common scene that includes both scenes. This latter embodiment is illustrated by reference numeral 414. It might be the case that a common scene could be as large as the entire earth. That is, to the extent it is available, imagery that includes both scenes, or an entire set of scenes, can be used as a common reference image upon which to base a co-registration process for two or an entire set of scenes.

Turning to the process 412 for performing co-registration using a permutation of scenes, potential tie points are extracted for each temporal pair of overlapping scenes at a step 416. A temporal pair of overlapping scenes is made up of two scenes of the same geographic area taken at different times.

Tie points can be extracted using various methods. A first method that might be employed is a scale-space method that selects points with local minimum or maximum intensities that persist across different image scales. Other illustrative methods that might be employed include image cross-correlation, corner feature detection, and mutual information. Tie points are points selected in the images that will be used as reference pixels that, when lined up, will result in the entire images being more closely lined up. More technically, all image pixels in a target scene are subjected to a transform that alters their locations, thereby resulting in a target scene with pixels that properly, or at least approximately, correspond to matching pixels in the source scene.

At a step 418 we determine good tie points from the initial set of potential tie points. Not all tie points extracted in step 416 are as high a quality as others. The better the set of tie points, the more accurate the lining up of two images will be. We use several methods to determine the good set of tie points. In one illustrative method, we measure a pattern corresponding to the intensity variations of pixels surrounding each tie point. These patterns are compared between source and target tie points to find points whose patterns are a good match. Another illustrative way of determining good tie points is to calculate multiple instances of the same image transform, like global affine in one embodiment, from many individual subsets of the potential tie points. Parameters like x-translation and y-translation from the multiple global affine transforms can be analyzed to determine how well they agree. Good sets of tie points often produce similar transform parameters, while bad sets of tie points do not. Thus, in one embodiment bad tie points can be identified in this way and removed.

At a step 420, multiple transform algorithms are applied to determine which algorithm of the multiple algorithms should be used to transform the entire target image. The one with the least co-registration error will be used. Three illustrative transforms that can be employed include global affine, Delaunay triangulation, and thin-plate spline. Each of these algorithms can be applied using an initial subset of good tie points from step 418. The remaining good tie points, that is those not used in the calculating the transforms, are used to independently measure the resulting co-registration error. This is repeated many times using different sets of initial (used in the transform) and remaining tie points (not used in the transform) to statistically verify the co-registration error. The algorithm that generates the smallest statistically verified co-registration error is selected. This algorithm is then applied to the entire target scene at step 422 to derive transformed imagery.

Figure 4B:
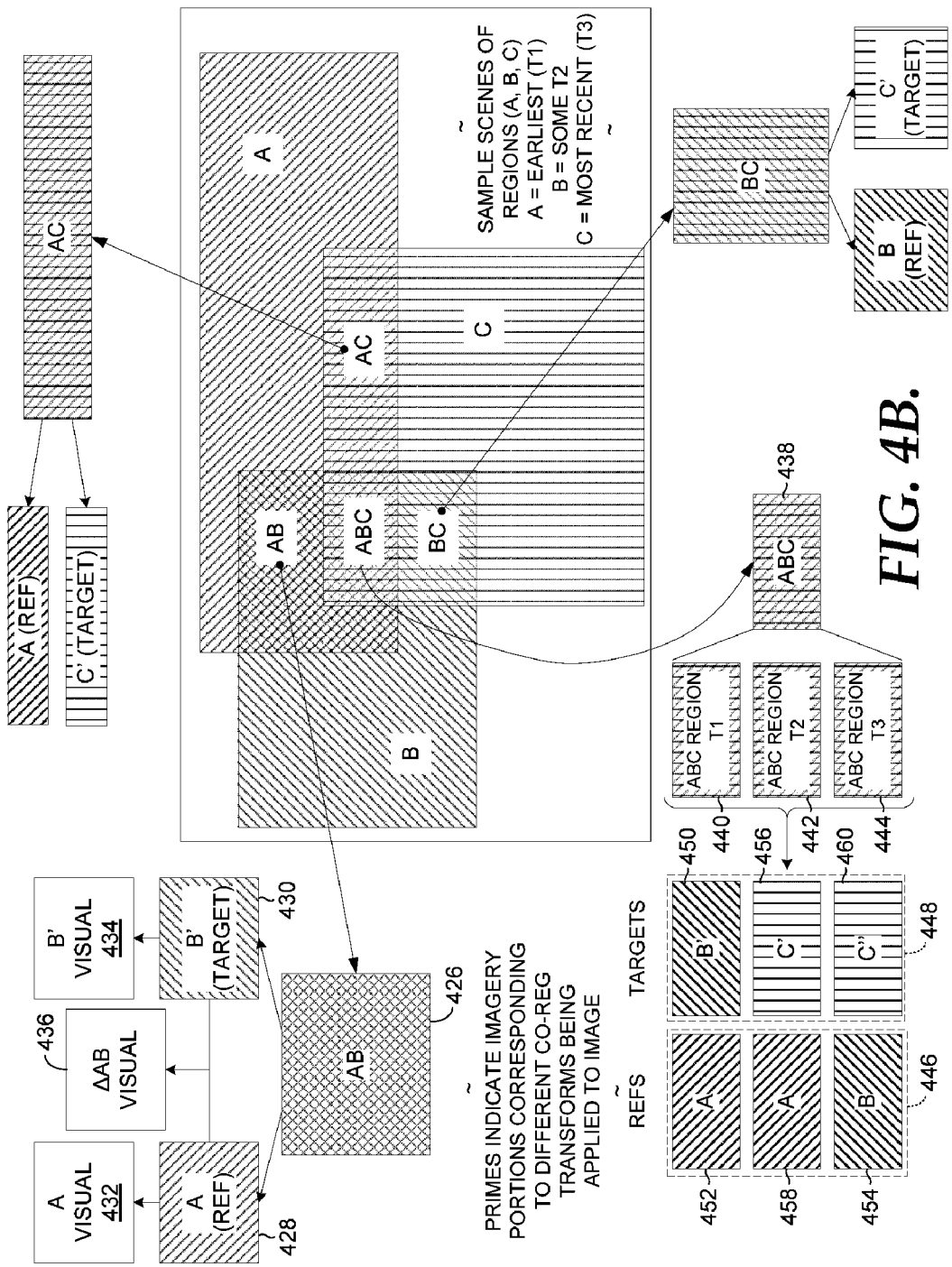
FIG. 4B depicts illustrative regions and corresponding imagery that are used to help explain an illustrative co-registration process.

We will return to FIG. 4A but now turn to FIG. 4B to describe the co-registration process in greater detail and give some examples. FIG. 4B depicts three illustrative scenes, each referenced by the separate letters A, B, and C. Three overlapping regions exist: AB, AC, and BC. Of those regions, one region is common to all three scenes: ABC. In this example, without loss of generality, assume that pictures of region A were taken earliest in time, then B, then C.

Imagery related to region AB is called out and referenced by numeral 426. The two constituent images that serve as a basis for comparing images of region AB include image A 428 and image B' 430. Image B' 430 is indicated as having been modified from its original state because it was subjected to a transformation algorithm so that it co-registered with image A 428. As previously mentioned, imagery such as 428 and 430 might have information in it that prevents it from being ideal to display in its native format. In embodiments where the imagery is desired to be presented in a way that humans can view it in a more visually appearing manner, what we are referring to as "visualization imagery" is created. Thus, visualization image 432 is a pretty picture of image 428, and visualization image 434 is a pretty picture of image 430. Although we have not yet described our change-detection processes, after those change-detection processes have been applied to corresponding scene pairs, change-visualization imagery can also be created. Change-visualization imagery is imagery that depicts change across two scene pairs. We describe that here as ΔAB visual 436.

We show another example in connection with region ABC 438. In this example, we have an image of the ABC region taken at a first time, which is referenced by numeral 440, an image 442 of the same region taken at a second time, as well as a third image 444 of the same region taken at still a different time. If it is desired to be able to present change information associated with all of the different variations of the geographic area at all of the various times for which we have seen information, then co-registration will occur for each combination. But as mentioned, the question arises as to what should serve as the base image for performing co-registration. The example that we are in the middle of describing contemplates the method of 412, which is illustrated here. Three reference images are used and three target images are used. The reference images are indicated by numeral 446 and the target images are referenced by numeral 448. Note that in this example, the reference images do not have primes, meaning they have not been subject to a transformation. But the target images 448 do have primes, indicating that they have been subject to a transformation by way of being co-registered with each respective reference image. For example, image B' 450 has been subjected to a co-registration process in which its original pixels were transformed based on reference image A 452. But image B' 450 is not the same as image B 454 because, as mentioned, image B' 450 has been transformed, whereas image B 454 has not.

By way of another example, consider image C' 456. It is labeled as having one prime because it has been transformed to be co-registered with reference image A 458. But image C' 456 is different than image C" 460 because image 460 was not transformed by the same reference image. That is, C" was derived from a transformation applied to it based on image B 454, as opposed to image A 458. In this example, image A 452 and image A 458 are the same image since it serves as the reference image for both B' 450 and C' 456.

Figure 4C:
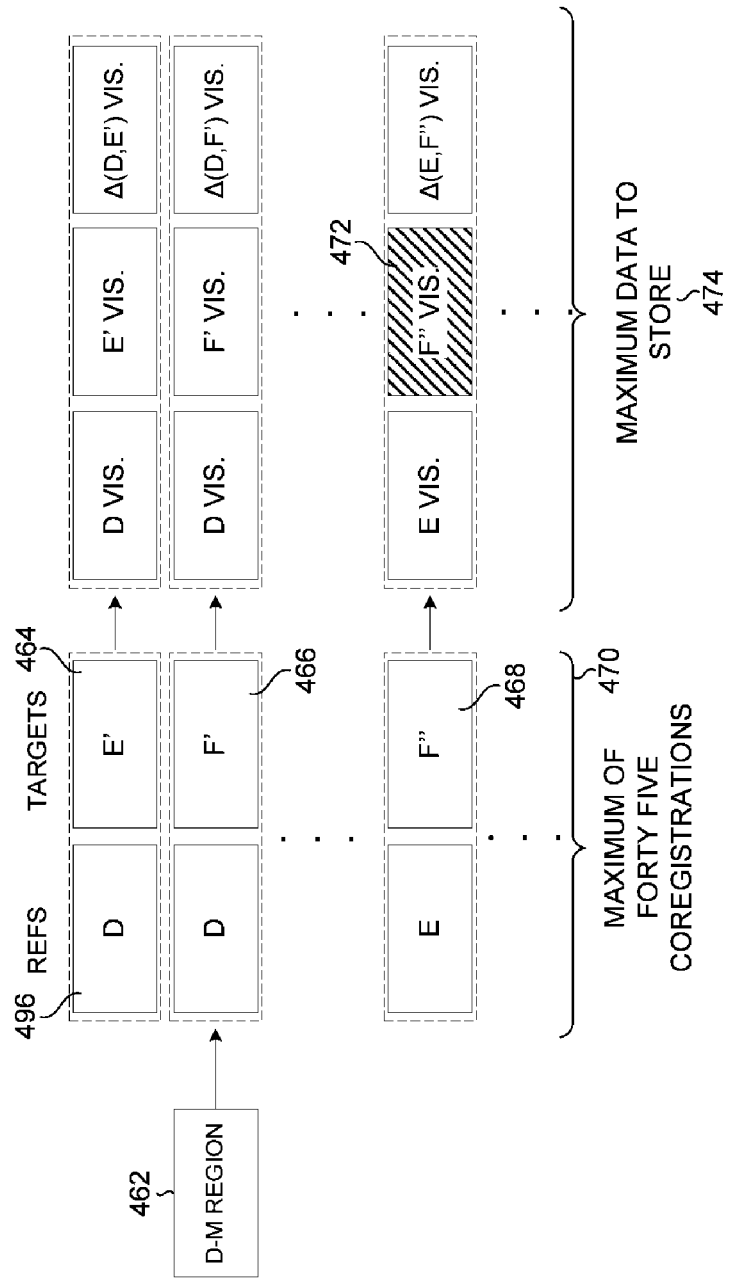
FIG. 4C depicts aspects of a co-registration process that co-registers various scenes with each other.

Pressing this example further, we turn to FIG. 4C, which depicts an example of ten scenes that all overlap a common region, which is referred to as the D-M region 462. Without going through every permutation, they illustratively show that image E needs to be co-registered to image D, resulting in E' 464; image F needs to be co-registered with image D, resulting in F' 466; and then every other image greater than the prior will need to be co-registered as well. For example, scene F will need to be co-registered with region E, which will result in image 468 F", which is different than F' 466. Herein lies an issue. As indicated, a maximum of forty-five co-registrations will need to be made if it is desired to be able to depict change across all permutations in this embodiment. The forty-five registrations are shown by brace 470. Moreover, arguably extra visualization imagery will need to be created and stored. For example, visualization imagery that corresponds to F" 468 will need to be created, and this is depicted by numeral 472, which represents a visualization image corresponding to F" 468. The maximum data to store 474 would be all of that data that makes up the visualization imagery across all permutations of combinations of scenes of a given geographic area taken at various times.

Figure 4D:
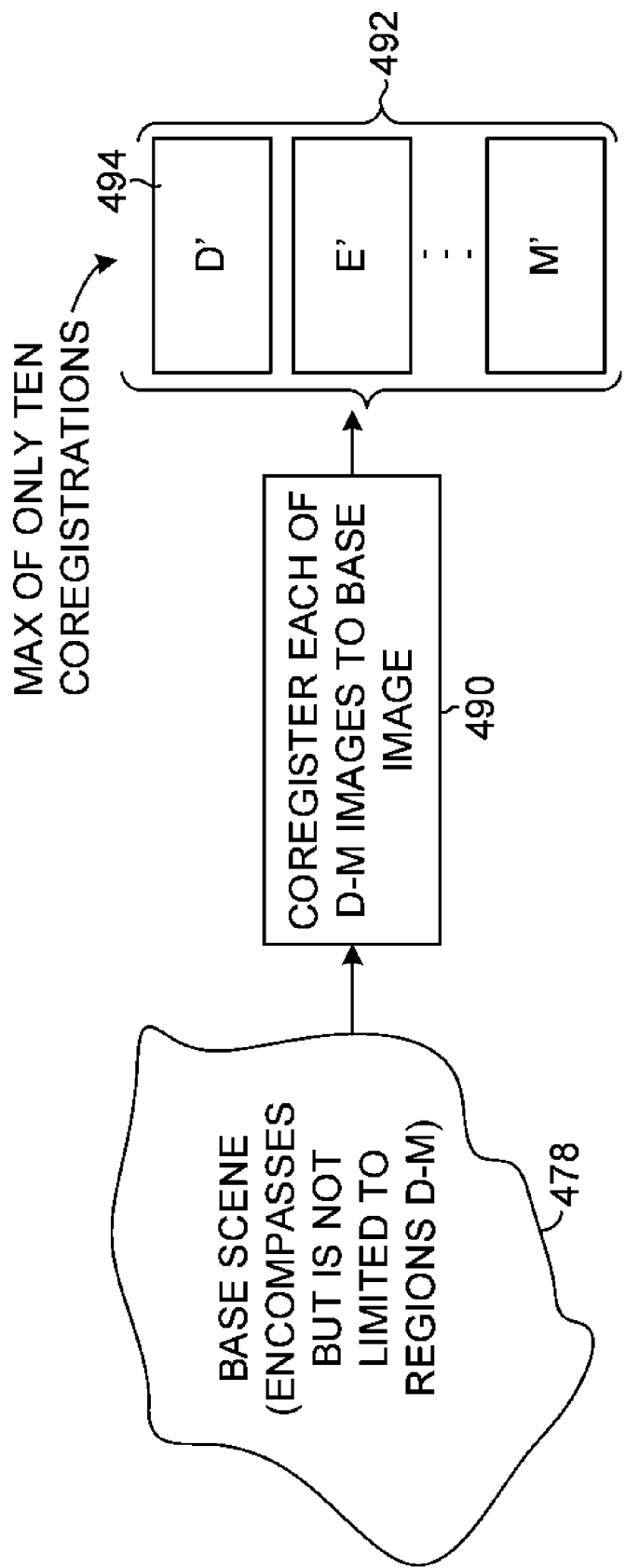
FIG. 4D depicts a co-registration process where images are co-registered to a common base scene.

Now returning back to FIG. 4A, and with reference to numeral 414, an alternative process is described in which co-registration is performed using a common base scene. At a step 476, reference is made to a base scene, which can be pre-identified. This is a single scene. We will describe this example in connection with FIG. 4D. An illustrative base scene is referred to by numeral 478. Again, this base scene encompasses but is not limited to all the regions D-M, which were introduced in FIG. 4C. By way of illustration, a base scene might be a scene that depicts the United States, wherein regions D through M represent ten images taken of the State of Missouri at ten different times. Returning to FIG. 4A, a determination of good tie points is made at a step 480. These tie points form tie-point pairs between the base scene and a given target scene to be transformed, or co-registered with. These tie points are used at a step 482 to line up the target scene to the base scene. If applicable, only a portion is utilized. As was the case with step 422, multiple algorithms are applied to the sets of tie points at a step 484 to determine the best algorithm that should be applied to the entire target scene, which occurs at a step 486. Incident to step 486, that target scene is subject to the transformation algorithm derived from step 484, resulting in a transformed target scene. Processing will then advance to feature-extraction process 488.

Returning to FIG. 4D, using base scene 478, each of D-M images is co-registered to the base image at a step 490. This results in a set of transformed images 492. Note that each image includes only a single prime. That is, image D' 494 is only a single prime, indicating that it has been transformed from its original image, which, is indicated in FIG. 4C by referencing image 496. An advantage here is that the maximum number of co-registrations necessary will correspond to the maximum number of corresponding temporal scenes. Here, there were ten scenes: D-M. Thus, in this embodiment, there is a maximum of only ten co-registrations that are needed as opposed to the forty-five (N(N−1)/2 where N=10) co-registrations that were necessary in FIG. 4C, which was the method of process 412 depicted in FIG. 4A. The process depicted by numeral 414 in FIG. 4A, which is briefly depicted in FIG. 4D, conveys that much less visualization imagery will need to be stored because fewer co-registrations are performed, resulting in fewer "after" visualization images being needed.

Some embodiments employ method 412, while others employ method 414. If a base image such as base image 478 is not available, then method 412 can certainly be used. If an image such as base image 478 is available, then a method such as process 414 can be employed.

Figure 5A:
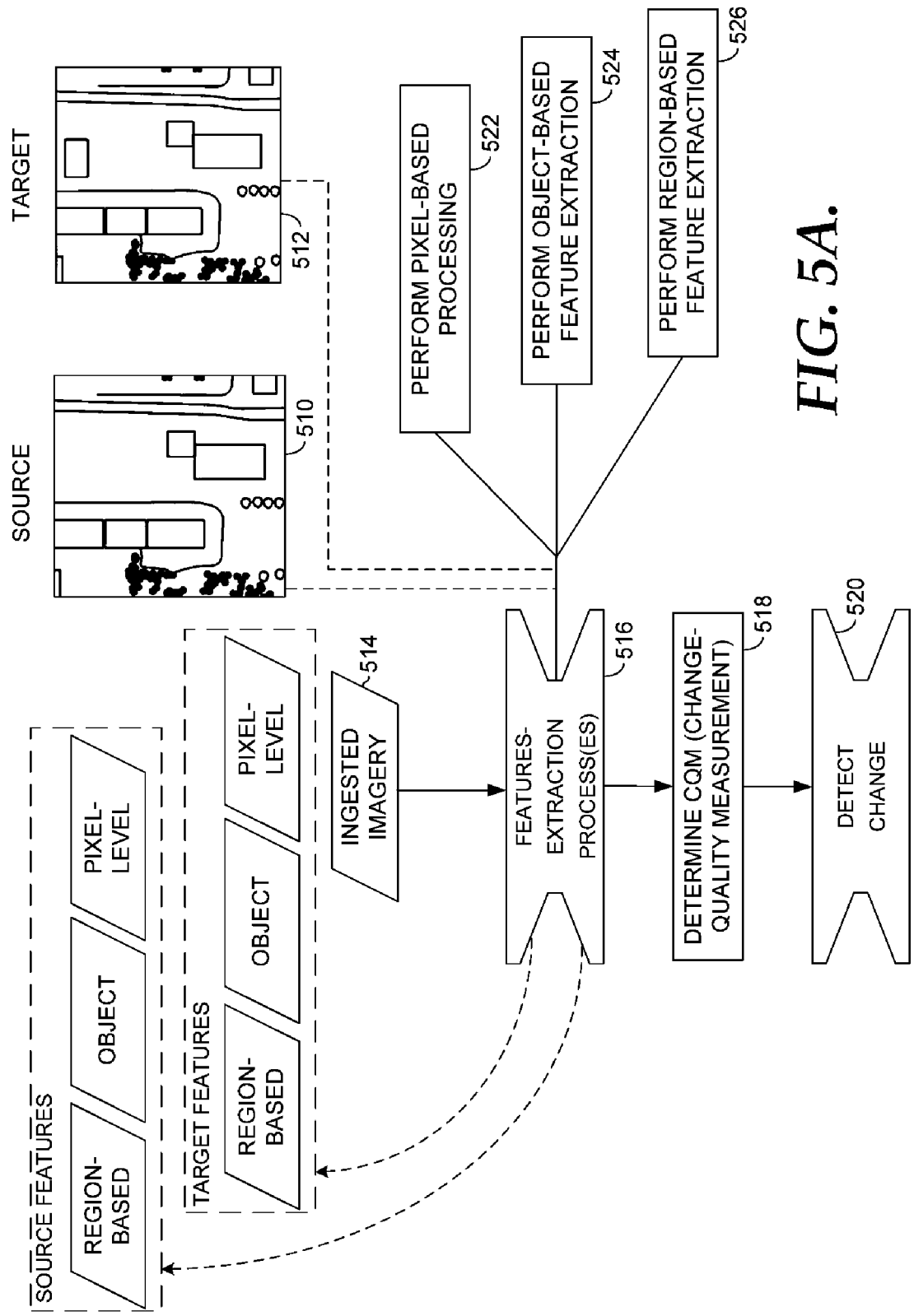
FIGS. 5A-5D depict illustrative processes of extracting features from imagery.

As mentioned, processing advances to a feature-extraction process in one embodiment. Turning to FIG. 5A, we introduce an illustrative feature-extraction process. To discuss this illustrative process with some context, we will make reference to a source scene 510 as well as a target scene 512. We will discuss extracting features from one or both of these scenes. As illustratively shown, ingested imagery 514 can serve as an input to one or more feature-extraction processes 516. As part of this process or as a separate process, a change quality measurement ("CQM") is determined at a step 518. Processing then advances to a change detection process 520.

Returning to feature-extraction process 516, we indicate that such a process might be made up of one or more processes including, for example, performing pixel-based processing at a step 522, performing object-based feature extraction at a step 524, and performing region-based feature extraction at a step 526. Again, these processes are not defined by bright lines, and might be known as other names, and are not constrained to the examples that we show. We will turn our attention to an illustrative pixel-based processing algorithm with reference to FIG. 5B. What we refer to as pixel-based processing is circumscribed by dashed line 528. Process 528 optionally includes calculating an NDVI value in 530, which relates to a vegetation index value. This example does not have to be done (not that others have to), but doing so produces a mask to determine what pixels are associated with a type of feature, such as vegetation. In one embodiment, the NDVI is derived by taking a ratio of the red and near-infrared bands.

Returning to features-extraction process 516, we indicate that such a process might be made up of one or more processes including, for example, performing pixel-based processing out of step 522, performing object-based feature extraction out of step 524, and performing region-based feature extraction out of step 526. Again, these processes are not defined by bright lines, and might be known by other names, and are not constrained to those that we show. We will turn our attention to an illustrative pixel-based processing algorithm with reference to FIG. 5B. What we refer to as pixel-based processing is circumscribed by dashed line 528. Process 528 optionally includes calculating an NDVI value, which relates to a vegetation index value. This does not have to be done (not that others have to), but by doing so we are able to threshold these NDVI values to produce a mask to determine what pixels are likely associated with vegetation and which are not. This information can be used, in one embodiment, to eliminate or reduce the contribution of these vegetation pixels to any change detection process. This may be useful to minimize the influence of agriculture or other seasonal vegetation changes when trying to detect other types of change like new construction. In one embodiment, the NDVI is defined by a function that uses the red and near-infrared band data.

Thus, the NDVI is calculated at a step 530 and a blurring option can be applied at a step 532 if desired. Performing what we refer to as a blur helps eliminate noise, things like cars on a road or patches on a road. These are illustrative micro discontinuities that might cause an algorithm to prematurely stop because the algorithm might recognize a micro discontinuity (such as a car on a road), as an indication of the end of a feature such as a linear feature, rather than a blip on a linear feature. Thus, as we will explain later, some of our algorithms employed are used to detect linear features. One aspect of calculating a linear feature is to determine where the linear feature starts and stops. Applying this blur technique prevents an algorithm employed from thinking that the road stops where the car starts. Applying this blur component helps the system disregard the car as a discontinuity in the road.

At a step 534 spectral features are extracted, resulting in a set of spectral features 536 being derived. When we make reference to "spectral" features we are generally referring to aspects of color or other aspects of spectrum. Accordingly, at a pixel level, in one embodiment, we analyze multi-band images and derive features associated with red, green, blue, near-infrared, black and white (panchromatic) values. In another embodiment, alternate color spaces could be used such as HSV, HSL, or CMYK. In some embodiments, the NDVI value is also derived or modified in connection with performing spectral analysis. As will be explained, these features such as spectral features 536 can be stored at a step 538 and used as an input to the change-detection process 540.

At a step 542, a co-occurrence textural analysis is performed. This is an example of a combined spatial-spectral pixel analysis. In one embodiment, a set of spectral co-occurrence matrices are generated for various angles using a particular pixel spatial offset. Co-occurrence texture measures are then computed from these matrices. Multiple pixel spatial offsets may be used to generate different sets of co-occurrence matrices. This textural analysis can be performed over various image partitions, such as regions or specific objects in the imagery. This texture analysis captures various measures of a region's spectral characteristics, as well as the spatial structure of the spectral intensities. Regarding textural analysis, note that a calm pond has a higher homogeneity texture measure whereas a forest has a high entropy measure and a low homogeneity measure. We may also compute correlation, skewness, energy, contrast, etc., that can be used to determine texture. Eventually, textural features 546 will be derived which represent the spatial-spectral characteristics of a particular area within the imagery. This area may be a region, an object, or a particular pixel's neighborhood.

Regarding performing occurrence textural analysis 544, we consider a pixel and move a window, passing it over all the pixels in the image. From the pixels under this window we compute occurrence texture measures on a per pixel basis. One of ordinary skill in the art may refer occurrence texture analysis by other names, such as spectral histogram derived texture. These per-pixel measurements characterize the spectral statistics of each pixel's neighborhood, as defined by the window. Illustrative textural measurements include entropy as measure of the randomness of the spectral intensities within the neighborhood of a pixel, as well as skewness of the spectral distribution (measured as the third order moment of the neighborhood spectral probabilities). Illustrative window sizes include 5×5 and 11×11 pixels for example. These occurrence texture measures could also be included in textural features 546.

At a step 548 linear features 550 are extracted. Illustrative linear features include length, width, and angle measurements. One method for performing linear analysis at step 548 includes considering a pixel, and searching outward in many radial directions (such as 18 directions, like a star burst) and comparing how similar the pixels along a given axis are to the center pixel. Abrupt change in pixel spectral characteristics is looked for. Where there is little or no change, pixel spectral correlation will be higher. Then, a determination is made as to which radial provided the maximum length of correlated pixels. We also utilize the minimum length as a width. The length might be one measure, for example, quantifying whether a pixel belongs to a linear feature. Again, length might be a maximum number of correlated pixels; whereas width might be a minimum number correlated. We also derive angular measurements of the maximum and minimum lengths a pixel. This captures a description of such imagery characteristics as roads being at zero degrees versus ninety degrees. Analysis of the relationship between the maximum and minimum lengths, as well as their angles, provides structural information about an area of imagery. Illustrative examples include the linear structures found in city road networks (grids) compared to highway interchanges. To clarify, we do not consider the width of a pixel to be the correlation length measure at 90 degrees from the maximum length. The minimum length may be found at 45 degrees from the maximum length, an illustrative example being pixels in the center of a road intersection.

In one embodiment, a differential morphological profile (DMP) is also created in a step 552. The DMP is an illustrative method that can be used to efficiently perform image segmentation, which basically divides an image into many segments where each segment or object is comprised of a group of spatially connected pixels. The DMP uses the morphological image operations opening and/or closing by reconstruction to identify pixel groups that contrast with their surrounding background by using structuring elements (or windows) of various sizes. This can be done with structuring elements of different sizes to determine the approximate scale of the pixel groups. The DMP is iteratively constructed by applying a series of structuring elements and storing in each level of the profile spatially connected pixels detected at the current scale that were not detected at the previous scale. This will be used in connection with extracting objects, which occurs at a step 554.

An object can be an item within a geographic area or, based on our usage herein, can be a geographic area itself. We will now describe it in the context of being an item within a geographic area. When used in this context, an object is a collection of pixels that are deemed to be part of a thing. For example, an object might be a building, or an airplane, or a baseball diamond. Utilizing the results of the DMP 552 is merely one method for determining objects. Other methods include a host of segmentation algorithms to perform object extraction. In one embodiment, each scale of the DMP can be thresholded at some value such that only pixels with values higher than the threshold remain "on" in a binary image. A connected components algorithm can be applied to the resulting images in order to identify individual objects. After this, each component in the image can be treated as an individual object.

Figure 5B:
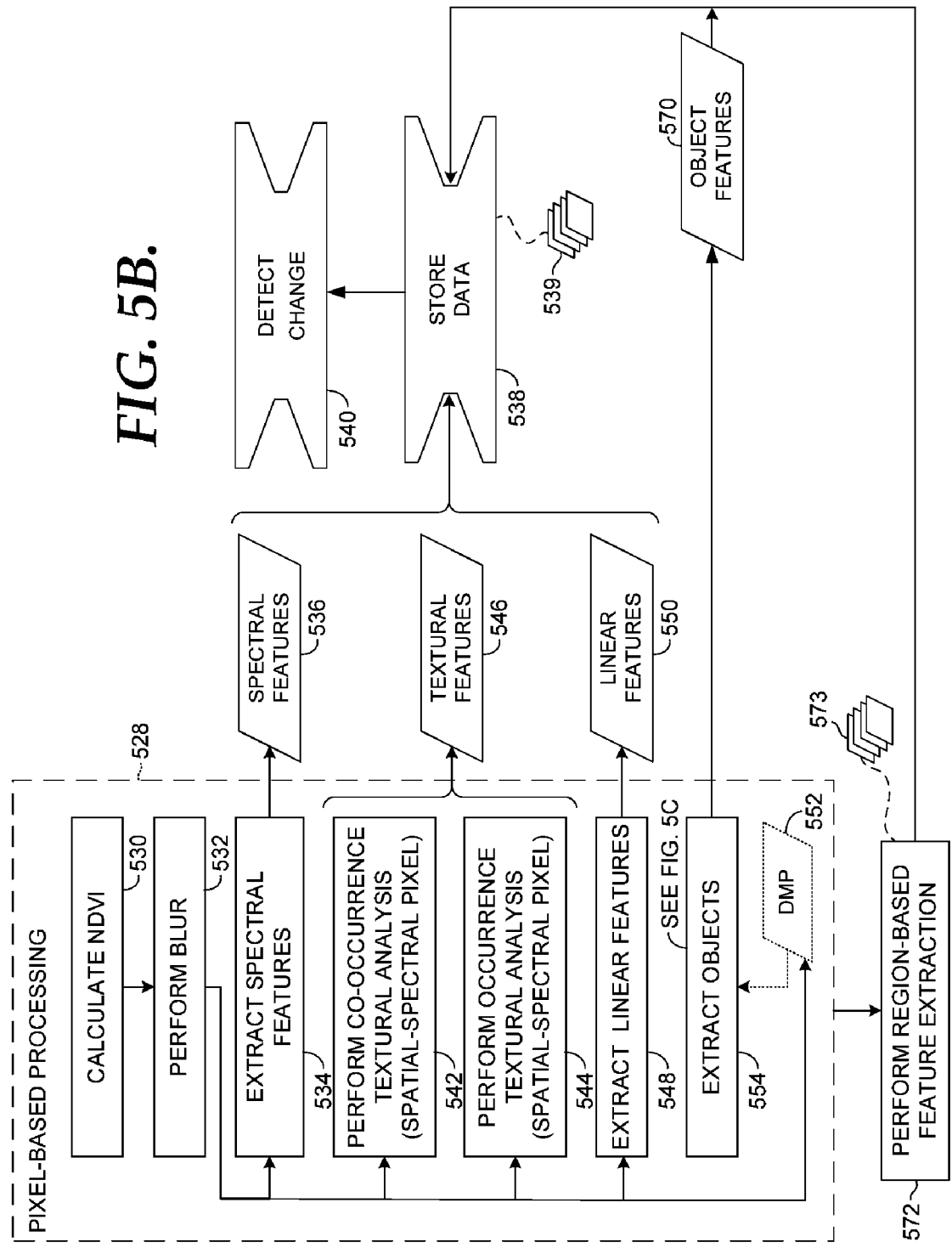
Figure 5C:
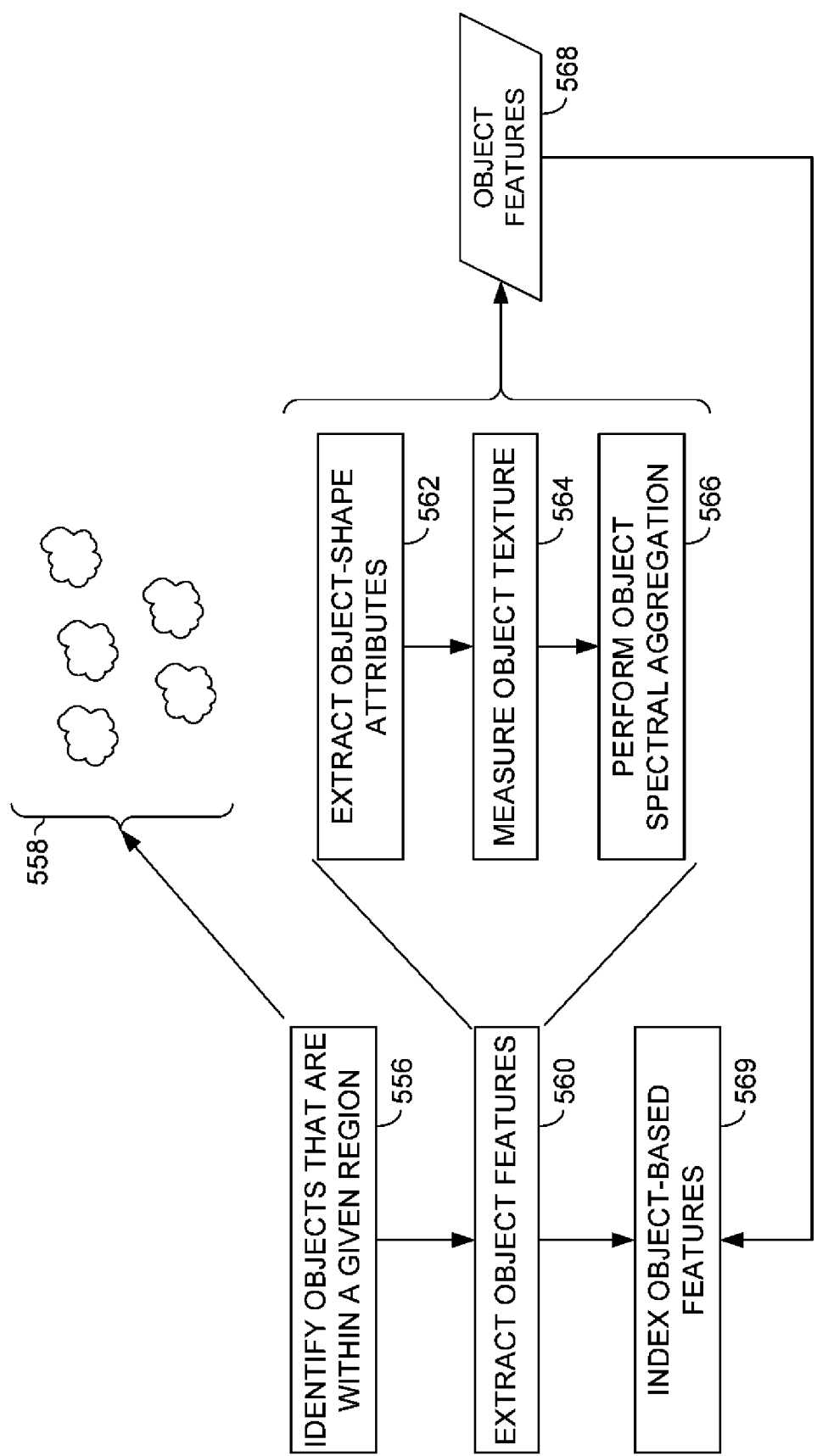

Turning to FIG. 5C, an illustrative method for extracting objects is provided. At a step 556, the objects are identified that are within a given region. These objects are referenced by 558. At a step 560, object features are extracted. One embodiment of this method includes extracting object-shape attributes at a step 562. One method of performing this includes aligning an object on a principal axis and then rescaling it to a common size. For example, an airplane can be determined to have a certain principal axis and then rotated so that our algorithms become insensitive to orientation because the objects are all aligned along a common principal axis orientation. One embodiment also includes rescaling the objects to a common size wherein the image is rescaled to a consistent size or some common size. We index the result, which takes the form of a binary rescaled image representation of objects extracted from the imagery at different scales.

At a step 564, object texture is measured. This can happen in a manner similar to that described in connection with processes 542 and 544. Object spectral aggregation occurs at a step 566. This process is also similar to the process previously mentioned in connection with step 534.

The fruit of extracting object features at step 560 includes object features, which are referenced by 568, which are then indexed out of step 569. Returning to FIG. 5B, we show that object features 570 are stored in step 538, and can also be a source for the change detection process 540. Another feature of objects that can be extracted include features related to an object's shape. Shape features are captured to allow comparison of the shape of an object to other objects in the database. Shape can be represented in numerous ways, an illustrative example is to encode the shape as a bitmap. This can be accomplished by reducing the size of an object to fit it into a predetermined reference grid. Then, grid elements that the shape overlaps are set as on, creating a solid representation. Further details of encoding object shapes as bitmaps can be found in Chapter 7 of the aforementioned '955 Provisional Application (filed on Oct. 16, 2008), which is expressly incorporated by reference herein. Other illustrative representations may include shape contours or derived skeletons, as well as higher-level shape measures such as compactness, size, or others.

Figure 5D:
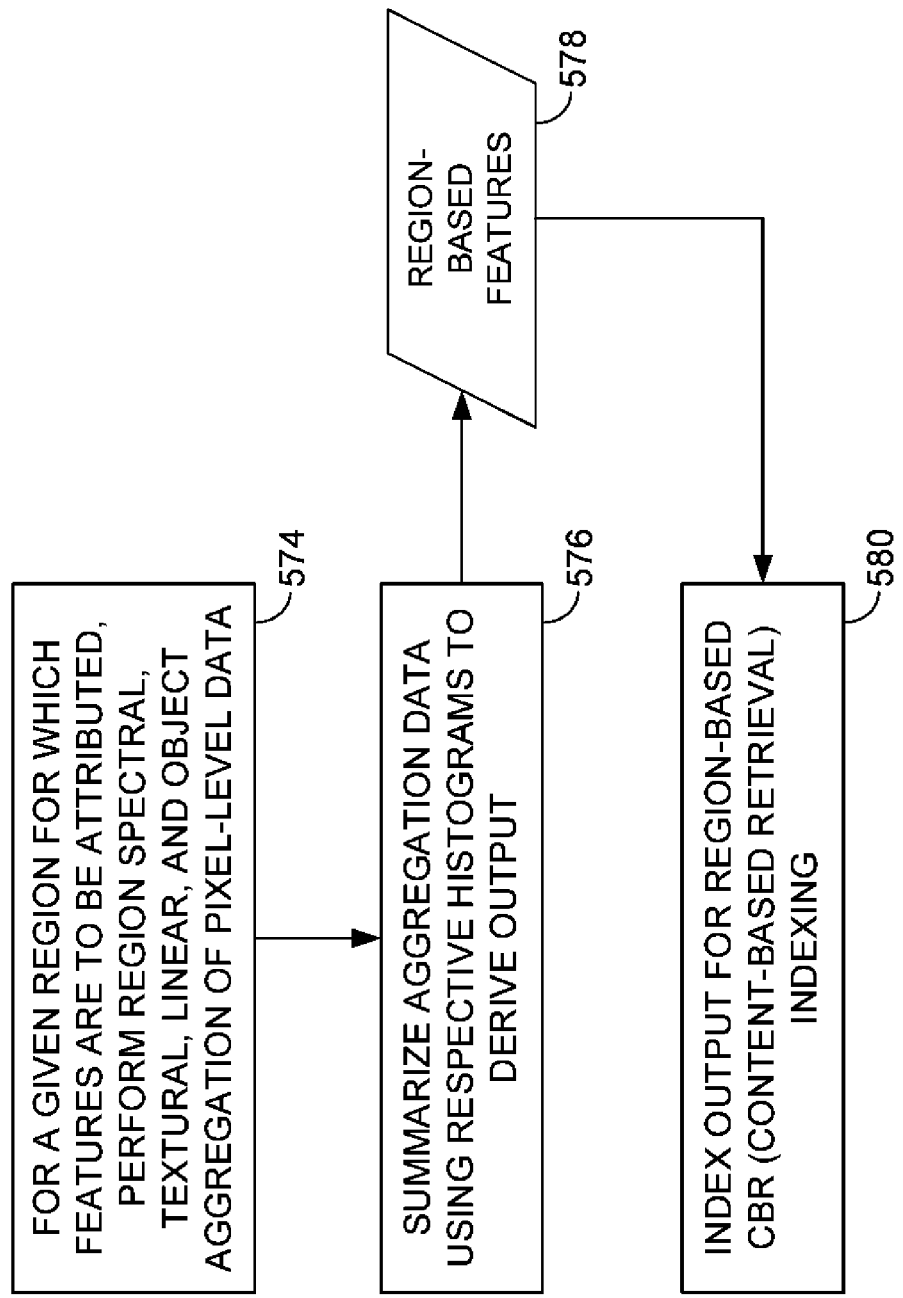

With continued reference to FIG. 5B, region-based feature extraction occurs at a step 572, which is shown in greater detail in FIG. 5D. A set of aggregated region vectors 573 is shown in connection with 572. Turning now to FIG. 5D, for a given region, spectral, textural, linear, and object aggregation of pixel-level data occurs. Thus, features that were previously gathered in steps such as step 534, 542, 544, 548 and 554 (which occur at the pixel level) are aggregated to derive region-based features at a step 574. In one embodiment, this aggregation data is summarized using respective histograms to derive output at a step 576, resulting in a set of region-based features 578. Histograms are just one illustrative example of numerous possible aggregation techniques. Other techniques may be employed where appropriate. Another illustrative example is that linear pixel-level features are aggregated into separate histograms for the angular direction of the maximum run-length; the ratio of minimum to maximum run-lengths; and also a histogram capturing the various angles between the maximum run-length angle and the minimum run-length angle. In one embodiment, multiple histograms and some single value aggregates, such as an average maximum run-length, may be combined into a region-based feature vector 578. These are indexed at a step 580 so that they can be used to facilitate retrieval of information that is sought based on those features. In one embodiment, feature extraction operates across an entire scene, so there is no problem of objects or linear structures splitting across tiles.

Briefly returning to FIG. 5B, an output of the feature extraction process includes a set of feature vectors 539. In one embodiment, these feature vectors describe features associated with each pixel. In another embodiment, these feature vectors describe a region or object within the imagery.

Figures 5E, 5F:
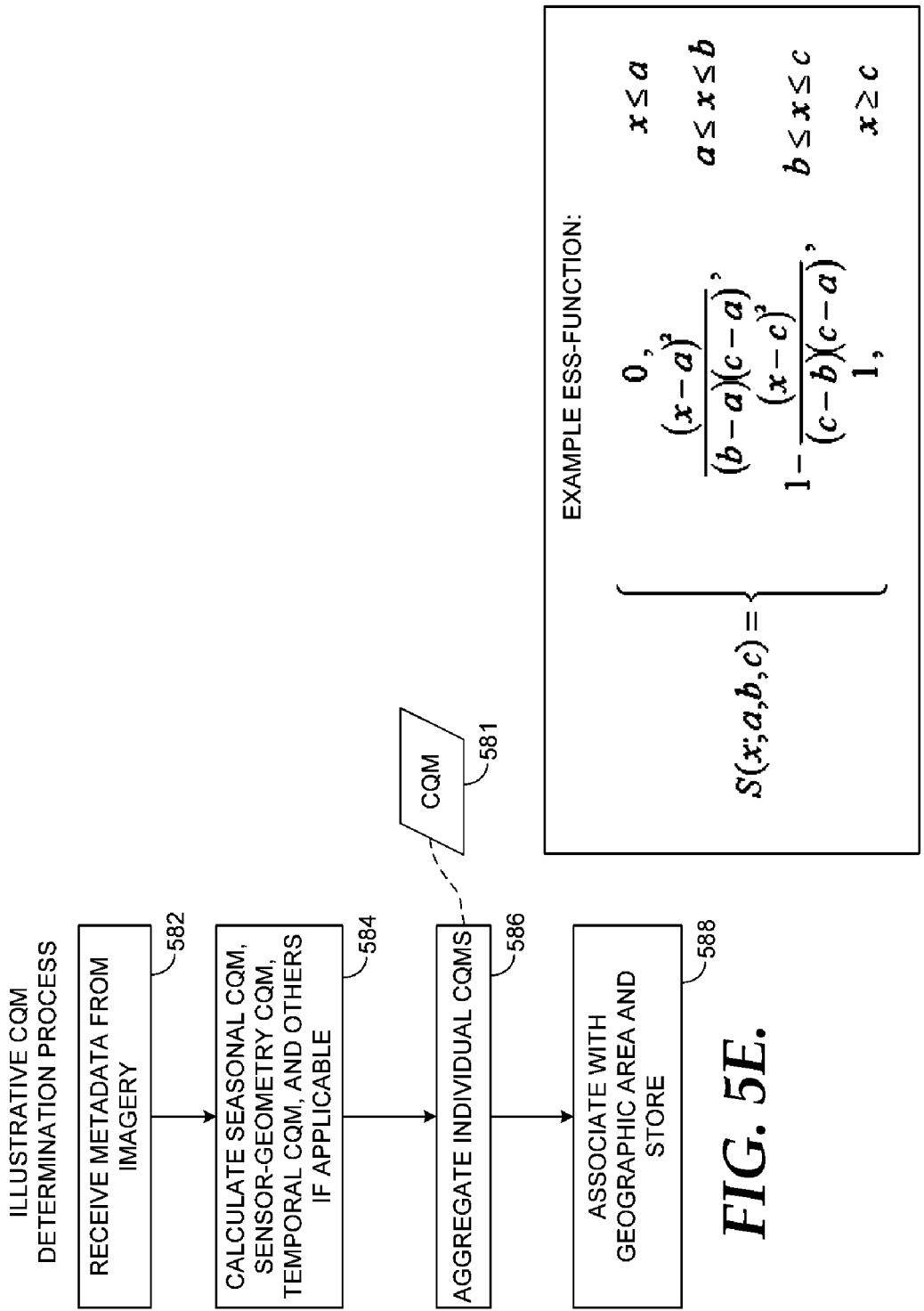

Returning to FIG. 5A, we mention that in one embodiment, a change-quality measurement, CQM, is derived at a step 518. This can be the same CQM as that mentioned in FIG. 2 by reference 240, which we will continue to reference. FIGS. 5E-5G depict aspects of deriving CQM 240. At a high level, CQM 240 quantifies a suitability for comparison of the set of comparison scenes. In some embodiments this might take the form of ascertaining the suitability of comparing current remotely sensed imagery to previously stored remotely sensed imagery. If we were explaining this in the context of FIG. 2, CQM 240 would quantify a suitability to compare target scene 220 with reference scene 218. When we speak of a suitability for comparing two scenes we are commenting on determining a likelihood that any change ultimately detected between two comparison scenes is the type of change that is sought by someone seeking change information.

By way of example, factors that tend to affect CQM 240 include a similarity of times of day that the comparison scenes were taken. For example, if two scenes were taken at the same time of the same day, then aspects such as shadows should be similar across the scenes. Thus, taking into account the times of day that each scene was captured is an input into deriving CQM 240. Another consideration is the similarity of sensor-pointing geometries. If a first scene captured by a camera taken at a certain angle, is being compared to a second scene that was taken with a camera at a similar angle, then such would tend to indicate a higher suitability that the two images could be compared with each other. Another data input that goes into deriving CQM 240 might be any factor that indicates a likelihood of seasonal differences being responsible for image differences. Consider some geographic area. Comparing an image of that area taken during the winter would be less suitable for comparing that image to one that was taken during the summer because snowfall might be a factor. But even if snowfall were present, at least if the two images were taken on the same day of the year, then such might indicate a higher suitability of comparison. Thus, taking into account the Julian day of the year that each image was captured is an input into deriving CQM 240.

In addition, latitude could be another factor indicating the likelihood of seasonal variations because certain geographic areas do not tend to experience wide seasonal differences. For example, a desert environment is often always a desert and the Sahara Desert, for example, includes portions that are situated at a certain latitude, and by virtue of that latitude, a determination can be made as to the extent that comparing two images of a geographic area at that latitude is proper. On the other hand, a latitude that lies farther away from the equator might generally be more susceptible to seasonal differences. Therefore, a latitude measurement in its own right can be a factor used in determining CQM 240.

Sun-aspect geometry can also affect CQM 240. That is, different geometries associated with the sun reflecting off a geographic area can tend to produce undesirable change detection results. Sun-aspect geometry is related to season as well as time of day, so this is yet another useful factor that can be used in determining CQM 240.

With reference to FIG. 5E, an illustrative process for determining a change-quality measurement (which is referenced by 581 for convenience) is provided. At a step 582, metadata is received from the imagery. In one embodiment, imagery is received from catalog 314 shown in FIG. 3B. Many of the features discussed are found in the metadata of applicable imagery. For example, metadata 122A includes a latitude indication, a time of year, a time of day, sensor-pointing geometries, and the like. Based on these inputs, at a step 584, constituent CQMs are calculated including a seasonal CQM, a sensor-geometry CQM, a temporal CQM, and others if applicable. Constituent change-quality measures do not need to be computed, but are done so in one embodiment. The individual CQMs are aggregated at a step 586 to produce CQM 581, which is associated in 588 with some pair of images in a geographic area and stored. Thus, a geographic area might be associated with multiple CQMs. Generally, a change-quality measurement will exist for any two scene pairs that reflect some common geographic area. This is useful in that it enables a user to search for imagery in dataset 252 that has, is above, or is below some given CQM. Thus, in some embodiments this query can be run with a single constraint; namely, CQM 581.

To recapitulate, in one embodiment, a low CQM value indicates a high probability that there will be false-positive change detections due to undesirable effects arising from differences in the types of values that we have discussed (e.g., time of day, Julian day of year, sensor-pointing geometry, etc.). Illustrative time of day values include 0-1440 minutes, Julian day of year can be 1-366 days, illustrative latitudes can be −90 to 90 degrees, illustrative sensor elevation angles can be 0 to 90 degrees, and illustrative sensor azimuth angles can be 0-360 degrees for example. In one embodiment, a membership function is used for computing normalized (e.g., 0-1) quantities for each component of the CQM. By way of illustration, an "ESS-function" can be employed, an example of which is shown in FIG. 5F.

FIG. 5G depicts illustrative pseudocode that shows the various items described as inputs to a function 590, and illustrative pseudocode variable definitions 590A. Based on application of the above, the quality of change-detection results decreases as the time separation between image acquisition data (delta days) approaches half of a year. This seasonal component depends on latitude where lower latitudes will have less seasonal variation and a higher quality metric. Of course, there might still be seasonal variations even at the equator, due to, for example, seasonal variations in rainfall patterns (wet vs. dry seasons) or other climatological conditions that cause spectral variations to occur in vegetated areas.

In an alternative embodiment, a more robust seasonal CQM could be derived from a global analysis of the seasonal variation in the earth's spectral signature. This data could be derived from satellites employed by agencies such as NASA such as MODIS and LANDSAT.

Regarding the geometry CQM, the quality of change-detection results decreases as the difference between sensor azimuth angles approaches 180° (opposite looking directions). This directional difference is relevant in that undesirable differences between two scenes will result due to geometric displacement in the 2D images of 3D objections (buildings, hills, etc.) and their corresponding shadows. The effect of the azimuth differences is diminished when the sensor elevation angle approaches 90°, which is when the sensor is looking straight down, sometimes called the "NADIR" look-at angle.

Regarding the temporal change-quality measure, the quality of change-detection results tend to decrease as the difference in image acquisition time of day (delta time) increases. This will generally have little effect on most satellite-based imaging systems because they tend to be sun-synchronous and will pass over the same location on the earth at the same time of each day. However, the temporal CQM metric is useful when dealing with remotely sensed imagery from airborne platforms (e.g., airplanes, UAVs) which acquire images at all times of the day, including nighttimes.

Figure 6A:
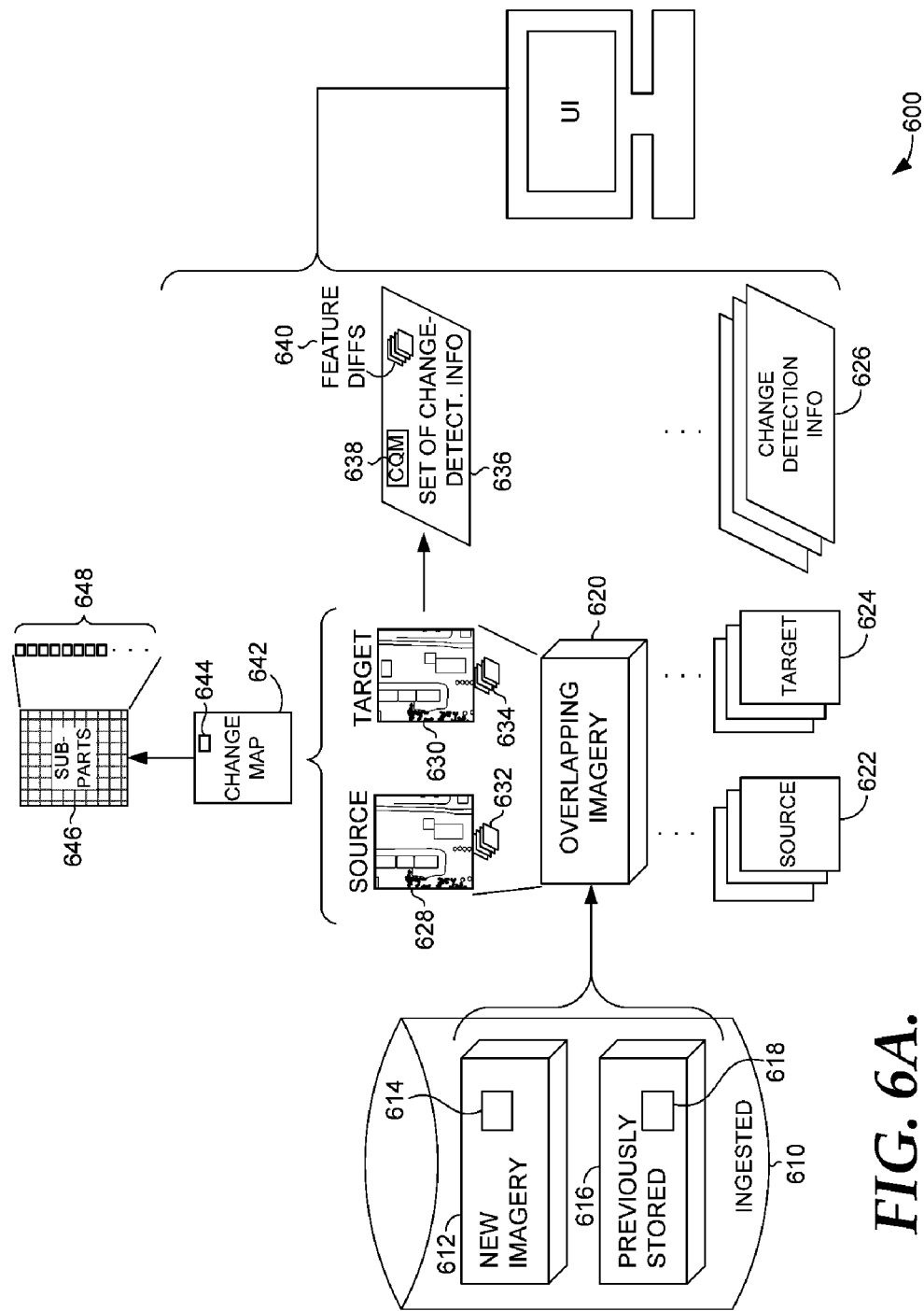
FIG. 6A is a block diagram illustrating aspects of an exemplary change-detection process.

Turning now to FIG. 6A, an illustrative block diagram is referenced generally by the numeral 600, which will be used in connection with describing an illustrative change-detection process, such as the change-detection process referred to by numeral 244 in FIG. 2. FIG. 6A depicts ingested imagery 610, which includes new imagery 612 and corresponding metadata 614 as well as previously stored imagery 616 and corresponding metadata 618. Provided portions of previously stored imagery intersect new imagery 612, overlapping imagery 620 will be present, which will give rise to a whole set of source scenes 622 as well as target scenes 624 that, when compared, will yield as many corresponding sets of change-detection information 626. In examples that will be described herein, the source scene will be considered the first, or before, scene and the target scene will be considered the after scene. To help explain a specific illustrative example, we will make reference to a single source and target scene, including source scene 628 as well as target scene 630. Source scene 628 is associated with a set of features or feature information 632, and similarly target scene 630 is associated with a set of target features 634. By comparing these two scenes we will ultimately arrive at a set of change-detection information 636, which might include the recently described change-quality measure 638 as well as a set of feature differences 640, which represent differences in values of features between 634 and 632. Another item that will be produced according to an embodiment of our technology from source scene 628 and target scene 630 is a change map 642, which depicts aspects of change between target scene 630 and source scene 628. A crude attempt has been made to illustrate a change between the source and target scenes of FIG. 6A by showing the small rectangle 644, which appears only in the target scene 630. The change map can be subdivided into a whole set of subparts, which are collectively referred to by numeral 646. Individual subparts, sometimes referred to herein as regions are referenced by numeral 648. We do not mean to imply that all references herein to "regions" are to such subparts, but do sometimes use the term in that way. Other times, it is just some region, with no special meaning; (same for "scene" for example). We may also refer to individual image subparts as "tiles" or "chips", and, in these instances, we do mean that these are equivalent or synonymous with the image subparts 648.

As will be explained in greater detail, subparts 648 can be individually ranked according to the closeness by which their attributes match a given query, which is why subparts 648 are illustratively shown to be broken out in tiles lined up in a rank order. The subparts 646 do not actually need to be separately stored, but rather might take the form of a logical creation such that the tiles 648 are not stored separately from an overall scene, but which are also separately retrievable based on a corresponding key or any other value that serves to identify each of the ranked regions 648.

Figure 6B:
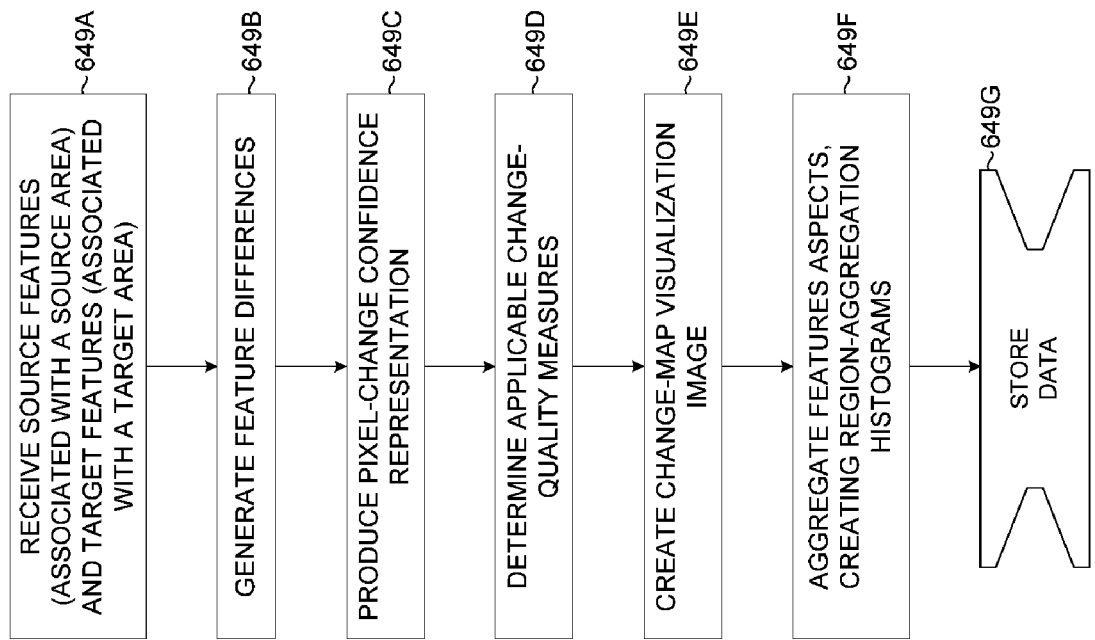
FIG. 6B depicts an illustrative change-detection process.

We will now provide an overview of an illustrative method for carrying out a change-detection process with reference to FIG. 6B. We will also be referring to other figures to help illustrate concepts associated with the higher-level steps of FIG. 6B. Turning now to FIG. 6B, steps 649A indicates that source features as well as target features are received. Source features are those associated with some source geographic area and target features are associated with a target area. The source area and target area can certainly be the same. Illustrative source features that might be received include source feature 632 of FIG. 6A, and illustrative target features include target feature 634 also of FIG. 6A.

At a step 649B, featured differences are generated. This method can be lengthy to explain so we will postpone explaining it in greater detail as well as the following steps so as to lay a foundation upon which to build. Thus, at a step 649C, a pixel change confidence representation is produced. This has been previously referred to as a change map, including change map 642 of FIG. 6A. But as will be explained, the phrase change map itself might refer to various objects as the case may be. That is, those of ordinary skill in the art might refer to the same thing by different names or different things by the same name. We might make distinctions so as to help explain aspects of our technology but do not mean to necessarily implicate differences per say. If the applicable change-quality measures have not yet been derived, then they are done so at step 649D, for example, showing this step here reinforces our previous assertions that the ordering of steps is not meant to implicate a precise order. Although we have previously described how to calculate the change-quality measure, it might be the case that in some embodiments it is calculated at some different time including during the step of 649D. Similarly, if the change-map visualization image has not yet been created then it is done so at step 649E, and feature aspects are aggregated at a step 649F, thereby producing region-aggregation histograms. This data can all be stored at step 649G, which will be described in later detail below.

Figure 6C:
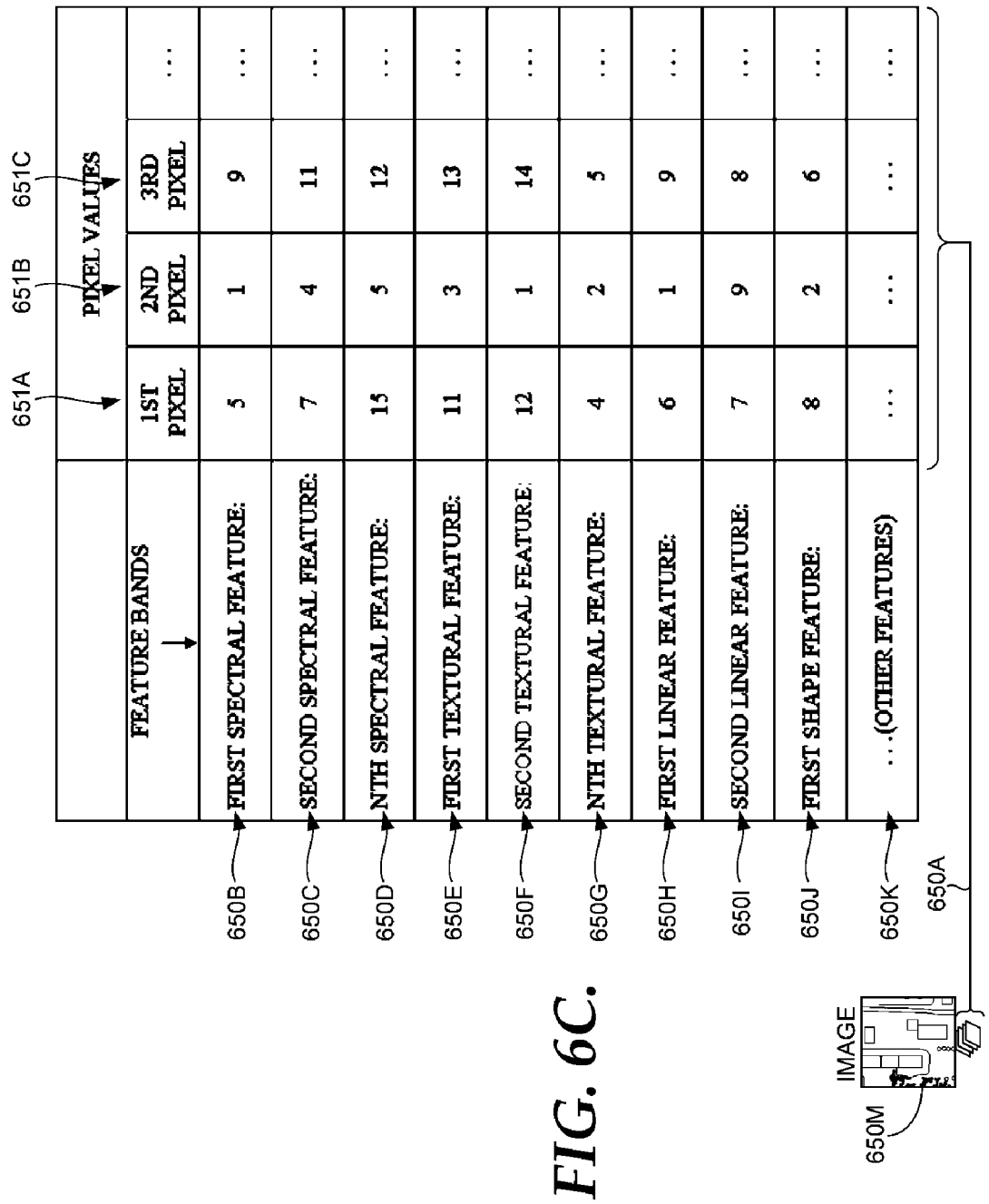
FIG. 6C depicts an illustrative set of feature bands and various values corresponding to various pixels.

Having provided a brief overview of an illustrative change-detection process, we now will turn to FIG. 6C to describe generating feature differences (649B) in greater detail. FIG. 6C shows an illustrative set of features, which are referred to by numeral 650A. Numeral 650A shows several feature bands, each represented by a row. For example 650B-K indicate various features that might be associated with the given pixel. Each pixel in a given image can include multiple features and thus, multiple feature values. That is, each pixel might have a red value, a blue value, a panchromatic value, etc. Each of these features is represented by an individual row. For example, row 650B describes a first spectral feature for each pixel in image 650M. Illustrative spectral features include, as mentioned, a red value, a blue value, a panchromatic value, a near-infrared value, and a normalized difference vegetation index (NDVI) value. Each of these features are also referred to as bands. Thus the first spectral feature 650B is also referred to herein as a given band. For example, one might refer to it as a red band or a blue band.

We generically refer to various bands by identifiers such as "first" and "second" to indicate that different embodiments can have various numbers of these bands or the absence of these bands. By way of further example, row 650E indicates a first textural feature. Illustrative textural features include textural features associated with a panchromatic band, or a red band or a blue band, etc. Other features stored might include linear features as well as shape features.

The columns of FIG. 6C each relate to a different pixel. For example, first pixel 651A is one pixel out of image 650M. Similarly, values are shown for second pixel 651B as well as 651C. Ellipses indicate that each pixel is described by values associated with the different feature bands. An image might have several thousand or million pixels, in which case it would have several thousand or million columns.

Figure 6D:
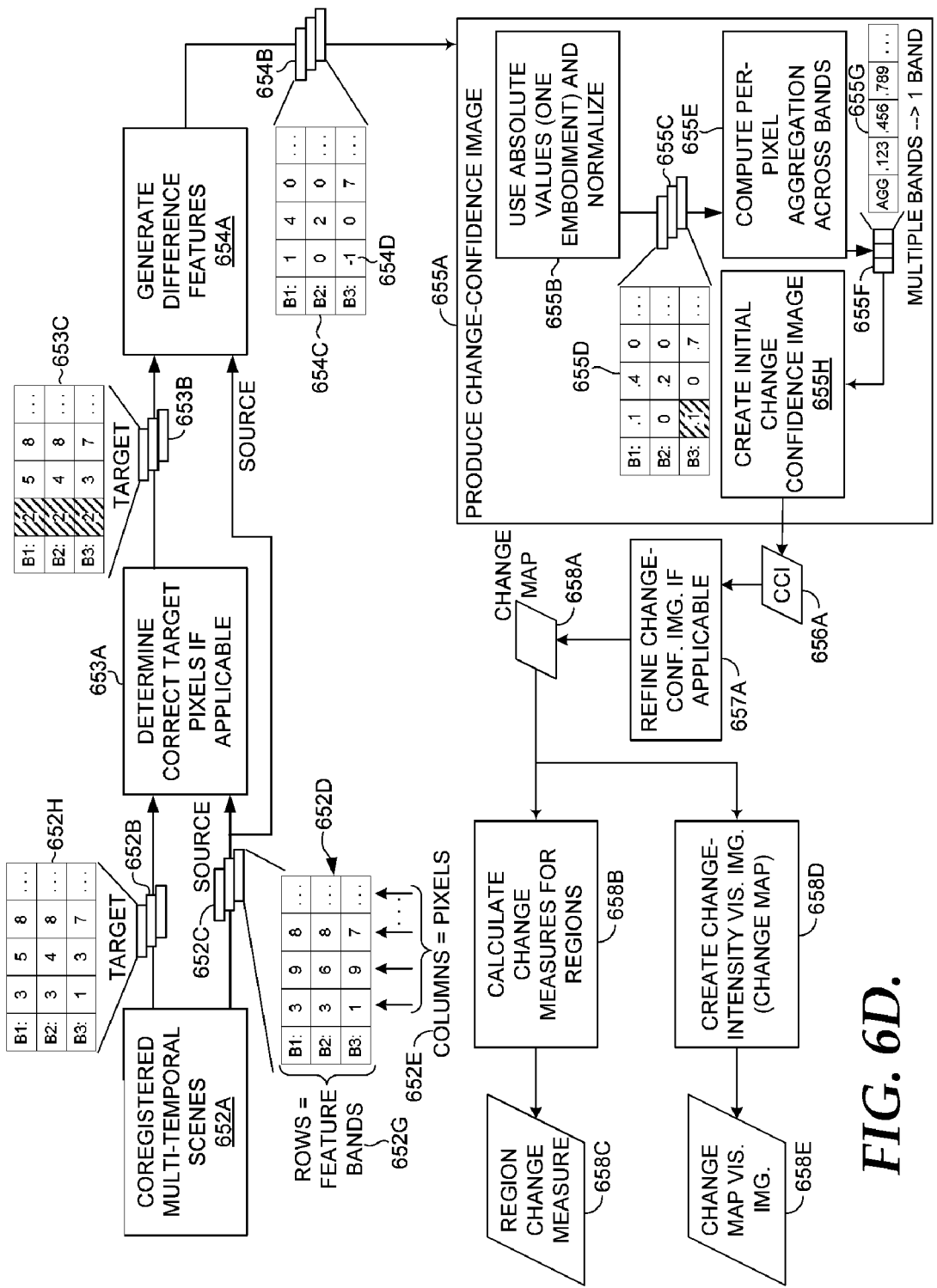
FIG. 6D depicts an illustrative method for quantifying change associated with regions.

Turning now to FIG. 6D, we depict an illustrative flow for calculating change according to an embodiment of our technology. A pair of co-registered multi-temporal scenes 652A is made up of a set of target bands 652B, which are associated with a target scene; and a set of source bands 652C, which are associated with a source scene. Source bands 652C are described in greater detail with reference to grid 652D, which include columns 652E which, similar to FIG. 6C, each correspond to pixels in the source scene; and rows 652G, where each corresponds to a given feature band. Feature bands 652G are indicated by characters "B1," "B2," "B3." We do not show this level of detail for each of the grids that are depicted in FIG. 6D, but do so with reference to source features 652C to provide an example.

Clearly, the values shown in the various grids of FIG. 6D (indeed almost every table herein) are not actual values. No attempt has even been made to indicate what these values might be in the real world. They are merely provided for illustrative purposes to indicate at a high level that some value is present.

At a step 653A, if desired, a determination is made as to what the correct target pixels should be. As previously described, a target image will normally go through a transformation process. We are about to describe comparing pixel-level feature values between two corresponding pixels. But a question arises as to which is the correct target pixel that should correspond to a sister pixel in a source scene. Imagine two checkerboards. Now image that each square on the checkerboard represents a pixel. Now imagine that the two checkerboards are pictures of the same thing, the same geographic area for example. One might think that the pixel in row one, column one should be compared in the source image to the pixel in row one column one of the target image. However, it might be the case that the identically corresponding pixel is not the actual pixel that should serve as the comparison pixel in the target image. This is the case because co-registration might be imperfect. To the extent that co-registration is imperfect, and pixels might actually be a few pixels off what they should be, we describe an option, actually several options, of how to go about determining the correct target pixels.

FIG. 6E introduces an illustrative feature vector. A feature vector is a data array that holds multiple pieces of information that can be associated with a single pixel in an image or a region containing a group of pixels in an image. We will describe these in greater detail below.

Turning now to FIG. 6G, we depict a reference pixel-level feature vector 680A. Numeral 680B represents several pixels in close proximity to a supposed target pixel. We say "supposed target pixel" because the actual value or target pixel is not yet known in this embodiment. Reference numeral 680C refers to a specific column, which identifies the actual identically co-located pixel. But it might be the case, as previously mentioned, that the identically co-located pixel 680C is not the proper pixel to select values from because of an imperfect co-registration. Therefore, in this embodiment, we employ a proximity-selection process in which the target pixel value of a given band is selected if it's the closest value to that of the reference pixel feature value. Consider first band 680D. It has a reference pixel-level feature value of five, which is represented in cell 680E. In this embodiment, we consider the values of several pixels that are located nearby the identically co-located pixel 680C. We choose the pixel value that is closest to the reference value, which in this case is five. Therefore, we select the value in cell 680F in this case. In fact, the circled values in the table represent the values that are selected in the different situations, giving rise to the difference vector 680G, which merely represents a difference in the various target values and reference values.

Turning briefly to FIG. 6F we show that, at a high level, a difference-feature vector 670B can be derived by taking a difference of a source feature vector 670C and a target feature vector 670D. However, we want to make clear that target feature vector 670D may not actually be a single vector; that is, a single column in any of the tables of FIG. 6G, 6H or 6I. Rather, FIG. 6F is meant to illustrate the concept of generating a difference vector by differencing source and target pixel-level feature vectors. For example, if the embodiment just described were employed, then target feature vector 670D might be composed of values 5, 7, 5, 9, 10, etc., based on the circled values of FIG. 6G.

Turning to FIG. 6H another embodiment for determining the correct target pixel set is provided. In this example, the identically co-located pixel 668A is used to calculate a difference in connection with the reference pixel-level feature vector 668B. This is shown by having each value in the identically co-located pixel 668A circled. Thus, in this embodiment, difference vector 668C is generated, which represents the difference between the circled values and the corresponding values of reference vector 668B. In some embodiments, the absolute values of the difference are maintained, but in other embodiments the sign is retained in order to provide certain types of information. The embodiment of FIG. 6H might be applicable in the case when co-registration is performed in such a manner as though a very high confidence exists that the images truly are lined up.

In still another embodiment, and with reference to FIG. 6I, we illustrate an example in which although the identically co-located pixel 684A is not used, the values of a single pixel are used. We refer to this single pixel as the actual corresponding pixel 684B. In this embodiment, a determination is made that pixel 684B is the actual pixel that corresponds to reference pixel 684C; and thus, it is the one used to derive change vector 684D. In this embodiment, this determination can be made by finding a pixel in close proximity that has the best match (i.e. the lowest total change difference) across all bands. There is no need to select different values in this embodiment because a determination is made that pixel 684B really does correspond to pixel 684C.

Thus, to summarize, the embodiment of FIG. 6G represents a conservative methodology whereby difference values are conservatively determined, thereby increasing the confidence level that the change that is detected is a conservative approach as opposed to having many false positives. But if a determination can be made as to what actual pixel should be used then two variations of that embodiment are described in connection with FIGS. 6H and 6I. Returning to FIG. 6D it is indicated that target bands 653B, shown more clearly in grid 653C includes a set of hashed values, which indicate corrected target pixel values. While only one column of hashed values is shown in grid 653C, in one embodiment, all pixels in all bands in the target image could be processed in 653A.

These corrected target pixel values might have been generated by any of the embodiments we just described. Source bands 652C provide the other input into process 654A, which generates the difference features, which are represented by numeral 654B, which corresponds to grid 654C. Grid 654C includes values that reflect a difference between the values in grid 652D and 653C. In this embodiment, signs are retained, as evidenced by cell 654D, which has a value of "−1." The difference features 654B provides input to step 655A in which a change-confidence image is produced. In one embodiment, this is accomplished by utilizing the absolute values of the contents of grid 654C which are also normalized in one embodiment. This results in a set of bands 655C, which corresponds to grid 655D, which includes normalized absolute values as compared to those in grid 654C.

These normalized values 655C are calculated, in one embodiment, by determining a Z-score, or standard score, for each pixel using the statistics of the pixel values in each band. This is done by subtracting the band average from each pixel in the band, and then dividing each pixel in the band by the band's standard deviation. Another way to normalize the pixel values is to transform each pixel value into a range form 0 to 1 using, for example, fuzzy membership functions. There are other ways to normalize these values, but doing so as described above enables a per-pixel aggregation across bands to occur at a step 655E. This aggregation across bands can be done in many ways. In one embodiment, this can be done using a simple summation of the normalized pixel values produced by step 655B. In another embodiment, this can be done using a summation process that includes assigning greater weight to certain bands and lesser weight to others. For example, spectral features in the bands can be analyzed to determine which pixels might be associated with vegetation. The normalized differences associated with vegetation pixels could be given a lesser weight, in one embodiment, when performing the aggregation across bands so as to minimize the effect of possible seasonal variations on the change-detection results. The outcome of step 655E is a single vector 655F, which is shown in greater detail by vector 655G, which represents a compression of the various bands in grid 655D into a single band. In one embodiment, this represents compressing 14 bands into a single band. This single band represents one value per pixel. That is, a measure of change intensity per pixel is included in vector 655F. Again, the values are merely representative. In some embodiments, the actual values might be integer or possibly floating point values with 15 digits of precision.

At a step 655H, an initial change-confidence image is created, resulting in a change-confidence image 656A. The change-confidence image 656A is an image based on the pixel-level values in vector 655F. Vector 655F includes values for every pixel such that an image can be derived from those values, and that image is at least an initial change-confidence image 656A, which might also be referred to as a change map. But, in some embodiments, it might be desirable to refine the initial change-confidence image 656A by quantizing or making more discrete the change values derived from vector 655F. In embodiments where this is desired, such can occur at step 657A, which results in a change map (or refined confidence image), 658A. We will describe an illustrative refining process 657A in connection with FIG. 6J after we finish describing the rest of this process.

At a step 658B, change measures for the various regions that the processes have been acted on are calculated, resulting in a region change measure 658C. If all of the processes described in connection with FIG. 6D have already been at the region, or tile level, then this region change measure 658C would be a single number that would indicate an amount of change associated with a given region such as one of the regions of the set 648 in FIG. 6A. If this process is carried out against all of the regions that are the object of a given query, then the objects can be ranked based on an amount of change in each region, thereby producing a set of ranked tiles that are ranked according to an intensity of change associated with a given region.

Change map 658A can also provide input into step 658D, in which a change-intensity visualization image 658E is created. This change map visualization image 658E might also be referred to as a change map as used herein. This visualization image 658E is often color-coded as we have previously described earlier in saying that it is somewhat akin to a weather map, which is color-coded based on intensity of change. It might be the case that change map 658A is either gray scale or not color-coded in some embodiments.

Figure 6J:
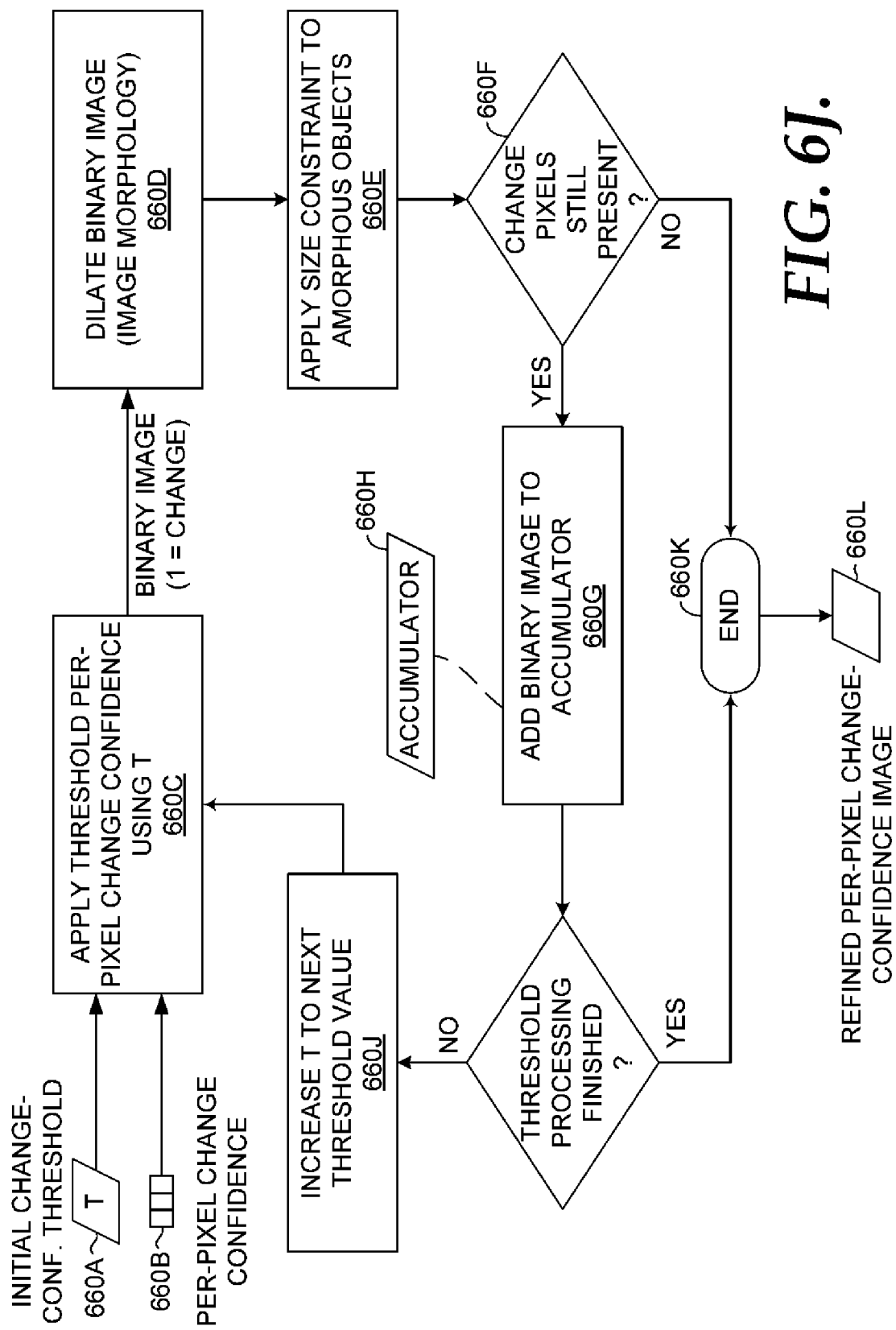
FIG. 6J depicts an illustrative process for refining a change-confidence image.

We will now describe an illustrative refinement process with reference to FIG. 6J, which was initially introduced by way of step 657A. Turning now to FIG. 6J, we describe what might be thought of as a stack-filtering process. Recall what we are trying to do at this point. If desired, in this embodiment, we are refining a change-confidence image such as that of 656A. It might be desirable to refine an initial change-confidence image because that initial image might not be as granular or as quantized or as discrete as desired. By forcing confidence image pixel values to be at discrete levels, change information can be more easily observed by a human being in one embodiment. We are essentially forcing a continuous range of confidence values (e.g. floating point) to take on a smaller number of discrete or quantized value levels (e.g. integer). The resulting quantized image with a discrete number of levels can be used to more clearly indicate change. In one embodiment, we iteratively apply various pixel value thresholds to determine which pixel values can withstand successive passes, in which those that survive become stacked upon themselves, like checkers stacked in a column. Then, those columns with the greatest number of checkers are associated with certain values and progressively shorter columns are associated with still different values such that we are able to quantify and even color code if desired those columns of varying height, and in which generally, the higher columns indicate more intense change, whereas shorter columns indicate less change.

With reference to FIG. 6J, an initial change confidence threshold 660A provides an input along with the feature band 655F of FIG. 6D, which will be referred to here by numeral 660B. Say we are dealing with initial change confidence values between zero and one. The initial threshold might start off as 0.1. Vector 660B includes a single value per pixel in which each value indicates a pixel's change confidence.

At a step 660C, the threshold 660A is applied to the set of pixel values 660B. The outflow of process 660C will be a binary image in which a pixel value of 1 represents change above the threshold 660A, and a pixel value of 0 represents change not above the threshold. Thus, those pixels that survive this threshold will be added ultimately by way of a binary operation. At a step 660D, the binary image is dilated, which is accomplished using an image morphology operation in one embodiment. Size constraints are applied to resulting amorphous objects from the dilation at a step 660E. In one embodiment, the binary image is processed with a connected components algorithm to discover amorphous objects. Components (amorphous objects) are eliminated from the binary image if they do not meet a minimum pixel count (size). At a step 660F, a determination is made as to whether any change pixels are still present after size constraints of 660E. If not, the iterative process ends and proceeds to 660K. If there are, the image that was generated as a result of 660E is added to an accumulator 660H at a step 660G.

Processing advances to a step in which a determination is made as to whether the threshold processing is finished. If so, the process ends at a step 660K resulting in a refined per-pixel change-confidence image 660L. But, if the threshold processing is not finished, then threshold 660A is increased at a step 660J to a next threshold value. An illustrative next threshold value might be 0.2, which might indicate a higher intensity of change. In another embodiment, the thresholds may increase non-linearly. An illustrative example of non-linear thresholds is (0.1, 0.15, 0.175, 0.187, 0.2, 0.21, 0.25, 0.3, 0.4, 0.5, 0.7, 0.8, 0.9). Once again, the per-pixel change-confidence of 660B is evaluated to find pixel values that might survive this test of higher change intensity. Those that survive form a binary image in which pixel values are either present or not present. Those that survive are added to the binary image and then the binary image is added to the accumulator at step 660G and the process starts over at 660J again, where the threshold 660A is increased yet again. As the threshold is increased, only those pixel values having progressively higher amounts of change will be able to survive and thus will operate as checkers that are being stacked on top of previously surviving checkers. Ultimately, the stack of pixel values, or checkers, will be derived for all pixels, and, as mentioned, those pixel values by way of column heights will be mapped to color or gray-scale intensity to ultimately derive the refined change confidence image 660L, and/or change-map visualization image 658E. In another embodiment, the thresholds may increase non-linearly.

Figure 6K:
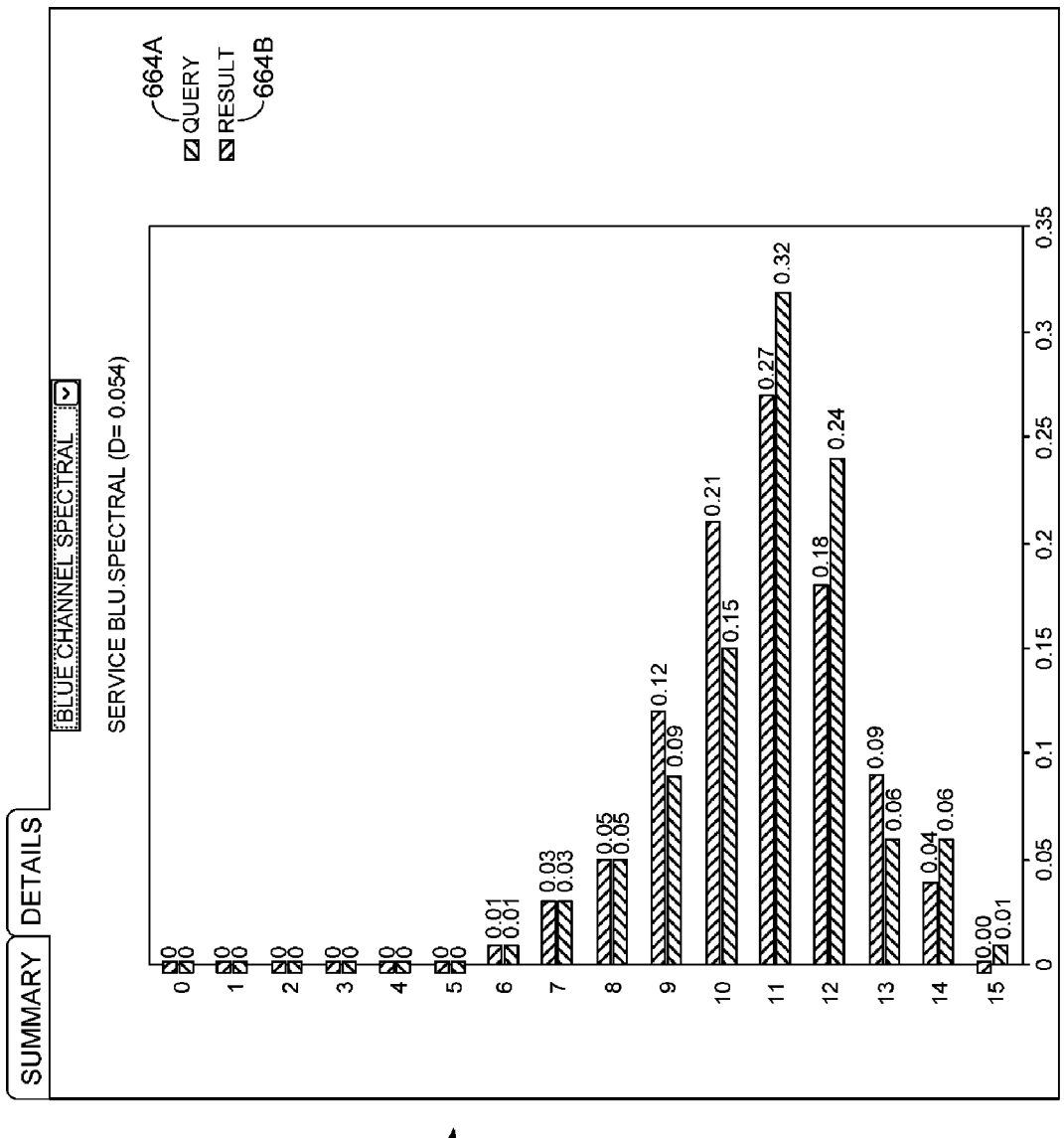
FIG. 6K depicts an illustrative histogram associated with an illustrative feature vector.

An illustrative tile-aggregation histogram representing a feature vector is provided in FIG. 6K and referenced by numeral 664. In various instances of our technology, vectors are stored as histograms. The histogram of FIG. 6K indicates a relationship between a given query 664A to a result 664B. This comparison is an illustrative example of the region aggregation histograms 649F in FIG. 6B.

Figure 7A:
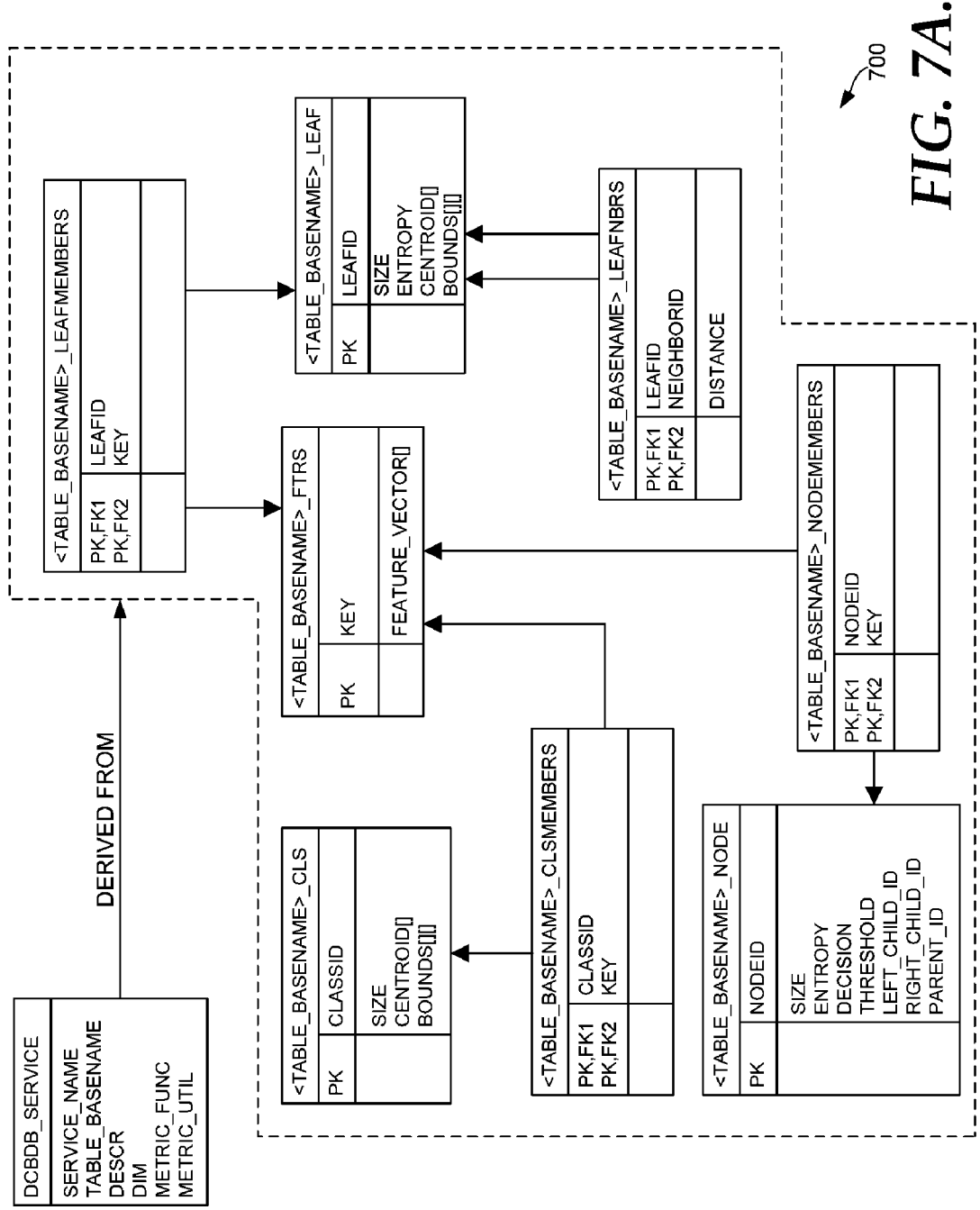
FIG. 7A depicts an illustrative data model for storing imagery feature data.

Turning now to FIG. 7A, an illustrative data structure is provided and referenced generally by the numeral 700, which in one embodiment, is used to store the fruits of the various analysis processes that we have described. Considering the aforementioned '955 Provisional Application (filed on Oct. 16, 2008), the many of the aspects of data structure 700 are self-explanatory. Therefore, we reference FIG. 7B, which depicts an illustrative process for storing data, which might include an aspect of storing the data as shown by numeral 232 in FIG. 2. Although it might be the case that storing data 232 does not include these steps because some of the data stored is done so by one or more different storage processes, and might even store data that is not stored according to the data model shown in FIG. 7A. For example, in some embodiments, pixel-level attributes are not stored according to the data model in FIG. 7A and the processes that we are about to describe. Rather, in some embodiments, aggregations of pixel-level values are stored.

Figure 7B:
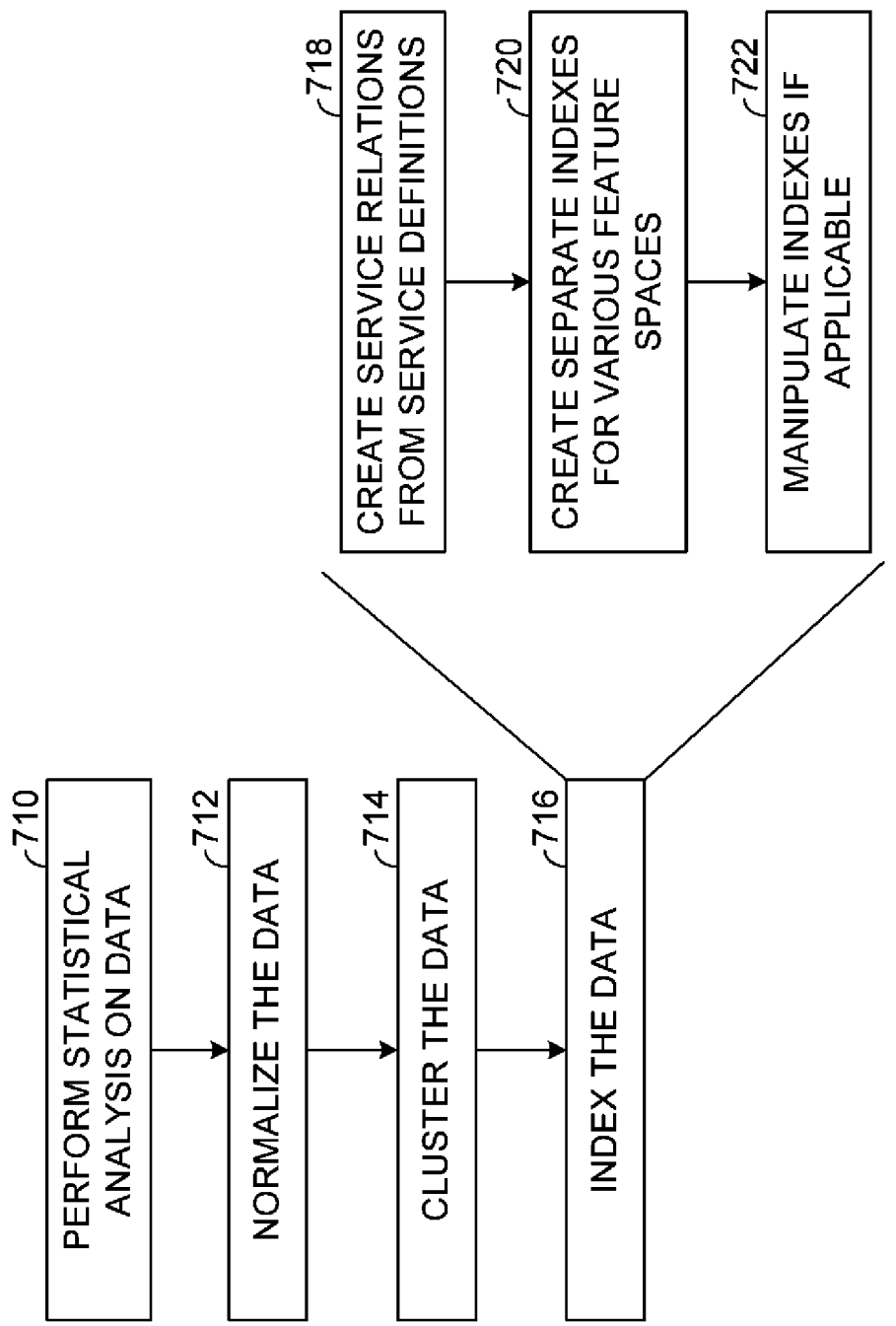
FIG. 7B depicts a high-level overview of an illustrative process for storing imagery feature data.

With reference to FIG. 7B, statistical analysis is performed on the data at a step 710. When we refer to "the data," we refer to a variety of things. For example, in one embodiment, the data is a collection of vectors of floating point or integer measurements (feature vectors), each of which corresponds to a single member stored in a database. The vectors are multidimensional, adding to the complexity of indexing and storing the data therein. A great deal of information including lower-level aspects of the data storage process are described in the aforementioned '955 Provisional Application (filed on Oct. 16, 2008), which is expressly incorporated by reference herein for the purpose of, among other things, describing methodologies and data structures associated with various facets of storing and retrieving data according to our technology. We will continue to describe some high-level aspects below, but rely on the wealth of information described in the aforementioned '955 Provisional Application to fill in the lower-level details.

As mentioned, the various features might be stored in a database such as imagery database 254 of FIG. 2, which is composed of a collection of feature spaces, each of which represents a set of related measurements about the database members. Considering FIG. 7E, for example, a red-texture feature space might be a collection of nine texture measures from the red color spectrum imagery band. In one embodiment, each feature space has various properties, such as a descriptive name, dimensionality, a suitable distance metric that enables similarity ranking, etc. These properties are stored and described in a single service in one embodiment, as shown in FIG. 7A.

Although we have previously alluded to this, there can be various feature spaces. We will describe four illustrative feature spaces each of which can include constituent feature spaces. For example, illustrative feature spaces include texture features, spectral features, linear features, and object-composition features. Regarding the texture features, there can be one feature space for each band including panchromatic, red, blue, green, near infrared, as well as the aforementioned vegetation index. By way of illustration, co-occurrence texture measures can include cluster tendency, contrast, correlation, energy, entropy, and homogeneity, which can be computed over various spatial extents, such as 2 meters, 10 meters, and the like. These are not meant to be limiting, but illustrative in nature. In alternative embodiment, occurrence texture measures, like those previously described above, could also be used.

Spectral features might include one feature space for each band as mentioned in connection with the texture analysis. Histograms can be normalized and partitioned according to the spectral distribution of the respected bands across a wide set of scenes in the imagery database.

Regarding linear analysis, linear measurements can be associated with regions and include items such as histograms of a maximum correlation run-length of pixels (length); the sine of an angle between a region pixel's minimum and maximum length; and a histogram of minimum and maximum lengths. Other linear features relate to a directional analysis, in which histograms of maximum run-length directions for a given region are provided.

Regarding object-composition features, a feature space can exist for objects lighter than their surrounding content, and a separate feature space for objects darker than their surrounding content as well. These can be derived from the aforementioned DMP object extraction (See e.g., FIG. 5B). These can represent an object composition of a region, for example, answering a query as to whether a region contains a mix of different size objects, a few large objects, or many small objects.

Regarding the aforementioned statistical analysis of step 710, each feature space can be treated independently for statistical analysis. For each feature in the feature space, the minimum, maximum and mean can be computed. Multivariate covariance matrices can be computed across the feature space. This can be done using standard multivariate statistical methods. Alternative embodiments of the statistical analysis may include correlation analysis, principal component analysis, etc.

At a step 712, the data is normalized. This can mean normalizing the data or constraining the data to be within a set of given ranges such as between zero and one, or negative one and one, or whatever X, Y. Methods might include principle component analysis (PCA); subtract the min and divide by the range; or Z-score. Other methods can also be employed. In one embodiment, the resulting normalized vectors may or may not be unit vectors.

At a step 714, the data is clustered. Clustering the data provides class assignments for each member of the database, such as database 254, for indexing methods. This helps facilitate indexing methods, such as entropy balanced statistical K-D trees, to exploit class statistics of database members that are determined to be similar in feature space. In a first embodiment, all or part of the data can be clustered according to ground-truth labels if available. Ground-truth labels represent expert knowledge or database-content groupings. In a second embodiment, the data can be clustered using an appropriate clustering algorithm that is suitable for the data population. The clustering may be a space-partitioning scheme, such as a K-means, or a mode-seeking algorithm.

At a step 716, the data is indexed. This can include three high-level steps, which we will briefly mention and then flesh out below. At a step 718, service relations are created from service definitions. At a step 720, separate indexes are created for the various feature spaces. At a step 722, the indexes are manipulated if applicable. We will now describe indexing the data in lower-level detail.

Returning to FIG. 7A, service definitions provide a way to create relations for a given service. They include features, classes, class members, node members, leaves, leaf members, and, leaf neighbors for example. Features might be identified by a unique member Key in one embodiment. The actual collection of feature-space measurements for each database member can be stored in the applicable rows. Classes (which can be identified by a ClassID), store a set of class statistics, such as minimum/maximum bounds, mean, and size.

Class members (identified by ClassID+Key) represents association of each database member to a given class. A node (identified by NodeID) represents an indexing node that is used for content searching navigation. Conceptually, a node represents a partition of the high-dimensional feature space. Each node contains information such as the navigation decision and some node statistics such as size and entropy.

Node members (identified by NodeID+Key) list associations of nodes with the contained members. Node members are used during indexing induction and maintenance in one embodiment. A leaf (identified by LeafID) is an index data leaf, which defines a usually small hyper-rectangle in high-dimensional feature space (conceptually). A leaf also can include basic statistics such as minimum/maximum bounds, mean, entropy, and size. Leaf members (identified by LeafID+Key) lists associations of leaves with their contained members. Leaf members are used during retrieval to generate member rankings against a query feature vector. Leaf members are stored separately from node members in one embodiment so that index maintenance can operate without interference with retrieval rankings and vice versa.

Leaf neighbors (identified by LeafID+NeighborLeafID) represent a feature space and distance metric driven priority of "neighborship" for each leaf. During content retrieval, it can be expected that the number of desired results might exceed the membership of a single leaf that the search initially finds. The "neighbor priority queue" provides an ordered list of leaves to continue acquiring results from during a content-based search. The conceptual effect is that a search into high-dimensional space spirals outward in high dimensional feature space collecting results based on similarity.

By way of illustration, each feature-space can be represented according to our data model as a service. A separate index is created over the data-member population for each feature-space. The feature-space data can initially be loaded into a feature table. Classes and class-member associations are created, which are the result of ground-truth labeling or clustering as previously described. An entropy balanced statistical K-D tree (EBS) index is created over the feature-space, resulting in a single index, which can be materialized from the node relation. An example of this is provided in the aforementioned '955 Provisional Application, with reference to its algorithm 1.

Index data leaves are analyzed and the leaf neighbor priority cues are created into the leaf neighbor relations. An example of this is provided in the aforementioned '955 Provisional Application, with reference to section 3.2.3.

As mentioned, online manipulation algorithms enable a manipulation of the indexes with minimal downtime and still allow efficient and accurate content retrieval. This is discussed more fully in Chapter 5 of the aforementioned '955 Provisional Application. Adding new data is described in connection with the "insert" references. Updating features, as well as data removal (delete) are also described, as is manipulation monitoring and delayed maintenance.

As previously mentioned our data model enables high scalability and performance to be realized. The data can be distributed across one or more relational databases that are located on a network, wherein the databases are organized as previously described. The resulting indexing creates data leaves that are groups of similar content. This allows for high scalability of the index as the database itself grows. All or a portion of the index can be materialized in memory of a search-agent process.

Search agents can interface with the database to provide a service to client processes. The agents can be co-located with, or network distributed away from the various databases, e.g., imagery databases 254. Search agents can perform parallel database-side "leaf ranking" and agent-side "results set merging." Lower level details of this aspect can be provided with reference to algorithms 2 and 3 of the aforementioned '955 Provisional Application.

Figure 7C:
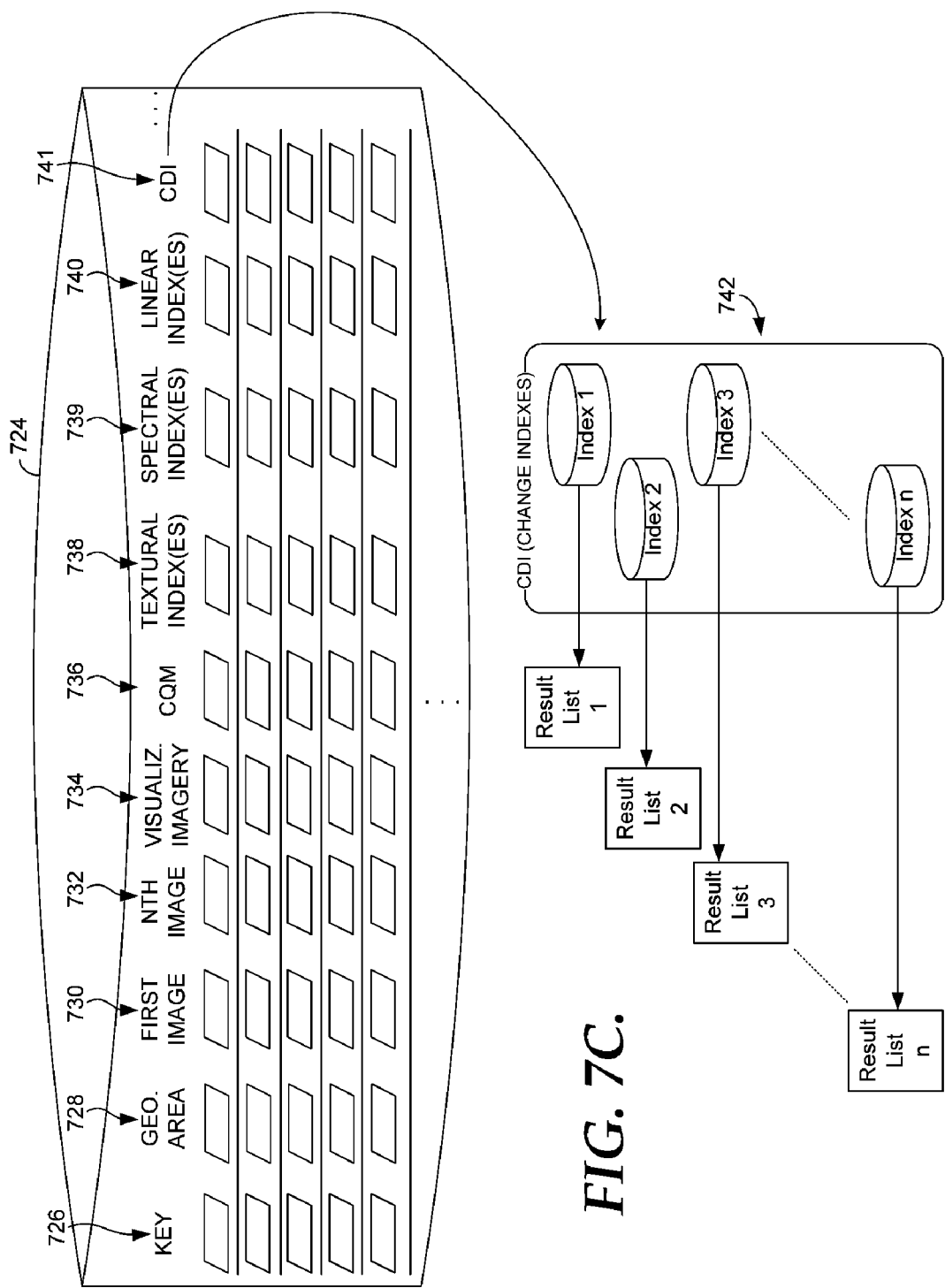
FIG. 7C depicts how a key might be associated with various informational attributes of a given geographic area and how information can be separately indexed based on separate features.

Turning now to FIG. 7C, we show an illustrative database 724 that includes various types of information. Database 724 might actually be a conglomeration of databases and the information shown might actually come from various sub datasets. As should be clear from our previous description, we employ relational-database technology; thus, it should be clear that the data stored will not actually be stored as flat as is depicted in FIG. 7C. Additionally, in one embodiment, relational database technology is not used for source or derived images, instead cataloging their location on a file system or network, as shown by illustrative example in FIG. 3B. The depiction of the data in FIG. 7C is done so for illustrative purposes, and is also clearly not exhaustive. That is, more information is stored in database 724. By way of illustration, a key 726 operates as a unique identifier that identifies a certain geographic area 728, which might be associated with a first image 730 that depicts the geographic area in a first state. If several images are associated with a geographic area, then an NTH image 732 illustratively indicates that as many images as are available are associated with geographic area 728. If desired, visualization imagery 734 is also stored in connection with geographic area 728, as is one or several sets of change quality measures 736 which have been previously described. Several feature vector indexes can also be stored, each of which provides for content-based retrieval from the aforementioned feature sets. These indexes can indicate features associated with the different images, image-regions, or image items. We have illustratively shown textural indexes 738, spectral indexes 739, as well as linear indexes 740. Because we've run out of space we do not show other indexes but other indexes such as spatial indexes and the like could also be included. Change-detection information 741 is also stored in database 724. In some embodiments, change-detection information is stored by way of a change-aggregation vector, which can be represented by a histogram of aggregated pixel-level change vectors.

The scope of change-detection information 741 can be vast. This can be information that describes many aspects of change between a first image, and any number of subsequent images that are associated with geographic area 728. For example, when the various change feature sets are indexed individually, as shown by reference 742, changes associated with individual spectral, textural, or linear feature bands can be emphasized or de-emphasized. Although we will describe this in greater detail below, different change features can be weighted so that results are returned based on the waiting of inputs. For example, a person might be interested in things that have changed in a first type of spectral way, with no concern to any textural change. In this case, a given index is given priority over other indexes. Again, the change detection information itself, although also shown by a single parallelogram, can actually be an immense amount of information represented by several indexes, which are not shown so as to not obscure the present invention and for simplicity's sake.

Turning now to FIG. 7D, an illustrative set of multidimensional feature vector (MFV) is shown and referenced by 743. The format of this can vary. For example, in one embodiment data structure 743 indicates MFVs in columns. The dimensionality of the feature vector is K. This can be the "k" in an Entropy Balanced Statistical k-d tree. N is the size of the database for a given index (e.g., blue band as shown). The blue band spectral characteristics of each of these objects (Region/Tile in this case) are aggregated into a histogram (see FIG. 6k for example), which is treated as a MFV as well. Data structure 743 illustratively shows that different measurements (each represented by a row) can be associated with each of the different keys, as previously referred to. Each key might refer to a specific geographic area. This format would be similar for difference vectors representing change detection information aggregated to a region or tile level.

Turning now to FIG. 7E, a table 744 shows an illustrative set of feature spaces. Each feature space depicted will have the same keys of FIG. 7D 743, which correspond to certain geographic regions (such as regions that cover a given area such as 250 sq. meter region) or imagery objects. This allows us to reference the database items across the various feature sets with a single key. Accordingly, we can use a band such as the blue-spectral characteristics of a query region to find similar regions. Of course, this is just one of sixteen that we use to index regions in one embodiment. Dealing with all sixteen indexes of the dimensionalities listed in table 744 presents issues associated with handling the multiple indexes, which we will now describe below in connection with FIG. 7F.

Figure 7F:
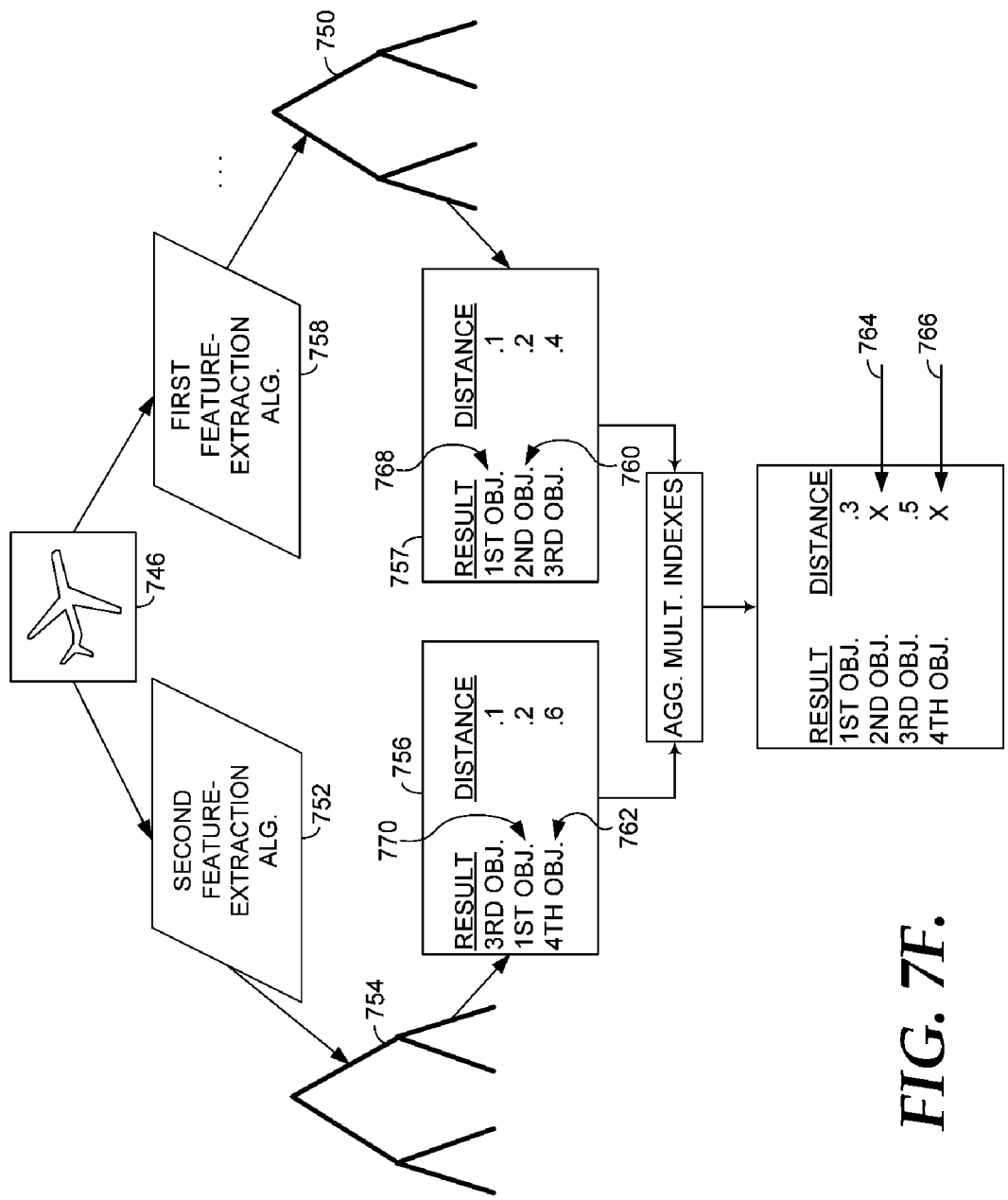
FIG. 7F depicts an embodiment for fusing together results associated with searching separate feature indexes to ultimately arrive at an overall result.

Turning now to FIG. 7F, a query object is represented by 746. A first feature-extraction algorithm 758 can be used to extract features from object 746 on-the-fly or to lookup features for the object if it is a previously processed object. These features can then be used to perform a search in a first tree 750. A second feature-extraction algorithm 752 is similarly associated with a second tree 754. These aforementioned feature extraction algorithms produce multidimensional feature vectors (MFV) in two different feature spaces. The MVF of each feature space are indexed separately in index trees 754 and 750. The indexes that are searched are those previously described.

Table 756 indicates search results that are returned incident to a query of index 754. "Distance" is used as a term to indicate a similarity or a closeness that the search result is to optimum. In the illustrative examples shown, smaller distance scores represent more relevant results. An issue is presented when an object is returned based on a certain set of characteristics it has according to one of the two algorithms (752, 758) but is not returned by way of the other. For example, it can be seen that second object 760 and fourth object 762 do not appear in both result sets. Therefore, their ultimate rankings, represented by X's 764 and 766, respectively, are yet to be determined.

To summarize, our system might allow a user to search using information extended from multiple data sources (e.g., indexes). Each of these sources might be indexed using different mechanisms, implemented using very different technologies, and even represent different types of information. Results returned by searching these disparate indexes are aggregated in a meaningful fusion.

An example of the aforementioned potential difficulties encountered during this process can be seen in the example multi-index aggregation shown in FIG. 7F. The region of interest in the image containing the query object, in this case an airplane, is first passed to two different feature-extraction algorithms 752, 758. These algorithms produce feature vectors which can be used to search indexes containing information in two different feature spaces, 754 and 750. These features could be extracted on demand or simply referenced in a database if the object had been previously processed. The indexes that are searched are those previously described.

The result from each search is a sorted list of results along with corresponding distance indications that indicate a distance from the query object to the result object in a given feature space. The sorted lists are referred to by 756 and 757. But if we attempt to aggregate the results from these sources into a combined list of results using, for example sum, as the aggregation function, it is clear that we would be unable to complete this task due to missing information in one embodiment.

We accommodate for this issue by either retrieving, calculating, or estimating applicable values. For example, we employ an absence penalty method (APM) algorithm that over retrieves a list of results from each source and computes aggregate scores for objects retrieved in a given result list. The aggregate scores are computed by using sum (or average or max or any other aggregation function) to aggregate the score for a given result based on the individual scores from each result list.

For example, the score for first object 768 in the list of results from the search of index 750 is 0.1. The score for the first object 770 in the list of results from the search of index 754 is 0.2. The sum of these two scores yields an aggregate score of 0.3. However, aggregating a score for the fourth object, 762, reveals that the object is not found in the top results from source 750. Thus, we estimate a score for the object in that result list. Because it didn't show up in the list of top results from 750, we glean that the fourth object must have a score greater than 0.4 (the score of the last result in the list) if we were to exhaustively enumerate the list of results from searching 750. Thus, the score is approximated as a function of the greatest score in the list. In one embodiment, the score is multiplied by a penalty factor, P, where P is greater than 1.

Figure 8A:
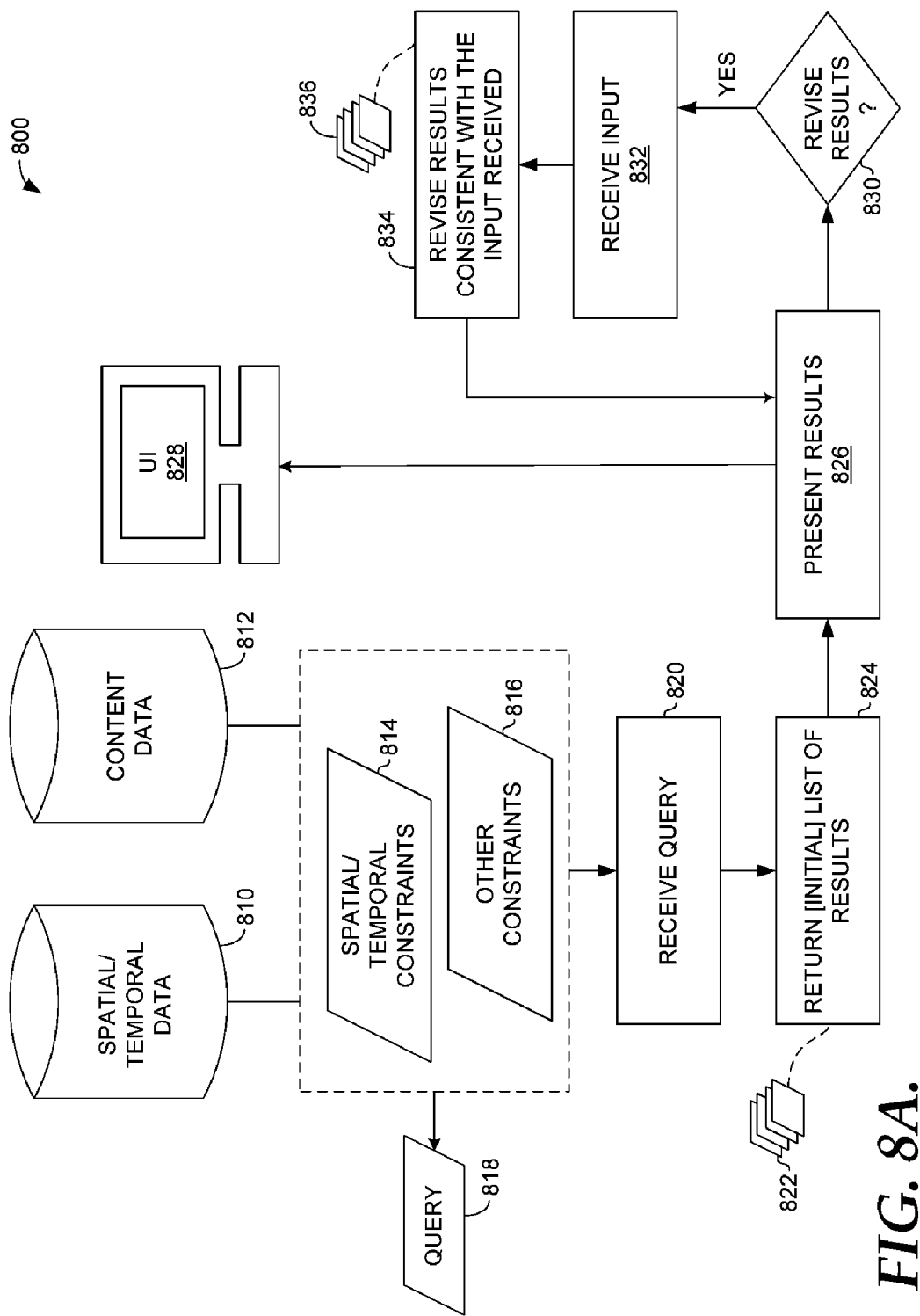
FIG. 8A depicts an illustrative method for retrieving results based on a received query.

Turning now to FIG. 8A, a high-level overview associated with retrieving a set of results based on a query is provided and referenced generally by the numeral 800. A set of spatial/temporal data 810 as well as content data 812 provides an ability to search subject to constraints such as spatial/temporal constraints 814 as well as other constraints 816. Illustrative queries might include something along the lines of present all regions like X from 2001 to 2003; or present all rectangular objects like some seed object, or do the same but in New York City, or the same but only show results near hospitals. These constraints can be used to build a query 818. At a step 820, query 818 is received. Incident to receiving query 818, an initial results lists 822 is returned at a step 824. These results can be presented at a step 826 on a user interface 828.

If applicable, the initial results list 822 can be revised based on user feedback or additional user interaction. At step 830, a determination is made as to whether the results are to be revised. If so, additional input is received at a step 832, which results in revising the results consistent with the input received at a step 834. This results in a revised results list 836, which can also be presented on user interface 828.

As briefly mentioned, user interface 828 might take the form of a viewer application. A viewer application can include an imagery viewer, a mapping component, a web browser, a virtual-globe viewer, or another user interface that is adapted to present the fruits of the imagery-results query.

Figure 8B:
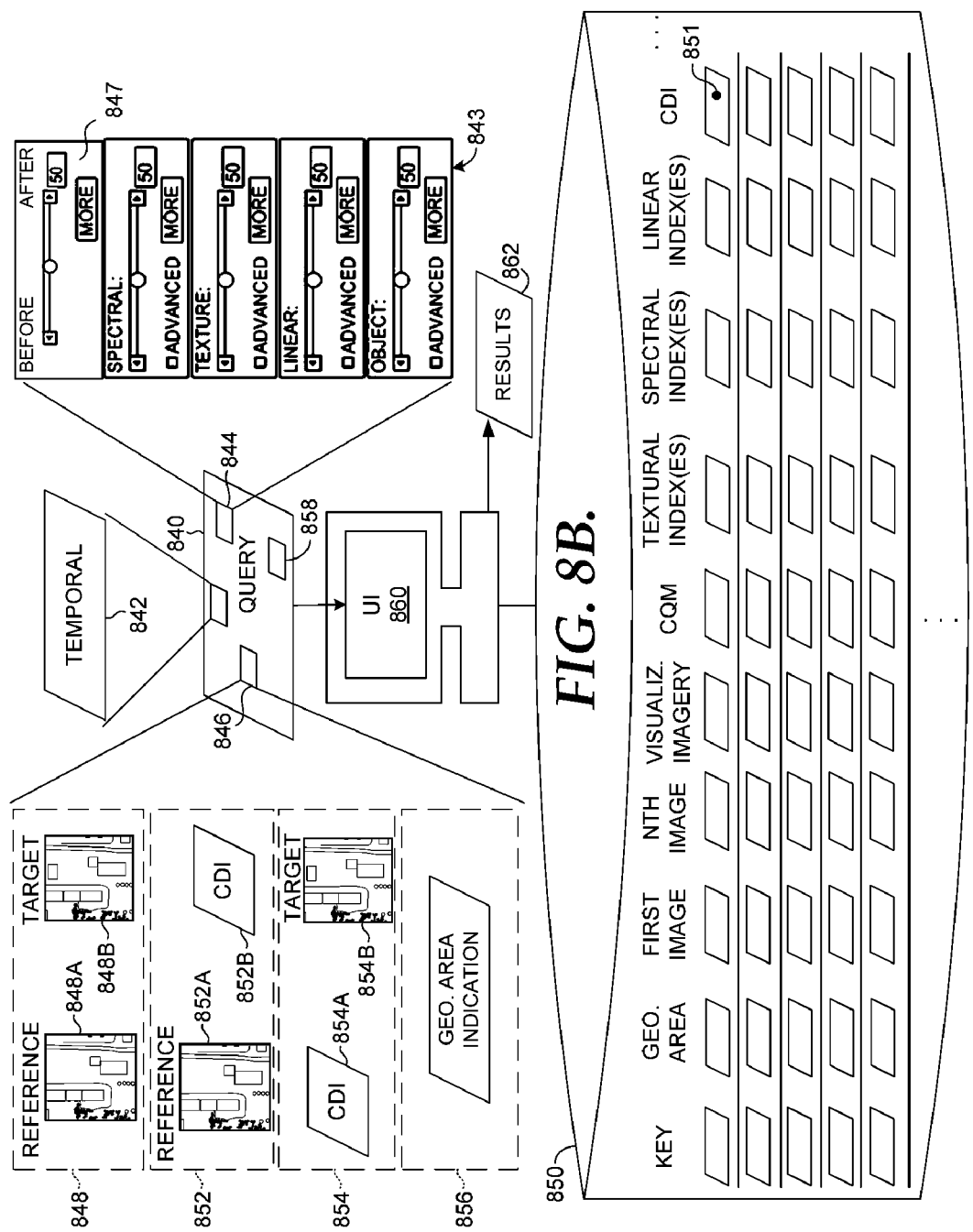
FIG. 8B is a block diagram that depicts various types of query inputs that might be associated with a given query.

Turning now to FIG. 8B, a diagram is provided that will be used to reference retrieval aspects below. As shown, a query 840 includes one or more inputs. A first type of input might be temporal inputs 842. These inputs would indicate various time spans or dates, such as from such and such year to such and such year. Timing can be done at as low a level as timing allows, such as down to the month or day level if the information is available. Another type of input might include a weighting input 844. This is referenced by showing a set of sliders 843, which can take the form of a user interface component that allows a user to emphasize what type of features should play what type of role in connection with returning results associated with query 840.

If a user does not care about linear attributes for example, then the corresponding slider can be moved to the zero end of the spectrum so that it plays virtually no weight. Similarly, when a certain type of change is sought, sliders can be used to indicate an emphasis to be placed on perhaps a before scene, or an after scene in connection with change information (see, e.g., slider 847). Other inputs are referenced by 846. Input 846 indicates that a first set of inputs 848 could include a reference image 848A as well as a target image 848B. In this example, if someone were searching for change information, then reference image 848A and target image 848B can be compared so that change information associated with the two images can be derived, and then dataset 850 can be searched for other geographic areas that have changed in a manner similar to the way that reference image 848 transitioned to target image 848B.

Again, by using sliders such as those at 846, the results returned might be those results that change in a similar manner but which started in a manner similar to reference image 848A; or in another search, results can be returned that had similar change information but that winded up looking like target image 848B. Another form of input 846 might include that of 852, which includes a reference image 852A and changed-detection information 852B. In this example, changed-detection information 852B is provided as well as a reference image 852A.

Another illustrative type of criteria that serves as input 846 might include those referenced by 854, which include a set of changed-detection information 854A as well as an "after" image 854B.

And still another embodiment, input 846 might include only an indication of a geographic area, referenced by 856. In this example, someone might request any information related to things that have changed in a given geographic area. Although not shown, still another type of input might include change information only. In this example, the change information serves as the only input, and dataset 850 is searched for geographic areas that are associated with change similar to the change information provided as the only input when making up query 840. This would be an illustrative example of other types of inputs, which is generically referenced by 858. Another example of an input 858 includes a change-intensity indication. That is, results can be searched for based only upon a given change intensity. One might search for "all regions that have changed by X much." Query 840 is received by user interface 860, which facilitates returning a set of results 862, which can be depicted in UI 860 or some other user interface. Details regarding dataset 850 are provided in FIG. 7C.

Figure 8C:
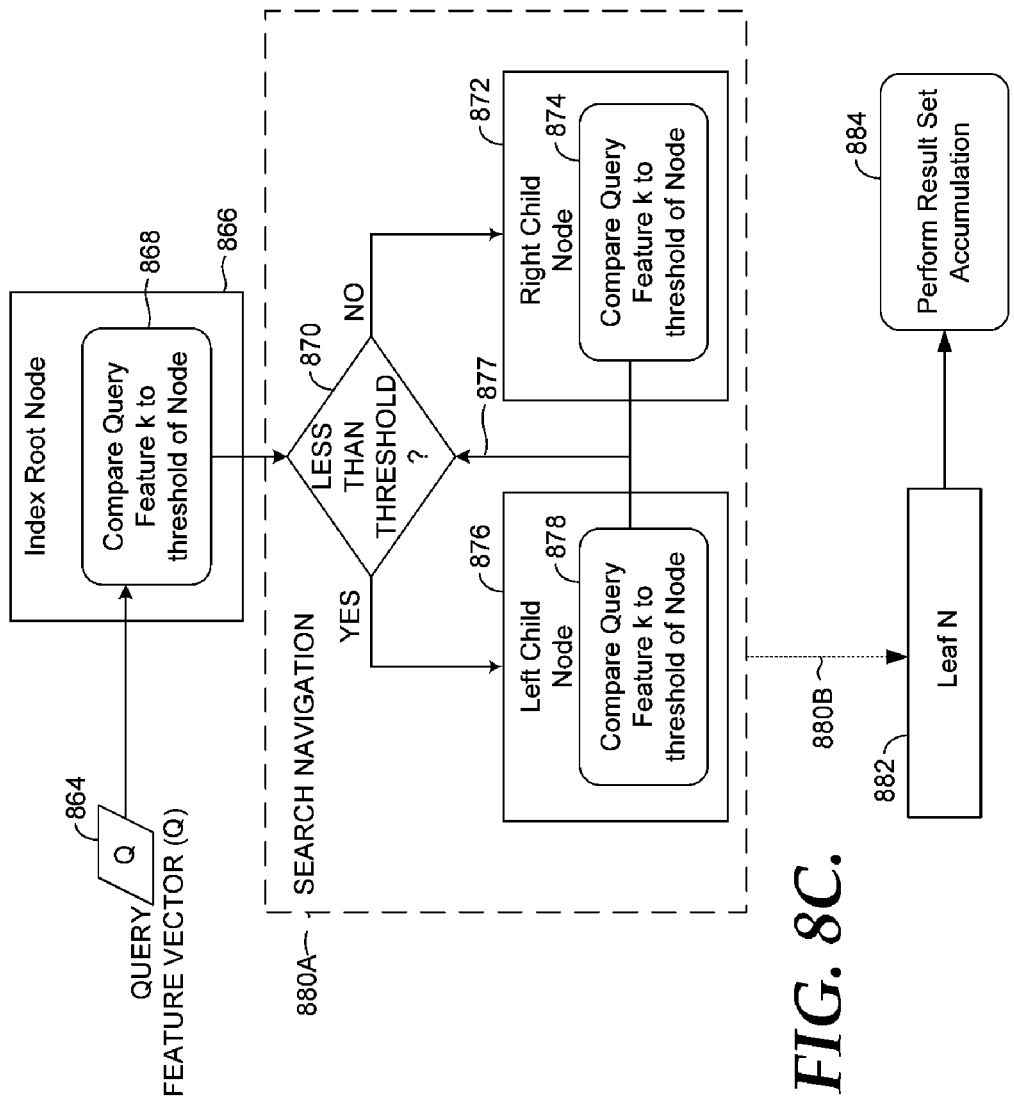
FIGS. 8C-8E depict more illustrative flows associated with searching for relevant results.

Turning now to FIG. 8C, a high-level flow diagram is provided that illustrates one embodiment of aspects of searching for results incident to receiving a query 864. In one embodiment, query 864 takes the form of a feature vector as previously mentioned. In this embodiment, query 864 interacts with index root node 866, in which a given feature "K" is compared to a threshold value of the node 868. If a determination is made at a step 870 as to whether the applicable query feature "K" is less than the applicable threshold associated with root node 866. If not, processing advances to a right child node 872, in which a comparison 874 is made between the query feature "K" to the threshold of node 872.

If, at step 870, query feature "K" was less than the threshold of node 866, then processing advances to left child node 876, in which a comparison is made between the query feature "K" to the threshold of the node 878. Arrow 877 indicates that the search navigation process 880A is repeated until the applicable leaf node is reached, which is indicated by numeral 882. The final navigation into the destination leaf node 882 is represented by 880B. Incident to reaching leaf node 882, the result set is accumulated at a step 884. The flow represented in FIG. 8C represents an embodiment of the actions carried out by an illustrative search agent, which was mentioned above. We will now describe an illustrative result-set-accumulation process with reference to FIG. 8D.

Figure 8D:
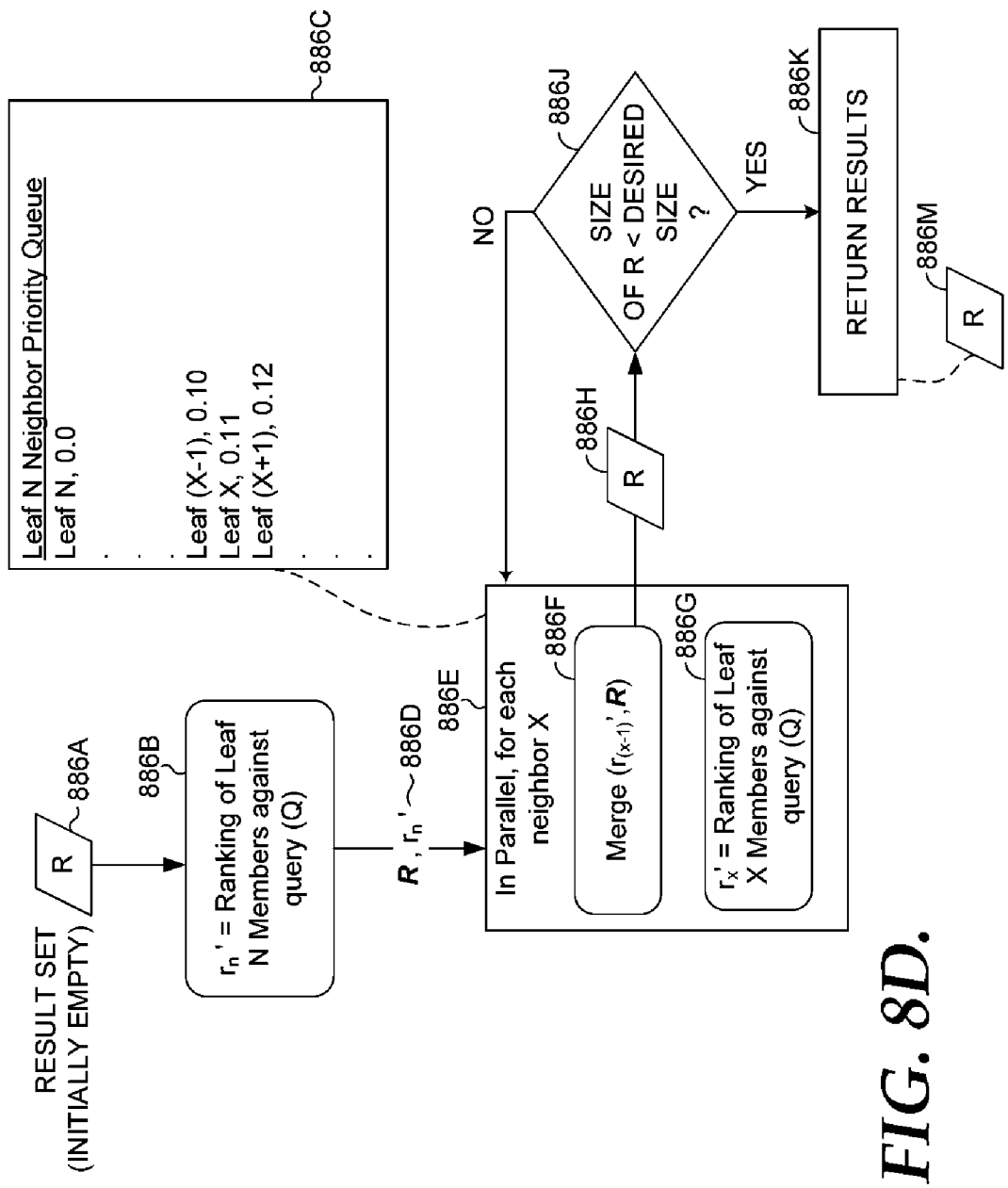

Turning now to FIG. 8D, an illustrative method for building a result set is provided. A result set 886A (also referenced by the letter "R") is initially empty. It is received by block 886B, which indicates a ranking of leaf N members against a given query, such as query 864 of FIG. 8C. This provides an output 886D that is received by process 886E, which in one embodiment includes performing a parallel process for each neighbor X. A first process 886F includes a merging of the values shown. Process 886G indicates a ranking of leaf X members against the query. A product of this process is result set 886H, which is evaluated for size. That is, at a step 886J, a determination is made as to whether the size of result set 886H is less than the desired size. If so, processing continues with the next neighbor leaf X in step 886E. Otherwise, results are returned at a step 886K, which results in a set of returned results 886M. A lead N neighbor priority queue 886C (see e.g. FIG. 7A) is associated with step 886E.

Figure 8E:
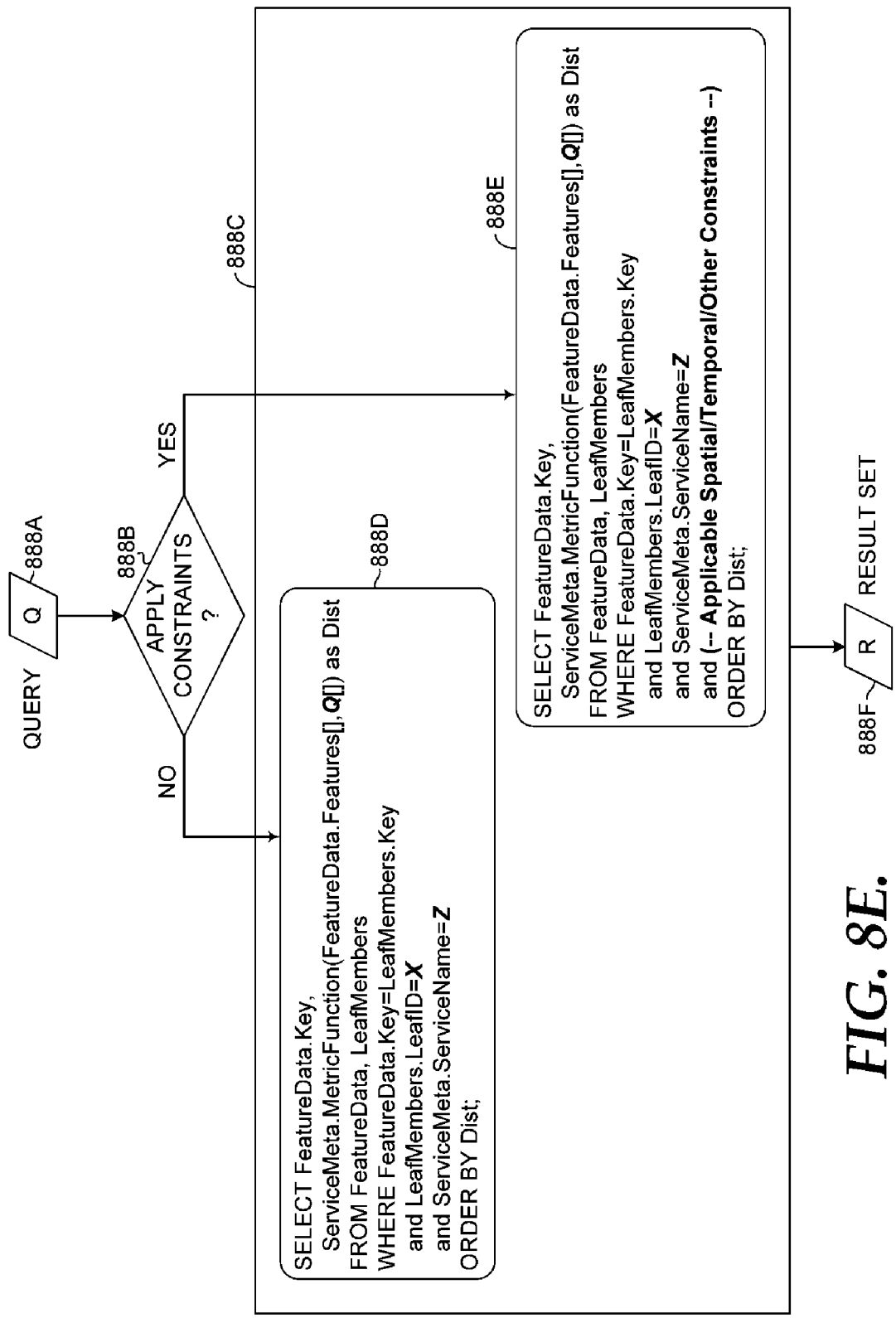

Turning now to FIG. 8E, an illustrative method for ranking lead members against a query is provided. A query 888A is evaluated at a determination step 888B to determine whether constraints are to be applied, advancing to one of two steps in block 888C. If constraints are to be applied, then processing advances to step 888E, which illustrates illustrative pseudo code that describes a process in which query 888A is an input. If constraints were not to be applied at step 888B, then the pseudo code associated with block 888D is applied in one embodiment. The outcome of either of these processes 888C yields result set 888F in one embodiment.

Figure 8F:
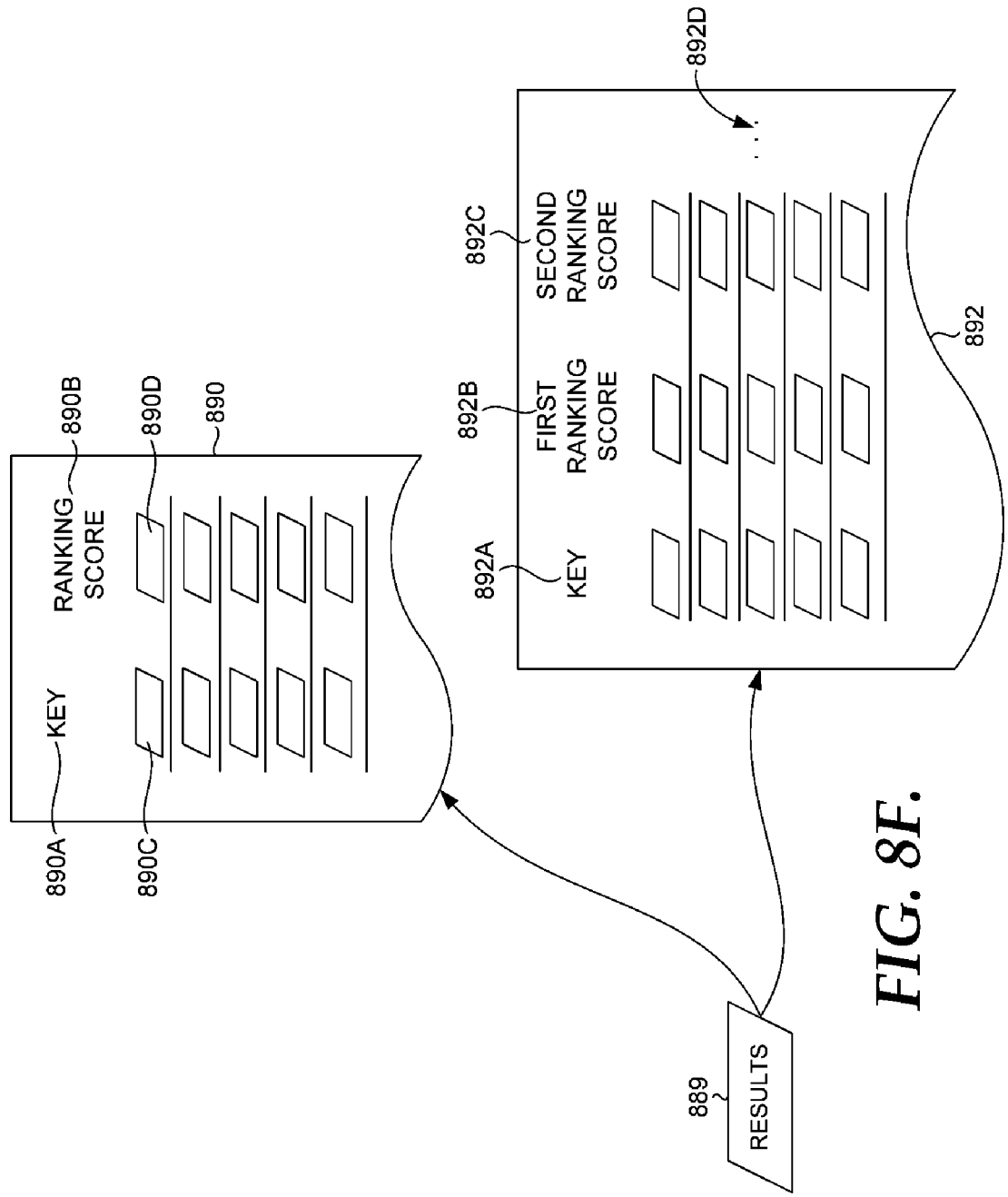
FIG. 8F depicts illustrative relationships between keys and ranking scores.

Briefly returning to FIG. 8B, results 862 are shown as being provided in connection with processing query 840. FIG. 8F depicts some illustrative formats that such a result set might assume.

Turning now to FIG. 8F, a given set of results is referenced by numeral 889. A first illustrative format of results set 889 is indicated by reference numeral 890. In this embodiment, what amounts to a two-dimensional array of populated values is returned. In this embodiment, a set of keys 890A are associated with a ranking score 890B. Thus, a given key 890C is associated with a given ranking score 890D. Ranking score 890D indicates a degree to which a geographic area associated with 890C exhibits characteristics that are of the type sought by a given query. Key 890C can be used to retrieve a variety of information. With brief reference to FIG. 7C, we show that key 890C is usable to retrieve items such as a geographic area, an image that depicts the geographic area in a certain state, an image or entire set of images that depict a geographic area in various other states, visualization imagery that can be used to present presentations of the geographic area at the different states, a change quality measure, other feature indexes, as well as change-detection information.

An illustrative query might seek an indication of tiles that have exhibited certain change characteristics in a given geographic area. As described, our technology enables results to be returned in the form of portions of that geographic area that are ranked according to one or more inputs into the query. If a given query has a result set that can be ranked by a single score, then returning a data structure of the likes of that depicted in block 890 can be provided.

In other embodiments, multiple ranking scores can be associated with a set of keys. For example, data structure 892 indicates that a set of keys 892A are respectively associated with a first ranking score 892B as well as a second ranking score 892C. Still other ranking scores could also be included, which is indicated by reference numeral 892D. Multiple ranking scores can be useful in embodiments where the results returned might be a function of multiple variables. For example, consider a query that seeks geographic regions that have changed in a manner similar to a way that another geographic area has changed. In such an example, a user might be interested in results that are most similar to a change signature. In such a case, first ranking score 892B might correspond to how similar target geographic areas have changed in comparison to a given set of source change-detection information. But a user might also wish to rank the results based on the after state of a given geographic area. For example, assume that a user wishes to search for geographic areas that have changed in a way similar to a first geographic area, which has changed from a first state to a second state. Let's assume that the second state looks like a road, and the first state looks like a forest. Incident to processing a query that describes the user's search, results are returned and first ranking score 892B indicates geographic areas associated with a change pattern that is similar to that of the source change signature. But a user might be most interested in results that have a similar change pattern (e.g., a similar change map or change intensity) but that wind up looking like the source geographic area; that is, like the image of the source geographic area in the second state. Thus, the user is interested in receiving indications of geographic areas that have changed in a certain way and that wind up including pictures of a road. If this is the case, then second ranking score 892C might indicate a degree of similarity between two after images.

Similarly, if a user was more interested in the results that exhibit similar change features but that also appear the way the source geographic area started off; that is, the way it was depicted in its first state. In such an example, second ranking score 892C might be used to indicate a similarity of two common first states. We have provided two illustrative examples to illustrate the concept that search results might be ranked based on more than one score. Sometimes, results 889 are to be revised. For example, a user might provide feedback that indicates a desire to have an initial result set revised.

Figure 8G:
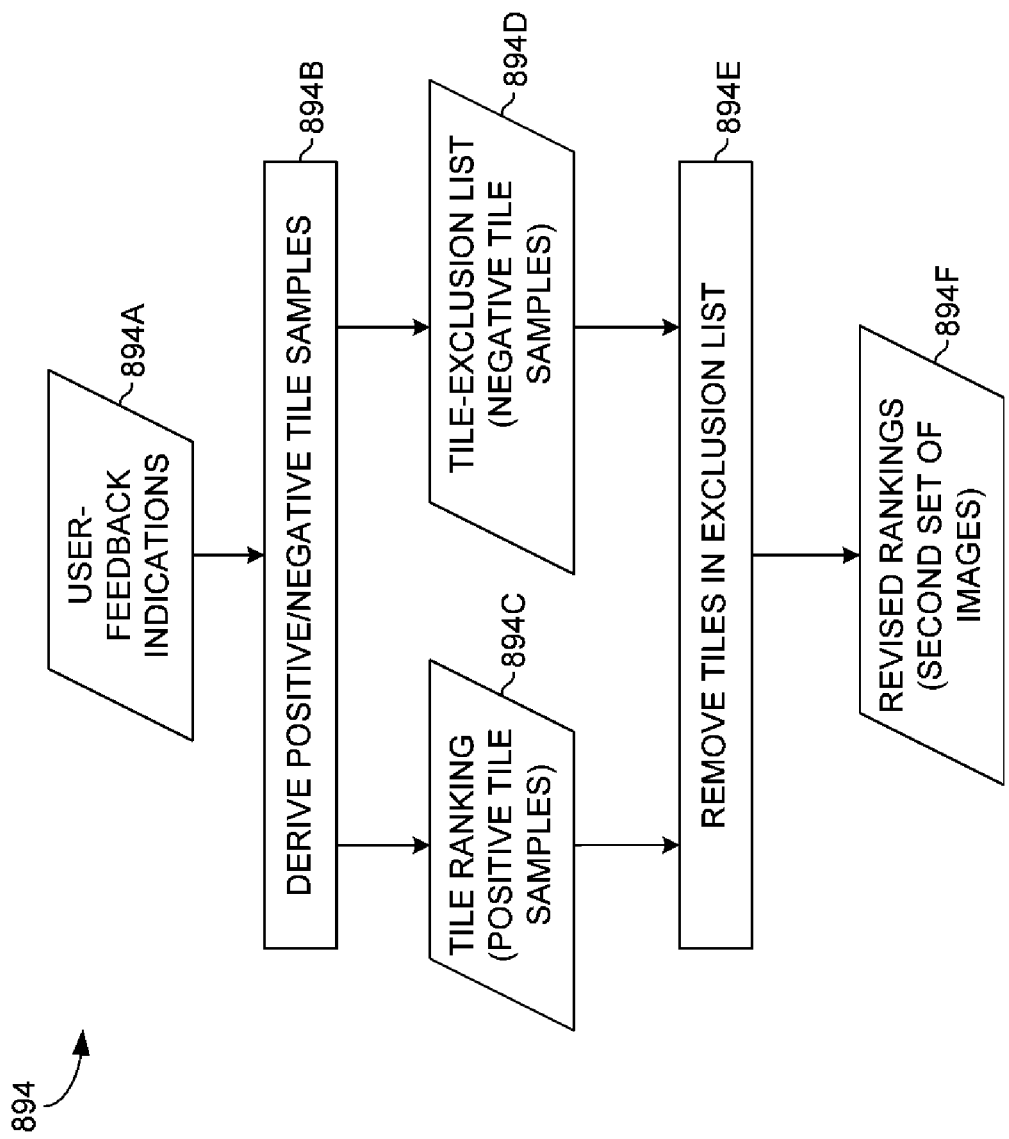
FIGS. 8G-8I depict illustrative processes for applying feedback indications to a set of results.

Turning now to FIG. 8G, we depict an illustrative process 894 for revising an initial set of results. Further below in this disclosure, we will provide examples of how a user could provide user-feedback indications 894A. Briefly, when query results are presented to a user, they can be presented in connection with a set of user-feedback options that enable a user to provide feedback based on the individual results returned. This can be seen, for example, in FIG. 18. In other embodiments, pop-up windows can be used to expose a set of links that provide additional input that is associated with a set of query results already returned. An illustrative pop-up window or control includes that of 2412 in FIG. 24. Both of these features will be described in greater detail below, but we wanted to briefly introduce them here.

Incident to receiving a set of user-feedback indications, positive and/or negative tile samples are derived at a step 894B. A tile ranking 894C associated with positive tile samples is generated. Also, a tile exclusion list 894D is generated, which is usable to account for negative tile samples. At a step 894E, the tiles in exclusion list 894D are removed, resulting in a revised set of rankings 894F. The revised rankings correspond to re-ranked geographic areas, which are associated with corresponding imagery, which is why we also indicate that the revised rankings amount to a second set of images. In some embodiments, the second set of images is a subset of the first set of images, but in other embodiments the regions that are returned are outside of the initial set. For example, perhaps a user performed an initial search and then sought a revised set of results based on one or more regions that exhibited desirable features. Incident to receiving an indication of those user-feedback options, an embodiment of our technology would enable, for example, searching for other geographic areas that exhibit features that a user indicated as desirable in connection with the chosen initial set of results. In another example, perhaps a user was initially searching geographic areas in Missouri, and then sought a revised set of results based on one or more regions that exhibited desirable features. Incident to receiving an indication of those user-feedback options, an embodiment of our technology would enable searching the entire country, for example, for other geographic areas that exhibit features that a user indicated as desirable in connection with the chosen initial set of results.

Figure 8H:
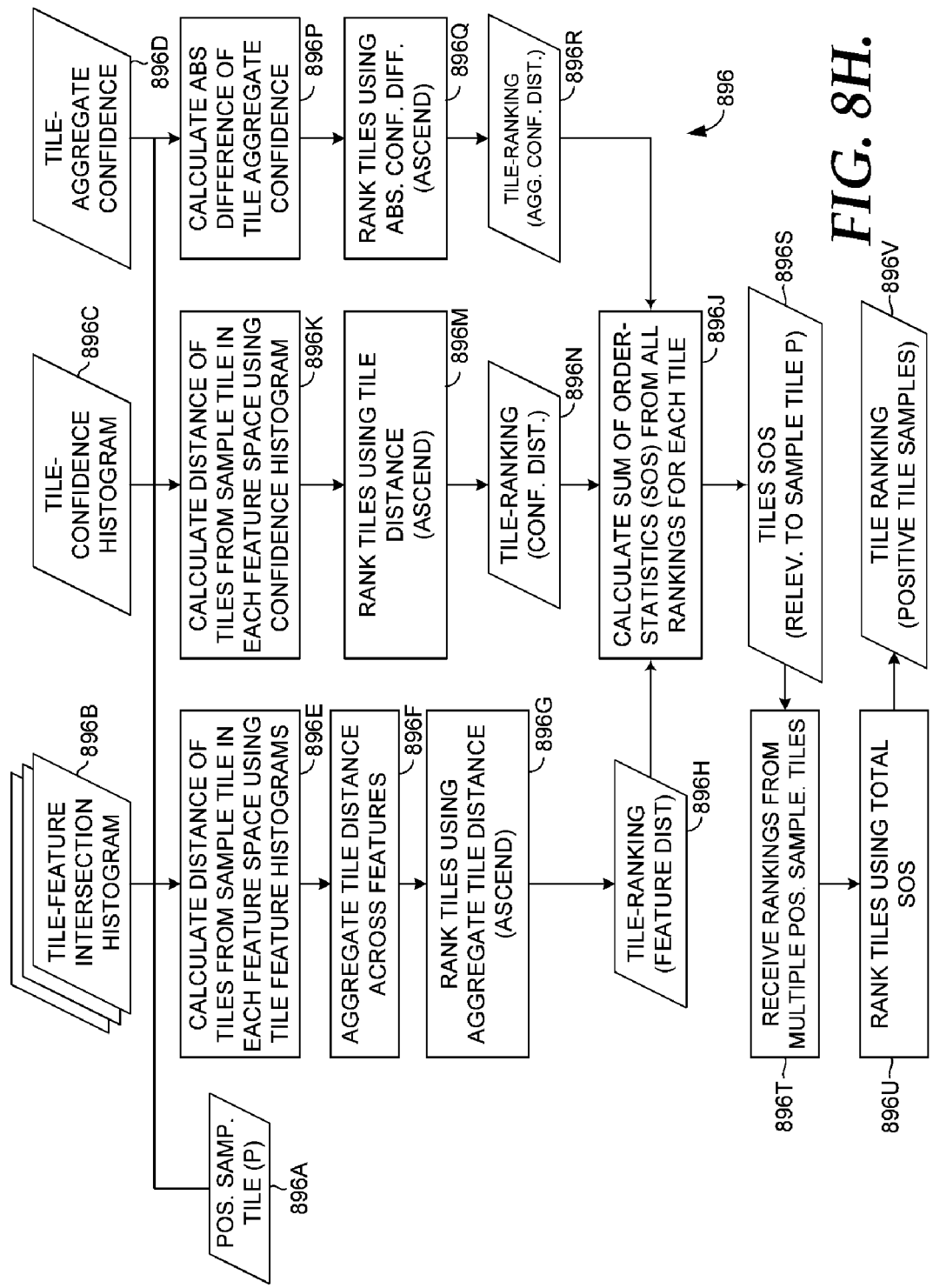

Turning now to FIG. 8H, an illustrative process for deriving a tile rankings 894C is provided and referenced generally by the numeral 896. An initial positive sample tile (P) 896A serves as input to three processes, which are indicated by reference numerals 896E, 896K, and 896P. Starting with the left portion of the flow, a tile-feature-intersection histogram 896B serves as a second input into step 896E, which includes calculating a distance of tiles from sample tile 896A in each feature space using the tile-feature histograms 896B. Again, when we speak of "distance" in this context, we are generally referring to a quantified value that indicates a relevancy to a provided query. Step 896E is done as many times as histogram inputs are provided. For example, one embodiment of our technology utilizes 14 tile features, and thus 14 histograms. In such an embodiment, step 896E is performed 14 times. The tile distances are aggregated across features at a step 896F. At a step 896G, the tiles are ranked according to the aggregate tile distance of step 896F. In one embodiment, the ranked order is ascending. The fruit of this step is an initial tile ranking 896H, which indicates feature distance. This tile ranking 896H is inputted into step 896J, which calculates the sum of order statistics (SOS) from all the rankings for each tile. While not shown in FIG. 8H due to space limitations, feature histograms associated with the "before" tiles and feature histograms associated with the "after" tiles could follow the same processing sequence associated with the tile feature intersection histograms 896B. In one embodiment, this would allow for feedback associated with the "before" and "after" tile states to return ranked results that are more like one or the other state. We will describe how the other tile rankings are obtained now.

Returning to step 896K, which contemplates calculating a distance of tiles from sample tile 896A using the tile-confidence histogram 896C. At a step 896M, the tiles are ranked based on their respective distance scores. In one embodiment, this ranking is in ascending order. An output of this process is a tile ranking 896N, which relates to confidence distance. This tile ranking 896N is also inputted into step 896J in one embodiment.

Returning to step 896P, which contemplates calculating an absolute difference of tile-aggregate confidence, inputs include positive sample tile 896A as well as an indication of tile-aggregate confidence 896D. From this, the tiles can be ranked using absolute tile confidence difference, thereby yielding a tile ranking 896R, which relates to aggregate confidence difference 896Q. This ranking 896R is also inputted into 896J, which yields an indication of a set of tiles sum of order statistics 896S, which is relevant to sample tile 896A. This process can occur for multiple positive sample tiles. For example, a user might indicate multiple tiles as being the type of tiles of interest to him or her. Thus, all of the applicable rankings from multiple positive sample tiles are received at step 896T. The tiles can be ranked using a total SOS value at a step 896U, which results in a tile ranking 896V that is relevant to the positive tile samples. This tile ranking 896V can be the same as that of 894C in FIG. 8G.

Figure 8I:
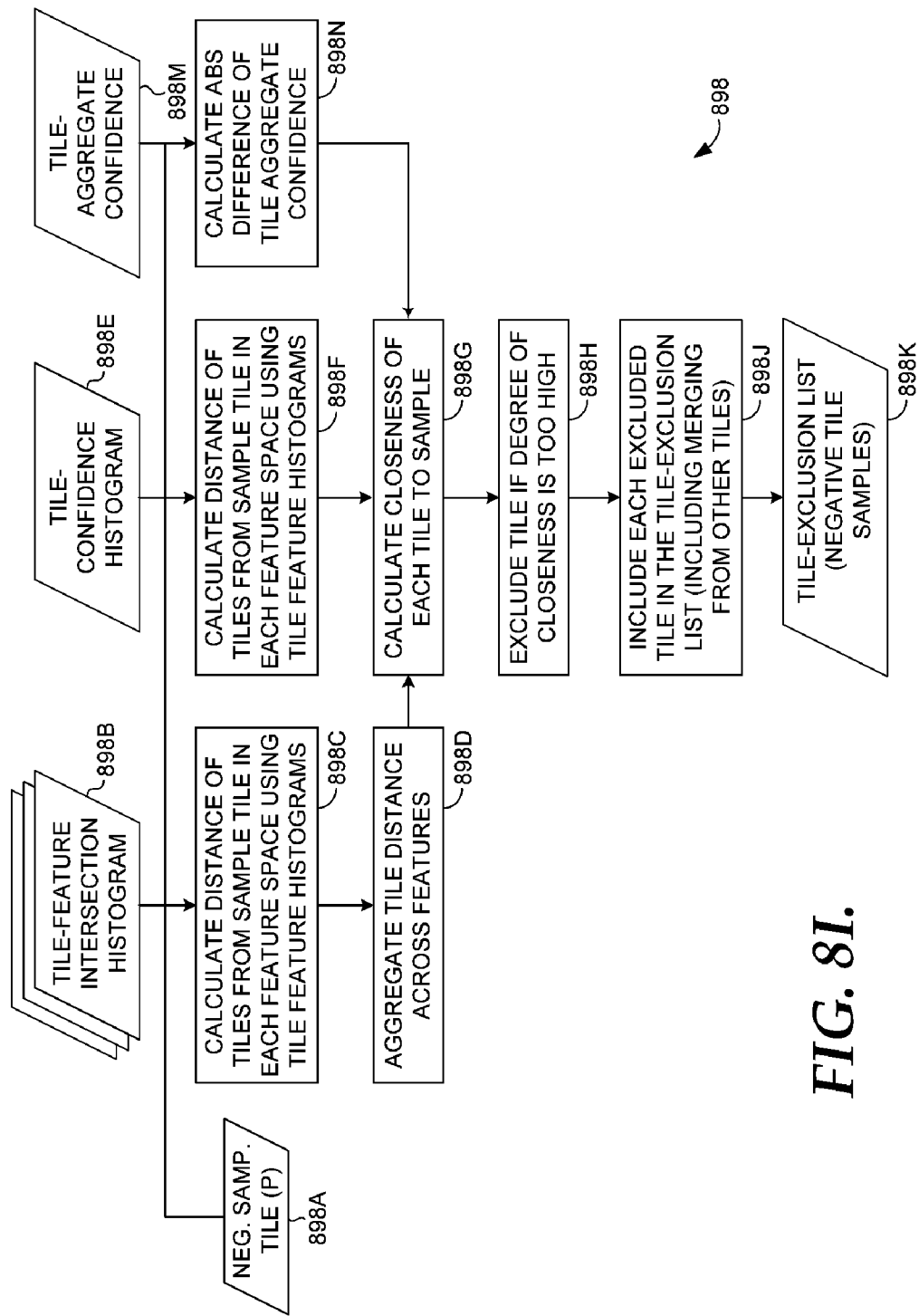

Turning now to FIG. 8I, an illustrative method for constructing a tile-exclusion list 898D is provided and referenced generally by the numeral 898. A first input includes a negative sample tile (P) 898A. A negative sample tile could be a tile that a user indicates is undesirous; that is, as having features that are undesirable to a user. Other inputs include a set of tile-feature intersection histograms 898B, a tile-confidence histogram 898E, as well as a tile-aggregate confidence 898M.

Tile-feature-intersection histogram 898B is received along with sample tile 898A at a step 898C, in which a calculation is made of the distance that the tiles are from sample tile 898A in each feature space using the tile-feature histograms 898B. These distances can be aggregated across the various features at a step 898D, after which processing advances to a step 898G in which calculation is made of the closeness of each tile to sample tile 898A.

Tile-confidence histogram 898E is inputted into step 898F along with negative sample tile 898A so that the distance of the tiles from sample tile 898A can be calculated. Processing advances to step 898G, in which the closeness that each tile is to the sample is calculated. Similarly, at a step 898N the absolute difference of tile-aggregate confidence 898M is calculated based on negative sample tile 898A. The outputs of this step 898N are also inputted into step 898G, after which processing advances to a step 898H in which the tile is excluded if its degree of closeness is too high. Here, we are looking to exclude tiles similar to the provided negative sample 898A.

At a step 898J, tiles are included in the tile-exclusion list, as are other tiles that have been acted on in addition to sample tile 898A. This results in creating tile-exclusion list 898K, which can be the same as tile-exclusion list 894D of FIG. 8G.

We will now summarize in some respects and in other respects provide additional examples of aspects of our technology. From this point forward, although we might make reference to other figures as well, we will describe some examples in connection with FIG. 1B, which depicts a first geographic area 110 as well as a second geographic area 112. Each of the geographic areas are associated with imagery taken at least two different times. Clearly, if images were taken at multiple times, then multiple states would be depicted. But as shown, each area is associated with a first state and a second state. First geographic area 110 is associated with an image that depicts a first state 114 as well as an image that depicts a second state 116. Various features 118 are associated with a geographic area imagery of the first state, and corresponding features 120 are associated with the image that depicts the second state 116 of first geographic area 110. A corresponding change map 122 indicates change associated with change from first state 114 to second state 116. Similarly, a change quality measure 124 as well as a set of difference-feature vectors 126 are also associated with change between first state 114 and second state 116. We do not mean to imply that these are necessarily associated with change map 122, but schematically show them in close proximity to change map 122 to convey that they convey change information associated with first geographic area 110. Similarly, second geographic area 112 includes imagery 130 that depicts it in a first state as well as imagery 132 that depicts the same area 112 in a second state. First state 130 is associated with a set of features 134, and second state 132 is associated with a corresponding set of features 136. A change map associated with first state 130 and second state 132 is referenced by the numeral 138, as well as a corresponding change quality measure 140 and set of change features 142. As with the first geographic area, second geographic area 112 has imagery taken at two times, thereby providing first state 130 and second state 132. In other embodiments, multiple images taken at multiple times could be employed to derive any number of states of the two geographic areas in overlapping portion 150, which intersects the two geographic areas.

Figure 9A:
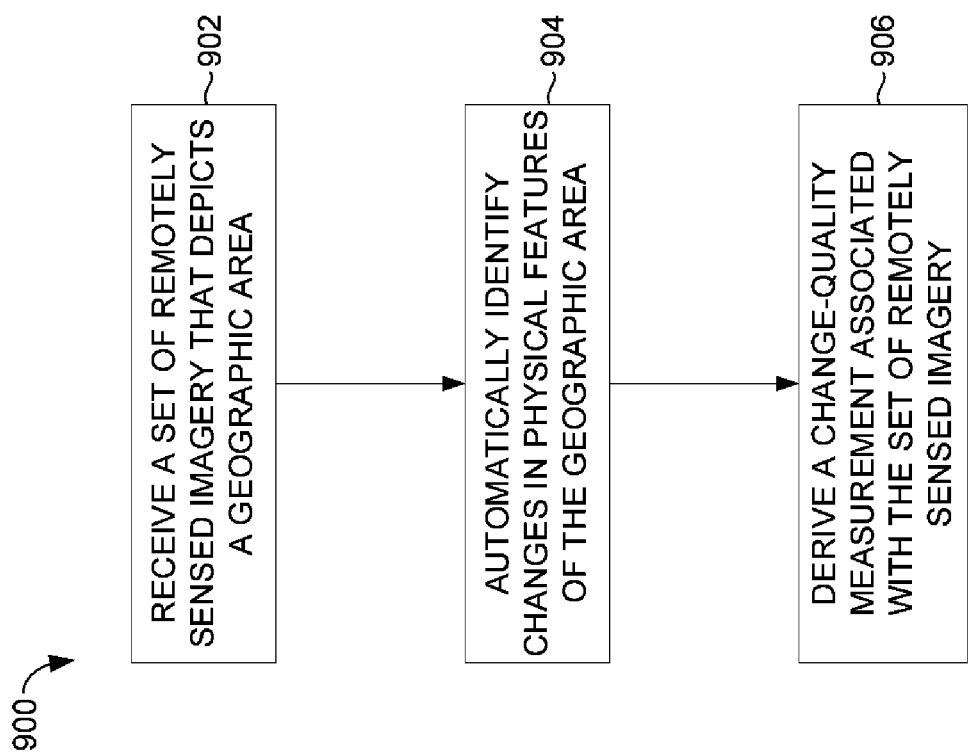

Turning now to FIG. 9A, an illustrative method for detecting change in a geographic area is provided and referenced generally by the numeral 900. At a step 902, a set of remotely sensed imagery is received that depicts the geographic area. For example, remotely sensed imagery 152 might be applicable.

At a step 904, changes in physical features of the geographic area are automatically identified. We have previously described illustrative embodiments of change-detection processes that would identify changes in physical features between two states of the given geographic area. For example, if one were considering second geographic area 112, this step would include detecting changes between first state 130 and second state 132.

At a step 906, a change-quality measurement associated with the set of remotely sensed imagery is derived. We illustratively show change-quality measurement 140 in connection with second geographic area 112, which is associated with imagery that depicts first state 130 as well as second state 132. We have also discussed methods for calculating CQM 140 above. See, for example, FIGS. 5E-5G. As mentioned, the change-quality measurement 140 quantifies a suitability of comparison of the set of remotely sensed imagery to previously stored imagery. Thus, first state 130 is associated with previously stored imagery, and, by way of example, second state 132 is associated with newly acquired imagery. CQM 140 indicates a suitability for comparing the two images. We have previously mentioned that illustrative attributes that factor into determining CQM 140 include a similarity of times of day, a similarity of sensor-pointing geometries, as well as any factor that indicates a likelihood of seasonal differences being responsible for image differences. Such a factor might include an indication of a similarity of days of year, a similarity of sun-aspect geometries and a given latitude at which the images were taken.

Figure 9B:
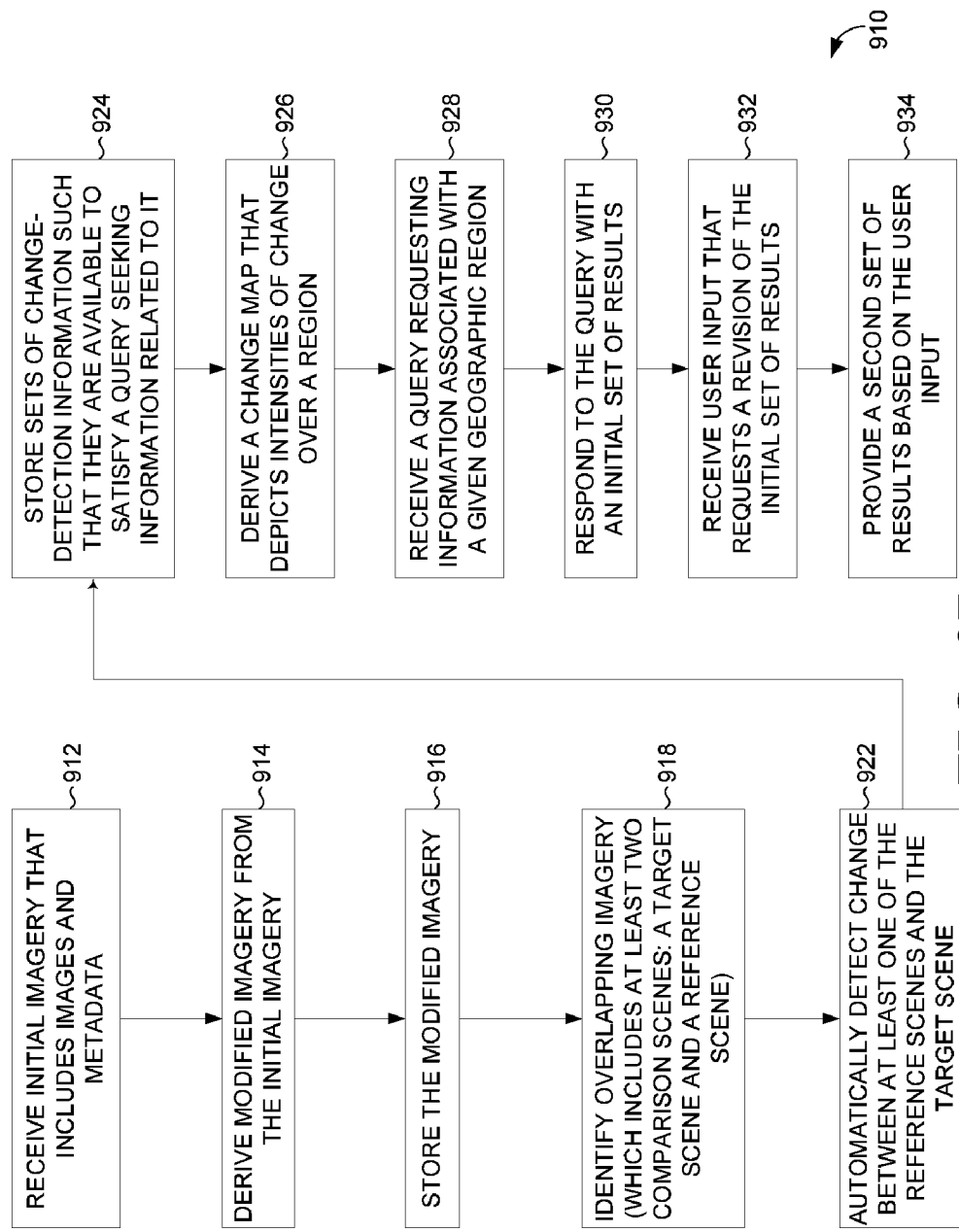

Turning now to FIG. 9B, a more detailed flow diagram that illustrates an illustrative method of detecting change in a given geographic area is provided. The change that could be detected does not need to include an entire area but might include portions thereof or even items therein. At a step 912, the initial imagery is received that includes images and metadata. Illustrative initial imagery could include that of FIG. 1A illustrated by numeral 118A. In such an embodiment, modified imagery is derived from the initial imagery at a step 914. In other embodiments, what is referred to as modified imagery might not need to be derived if it is already corrected in a manner that makes it suitable for comparison with other images.

At a step 916 the modified imagery is stored. In one embodiment, the stored modified imagery has been subjected to a geometric-correction process prior to being stored, thereby compensating for imagery distortions due to terrestrial topographic features. We have discussed this above. Storing the modified imagery might also include resampling the initial imagery to a nominal resolution, such as a common resolution shared between comparison images. In still other embodiments, the modified imagery includes initial imagery that has been geometrically corrected, resampled to a nominal resolution, had its pixel values converted to reflectance, and reprojected onto a common coordinate system. Illustrative coordinate systems include UTM, state plane, geographic, military-grid, etc., as previously mentioned.

At a step 918, overlapping imagery is identified. This overlapping imagery can include two comparison scenes, such as a target scene and a reference scene. In one embodiment, the target scene includes a portion of modified imagery that describes a certain geographic region, such as first geographic area 110 in FIG. 1B. Multiple reference scenes can be subsets of formerly stored imagery that also describe the same geographic area, such as first geographic area 110. Thus, in this example, first state 114 might take the form of a reference scene and second state 116 corresponds to a target scene. As mentioned, identifying overlapping imagery can be accomplished by coregistering the target scenes with each other, or coregistering the target scenes with a single reference scene that serves as a common basis for coregistration of multiple scenes (see, e.g., FIG. 4B).

At a step 922, changes are automatically detected without user intervention between however many scenes are desired, such as in between first state 114 and second state 116. In one embodiment, automatically detecting changes include referencing change-quality measure 124. In some embodiments, merely querying on change-quality measure 124 can provide a certain set of desired results.

In one embodiment, automatically detecting changes includes automatically extracting a set of target features 120 from target scene 116, comparing the set of target features 120 to stored reference features 118 associated with reference scene 114. Automatically detecting changes can also include producing multiple sets of feature differences 126. We show 126 as including multiple sets wherein each set might be associated with a sub portion of first geographic area 110. This results in a group of feature differences 126. As mentioned, the features might include spectral features, spatial features, linear features, or textural features. These, of course, are not the only features that might form a part of feature set 118 or 120, but are provided by way of illustration. Those of ordinary skill in the art might associate different wording with our terminology. For example, two main features include spectral and spatial features. Some features are a combination of these, such as wavelet, linear, and textural being derived therefrom. We do not mean to make any limiting comments in connection with explaining illustrative features and types of features that could be extracted and form parts of sets 118 or 120.

Automatically detecting changes (step 922) can also include deriving a change-map 122, which indicates areas of change between the comparison scenes 114 and 116. As we hopefully made clear previously, change map 122 depicts much more than whether there was change or not, especially at the pixel level. For example, one approach might be to simply indicate whether a change is associated with a given pixel, or change above some threshold. We do much more than this. We indicate intensity of change as well as area of change, and will show examples of this in other figures (such as FIG. 15, referencing numerals 1518 and 1520). As previously described, the areas of change identified in change map 122 can be gleaned by subjecting pixels to multiple successive thresholds that ultimately make up the change map and that also indicate pixel-wise change; that is, change at the pixel level.

In some embodiments, the change-detection or other process further includes subdividing change map 122 into a set of subparts, determining a change score associated with each of the subparts by aggregating pixel-wise difference values between pixels within the subparts, and ranking each subpart based on the change score, which indicates an amount or intensity of change from first state 118 to second state 120.

At a step 924, the sets of change-detection information 126 are stored such that they are available to satisfy query-seeking information related to it. We have described manners in which the change-detection information can be stored so as to facilitate efficient retrieval as well as efficient storage. This enables the change-detection information 126 to be added to a set such as dataset 252 at FIG. 2 so that it can be acted on by a query seeking specific results.

Step 926 describes deriving a change map that depicts intensities of change over regions such as first geographic region 110. At a step 928, a query requesting information associated with a given region can be received. An initial set of results can be provided at a step 930, which could be presented on a user interface. In some embodiments, user input is received at a step 932 requesting a revision of the initial set of results. When we speak of a revision of the initial set of results we do not mean to imply that the second set of results that are provided (step 934) all come from the first set of results. To the contrary, it might be the case that all or a portion of the second set of results were not part of the initial set of results returned.

As briefly mentioned, the results can be presented on a presentation device so that the change information can be visualized. We will provide examples of such visualization below. One aspect of visualization includes presenting the aspects of change (such as those described by numeral 126) in context such that the aspects of change are presented among surroundings that have not changed beyond some amount. As we will explain, tiles can be ranked and then pushed out to an image viewer such that only small chips are highlighted, but are done so among a background, which enables the chips to be viewed in context; that is, in one embodiment, in the midst of surrounding geographic areas. In one embodiment, this push can occur through the delivery of a KML document that contains references to the imagery to be displayed.

Turning now to FIG. 9C, another embodiment of a method for detecting change in a geographic area is provided and referenced generally by the numeral 940. Provided steps similar to that of FIGS. 9A/9B were accomplished at some point, at a step 942, change-detection information is automatically derived that is based on differences between a first feature set of first imagery and a second features set associated with second imagery. For example, change-detection information can be based on differences between features set 118 and features set 120.

At a step 944, portions of changed-detection information 126 are logically associated with corresponding portions of a geographic area such as first geographic area 110. That is, in one embodiment, first geographic area 110 might be subdivided into a set of subareas. We illustratively showed a set of subareas on FIG. 6A (see, for example item 648). In one embodiment, sub-portions 648 are not actually created or separately stored, but are logically defined to facilitate a logical association of an individual geographic sub-portion with a set of change-detection information. But in other embodiments, the regions might be actually stored depending on implementation preferences.

At a step 946, the change-detection information is stored in a dataset such that the regions of the geographic area can be retrieved on demand to satisfy a query seeking change information within the geographic area. Portions of the change-detection information respectively correspond to regions of the geographic area.

At a step 948, a query is received that has certain inputs. The types of inputs can vary. Illustrative inputs include an indication of a given area and a time indication that indicates a time span over which change information is sought. Thus, in one embodiment, the inputs to a query include an indication of the area over which change information is sought as well as a time span. For example, a user might be interested in receiving change-detection information associated with the City of Springfield from 2001 through 2007. Other information could be provided as user inputs as well. For example, two images might be provided, wherein change information is gathered based on the two images, and the change information is used to search for other geographic areas that have changed in a manner similar to the change information derived. As previously mentioned, the inputs might also be only a single input, such as only a region indication or only a change-intensity indication. In the case of only a region indication, any change information associated with that region indicated would be provided in response to such a query. Similarly, if only change-intensity information were provided as a query input, then only those geographic areas that satisfy the change-intensity-information constraint would be returned. Many more options exist, and we will provide even more examples below.

The process 940 could also include identifying a set of target regions of the geographic area based on the inputs. The geographic area could be associated with a before image that depicts a given target region in a first state and an after image that depicts the given target region in a second state. By way of example, if the target region is first geographic area 110, then a before image might be the image associated with first state 114 while the aforementioned after image might be the image associated with second state 116.

At a step 950, results can be returned based on the query. In one embodiment, the results take the form of a ranked list of target regions, or identifiers capable of identifying the target regions. Attributes that have changed that can be searched on include a change intensity, a change-quality measure, a change in spectral features, a change in textural features, a change in linear features, and a change in shape features.

Figure 10A:
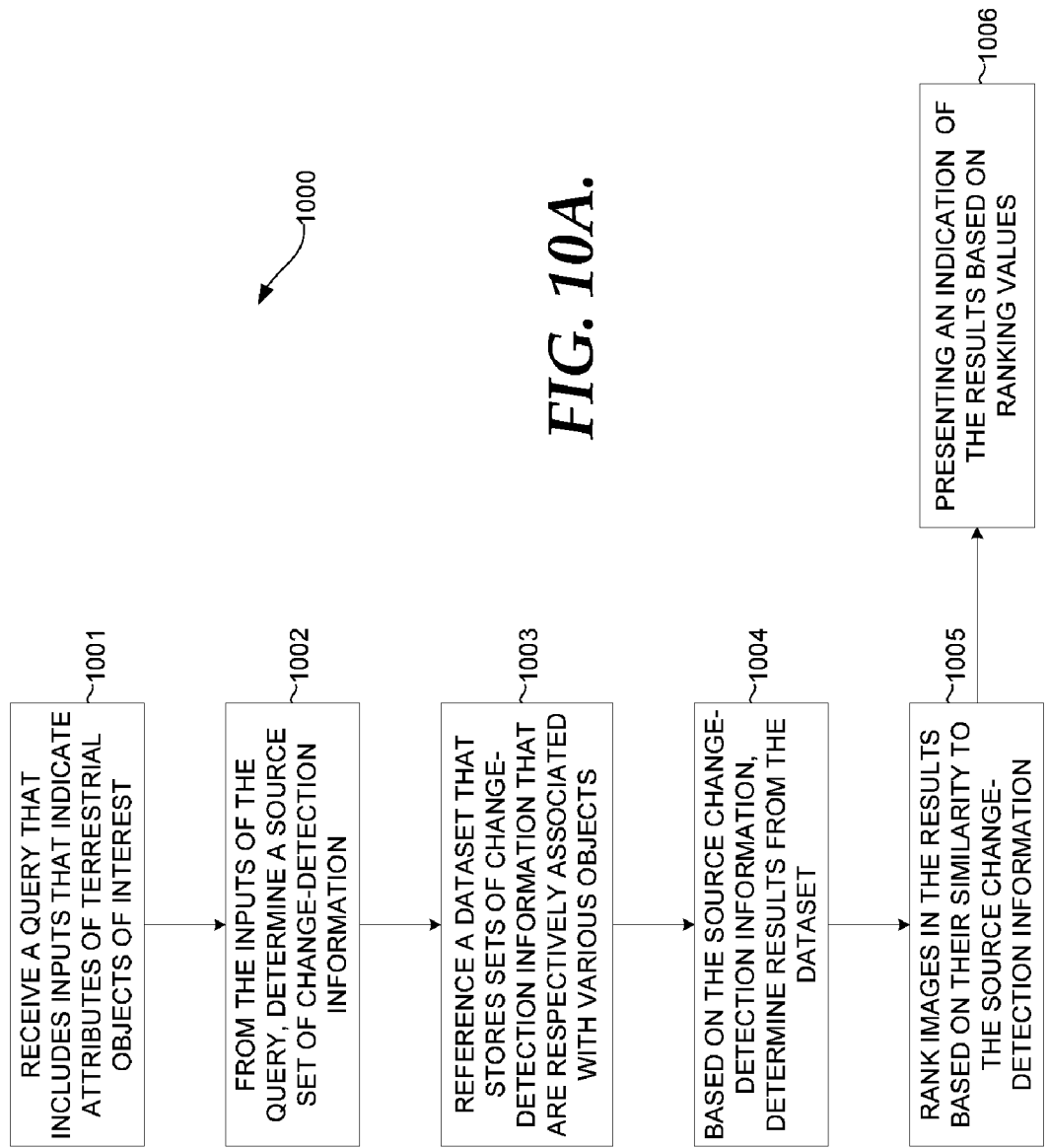
FIGS. 10A-10C depict illustrative methods for identifying terrestrial objects that have changed in a certain manner.

We will now describe illustrative methods for identifying terrestrial objects that change in a certain manner. We will reference FIG. 8B but turn now to FIG. 10A. FIG. 10A depicts such an illustrative process, which is referenced by numeral 1000. At a step 1001, a query is received that includes inputs that indicate attributes of terrestrial objects of interest. With reference to FIG. 8B, we show just a sampling of illustrative inputs to a query. For example, by way of reference numeral 846, a first set of inputs might include a reference image and a target image, 848. A second set of inputs 852 might include a reference image and change-detection information that is associated with that reference image. Similarly, as mentioned, another illustrative one or more inputs might include change-detection information 854A as well as a target image 854B. A geographic area indication 856 might be provided. A CQM value might also be provided. Temporal information 842 might be provided. Weightings can also be provided by way of a control such as that of 843. These weightings can be used to emphasize or de-emphasize various types of change features. In one embodiment, these weightings will be supplied to a result-set fusion process as shown in FIG. 7F. Similar sliders could also be used to provide emphasis given to the reference image 848A versus the target image 848B such that results look more like one or the other in connection with corresponding change-detection information.

At a step 1002, a source set of change-detection information is determined from the inputs of the query. For example, consider inputs 848 in FIG. 8B. Change detection might be gathered by referencing the geographic area associated with each of the images, and then corresponding change-detection information, which for example, might be changed-detection information 851. In another embodiment, if change-detection information was provided as an input to the query, then it will simply be referenced. An example would be providing CDI 852B or CDI 854A. In still another example, if a geographic-area indication 856 was provided, then its corresponding key from dataset 850 can be referenced to locate pre-stored change-detection information.

In still other embodiments change-detection information can be determined on the fly. That is, if images 848 were provided, change-detection information can be derived from those two images and then used in connection with seeking results from the applicable dataset.

The results of the query will be identified images that were derived from high resolution, remotely sensed imagery and that are associated with certain terrestrial objects (which might be geographic areas themselves) that have changed in the manner similar to a certain manner.

At a step 1003, a dataset is referenced that stores sets of change-detection information that are respectively associated with various objects. We show an illustrative dataset in FIG. 8B, referenced by numeral 850; another in FIG. 2, 252.

At a step 1004, results from the dataset are determined based on the source change-detection information. In one embodiment, the results include a set of images that includes content that is associated with change-detection information that is similar to the source change-detection information.

At a step 1005 the images are ranked based on their similarity to the source change-detection information. An indication of the results can be presented based on the ranking values at a step 1006.

Figure 10B:
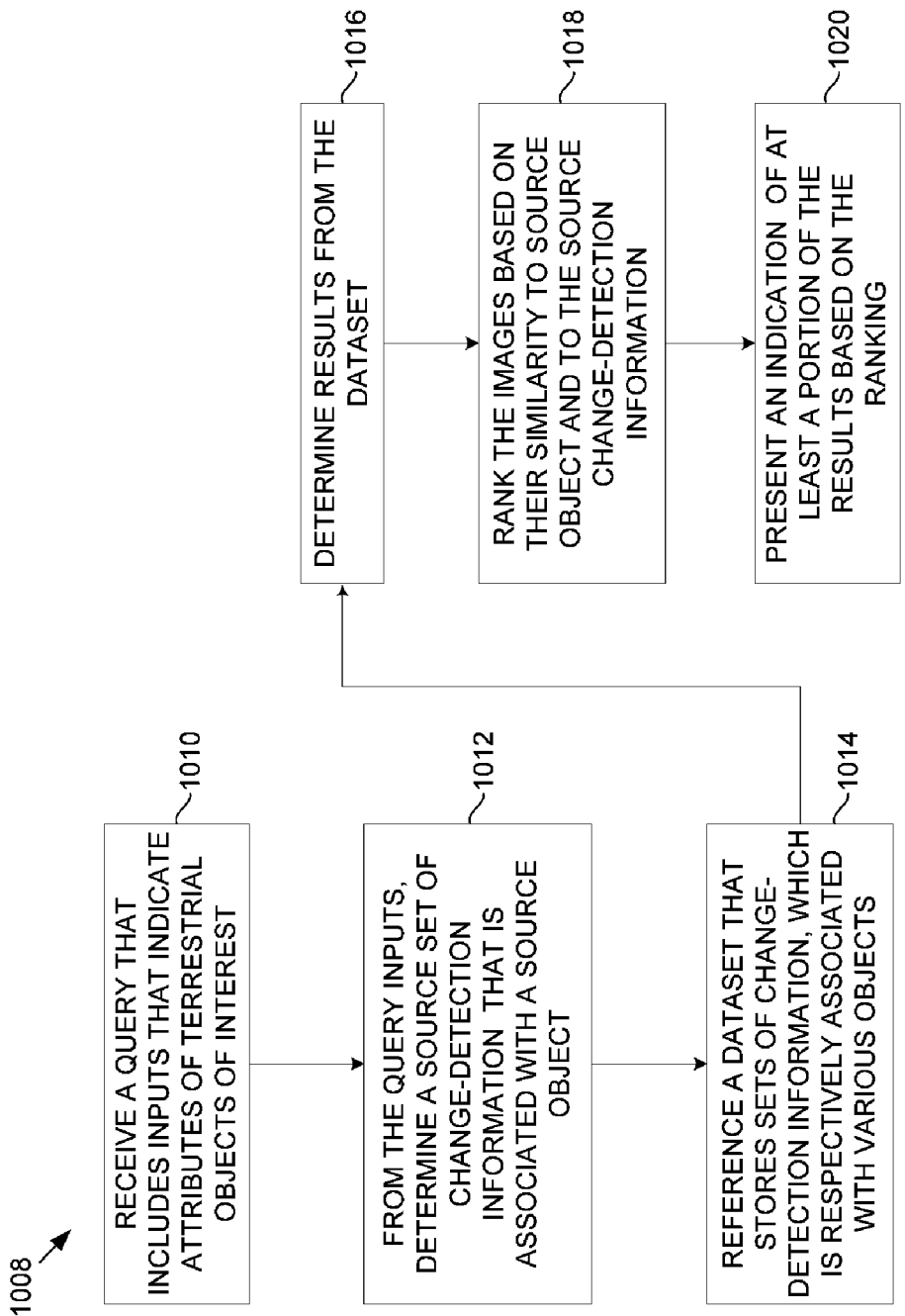

Turning now to FIG. 10B, another illustrative method for identifying terrestrial objects that have changed in a certain manner is provided and referenced generally by the numeral 1008. At a step 1010, a query is received that includes inputs that indicate attributes of terrestrial objects of interest. That is, a query is received that indicates attributes that would be possessed by objects that a user wishes to locate.

At a step 1012, a source set of change-detection information is determined that is associated with a given source object. We have previously described aspects similar to this step in describing step 1002 in FIG. 10A.

At a step 1014, a dataset is referenced that stores sets of change-detection information that is respectively associated with various objects.

At a step 1016, results from the dataset are determined. The results include, in one embodiment, images that include content that has features similar to those of the source object and that are associated with change-detection information that are similar to a set of source change-detection information. In one embodiment, determining the results includes identifying a source feature set that describes a set of features associated with a first image, comparing that source feature set against stored featured sets within the dataset, and determining which of the plurality of stored featured sets most closely matches the source feature set.

Figure 1B:
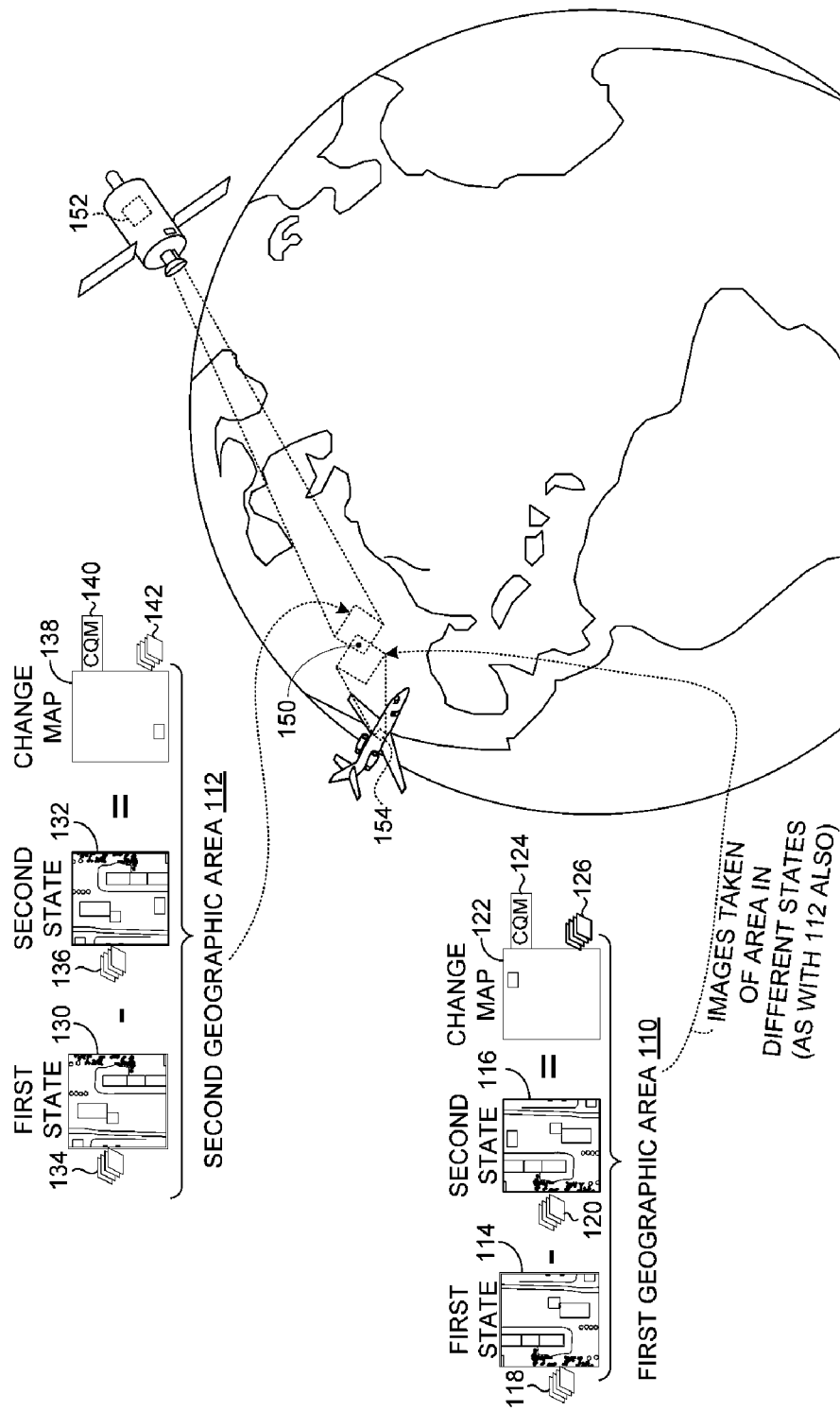
FIG. 1B depicts two illustrative geographic areas along with corresponding imagery.

Consider, for example, FIG. 1B. Identifying the source feature set might include identifying feature set 118. Then, the dataset might be searched for other images that share aspects of feature set 118. For example, items such as first state 130 might be retrieved if the dataset is similar. In other embodiments, feature set 120 might be used as a source to search upon. Still further, change-detection information 126 might be used to locate other geographic areas. For example, perhaps change-detection information 142 is similar to change-detection information 126. If so, then second geographic area 112 might be returned in response to a query based on first geographic area 110. Thus, determining the results includes determining target objects that are similar to the search object in the manner just described.

At a step 1018, the images are ranked based on their similarity to the source object and to the source change-detection information. As previously explained (for example with reference to FIG. 8F), the ranked results might be based on one or more ranking scores.

At a step 1020, an indication of at least a portion of the results are presented based on the ranking.

Figure 10C:
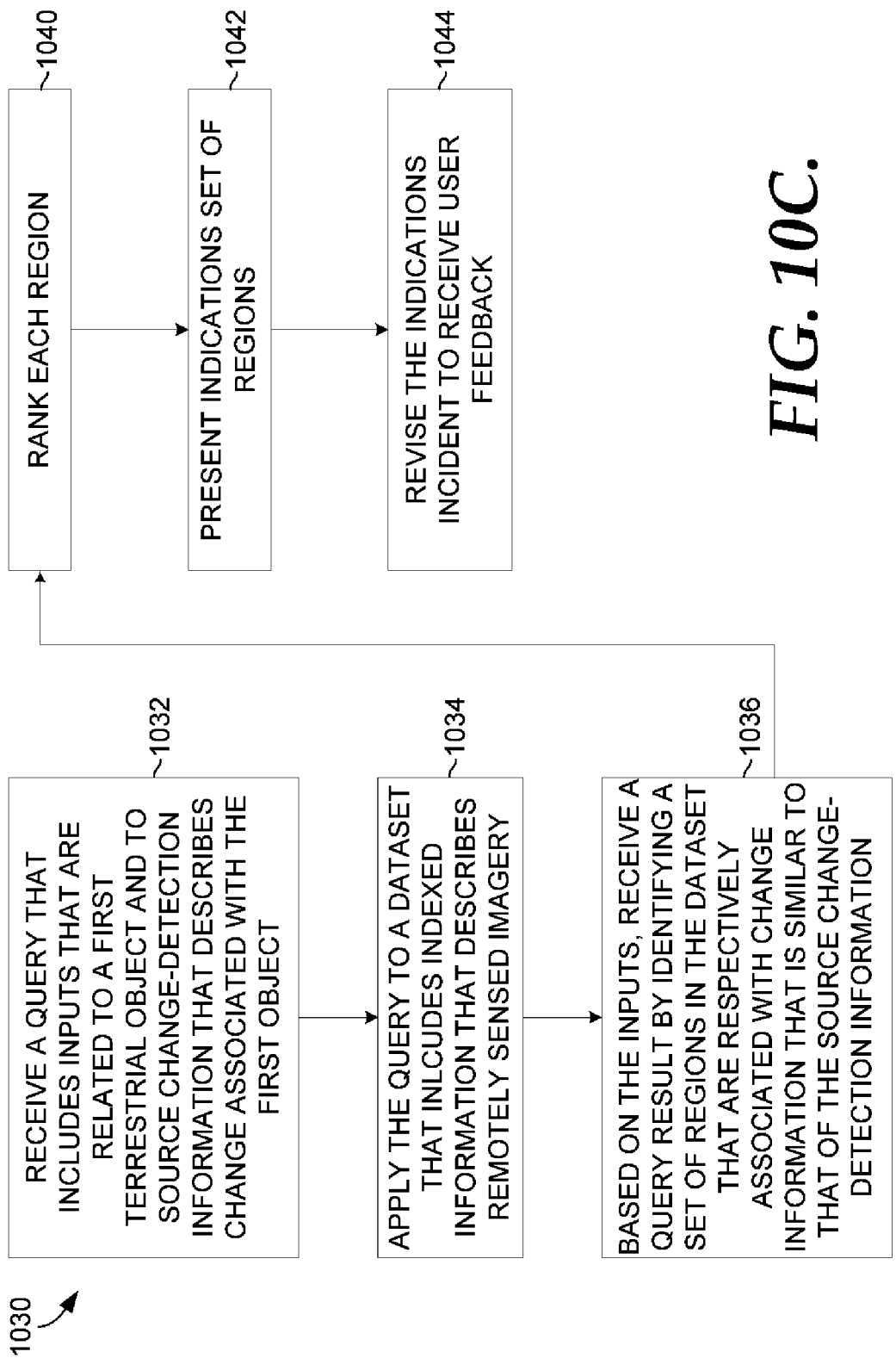

Turning now to FIG. 10C for another illustrative method for identifying terrestrial objects at a change in a certain manner is provided and referenced generally by the numeral 1030. At a step 1032, a query is received that includes input that is related to a first terrestrial object and to source change-detection information that describes change associated with the first object. Illustrative objects include geographic areas or items within the geographic areas. The source change-detection information is the change-detection information that is used as a source upon which the query utilizes to search a dataset.

At a step 1034, the query is applied to a dataset that includes indexed information that describes remotely sensed imagery. As mentioned, the indexed information can be separately indexed based on individual feature sets.

At a step 1036, an initial query result is received based on the inputs. The query was satisfied in one embodiment by identifying the set of regions in the dataset that are respectively associated with change information that is similar to that of the source change-detection information. The regions can be ranked at a step 1040 in one embodiment, and then indications of the identified regions can be presented at a step 1042. In one embodiment indications include textual references to the various geographic regions that are returned, and in other embodiments pictorial information is displayed.

If applicable, the initial set of results presented can be revised at a step 1044 incident to receiving user feedback, and then presented afresh.

We will now describe in greater detail aspects associated with visualizing results returned from a query. Various types of queries can be applied against datasets 252. A first illustrative type of query could be a region-based query, in which a user is seeking geographic areas of interest based on content provided. Images can serve as the basis for query inputs. Inputs can be selected by way of indicating a pre-stored image, or on-the-fly-type of embodiments can also be employed. For example, a user might hand draw or utilize a computer-aided-drafting program to outline a shape of an item of interest. For example, the user might be interested in locating things that appear in a shape similar to an airplane. The user could draw an airplane, in which this drawing serves as input into a query. The images shape features are analyzed and used to search against the data in dataset 252.

Input could also take the form of grabbing a tile or data from another application. For example, an earth viewer might be depicting a certain area of land. That area of land can be grabbed and inputted into the system as one of potentially multiple inputs that make up a query. If corresponding metadata is not available, then a search might be limited in some respects. In still other embodiments, imagery or items can be uploaded to serve as the basis for a query.

Returning to an explanation of the various types of inputs that might make up a query, geospatial information could be provided. We do not mean to attach a term-of-art type of definition to this term. Illustrative location-type information might take the form of "in Missouri," or "within ten kilometers of X." X could be a wide variety of types of items. For example, X might relate to types of organizations. Illustrative types of organizations include things like schools, churches, hospitals, energy-generation facilities, and many more. The examples are legion. X could also take the form of geographic features. That is features that exhibit certain geographic characteristics such as lakes, other bodies of water, canyons, and the like. X could also relate to transportation features, such as harbors, airports, etc. X might relate to populated areas, such that a query might request geographic areas that are within some proximity to a given populated area. X might relate to military establishments, such as airbases, hospitals, and the like. It should be clear that the few examples we gave are illustrative in nature. We have previously mentioned that these heterogeneous types of data items can be levied as constraints that form part of a query.

Another illustrative input could include a temporal input. An illustrative temporal input might be on the order of "between time A and time B," or "anything after to such and such date." Any constraint related to time can serve as an input into a query.

Another input to a query might be an indication of object size. For example, a query might desire to be constrained to those objects "within a size between 30 and 80 square meters." Item size itself can also operate as a constraint, such that buildings that consume some minimum or maximum square area are searched, or items occupying a given amount of space.

As previously mentioned a change-quality measure can be an input. An illustrative search involving a CQM might be something along the lines of "with CQM greater than 8". This can help filter out false positives and reduce a set to include only those results that might be more relevant to a user.

As mentioned, a change intensity itself can provide the basis for a query input. In one embodiment, a provided change intensity can operate as a threshold. An illustrative search involving change intensity might be something along the lines of "find all regions or tiles in Kansas City, Mo. with a change intensity greater than 5". This can help filter out regions with low, weak, or no change, thereby reducing the result set to include only regions that have strong change which are more relevant to a user.

Of course a query might include any combination of the above inputs as well as other inputs not mentioned. This allows for sophisticated query searches, such as "return all change tiles above some threshold within two kilometers of all airfields in California that are within three kilometers of a park within the last six months that have a change-quality measure of at least 7". Query inputs can also be generated from results that were returned from a previous query. For example, in the aforementioned query, if a given set of results are returned, the user might wish to find more results that exhibit features that are similar to one or more particular results in (or not in) the results set. In this case, the results of a former query can become inputs to a subsequent query.

As briefly mentioned above, the different inputs to a query can also be weighted. That is, varying degrees of importance can be associated with the different attributes so as to fine-tune the set of results that are returned incident to submitting a given query. We will describe this in even greater detail in connection with some illustrative user-interface diagrams that are discussed below.

Sometimes, the database dataset-searching approach is dictated by the type of input provided. For example, if the input is a given pair of scenes, then content associated with the scene such as feature vectors or change-detection information can be referenced and then used to locate items of interest. By way of illustration, inputs might include a first scene, a second scene and a change (difference) feature vector.

An on-demand embodiment contemplates receiving two new images that have not been ingested. In such an embodiment, feature attributes associated with the images can be derived on demand, and those feature sets can be used to search against data in dataset 252.

We briefly mentioned that region-based queries are one example of the type of query. Other types of queries include item-based queries, which search for items within regions, as well as change-related queries, which either search for change or search for geographic areas that have change in a manner similar to the way that other geographic regions have changed.

Figure 11A:
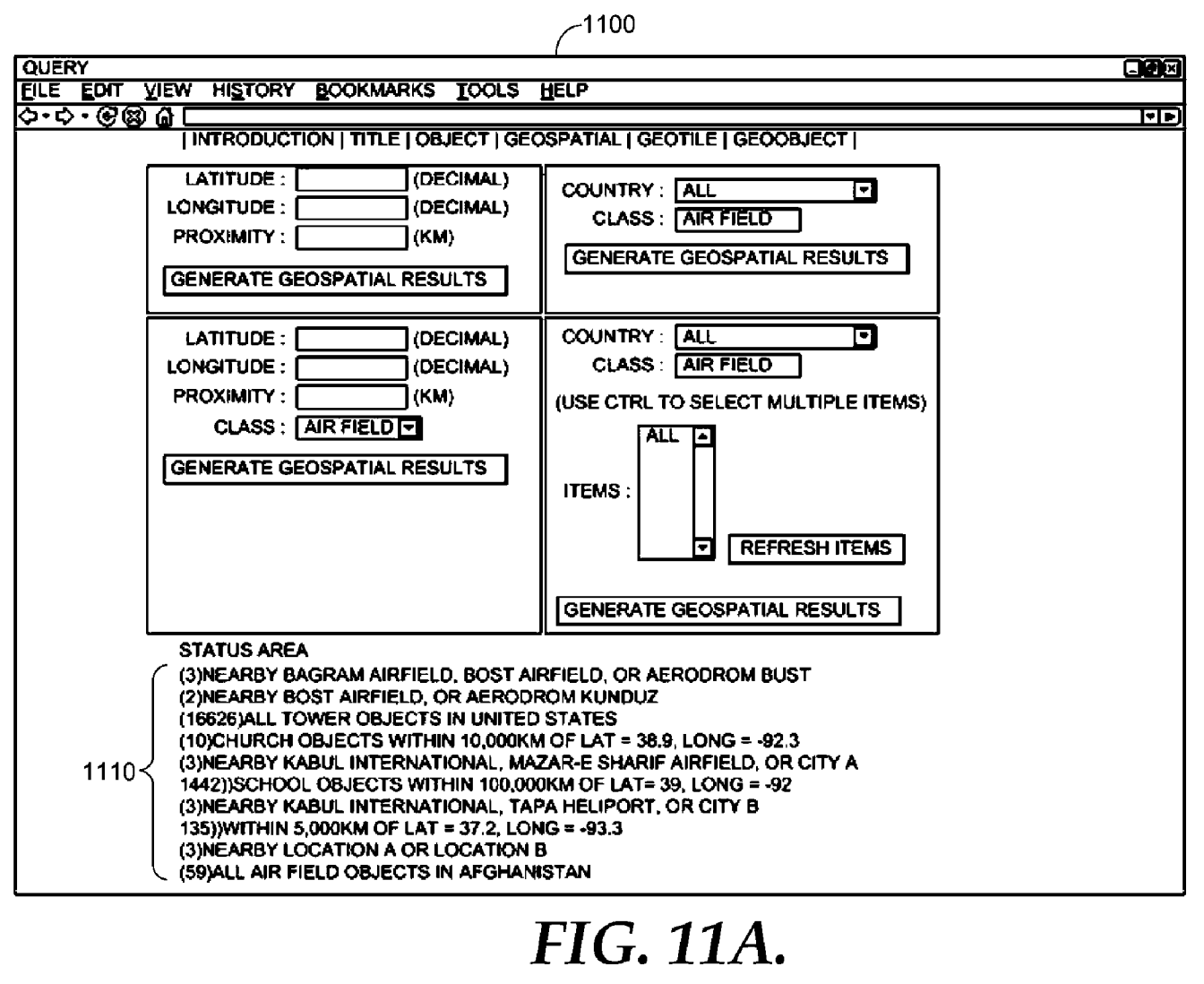

FIG. 11A depicts an illustrative presentation 1100 that shows various ways of receiving geographic user inputs to facilitate a query. By way of example, it is shown that items such as latitude, longitude, proximity to a given area, a country, a classification of a type of item, and more are shown. In some embodiments, prior searches 1110 can be presented to a user. The prior searches 1110 provide other illustrative examples of types of searches that are applicable to our technology.

Figure 11B:
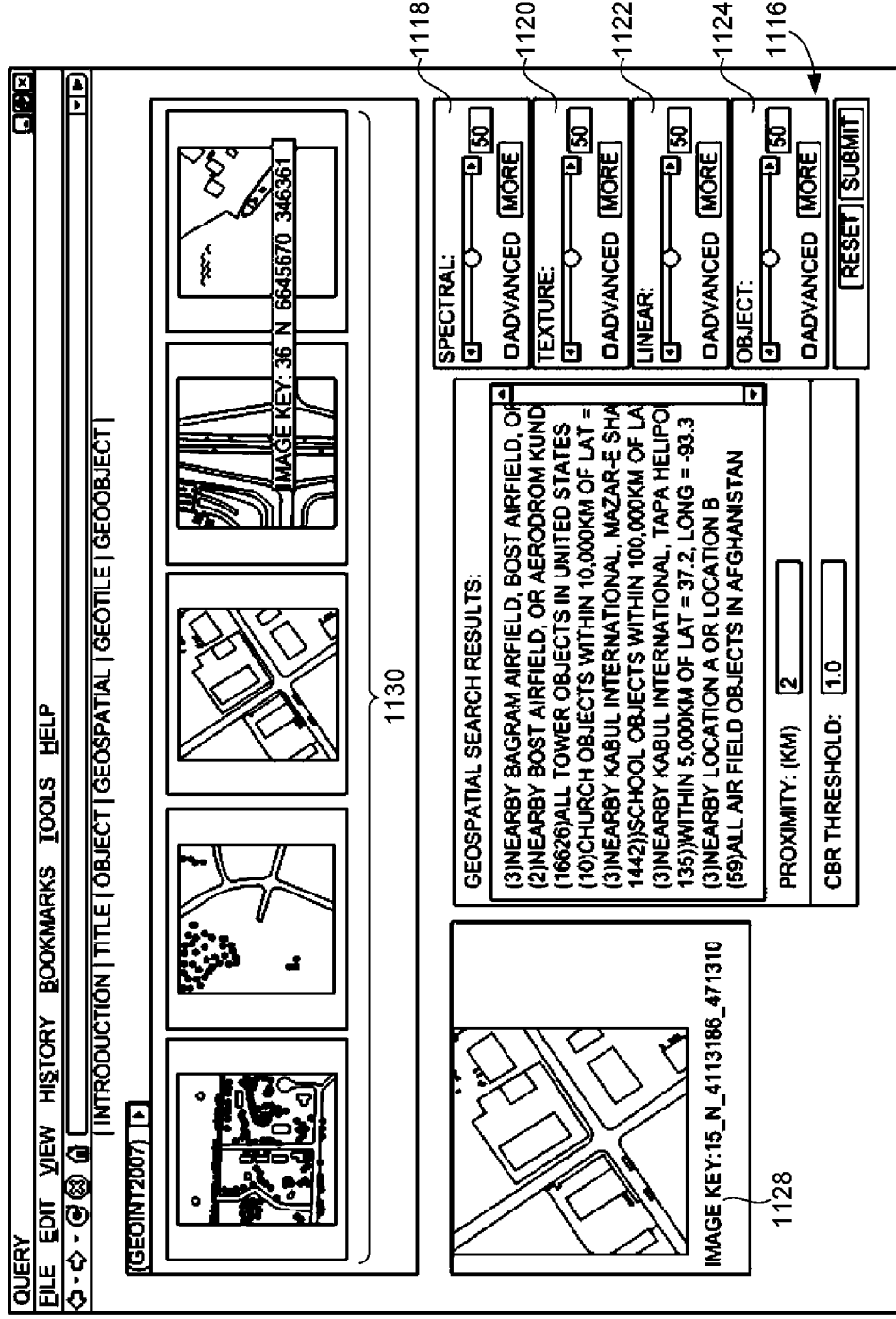
FIGS. 11B-11D depict aspects of returning results associated with a region-based query.

FIG. 11B depicts a screenshot 1114 that illustrates the sliders 1116 that we have previously mentioned. As shown, a first slider 1118 is associated with spectral features, a second slider, 1120 is associated with texture features, a third slider 1122 is associated with linear features and a fourth slider, 1124 is associated with objects or scale-related features. We do not mean to imply that sliders are the only way to vary a weighting of inputs into a query. Textboxes could also be used, which are actually also shown. One of the points to be taken away from user-interface component 1116 is the fact that various inputs can be weighted, and then results from the various feature space indexes are weighted during the aggregation process of result-set merging as discussed previously and illustratively depicted in FIG. 7C. In one embodiment, the result objects' distances are multiplied by the weight of the feature space during aggregation. One way of accomplishing this is to store attributes of specific features when storing the imagery. For example, when we store an image associated with a given geographic area, we also store attributes at the feature level. In some cases, this results in storing information associated with multiple bands, such as 14 bands or 16 bands of information. We have provided illustrative types of bands or features in, for example, FIG. 7E, which indicates various features that can be separately indexed, and thus separately searched on, and thus separately weighted so that the results returned are those that are relevant to a user based on a weighting provided. Screenshot 1114 indicates that a given image 1128 provides the basis for a query, which in one embodiment is selected from a group of pre-stored example tiles 1130.

Figure 11C:
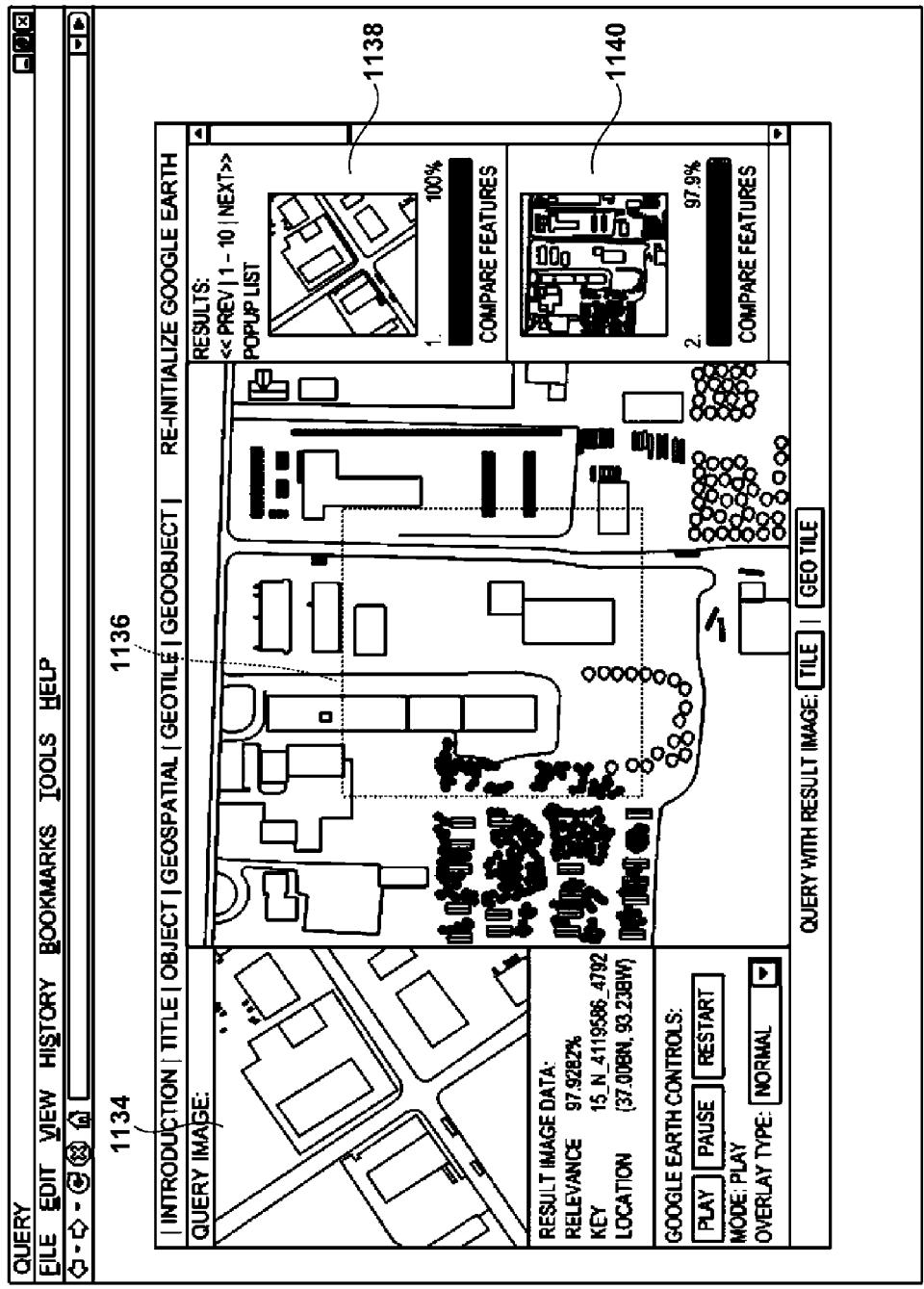

FIG. 11C depicts a screenshot 1132 that provides another example of querying based on an image, such as image 1134. This embodiment indicates that a result 1136 could be returned and also shown in context. Other results include items 1138 and 1140.

Figure 11D:
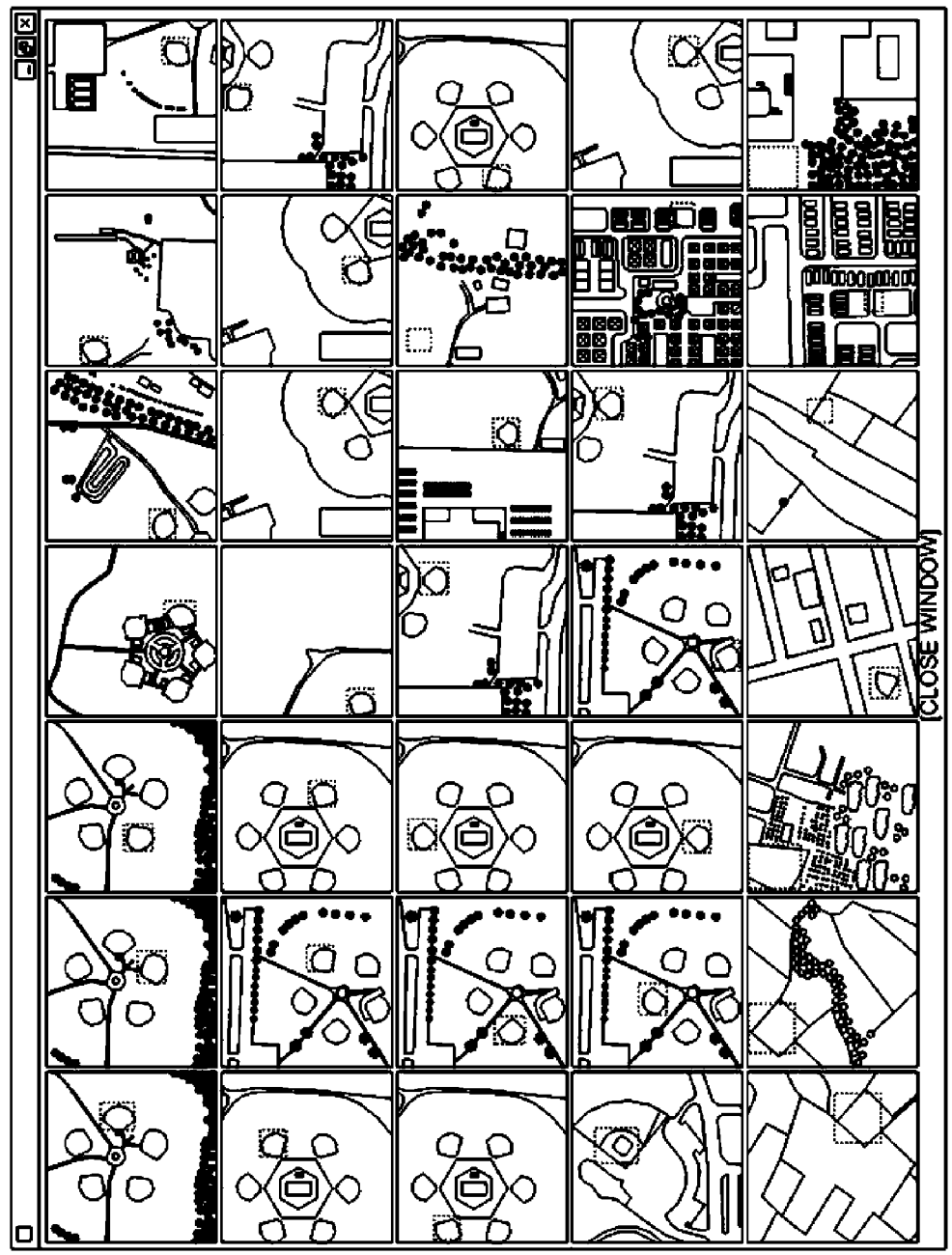

FIG. 11D includes an item 1142, which illustrates the fact that an entire set of result tiles can be presented to a user in a way, such as in a grid-like pattern. The tiles shown could also be pushed out to an imagery viewer, which we will describe in greater detail below.

Figure 12A:
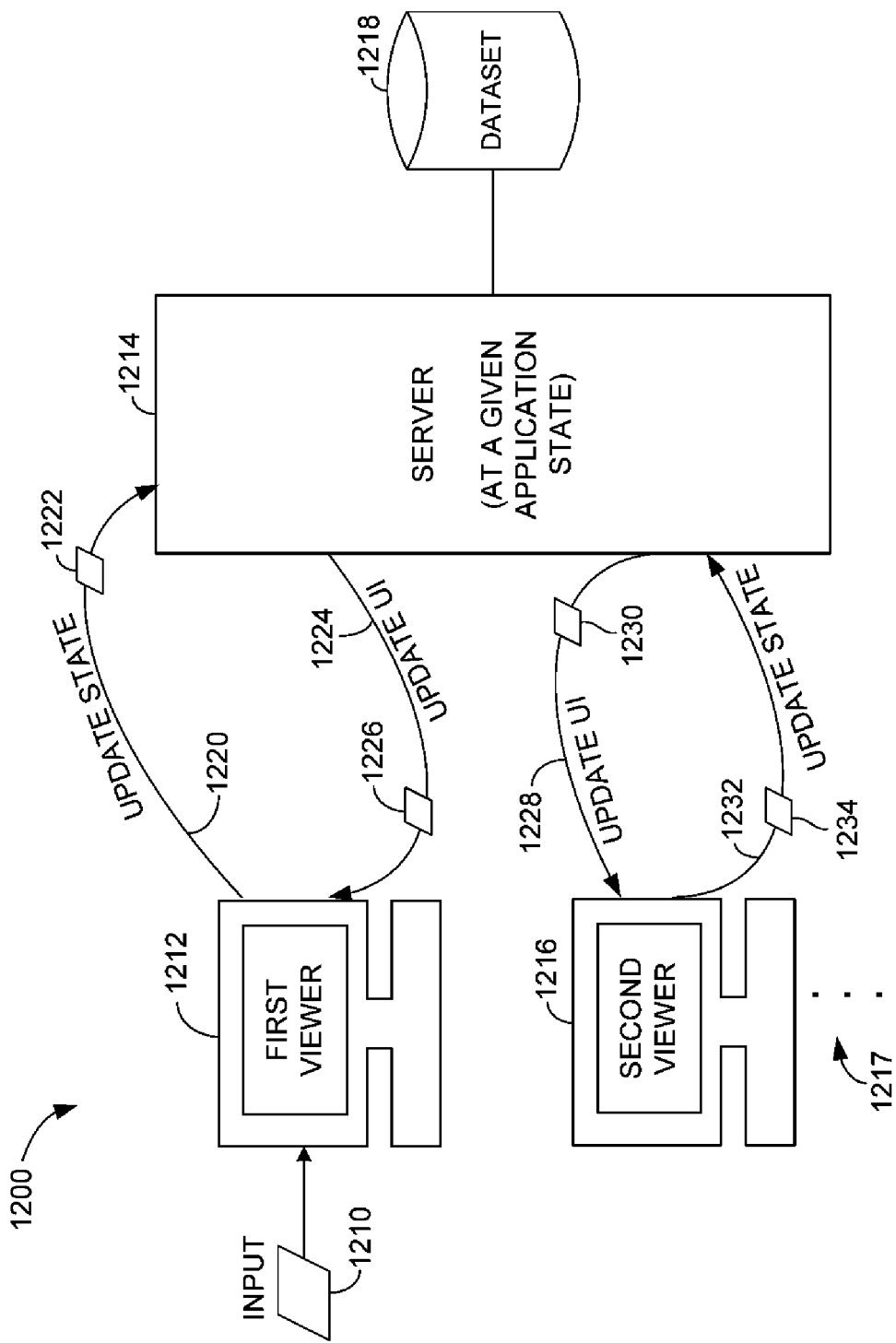
FIG. 12A depicts a state diagram that illustrates how multiple viewers can be updated based on input from other viewers.

Turning now to FIG. 12A, a state diagram depicts an illustrative method for updating one or more viewers based on input provided. An initial set of input 1210 might be received by first viewer 1212 in one embodiment. First viewer 1212, is coupled to a server 1214, which is coupled to a second viewer 1216. We indicated by ellipsis 1217 that many more viewers could also be utilized in connection with an embodiment of our technology. Illustrative viewers include a web browser, a client application, a mapping component, an imagery viewer, or the like. By way of example, an illustrative imagery viewer includes the virtual-globe viewer "Google Earth" offered by Google Inc. of Mountain View, Calif. Imagery and other information can be rendered in mapping components and imagery viewers through commands indicated in a KML file. This file can be static or delivered dynamically over the network.

At a step 1220, input 1222 is provided to server 1214. This takes the form of requesting a state update. Input 1222 could be any type of the inputs that we've previously mentioned, other types of inputs including input by a user or by another machine. This input is received at server 1214, which might interact with dataset 1218 to, at a step 1224, update a user interface on first viewer 1212 by providing information 1226. In accordance with an embodiment of our technology, this update request 1220 might also propagate another update instance 1228 by providing information 1230 to second viewer 1216. Thus, information received by way of a first user interface might cause a change in that first user interface and might also cause other changes to occur in other viewers that are being run in connection with server 1214. For example, a user might see a tile of interest in an imagery viewer, request more tiles like that tile, and those tiles will be updated in the imagery viewer, but also displayed in a grid such as grid 1142 in a web browser for example.

Similarly, at a step 1232, input 1234 could be received from second viewer 1216 and communicated to server 1214, which provokes an update process 1224 and/or 1228.

Figure 13:
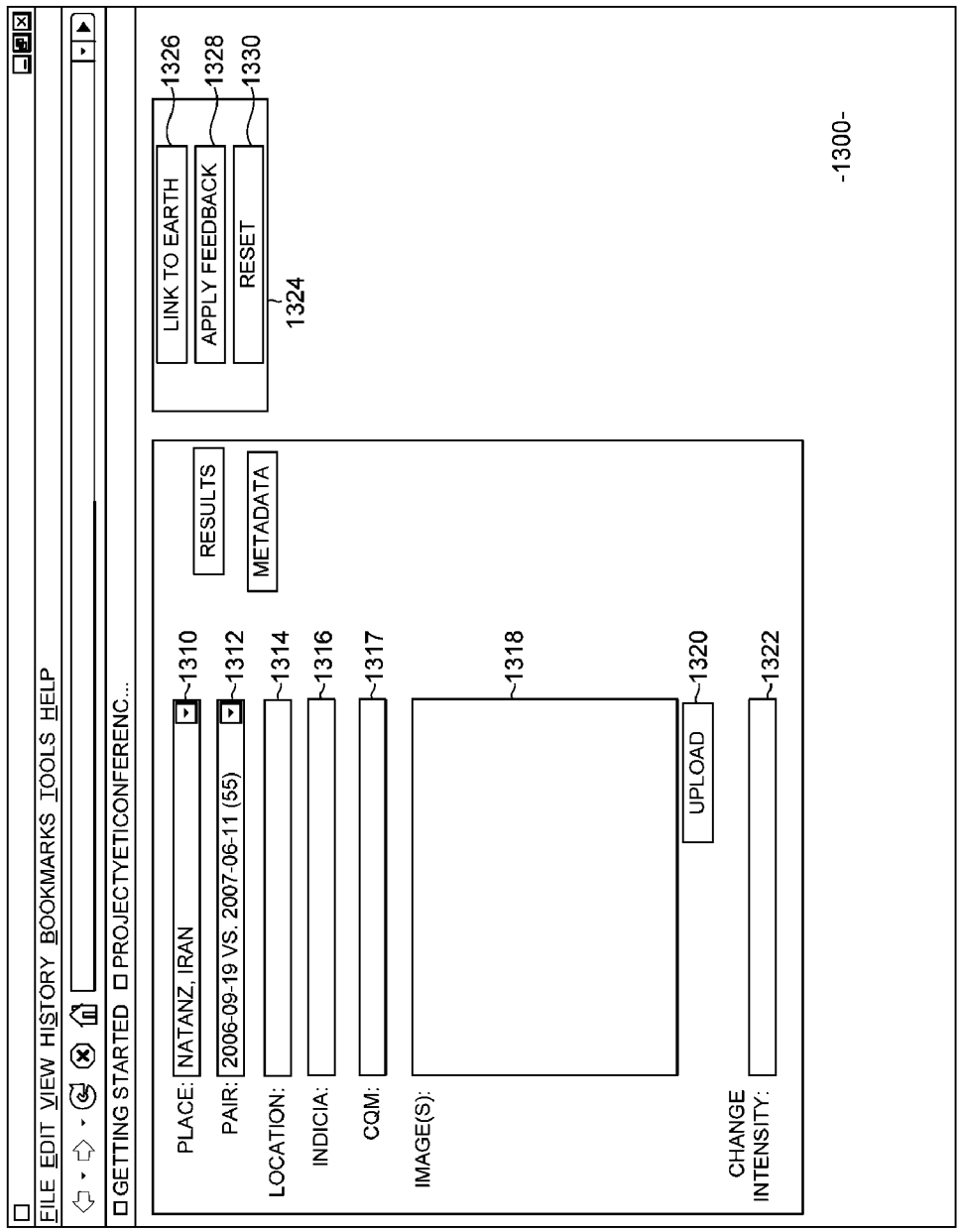
FIG. 13 depicts an illustrative user interface for receiving query-input options associated with seeking change information associated with one or more geographic areas.

Turning now to FIG. 13, an illustrative embodiment for a user interface for receiving query inputs is provided and referenced generally by the numeral 1300. The various functional aspects offered by way of user interface 1300 might be implemented in a variety of ways. We show a few illustrative controls to help convey various aspects of our technology, but do not mean to imply that user interface 1300 is limiting in nature unless we specifically say otherwise.

In one embodiment, a drop-down menu 1310 allows a user to select a place of interest. As illustratively shown, "Natanz, Iran," is shown as having been selected. Thus, in some embodiments, various places are predetermined and exposed by way of a drop-down menu. In other embodiments, a location can be entered by a user using a text box such as text box 1314. By way of example, a user might enter a zip code, a latitude or longitude coordinate, or some other location indication as we have described or that would be clear to a person of ordinary skill in the art.

A drop down menu 1312 enables a user to select a specific time period. For example, as shown by way of example, two dates ("2006-09-19 and 2007-06-11") have been selected. Control 1312 does not need to be a drop-down menu. Temporal information can be provided by way of a text box or some other control.

In one embodiment, a text box 1314 is provided to enable a user to input one or more geographic areas. It might be the case that a user is aware of indicia that identifies specific areas of interest. If that is the case, then that indicia can be input into text box 1316. In another embodiment, a text box 1317 allows a CQM threshold or range to be input to, for example, locate only geographic areas containing change results derived from imagery with a specific CQM constraint (e.g. "greater than 7" or "between 7 and 9")

An images area 1318 can also be provided. In one embodiment, this allows a user to draw the shape of an item of interest in area 1318, which might actually be utilized to upload multiple images (such as a before image and an after image). In other embodiments, it might receive a screen capture of an image of interest that is to be used as the basis for a query. And in still other embodiments, a user might wish to upload image pairs. This can be done by way of "upload" button 1320.

Still further, a change-intensity text box 1322 is provided to enable a user to indicate a desired change in intensity that is to be used in connection with satisfying a given query. Attempting to list all of the different types of ways that inputs can be provided might tend to obscure aspects of our technology. Suffice it to say controls can be provided by way of a user interface such as that of 1300 to receive any of the different types of inputs that we have described, or any of the types of constraints that will be levied by way of a query against a geospatial dataset.

Area 1324 shows three illustrative buttons that expose certain functional aspects of our technology. A "link to earth" button 1326 is provided. Button 1326 enables a link to be established to an earth-viewing application. In some embodiments certain services are employed, and links to a given service might need to be established. This can happen automatically in the background or by way of a button.

Button 1328 allows the application of feedback. As was previously described, and as will also be described below, feedback by way of a user or other entity can be applied to a first set of search results to derive a second or as many subsequent desired search results as desired.

A reset button 1330 can be used to quickly either wipe out the data inputs provided or return them to some default state. We have also described screen shot 1100 in FIG. 11A, which depicts other illustrative ways of receiving various types of geographic inputs that can be used to constrain a query.

Figure 14A:
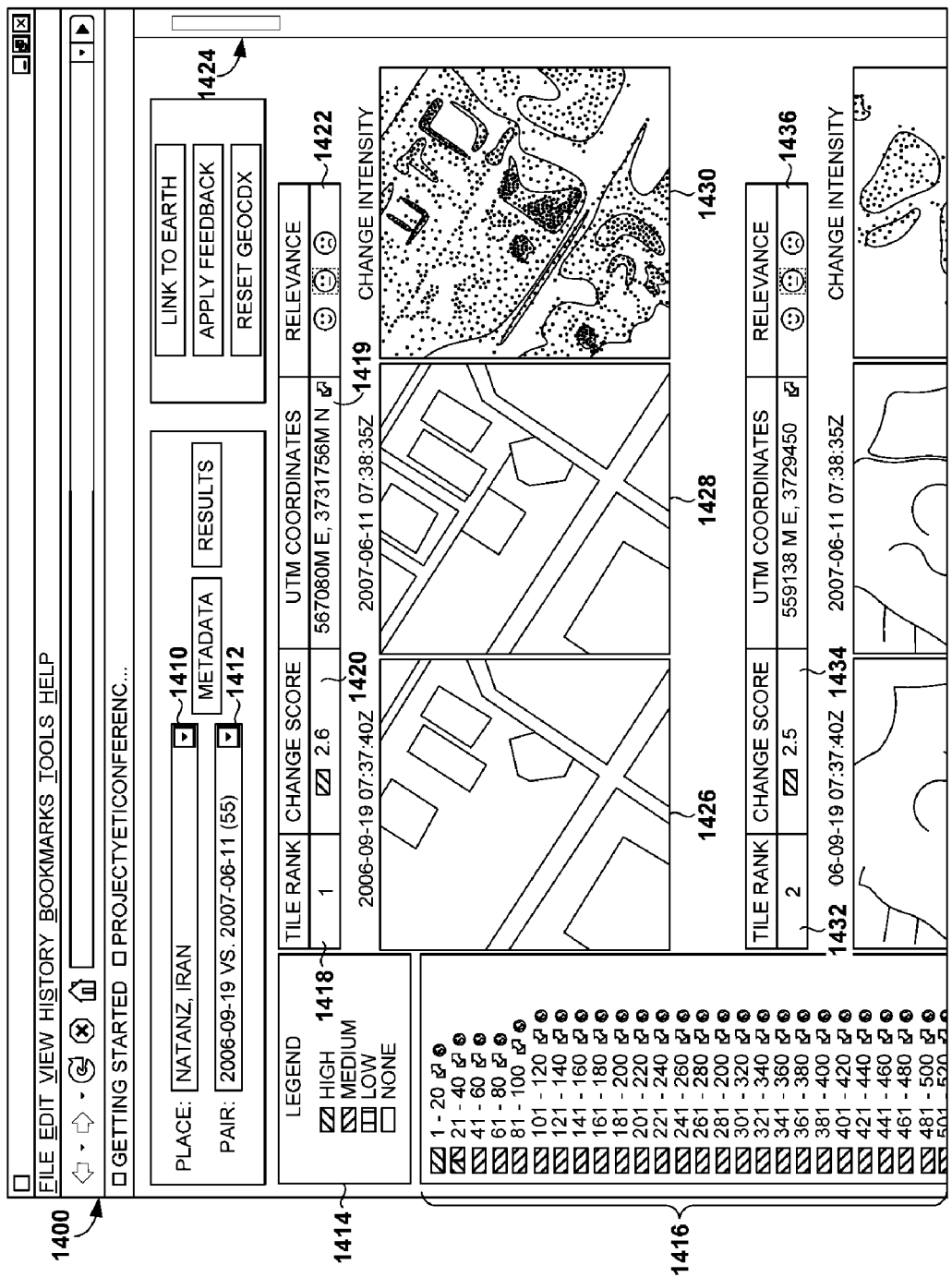
FIGS. 14A-14B depict an illustrative user interface for presenting results associated with a change search query.

Turning now to FIG. 14A, an illustrative screen shot 1400 depicts a set of results that have been returned incident to processing a query. We will be providing examples to help illustrate aspects of the invention. By providing these examples, we do not mean to imply that our invention is constrained by what might be depicted in connection with a specific example. They are illustrative in nature.

Control 1410 indicates that the place of interest in this example is Natanz, Iran. The relevant time period is between Sep. 19, 2006 and Jun. 11, 2007, as indicated by control 1412. If multiple dates were desired to be searched, then this can be done and would be reflected in screen shot 1400 in one embodiment. As previously mentioned, no dates could be provided, in which case, any change information associated with Natanz, Iran, would be returned to a user. In this example, a user is seeking change information associated with a geographic area, Natanz, Iran, between the two dates mentioned.

After processing the query, a set of results are returned. Representations of those results are depicted in screen shot 1400. As previously described, in one embodiment, the results are ranked according to their change score, which we variously refer to as a distance measurement, wherein we use the term "distance" not to indicate a physical distance measurement such as length or meters; rather, it indicates a relevancy. A legend 1414 indicates by way of illustration that some tiles returned might be of high relevance, some medium, some low, and some not relevant at all. One can apply as many buckets here as is desired. When the tiles are ranked, one embodiment of our technology groups them in sets. For example, they might be grouped in sets of 20. We show the first 500 ranked tiles in sets of twenty by way of numeral 1416. That is, numeral 1416 indicates several groupings of tiles. The first grouping indicates the first tiles, 1-20, which would be the 20 most relevant tiles based on the inputs 1410 and 1412. Though this might not always be the case, the first set of ranked tiles are indicated as high, the middle set between medium and high, and then the remaining sets are indicated as having medium relevancy. If the geographic area contains a great many regions that are very similar to the query criteria, then it might be the case that several sets of the tiles are considered highly relevant.

Box 1418 indicates a given tile ranking. Box 1418 indicates a tile ranking of "one," that is, the geographic area associated with that tile is the geographic area that includes features that are most relevant to the provided query. By way of illustration, this geographic area might have UTM coordinates as show in box 1419, e.g., "567080M E, 3731756M N." This tile has been given a change score of "2.6" as indicated by Box 1420.

We have previously described that user-feedback options can be presented to a user, thereby enabling a reception of user-feedback indications that indicate a desire to see images that are more alike or dislike a given image. Illustrative user-feedback options are shown in box 1422. We show them as smiley faces to help convey to a user the concept of desire, neutral, and undesired options. These might also be referred to as a "more like this," neutral, or "fewer like this" options. A user acting on the happy smiley face would convey that the user wishes to receive more results that are similar to the results associated with the given geographic area. A user indicating the frowning face would indicate that the user does not want to see images that look like the images associated with a given geographic area.

Image 1426 represents a given geographic area in a first state. This might be a "before" state. Image 1428 indicates the geographic area in an "after" state. If more states were available, then they could also be shown. That is, dataset 252 might include several images of the same geographic area. If that is the case, then the multiple states could be shown here. Image 1430 is an example of a change map. Image 1430 indicates change intensity associated with the two images. That is, image 1430 visually depicts an amount of change associated with a given geographic area. Because this is a patent application, much of the detail in pictures 1426 and 1428 is not presented. For example, image 1426 might really correspond to a photograph, in which dirt and other low-level features would be shown. We show in image 1426 outlines of more prevalent items associated with the geographic area relevant to image 1426. For example, one can think of the outlines as building structures and the linear aspects as roads. Image 1428 indicates the same geographic area but at a second state. We try to show by image 1430 the concept of change intensity. The more densely packed dots represent areas of greater change, which, again, is somewhat hard to glean based on the line drawings of Images 1426 and 1428. But for purposes of illustration, it can be seen in change map 1430 that certain areas of the given geographic area have changed more than others. A user's eye is quickly drawn to those areas of intense change. More than just conglomerating the dots as shown, they can also be color-coded. We have previously mentioned that in some ways, a change map such as that of 1430 can relate to weather-radar map. If that were the case here, the center portion of the change map 1430 might be bright red, whereas the extremities might be light blue.

Figure 14B:
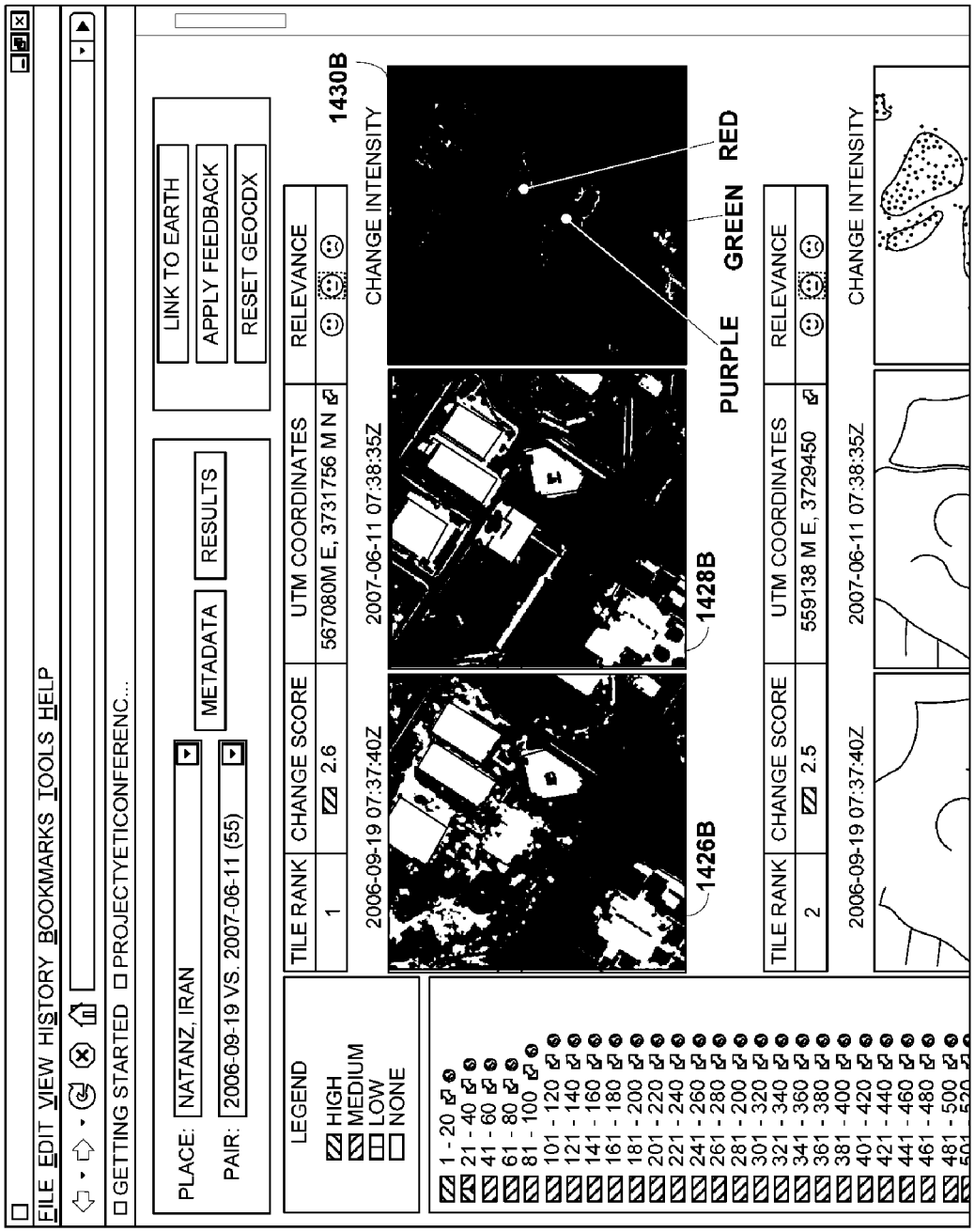

We show in FIG. 14B a copy of FIG. 14A, but which includes images 1426B, 1428B, and 1430B, which are more detailed representations that respectively correspond to images 1426, 1428 and 1430 in FIG. 14.

Returning to FIG. 14A, box 1432 indicates the second most highly ranked tile, which has a chain score of "2.5" as indicated by box 1434, and also includes user-feedback options 1436.

Figure 15:
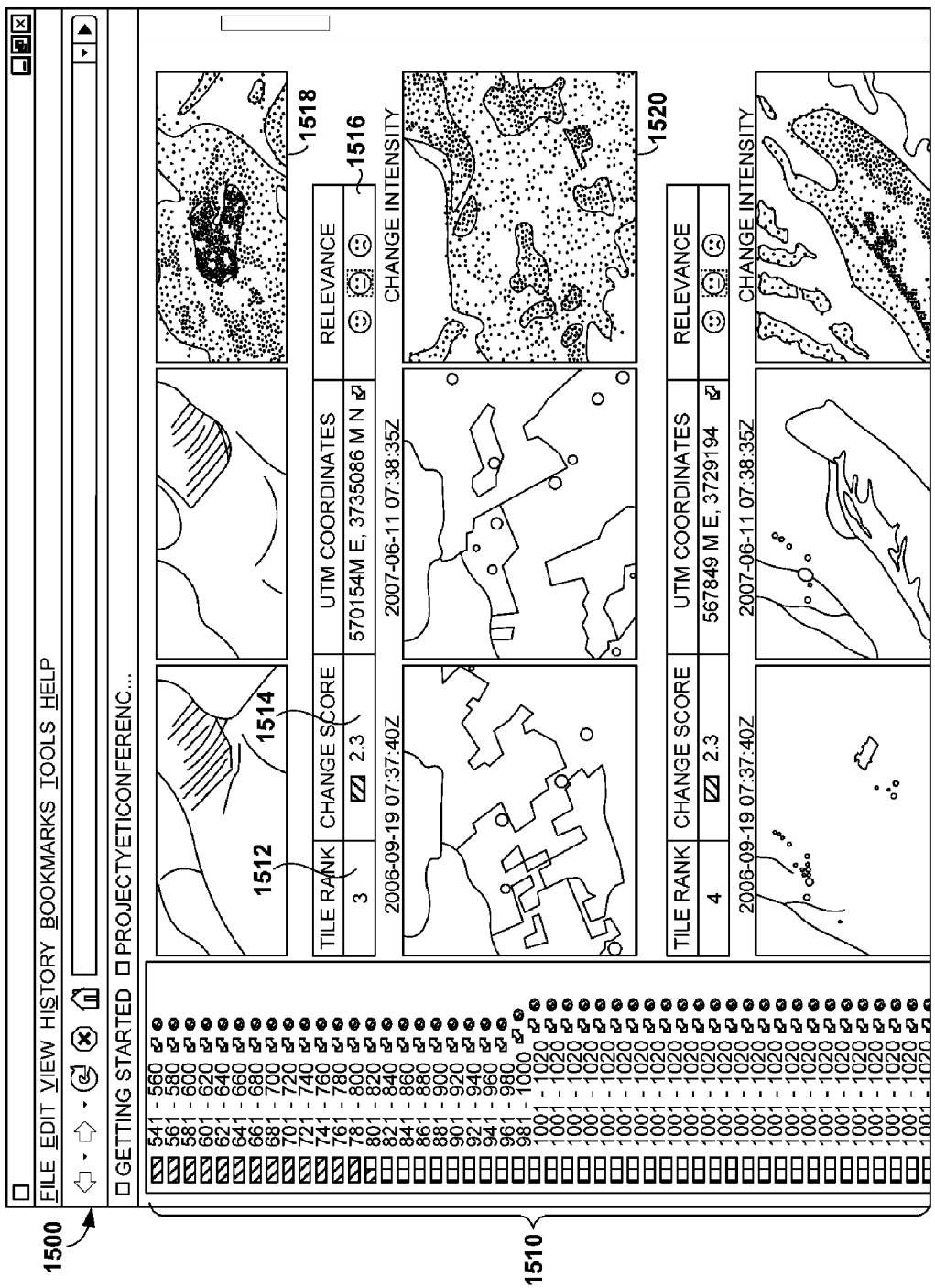
FIG. 15 depicts additional results of the set depicted in FIG. 14A.

In FIG. 15, screen shot 1500 depicts even more groupings of ranked tiles 1510, as well as successively lower ranked tiles. For example, the third most highly ranked tile is shown by 1510, having a change score of "2.3" as indicated by 1514. Relevance-feedback can be provided by way of the options indicated by 1516. A change map 1518 depicts change between the tiles associated with the second geographic region. Change map 1520 depicts change associated with the images of the third geographic region. All of the items in 1510, as well as those of 1416 in FIG. 14A, include hyper links that, if acted on, push the respective set of tiles into a viewer. We have previously mentioned that illustrative viewers could include an imagery viewer, as well as a web browser, which is depicted in FIG. 16.

Figure 16:
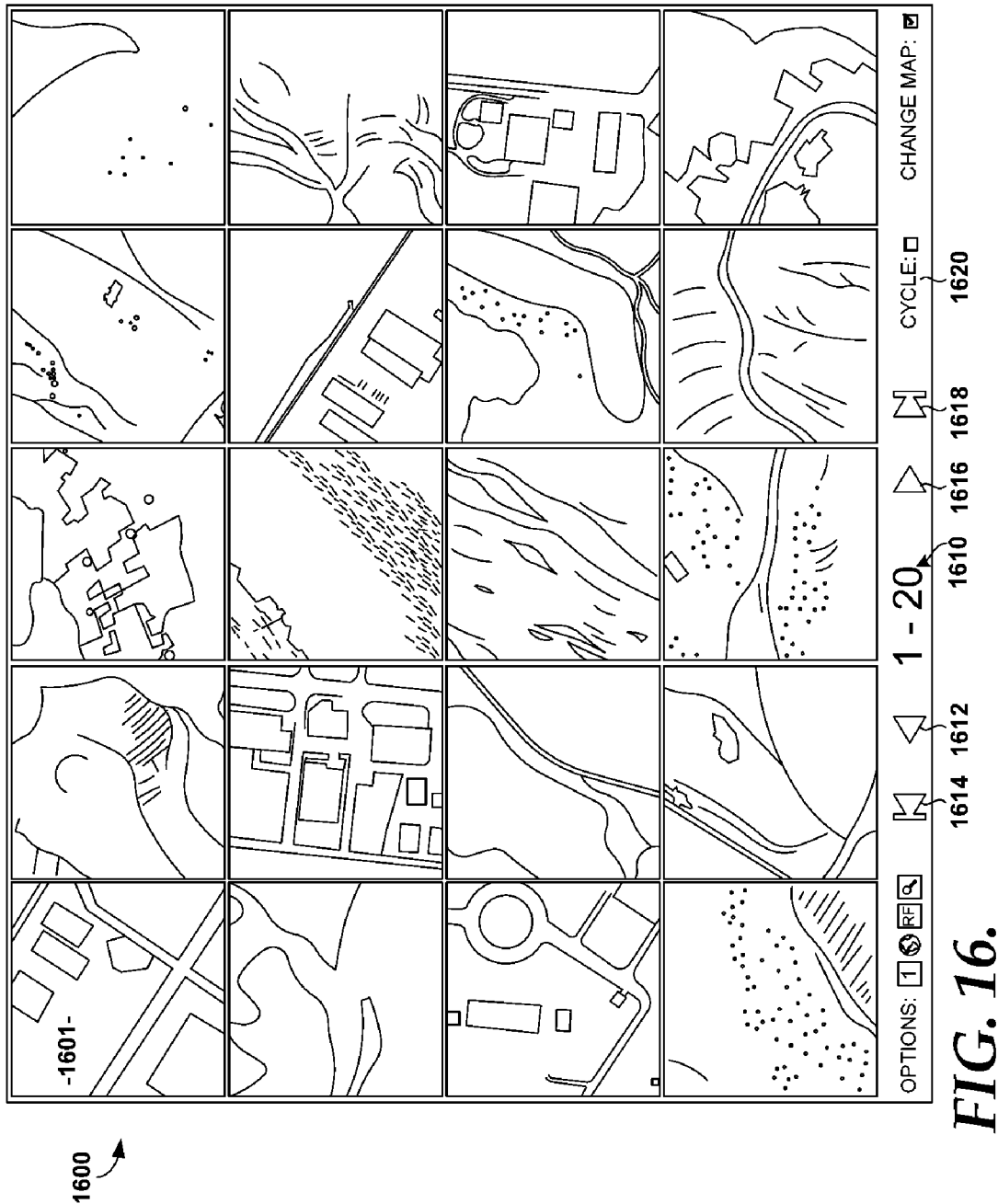
FIG. 16 depicts another way of presenting returned image tiles.

FIG. 16 depicts 20 tiles in depiction 1600. In this example, the 20 tiles all correspond to before images of each of their respective geographic regions. The most highly ranked tiles appear in the first row in this embodiment. For example, image 1601 is the same image as 1426 in FIG. 14A. This enables a user to see a set of tiles together. The tiles might be in some state, such as a first state, a second state, a third state, etc.

An indication of the number of tiles is provided by way of reference 1610, which indicates that tiles 1-20 are being presented. User-navigation controls are also provided. For example, arrow 1612 would allow, if applicable, scrolling to bring into view a previous set of tiles, and then an initial set by way of control 1614. Similarly, arrow 1616 would present a next set of tiles, and control 1618 might present a last set of tiles in one embodiment. The tiles can be cycled, as indicated by 1620. To cycle a tile means to rotate through different states of a geographic area. For example, assume tile 1601 corresponded to first geographic area 110 of FIG. 1B. If cycling were initiated, then the area that image 1601 occupies would variously cycle through first state 114, then second state 116, then, if desired, change map 122. In one embodiment all 20 tiles could cycle through their respective states and change maps if desired.

Figure 17A:
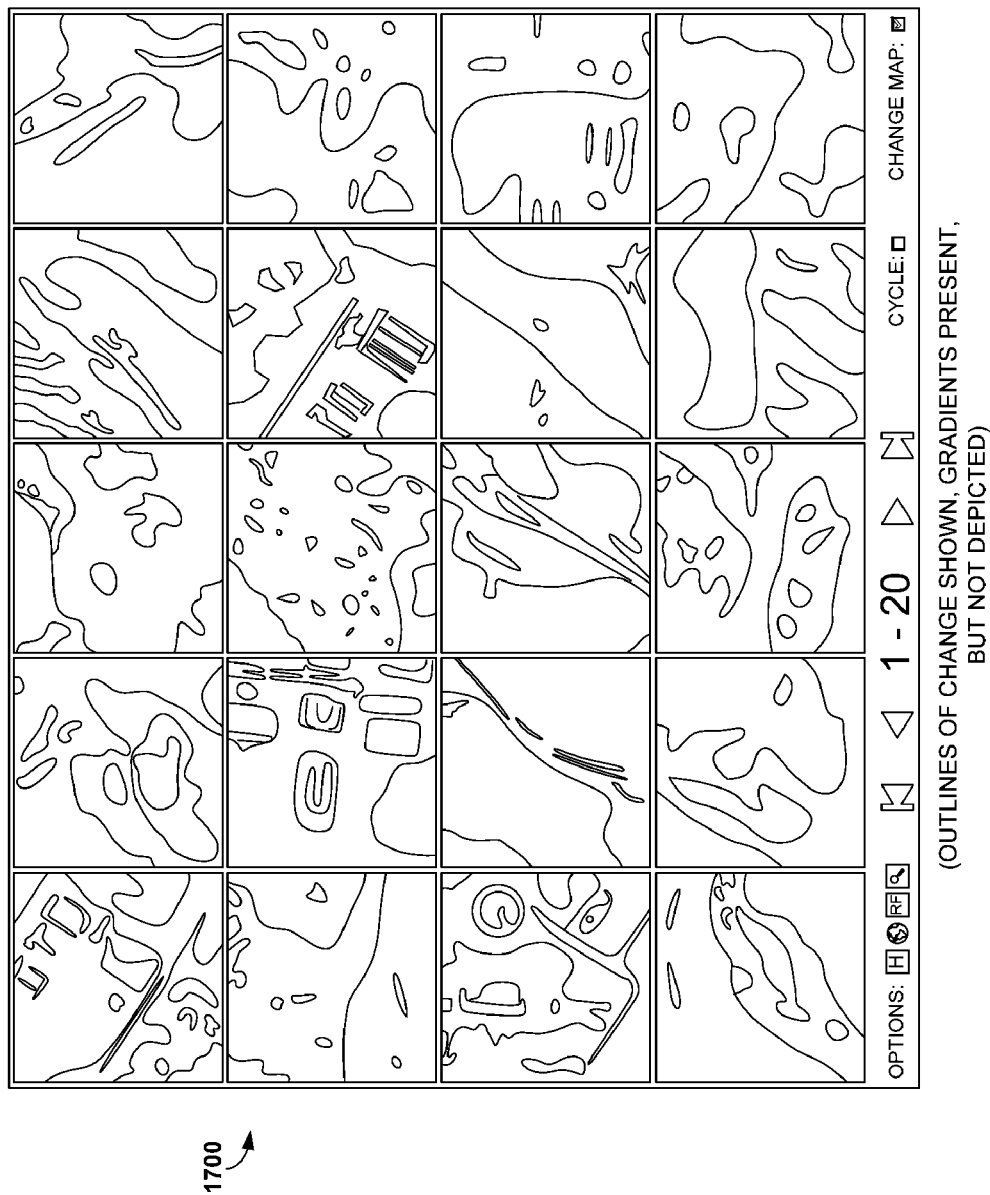
FIGS. 17A-17B depict aspects associated with change information for various geographic areas.
Figure 17B:
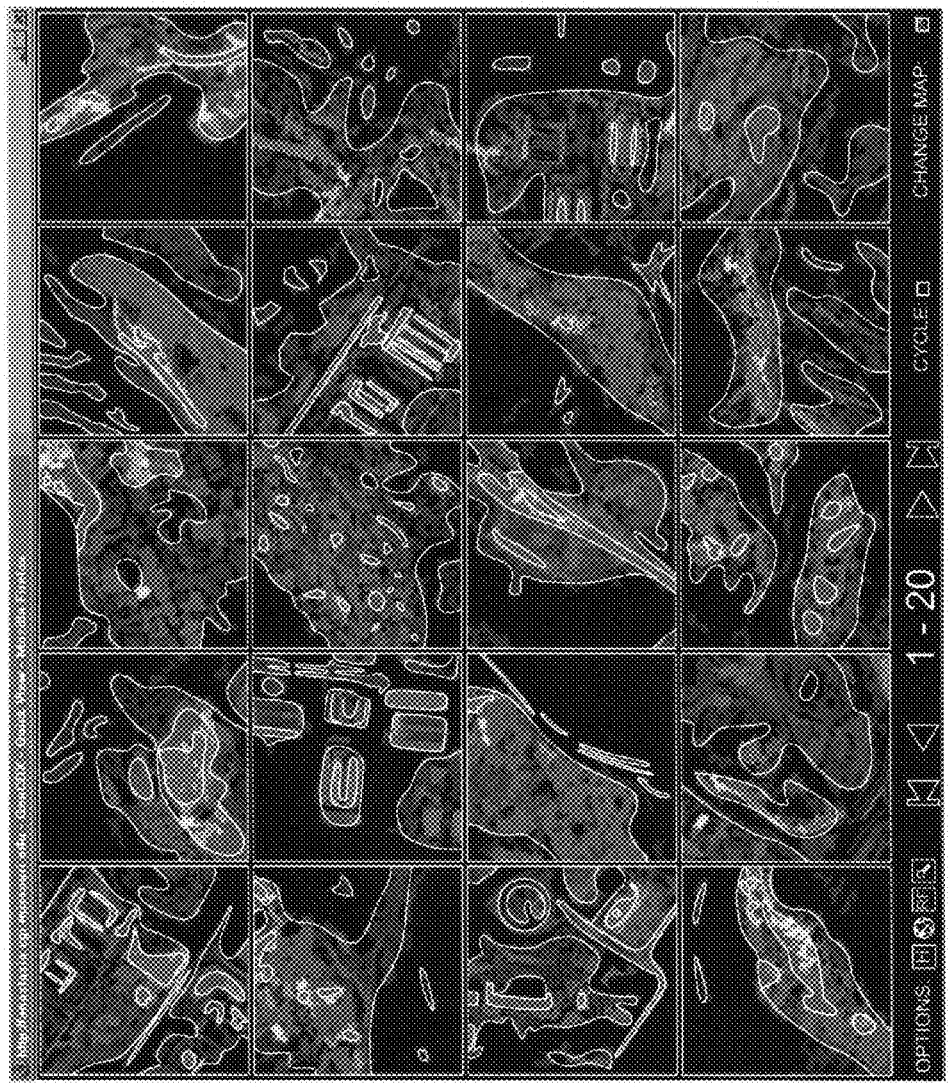
Figure 20:
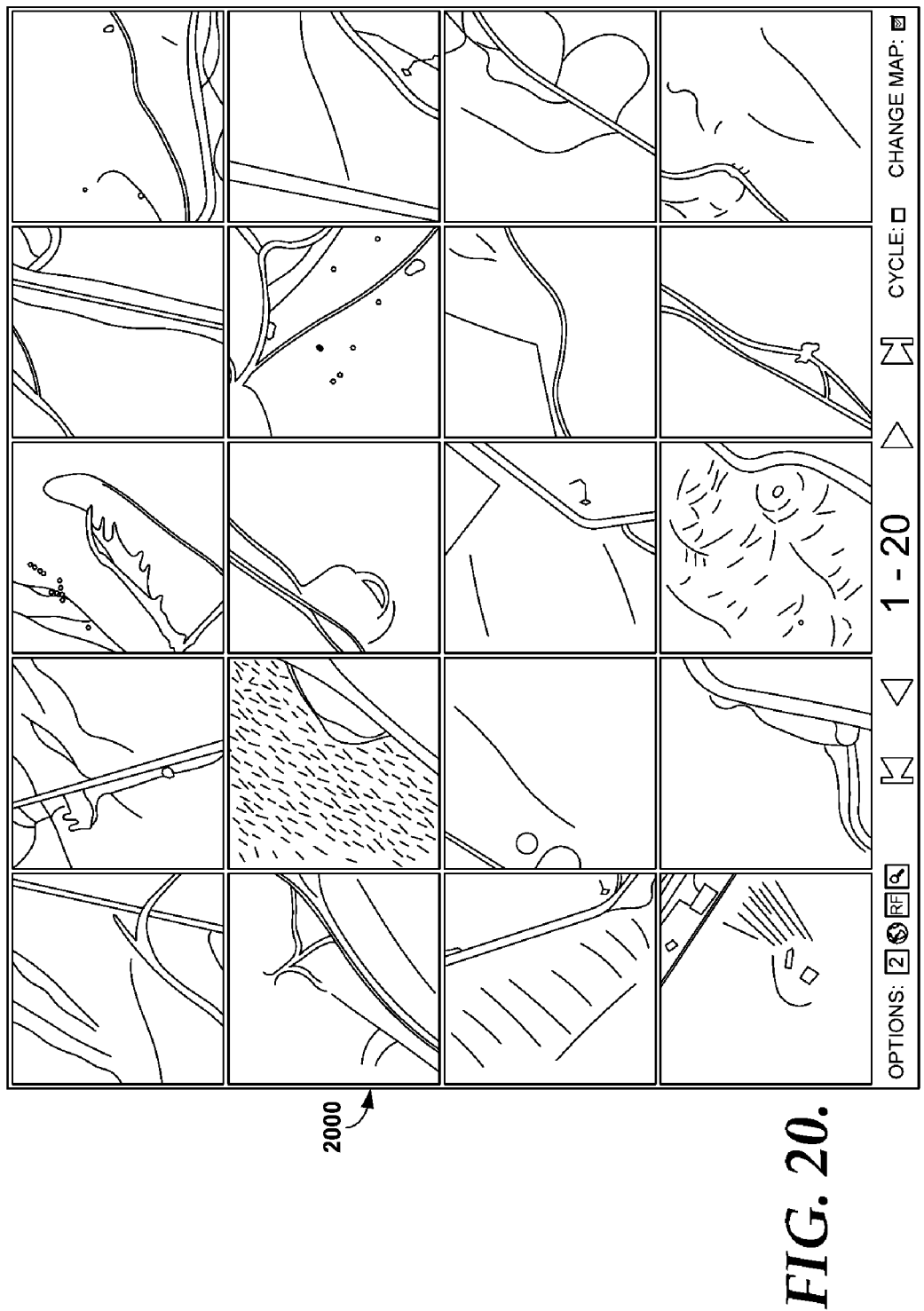
FIG. 20 depicts a set of revised results that were revised based on the various user-feedback options of FIG. 19.

FIG. 17A is a line drawing that indicates outlines of areas of change associated with respective geographic regions. That is, each tile of depiction 1700 corresponds to a certain geographic region. In FIG. 17A, 20 change maps are presented. Screen shot 17B is a screen shot that corresponds to FIG. 17A, but shows in greater detail the gradient natures of each change map. That is, FIG. 17B illustrates areas within the outlines of FIG. 17A. In one embodiment of an actual implementation, the outlines of FIG. 17B are not present. The outlines are shown here because of constraints associated with drafting patent applications. But, although they could be shown in some embodiments, in other embodiments the actual outlines of FIG. 17B are not present, only the interiors are presented.

Figure 18:
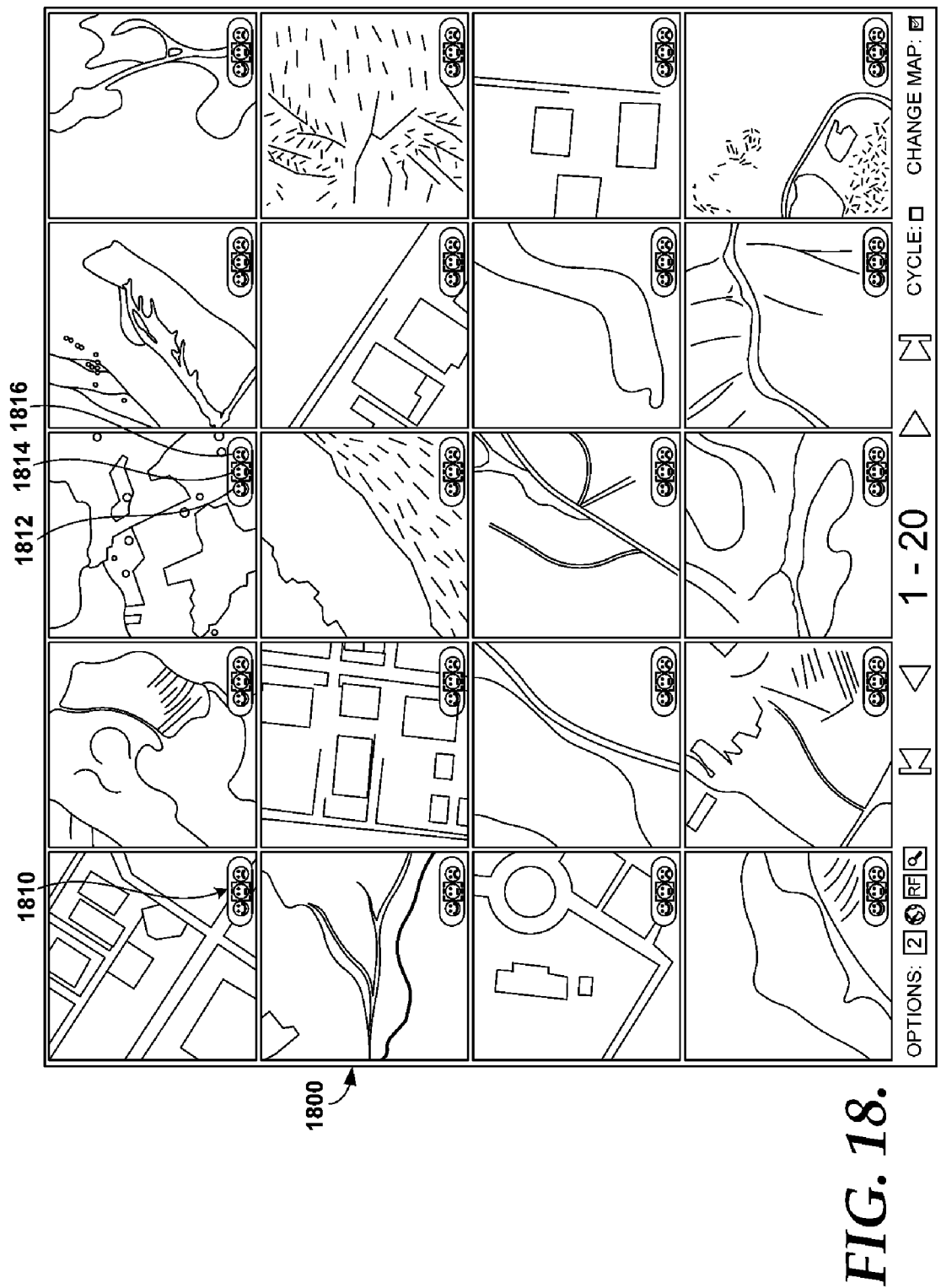
FIG. 18 depicts geographic regions in a grid-like pattern as well as corresponding user-feedback options.

FIG. 18 depicts an illustrative presentation 1800 of a set of tiles in an "after" state. Thus, presentation 1800 is similar to that of 1600 in FIG. 16, except after images of the respective geographic areas are presented instead of "before" images. We also illustratively show that user-feedback options could be presented in connection with each image. By way of example, 1810 refers to a set of user-feedback options. Specifically, 1812 refers to an illustrative user-feedback option that enables the user to indicate a desire to receive more tiles like the instant tile. Option 1814 indicates a neutral indication. Option 1816 indicates an illustrative user-feedback option for enabling a user to indicate that the instant tile does not contain features that a user desires to see and/or contains features that a user does not desire to see. Clearly, other types of user-feedback options besides smiley faces could be included. An implementer might present check boxes, a slider, or any number of controls that are adapted to receive user-feedback indications that indicate a preference associated with one or more images. The user-feedback from multiple images can be internalized and processed at the same time, as previously discussed. See, for example, FIGS. 8G-8I. Incident to receiving as many user-feedback indications as indicated, a revised set of tiles can be presented.

Figure 19:
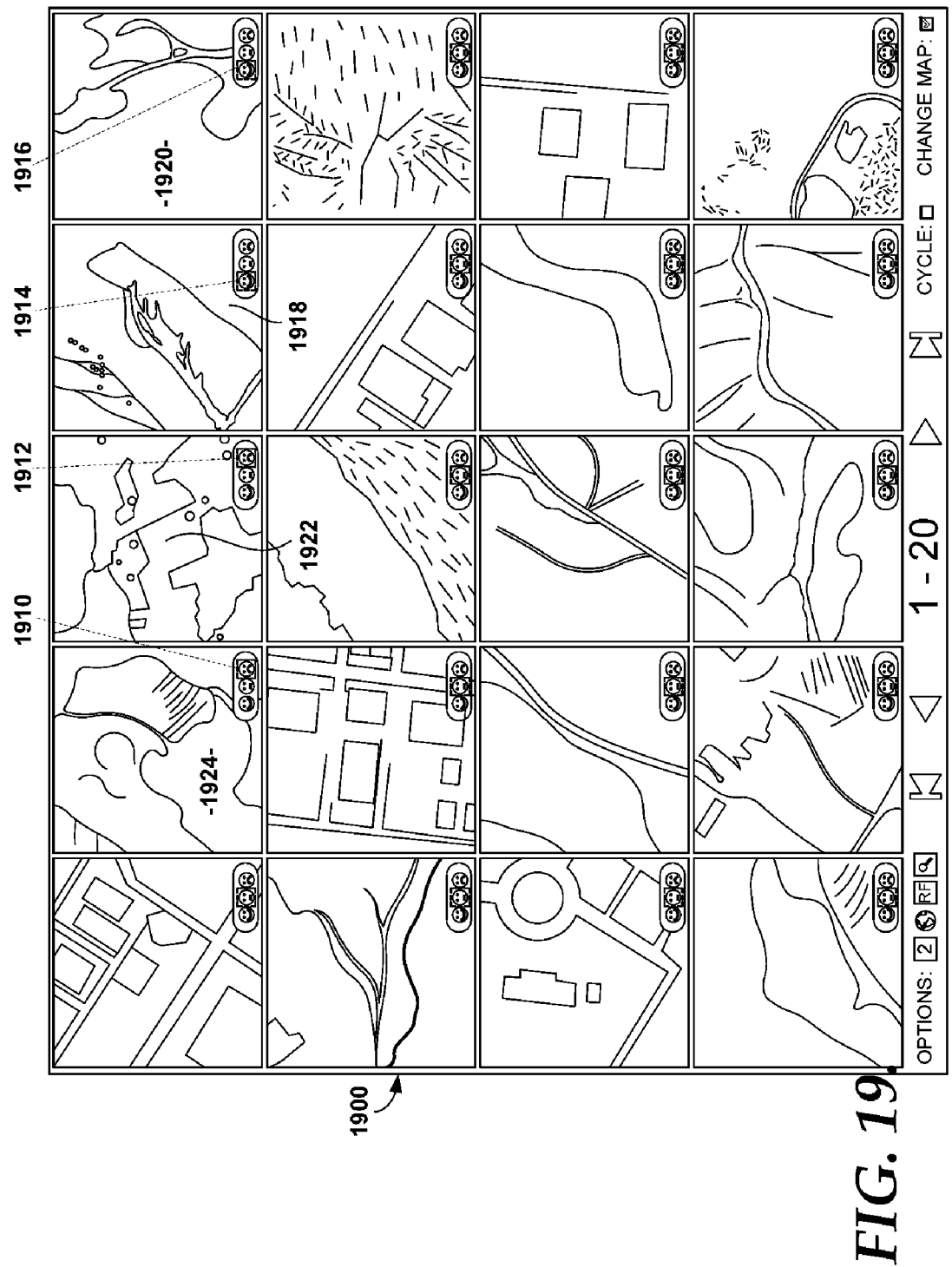
FIG. 19 depicts geographic areas as well as corresponding user-feedback options.

For example, FIG. 19 depicts a presentation 1900 that illustrates that a user has indicated a desire to see tiles that are unlike tile 1924 (by selecting option 1910), unlike tile 1922 (by way of option 1912), more tiles like tile 1918 (by way of option 1914), and more tiles like 1920 (indicated by option 1916).

Incident to processing the user-feedback of FIG. 19, presentation 2000 of FIG. 20 can be rendered in a viewer. FIG. 20 accounts for the two negative-feedback indications and the two positive-feedback indications to present the tiles that are shown. The new tiles rankings are based on similarity to the positive-feedback tiles and dissimilarity to the negative-feedback tiles. These new tile rankings can be dynamically pushed to another viewer application, such as an earth imagery viewer. Referring back to FIG. 19, one observes that tiles 1918 and 1920 exhibited some linear characteristics. Presentation 2000 depicts other tiles that also share features such as having linear features. The tiles presented in presentation 2000 represent the "after" state of a geographic area. These also could be cycled, or toggled to represent a "before" state.

Figure 21:
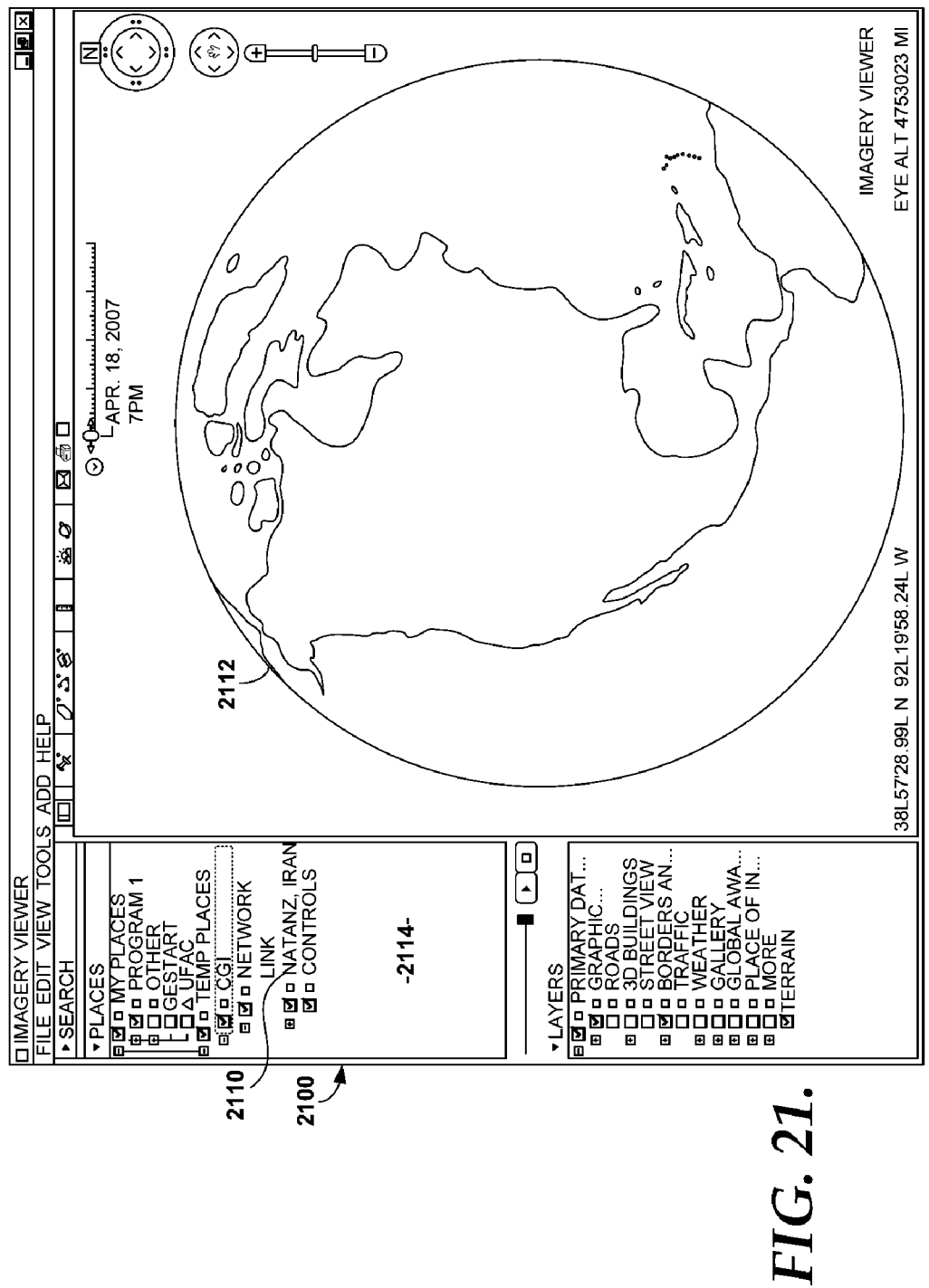
FIG. 21 depicts an illustrative imagery viewer.

Turning now to FIG. 21, an illustrative imagery viewer is provided and referenced generally by 2100. A depiction of the earth 2112 is presented in one embodiment. Reference 2110 indicates that we will continue our example that we previously started explaining in connection to Natanz, Iran. A network link has been established to imagery viewer 2100, resulting in the tree structure that is being depicted in area 2114.

Suppose that a user wishes to push a set of tiles into the imagery viewer. For example, with reference to FIG. 14A, assume that a user wishes to push the first 20 tiles of 1416 into an imagery viewer using KML. This could be accomplished by clicking on the hyper linked grouping, which results in a depiction illustratively shown in FIG. 22 and referenced generally by 2200. Reference 2210 indicates that the place of interest is Natanz, Iran (see 1410) and 2212 indicates the dates corresponding to the dates denoted by reference 1412 in FIG. 14. User interface 2213 allows these tiles (variously referred to as "chips") to be presented in context. The various tiles appear in the patent drawing as black squares, but this is not how they would appear in real life in one embodiment. For example, they might appear as outlines, and depict a state of the geographic region. We show them as filled-in black so that they would be easier to refer to at this zoomed-out stage. By way of example, 2216 and 2214 correspond to two tiles. Reference 2218 refers to a set of seven tiles, and 2220 refers to five more tiles. Finally, reference 2222 refers to another five tiles. These 20 tiles are the same 20 tiles that were initially presented in FIG. 14A, as well as FIG. 16.

It can now be seen that areas of change associated with a very large area are highlighted so that a user can focus in on those specific geographic areas associated with each of the tiles. We are depicting relevant data. That is, determined as relevant to a query that a user, or other entity, provided. Rather than having to search the entire geographic area 2213, a user can now view specific areas of change.

Absent our technology, a user would be faced with searching geographic area 2213, and particularly searching geographic area 2213 in a given state. That is, a user might not even be aware that certain areas have changed over time. A user might be able to find an item of initial interest, such as a road, but that item might not be of particular interest because the user would not know that that road was recently installed. A recently installed road might indicate a development of some sorts which development might be relevant for some reason. For example, say that a state in the United States was prohibited from creating some large development in some area. The presence of a road might indicate the beginnings of such a development.

Figure 22:
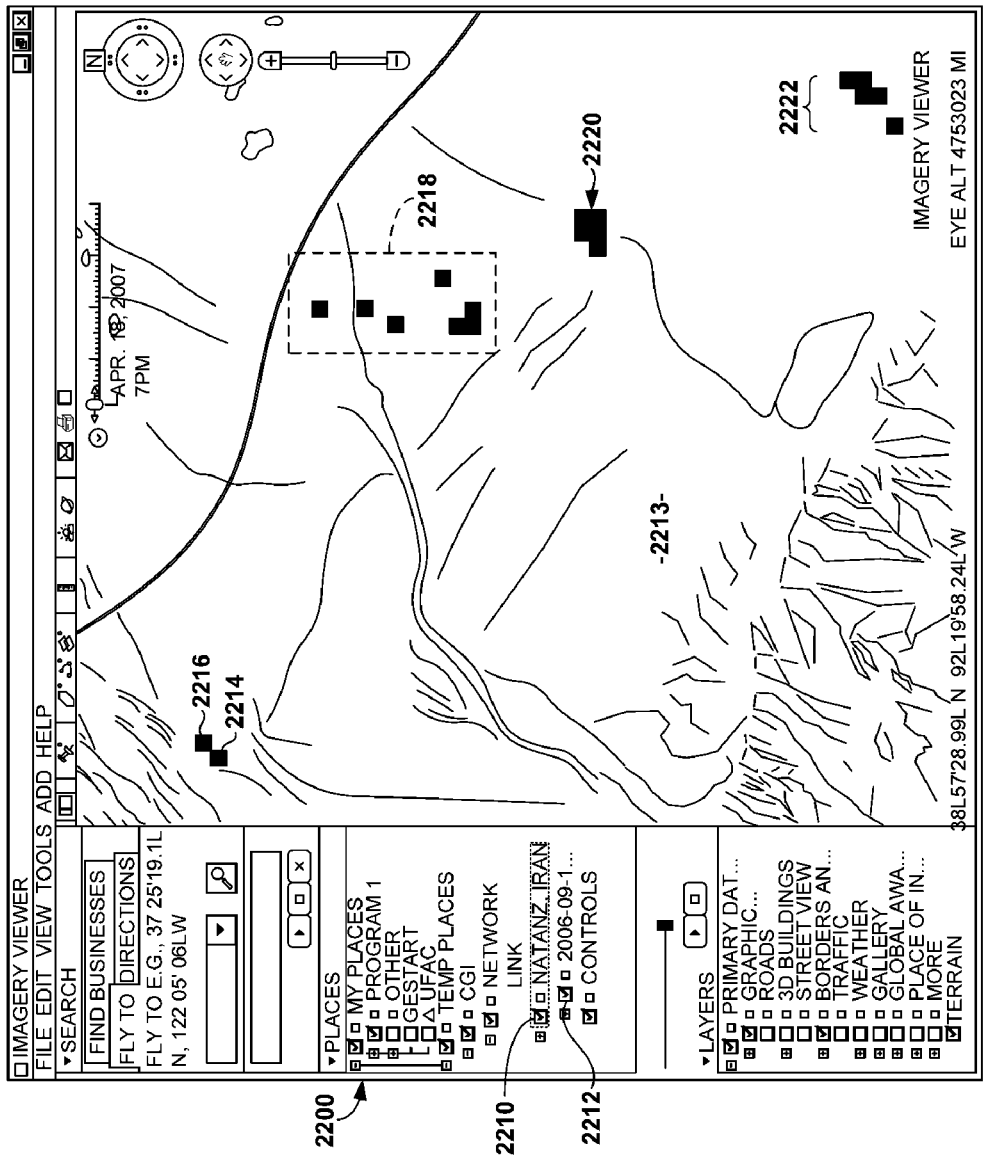
FIG. 22 depicts a set of tiles in an imagery viewer in one embodiment.
Figure 23:
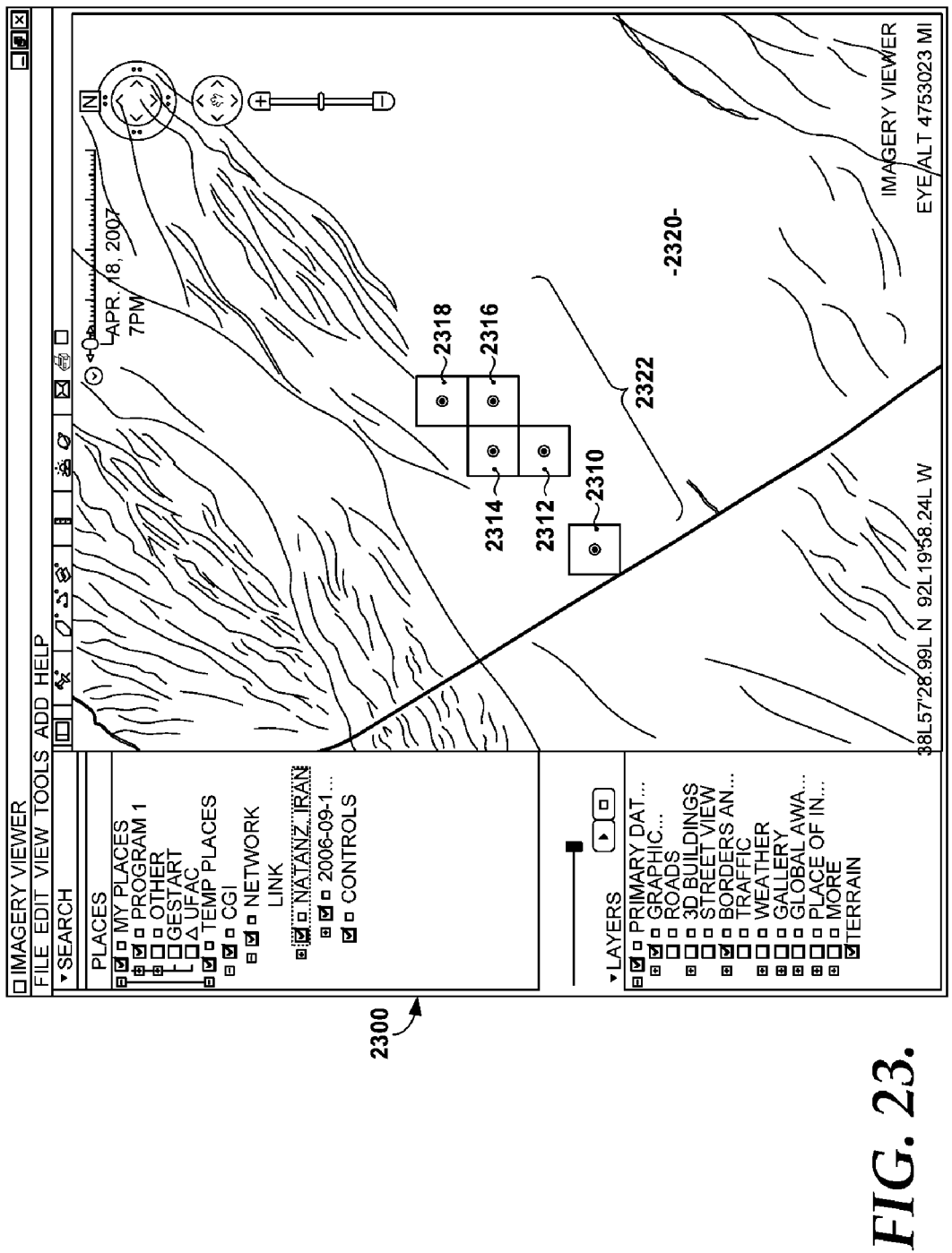
FIG. 23 depicts a subset of some of the tiles (2222) from FIG. 22 in greater detail.

Turning now to FIG. 23, a presentation 2300 depicts tiles 2222 (from FIG. 22) in greater detail. The tiles are associated with the following reference numerals 2310, 2312, 2314, 2316, and 2318. These are five of the tiles that appeared in FIG. 22. We are showing them somewhat zoomed in to illustrate other aspects of our technology. We note that from the drawings it appears as though tiles 2310-2318 appear to merely be outlines. But really, each tile reflects a depiction of background 2320 in various states. For example, the tiles, collectively referred to by the numeral 2322, could depict a first state of each respective geographic region, a second state of the applicable geographic region, intermediate states, as well as change maps associated with change between any of the aforementioned states. In the screenshots that follow, we will illustrate by way of line drawings the reality that tiles 2322 depict information, and are not merely outlines.

Background 2320 allows tiles 2322 to be viewed in context. Tiles 2322 are tiles of specific geographic areas, such as those viewed on one or more of the previous referred to grids. But if a user wishes to observe the tiles in the midst of their respective surroundings, then pushing the tiles out to an imagery viewer such as that shown enables such a contextual viewing. Each tile includes interaction options in one embodiment. By way of illustration, tiles 2322 each include what appears to be a bull's eye in the center of each tile. This bull's eye provides a way for a user to interact with each of the tiles. In alternative embodiments, outlining could be provided, the outlining could be hyperlinked, or the tile itself could be hyperlinked. We will now describe illustrative aspects of interacting with the tiles, starting with FIG. 24.

Figure 24:
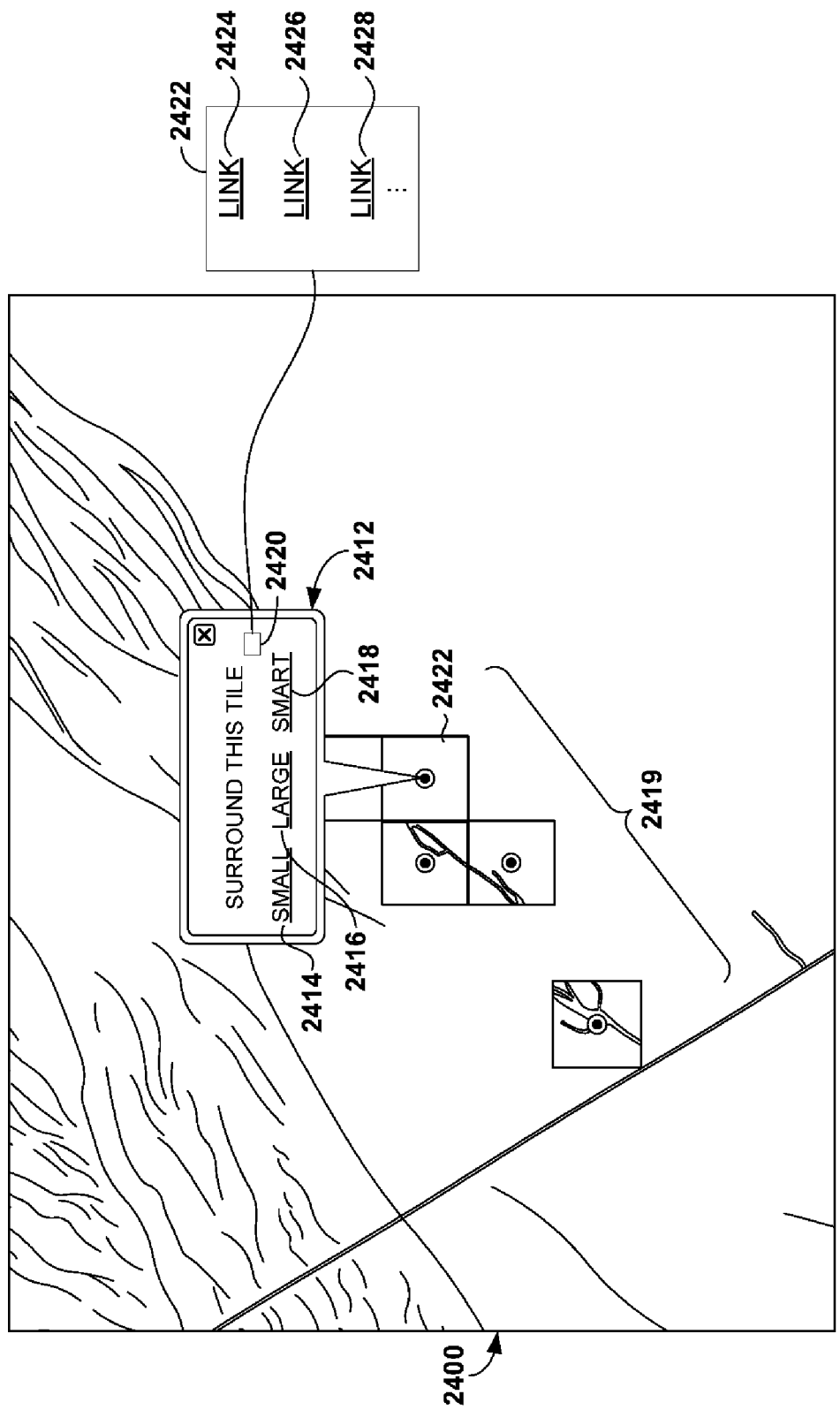
FIG. 24 depicts an illustrative control option that presents exemplary hyperlinks usable to interact with the various tiles presented.

FIG. 24 depicts an illustrative presentation 2400 that includes tiles 2419, which can be the same tiles 2322 that appeared in FIG. 23. We further show a control 2412 that exposes a plurality of interaction options. Three illustrative options are shown within control 2412, but others are available as well. We indicate that others are available by way of placeholder object 2420, which is shown in greater detail by reference numeral 2422, which illustrates three other links (2424, 2426, and 2428), which might only be a subset of still more links, illustrated by the ellipses. In certain aspects of the drawings we show an ellipses to clarify that there are other options besides those shown, but we do not mean to imply that in drawings that do not include an ellipses that the options shown are the only options. Sometimes, different aspects of the different drawings might tend to appear as though certain options might be exhausted. Rarely any are, but sometimes we show an ellipses to help make clear that certain options that might otherwise seem to possibly indicate an exhausted list that such a list is not exhausted.

Control 2412 includes three links: A small link 2414, a large link 2416, and a smart link 2418. In the embodiment being described, each of these links relates to a surround function. That is, small link 2414, if acted on, would surround a given tile by a set of tiles determined to be within some radius. For example, perhaps small link 2414 would cause every contiguous tile to be presented that touches a given tile.

Similarly, large link 2416 enables a presentation of tiles that are within a greater radius than those presented by way of small link 2414. These options can be useful when a user wishes to view change associated with surrounding areas that surround a given tile. In some embodiments, such change in such tiles might not have been sufficiently high to have been ranked among the set that is currently in view. These options provide a way to view change information associated with nearby tiles.

Smart-surround link 2418 applies a little more intelligence than small link 2414 or large link 2416. The smart-surround option 2418 analyzes nearby tiles to determine which of those might have a change pattern similar to that of a given tile. In one embodiment, if nearby tiles have changed beyond some amount, they are pushed to screenshot 2400. In other embodiments, a window of parameters is applied such that change that falls within such a window is used to return geographic areas.

Other links such as those in 2422 can be used to expose other functional aspects. For example, link 2424 might be used to locate other geographic areas that appear similar to a given tile, and provide a representation of that tile. In some embodiments, the representation takes the form of an arrow pointing in a direction that leads to the target, or found, tile. In other embodiments, the tile is brought into view by way of an overlay or popup that appears on top of screenshot 2400. In still other embodiments, the user interface flies or tours to the target tile, thereby bringing it into view. Thus, for example, assume that a person is interested in tile 2422. If a user wants to find more tiles that look like say a before state of region 2422, then acting on link 2424 might automatically bring a target tile into view, provided that geographic area found includes features similar to the features of a before state of tile 2422. Similarly, searching could be done based on an after state of region 2422. Still further, another link, such as link 2426, might bring into view tiles that had changed in a manner similar to the way that geographic area 2422 has changed. Acting on such a link 2426 could automatically bring into view that tile, or a set of tiles.

Other options, such as link 2428 might be used to add a given geographic area to a set of favorites, such that a list is maintained of tiles of interest. The tiles that make up such a list can also be interacted with, such that they can serve as inputs to an individual query to find more geographic areas that exhibit features shared by the geographic areas added to the list.

Figure 25:
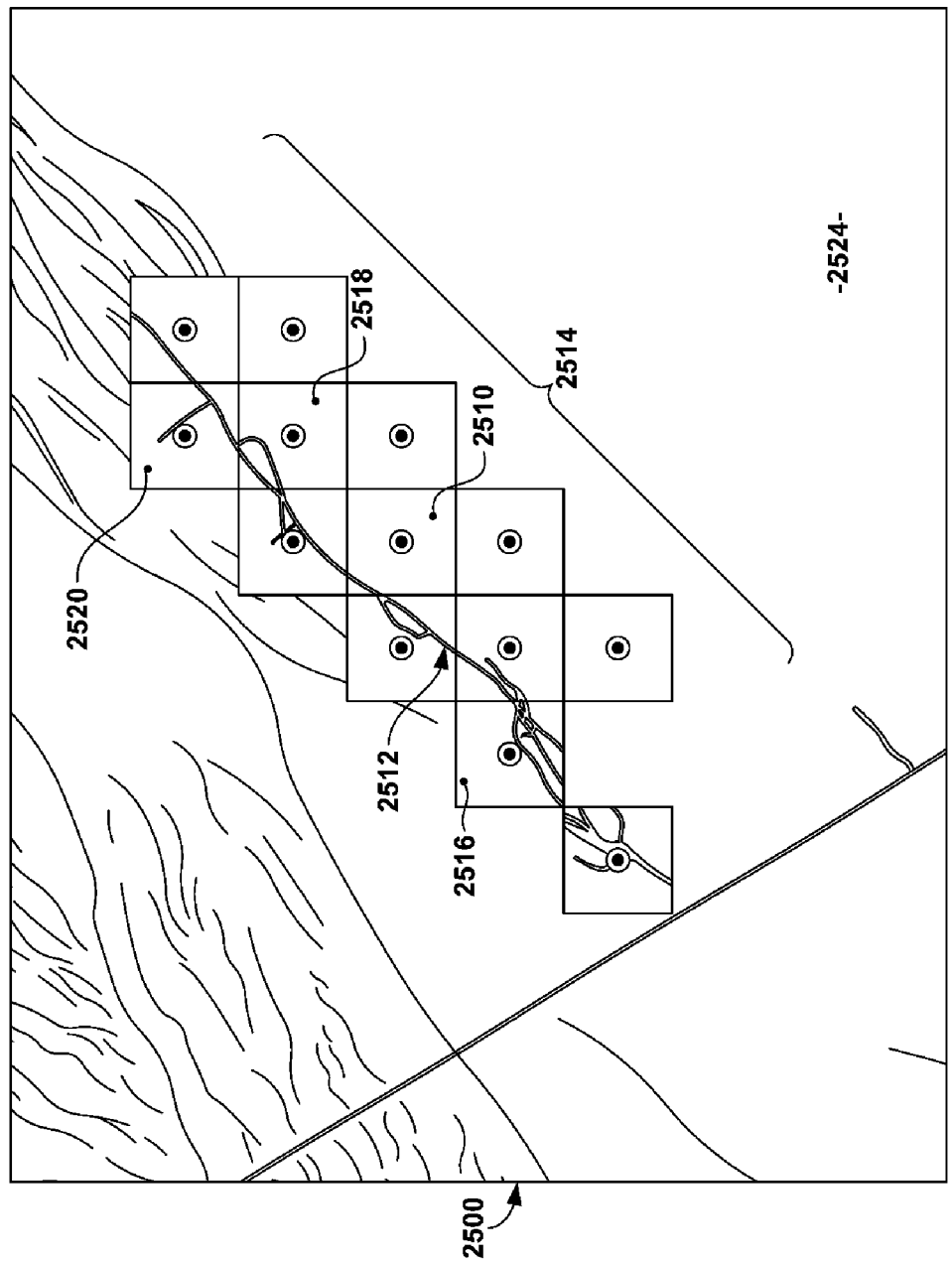
FIG. 25 depicts the results of utilizing an embodiment of the "smart surround" feature of FIG. 24.

Turning now to FIG. 25, a screenshot 2500 depicts the results of a user having acted on smart-surround link 2418 of FIG. 24. Now, tiles 2514 are shown. In FIG. 24, it was difficult to tell that a roadway feature might be viewable. Let us assume that tile 2510 corresponds to tile 2422 of FIG. 24. The upper left hand corner of tile 2510 includes what now can be seen as a roadway feature. Because the smart-surround option 2418 was acted on, other tiles have been brought into view, which more clearly makes visible roadway structure 2512. For example, tile 2516 is now visible. Tile 2516 might not have been visible in FIG. 24 because, although it does depict a portion of roadway structure 2512, it might not have exhibited enough change to be sufficiently highly ranked to be initially presented in presentation 2400. But by clicking the smart-surround option associated with tile 2510, our technology receives an indication of the key associated with tile 2510, and then searches through, in one embodiment, the list of ranked tiles to determine other tiles that have changed and that are nearby to tile 2510. As a result of this analysis, tiles such as tile 2518 and 2520 are pushed out to presentation 2500, thereby enabling a viewing or cycling of states of the corresponding geographic regions. That is, each of the tiles might present a before state, an after state, or a change map. Although some tiles are shown by mere outlines without any fill patterns, we show them in this manner to illustrate the concept that they can be retrieved, but leave them blank so as to highlight aspects of this specific example, wherein roadway 2512 is identified.

Returning now to FIG. 23, a user can drill down and zoom in on tiles 2322 of FIG. 23, and then interact with a tile such as tile 2422 to receive even more information about nearby geographic areas that have changed in a manner similar to tile 2422. Acting on such an option 2418, yields tiles 2514 in FIG. 25, which clearly indicate the presence of a new road structure 2512. Thus, one embodiment of our technology allows the rapid searching of a large area, such as Natanz, Iran, to very rapidly identify a new road structure such as road structure 2512. Now, a user can analyze the surrounding geographic area 2524 in greater detail. A user can analyze why such a new road 2512 has been recently built. The applications that are made available by way of our technology are legion. A user is now armed with an ability to quickly locate areas of interest. This is a benefit over and above merely depicting the entire geographic area of Natanz all at once. That is, our technology does not require presenting huge amounts of data, which would otherwise take a long amount of time and large amount of space to present in a viewer application such as that depicted by presentation 2500.

In contrast, we expose the ability to automatically and quickly detect geographic change and present these results efficiently and rapidly to a user. While this specific example illustrated the use of locating a newly developed road, the examples are legion for determining geographic areas that have changed in many different ways. Thus, if other geographic areas are sought that exhibit change characteristics similar to those of any of the change areas depicted in a viewer as a result of a user query, than these can be easily gathered and presented as well.

Figure 26:
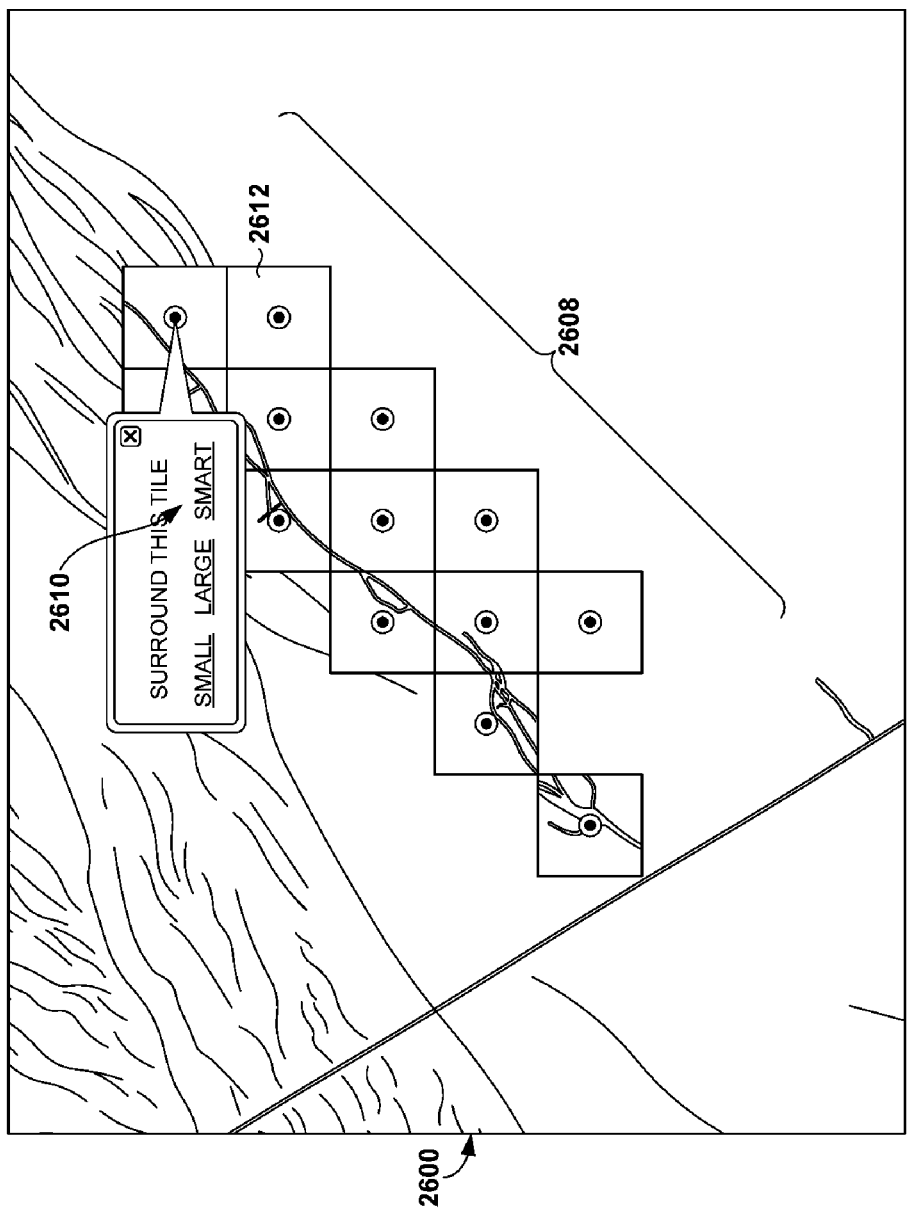
FIG. 26 depicts tiles similar to those of 25, but perhaps in a different state.
Figure 27:
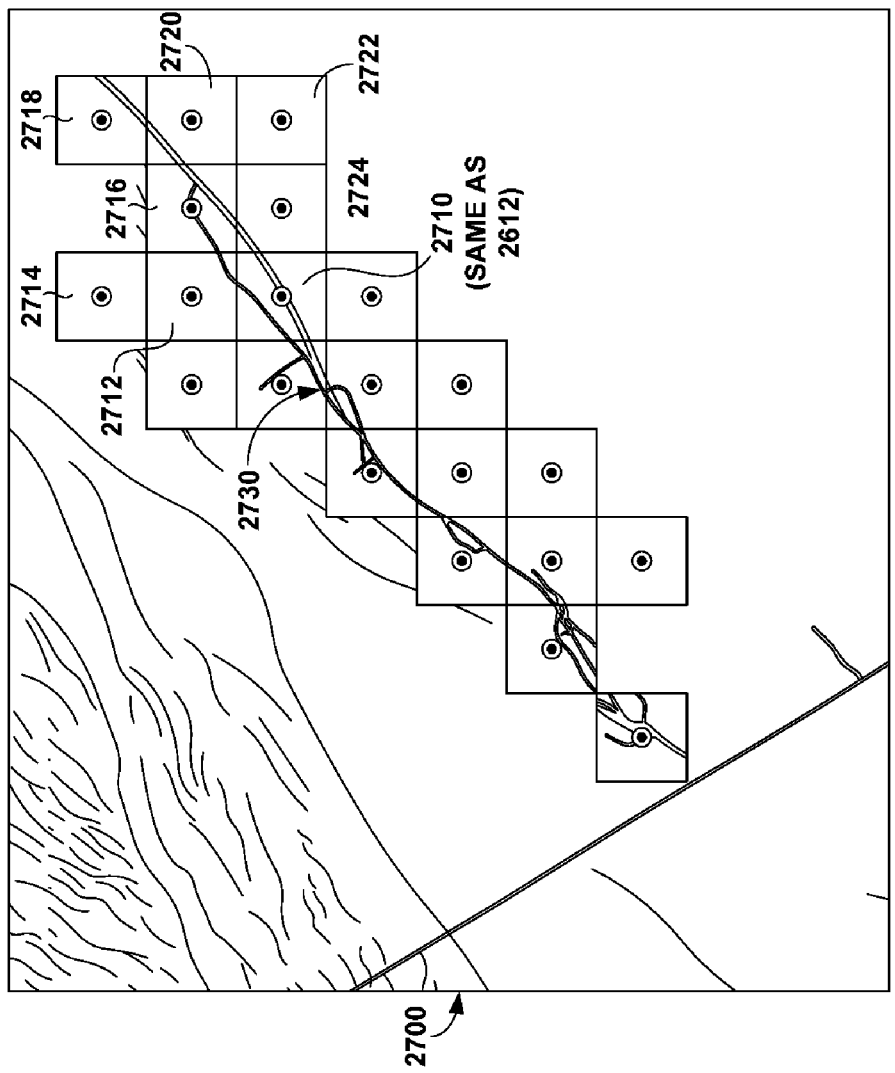
FIG. 27 depicts additional tiles incident to acting on the "smart surround" option of FIG. 26.

Turning now to FIG. 26 presentation 2600 illustrates another example of further presenting a set of options associated with a given tile, such as tile 2612, which is among tiles 2608. Acting on a smart-surround option 2610 might yield depiction 2700 of FIG. 27, which indicates a presentation of tiles 2712, 2714, 2716, 2718, 2720, 2722 and tile 2724 based on having interacted with tile 2710, which might have been the same tile as 2612 of FIG. 26. Now, roadway 2730 is even more clearly brought into view.

To recapitulate, our technology enables a user to rapidly locate geographic areas of interest that have changed in a certain manner. We have shown, for example, where a user inputs a query into a web interface to look for areas that have changed using various constraints such as location, time, change intensity, CQM, etc. (FIG. 14). The web-interface communicates over a network to a server which retrieves the relevant information from a database (FIG. 13) and returns to the web interface a ranked list of results (FIG. 14.) satisfying the query. The user reviews these results in the web interface in a variety of visualization formats (FIGS. 15 and 16), which include animations that show the tiles in a before and after state and that also may include a change intensity map (FIG. 17). In one embodiment of a web viewer, the user provides positive feedback on tiles that have changed in a manner of interest to the user, such as a new road being constructed, and negative feedback on tiles that have changed in a manner of no interest, such as agricultural areas of change (FIGS. 18 and 19). These results are communicated back from the web-interface to the server, which analyzes the feedback and retrieves a revised set of change regions based on the feedback. The revised results are viewed in the web viewer (FIG. 20) and then pushed to an earth imagery viewer for contextual visualization (FIGS. 21 and 22). In the earth viewer, the user interacts with the regions of interest and through additional tile-level controls is able to expand the area of interest using various options (FIGS. 23, 24, 25, 26, 27). These controls communicate back to the server which retrieves additional areas of interest from the database and then pushes these back into the earth imagery viewer. Finally, the earth imagery viewer also has controls that allow the before and after states of the imagery to be cycled.

Figure 28:
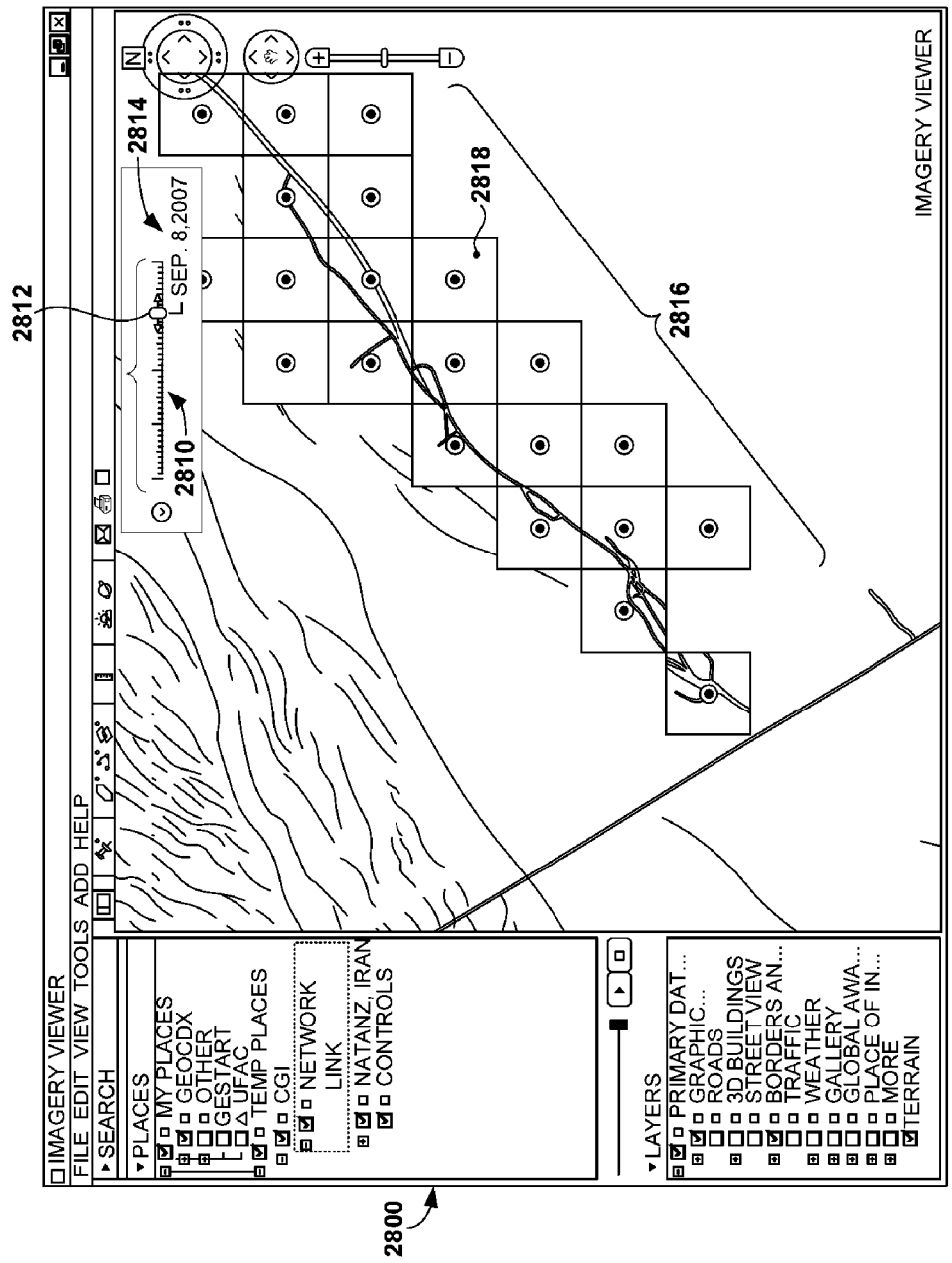
FIG. 28 depicts illustrative controls that are usable to interact with our technology to facilitate a tile-animation sequence.

We have previously mentioned that the tiles can be cycled in states. Turning to FIG. 28, presentation 2800 depicts a control 2810 that enables a user to set a time 2814 by way of control 2812 that allows one or more of tiles 2816 to automatically cycle states. That is, tiles 2816 might be animated. Consider a specific tile, such as tile 2818. According to one aspect of our technology, tile 2818 can cycle through. That is, a first state associated with geographic area 2818 can be presented, and then another state, and then another state, and then perhaps the change map, etc. The dates can be constrained by control 2812. By way of example, Sep. 8, 2007 is shown. If a beginning time were desired, it can also be provided. Thus, those tiles falling with any given date range would cycle through. Although this is unable to be shown in a stagnate document, a viewer viewing presentation 2800 would see certain tiles automatically changing states in an animated fashion without user interaction. This even more clearly directs a user's attention to areas of change, and allows a user to view first states, intermediate states, and ending states as well as change maps in a cyclical pattern.

Figure 29A:
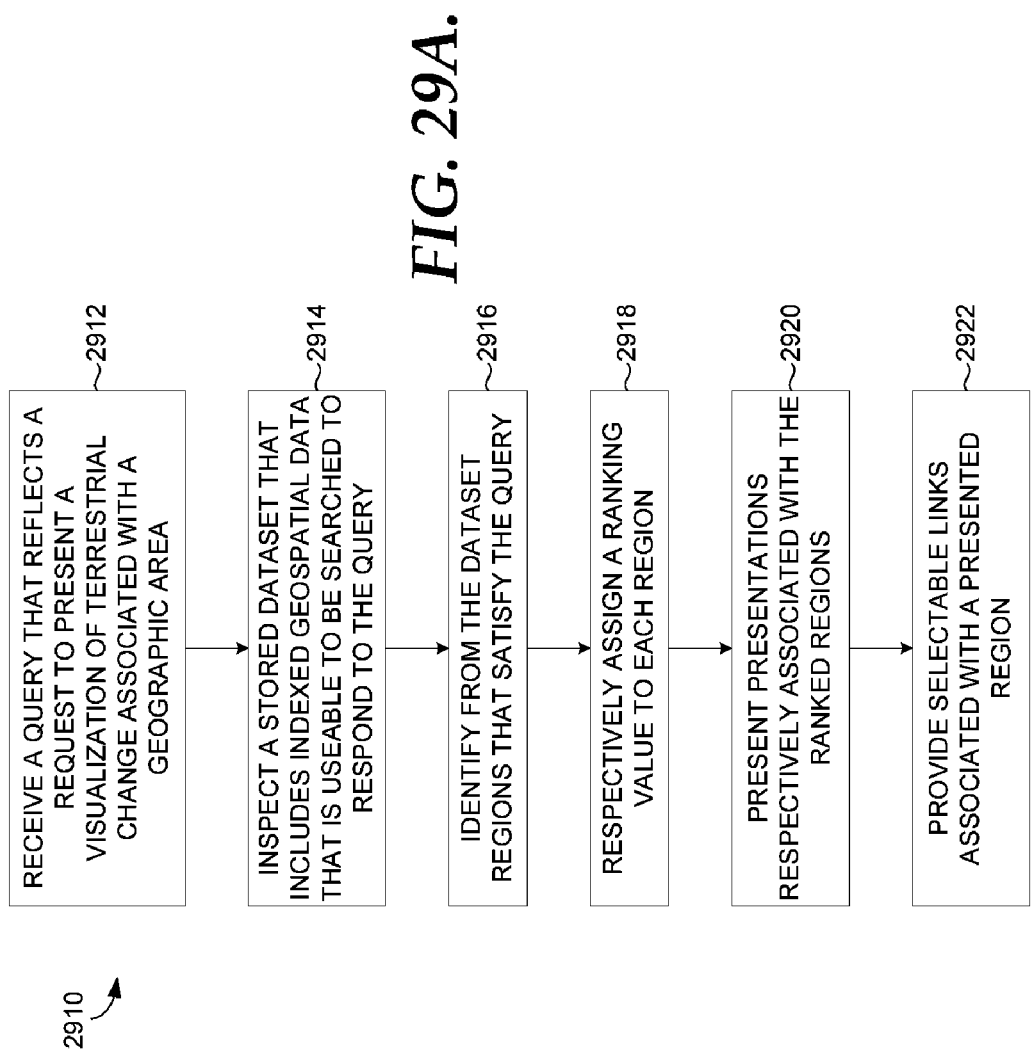
FIGS. 29A-29B depict illustrative processes for visualizing search results.
Figure 29B:
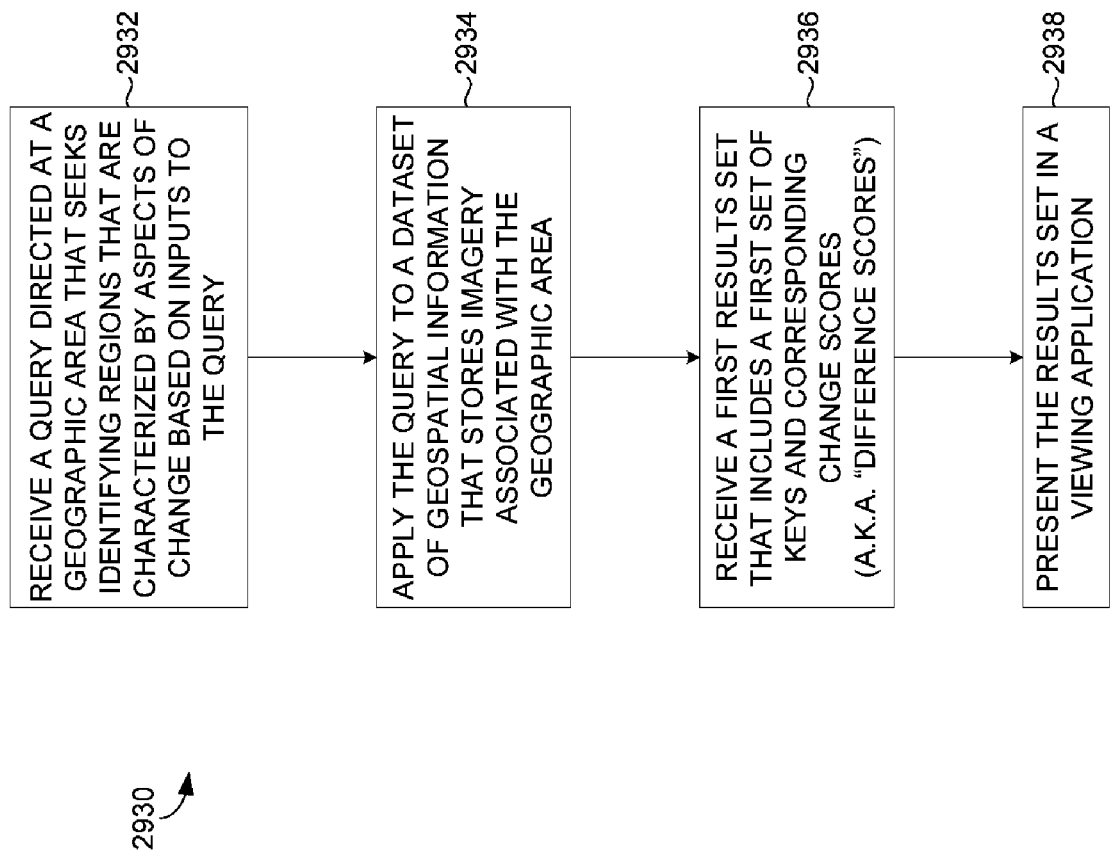

Although we have described aspects associated with presenting change information associated with the geographic area, we will now recapitulate various aspects in connection with FIGS. 29A and 29B. Turning first to FIG. 29A, an illustrative method for presenting aspects of change associated with a given geographic area is provided generally by the numeral 2910. At a step 2912, a query is received that reflects a request to present a visualization of terrestrial change associated with a given geographic area. In one embodiment, the query includes one or more inputs. The inputs might include location-identification information, time-span information, or a first and second image. In the case where inputs are first and second images, feature information can be extracted from the images on demand in one embodiment. In other embodiments, this feature information has already been extracted and is pre-stored prior to receiving the query. The inputs might also include a change-quality measurement as previously described. As previously mentioned, a dataset, such as dataset 252 (see FIG. 1) can be searched to satisfy the query. Such a database 252 might include heterogeneous cross-referencing data that facilitates cross referencing geospatial data with other information to return desired results.

At a step 2914, the stored dataset is inspected. In one embodiment, the stored dataset includes indexed geospatial data that are usable to be searched to respond to the query. The indexed geospatial data include indexed information that describes the geographic area in one embodiment. As described, the indexed information could have been derived from high-resolution, remotely sensed imagery. The indexed information can include information that describes items within a geographic area as well as a geographic area itself. Illustrative items that might be within a geographic area include things like airplanes, baseball diamonds, buildings, and other man-made or even naturally-occurring items.

At a step 2916, regions that satisfy the query are identified from the dataset. With reference to FIG. 1B, by way of illustration, illustrative regions that might have been identified include first geographic area 110 or second geographic area 112.

At a step 2918, ranking values can be assigned to each region. We have previously described various methods of assigning ranking values to identify the regions. The ranking values indicate a relevancy score such that, in one embodiment, those regions having a higher ranking value than others are more relevant than those having lower ranking values. At a step 2920, presentations respectively associated with the ranked regions are presented on a viewer. We have explained that a viewer can take on various forms including a web page, mapping application, on geospatial mapping platform, which might be a part of or separate from a virtual-globe presentation program.

In one embodiment, the presentations presented include an animation that includes sequencing images of the geographic area that are depicted in various states. We have described illustrative processes in connection with, for example, FIG. 28. With reference to FIG. 22, an illustrative depiction 2200 illustrates presenting a set of ranked regions on a user interface. They could also be presented in a grid-like pattern, such as is shown in FIG. 16 for example. The presentations might include an indication of the ranked regions. Thus, by way of example, words described in the regions might be presented. In other embodiments, pictures associated with the regions might be presented, as was shown in FIG. 14B for example. FIG. 14A also indicates hyperlinked rankings 1416, which can also be included in the presentations. The presentations might also include a visual depiction of change. We show an example of this in FIG. 14A, with reference to numeral 1430. The presentation might also include a "before" image that corresponds to a first state of the geographic area. For example, the first state might be first state 114 or first state 130 of FIG. 1B. Similarly, the presentation might include an "after" image that corresponds to a second state of a given geographic area. In FIG. 1B, we show examples of two second states 116, 132, which respectively correspond to two geographic areas. Of course, as many intermediate images as are available can be presented.

The presentation might also include an identified area that has changed in a manner similar to how a given area has changed. That is, a first geographic area might be presented. This geographic area for sake of example, includes imagery that describes a first state as well as imagery that describes a second state. From these two images, change information can be identified in the applicable dataset. This change information can then be used to search the dataset for other geographic areas that are associated with similar change information. To be similar to the change information might contemplate a similar change intensity. In other embodiments, similarity might include similarity to a given feature band. For example, say the reference area exhibited certain change characteristics in the red spectral band. Perhaps a user wishes to search on other geographic areas that exhibit similar change in the red spectral band without concern about change in other bands. By way of another example, perhaps the reference or source geographic area exhibited certain textural-related change. Because, as mentioned, we index feature and change information at the band level, we can search on a per band basis. Similarly, we can search on a set of bands while ignoring other bands. Still further, perhaps change detection is desired to be temporarily constrained. In this case, items that have changed over a similar period of time could be particularly retrieved and presented.

As previously described, the presentations might be presented as part of a larger geographic area such that they are visually distinguishable within an overall presentation that includes the larger geographic area. With reference to FIG. 22, larger geographic area 2213 provides a background upon which to present the various tiles that are shown, such as, for example, tiles 2218.

At a step 2922, selectable links that are associated with a presented region can be provided. We show some illustrative links in FIG. 24.

Turning now to FIG. 29B, another illustrative method for presenting aspects of change associated with various geographic areas is provided, and referenced generally by the numeral 2930. In one embodiment, at a step 2932, this method includes receiving a query that is directed at a certain geographic area. The query seeks to identify regions that are characterized by aspects of change based on inputs to the query. We have previously described an array of types of inputs that can be provided in connection with the query. At a step 2934, the query is applied to a dataset of geospatial information that stores imagery associated with the geographic area. This dataset includes information that is sufficient to identify the regions.

At a step 2936, a first results set was received that includes a first set of keys and corresponding change scores (which we variously refer to as difference or distance scores). By way of FIG. 8F, we describe some illustrative instances wherein keys associated with various ranking scores are returned. Keys can take on any format as long as they are able to uniquely identify geographic areas. The change score indicates an amount of change in the given region.

At a step 2938, the results are visualized in a viewing application. We have previously mentioned that all or a portion of the results set can include transitioning images that depict various states of the certain region, which can also include cycling against a background so that the images are looped.

Turning now to FIG. 30A, an illustrative process for revising a first set of search results is provided and referenced generally by the numeral 3010. At a step 3012, a first set of search results are retrieved incident to receiving a query that requests a set of geographic areas that are associated with certain change characteristics. The query can include various options that describe desired aspects of the set of geographic areas that are sought by way of the query.

At a step 3014, a first set of images is presented based on the query. By way of example, FIG. 19 depicts an illustrative example of presenting a first set of search results. At a step 3016, a user-feedback option is presented in connection with each image. We do not mean to imply that a user-feedback option needs to be presented with every image shown on FIG. 19. To the extent that some images do not include user-feedback options, those might not be considered within the aforementioned set. Illustrative user-feedback options are shown in FIG. 19 by way of smiley faces, which have been previously described. The happy faces indicate positive feedback, while the frowning faces indicate negative feedback. Thus, in one embodiment, at a step 3018, the smiling faces are user-feedback options that allow reception of the user-feedback indication that indicates a desire to receive more results that are similar to the image associated with the given smiling face. Similarly, a frowning face is an illustrative example of a user-feedback option that enables reception of a user-feedback indication that indicates a desire to receive more results that are dissimilar to the image associated with the frowning face. As previously mentioned, an array of other types of controls could be utilized instead of smiley faces, which are provided to illustrate the concept.

At a step 3020, a second set of images are retrieved based on the user feedback. In one embodiment, the second set of images were derived from the first set of images, but in other embodiments, the second set of images are either wholly or in part separate from the first set of images.

At a step 3022, the second set of images are presented on a viewer. The viewer might be the same viewer that was used to present the first set of search results or a different viewer.

Figure 30B:
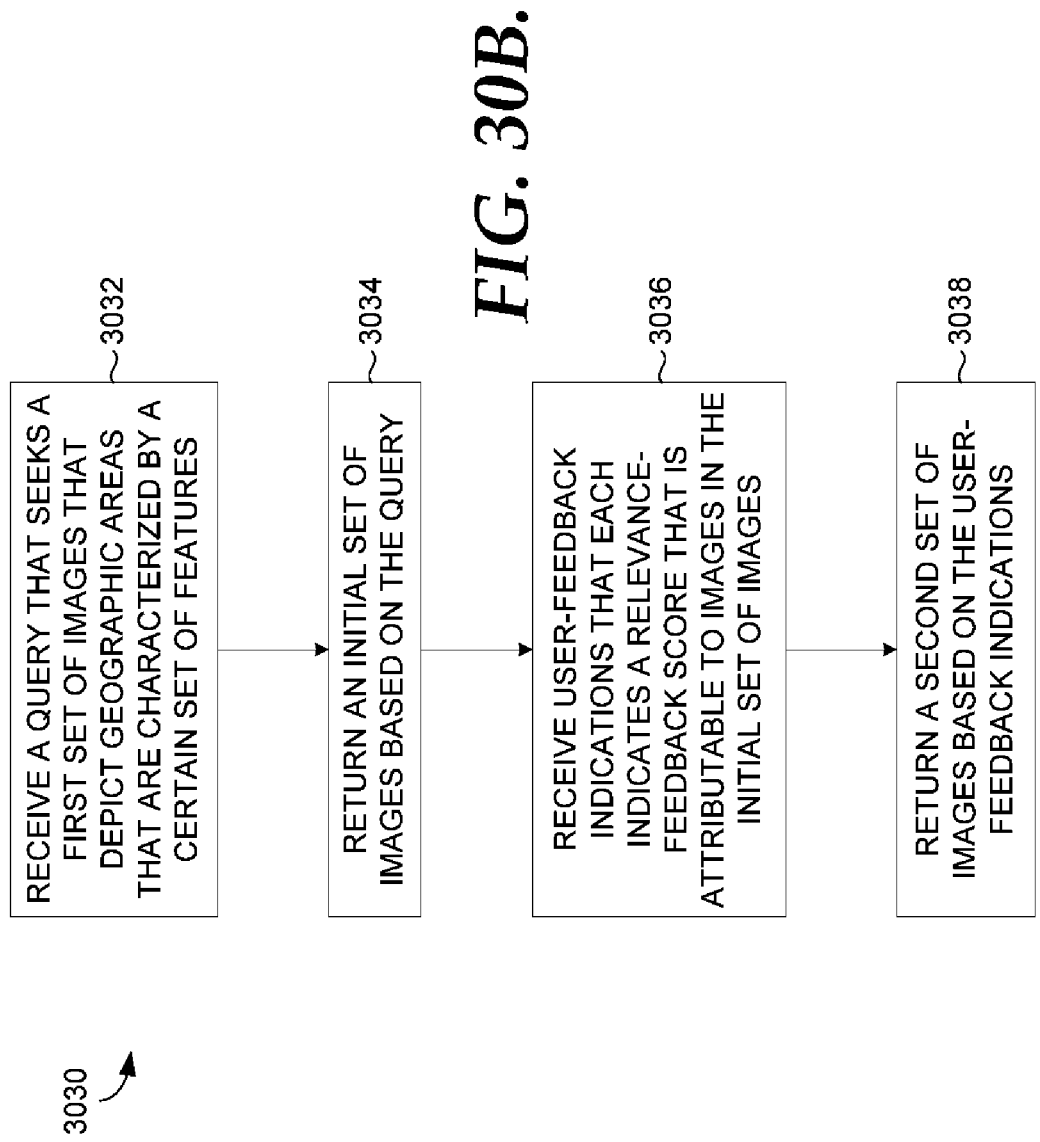

Turning now to FIG. 30B, another illustrative method for revising a first set of search results is provided and referenced generally by the number 3030. At a step 3032, a query is received that seeks a first set of images that depict geographic areas that are characterized by a certain set of features. We have previously described an array of types of features that can be searched on. For example, see FIG. 7E. An initial set of images based on the query is returned at a step 3034. User-feedback indications are received but each indicates a relevance-feedback score that is attributable to images in the initial set of images at a step 3036. At a step 3038, a second set of images is returned based on the user-feedback indications.

In one embodiment, the images that are returned were done so based on change information associated with the corresponding geographic areas.

Figure 30C:
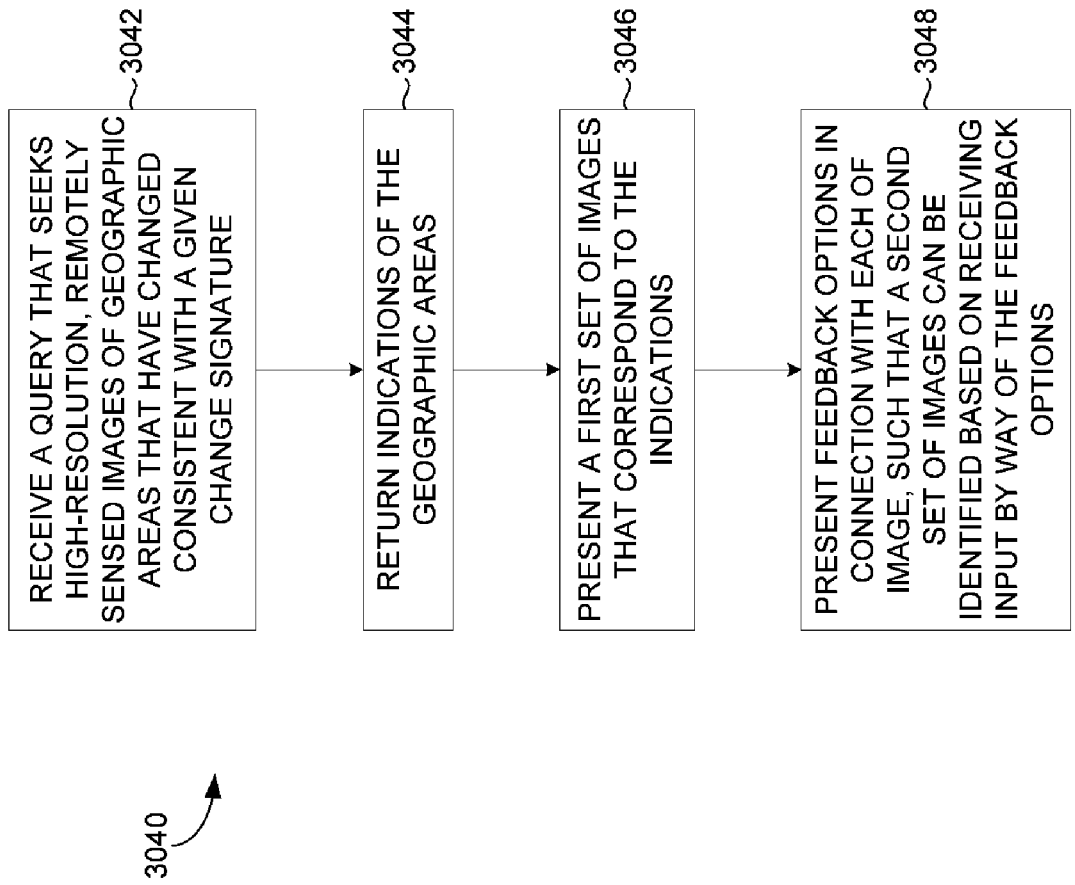

Turning now to FIG. 30C, still another embodiment for revising a first set of search results is provided and referenced generally by the numeral 3040. At a step 3042, a query is received that seeks geographic areas that have changed consistent with the given change signature. Thus, in this embodiment, change information is provided as an input to a query, and the first set of results that are returned are those results that are associated with change information that is similar to change information associated with one or more geographic areas upon which the query is based.

At a step 3044, initial indications of the geographic areas are returned. At a step 3046, a first set of images corresponding to the indications returned in step 3044 are presented.

At a step 3048, feedback options are presented in connection with each image, such that a second set of images can be identified based on receiving input by way of the feedback options. The feedback options might include "more like this" or "less like this options," where each option indicates a desire to receive more geographic areas that are similar to a certain region or regions, or more that are dissimilar to the given region or regions.

Many different arrangements of the various components depicted, as well as components not shown, are possible without departing from the spirit and scope of this disclosure. Embodiments have been described with the intent to be illustrative rather than restrictive. Alternative embodiments will become apparent to those skilled in the art upon reading this disclosure.

It will be understood that certain features and sub-combinations are of utility and may be employed without reference to other features and sub-combinations and are contemplated within the scope of the claims. Not all steps listed in the various figures need be carried out in the specific order described.

The invention claimed is:

1. One or more non-transitory computer-readable media having computer-useable instructions for performing a method of presenting aspects of change associated with a geographic area that has been captured by high-resolution, remotely sensed imagery, the method comprising:
   receiving a query by way of a first user-interface portion that includes at least one field for receiving input that is capable of receiving one or more of
      (1) a first image identifier and a second image identifier,
      (2) a query representing a desired change quality measurement, and
      (3) a query representing a desired change intensity,
   wherein said query reflects a request to present a visualization of terrestrial change associated with the geographic area and includes one or more inputs including location-identification information that identifies a given geographic region;
   inspecting a stored dataset that includes indexed geospatial data that is useable to be searched to respond to the query,
      (1) wherein the indexed geospatial data includes indexed information that describes the geographic area, and
      (2) wherein the indexed information was derived from the high-resolution, remotely sensed imagery;
   identifying from the dataset a first set of geographic sub-regions that are within said given geographic region and that are each associated with data that indicates that a given subregion has exhibited terrestrial change from a first state to a second state; and presenting by way of a second user-interface portion one or more presentations respectively associated with the geographic subregions, such that the presentations are visually ordered according to the amount of change in the associated geographic subregion, wherein the one or more presentations each include a first image representative of a first state, a second image representative of a second state, and a third image representative of the degree of change between said first and second images.

2. The media of claim 1, wherein the one or more inputs include one or more of:
  time-span information; and
  a first image and a second image, wherein feature information is extracted from the first and second images on demand, and becomes part of the stored dataset.

3. The media of claim 2, wherein the one or more inputs further include a change-quality measurement that indicates a suitability of comparing two images.

4. The media of claim 3, wherein the change-quality measurement is a measure of likelihood that the terrestrial change reflects human-induced change.

5. The media of claim 2, wherein the dataset further includes heterogeneous cross-referencing data that facilitates cross referencing the geospatial data with other information to return desired results, and wherein the other information includes indications of locations of items of interest.

6. The media of claim 5, wherein the items of interest include one or more of:
  types of organizations;
  geographic features;
  transportation features;
  populated areas; and
  military establishments.

7. The media of claim 1, wherein the indexed information that describes the geographic area includes information that describes items within the geographic area.

8. The media of claim 1, wherein the one or more presentations include an animation that includes sequencing images of the geographic area that depict it in various states including the first and second states.

9. The media of claim 1, wherein the one or more presentations further include:
  an identified area that has changed in a manner similar to how a reference area has changed.

10. The media of claim 1, wherein the third image representative of the degree of change between said first and second images indicates,
  areas of change of a given geographic subregion, and
  an intensity of change across the areas.

11. The media of claim 10, wherein the intensity of change is on a per-pixel basis such that each pixel in the third image reflects an intensity of change between two respective pixels in the first image and the second image.

12. The media of claim 10 further comprising a viewer, which includes one or more of:
  a web page;
  a mapping component; and
  a geospatial mapping platform including a virtual-globe presentation program.

13. The media of claim 12, wherein the viewer presents a background upon which to present at least one of the first, second, and third images associated with the one or more presentations, such that the geographic subregions are placed in visual context by way of the background.

14. The media of claim 13, further comprising providing one or more selectable links associated with each of the presented geographic subregions, wherein the one or more selectable links include one or more of the following:
  a first link that exposes a first surround option that presents change attributes on the background for a first series of geographic subregions that are contiguous with a certain geographic subregion that is associated with the one or more selectable links, wherein the first series of geographic subregions are presented irrespective of an amount of their change information;
  a second link that exposes a second surround option that presents change attributes on the background for a second series of geographic subregions that are within a predetermined proximity to the given certain geographic subregion, wherein the second series of geographic subregions are presented irrespective of an amount of their change information;
  a third link that exposes a third surround option that presents change attributes on the background for a third series of geographic subregions that are within a given proximity to the given certain geographic subregion, wherein the third series of geographic subregions are presented only if they are associated with a given threshold level of change;
  a fourth link that exposes a fourth surround option that presents change attributes on the background for a fourth series of geographic subregions that are within a given proximity to the given certain geographic subregion, wherein the fourth series of geographic subregions are presented only if they are associated with a similar level of change as that of the certain geographic subregion;
  a fifth link that facilitates identification of a first set of one or more other geographic subregions similar to the given geographic subregion, and automatically brings into view the first set of one or more other geographic subregions; and
  a sixth link that facilitates identification of a second set of one or more other geographic subregions that have changed in a manner similar to the way that the given geographic subregion has changed, and automatically brings into view the second set of one or more other geographic subregions.

15. One or more non-transitory computer-readable media having computer-useable instructions for performing a method of presenting aspects of change associated with a geographic area that has been captured by high-resolution, remotely sensed imagery, the method comprising:
  receiving a query by way of a first user-interface portion that includes at least one field for receiving input that is capable of receiving a first image identifier and a second image identifier, wherein said query is directed at the geographic area and includes one or more inputs, the query seeking an identification of geographic subregions that are within a geographic region and that are characterized by aspects of terrestrial change based on the one or more inputs;
  applying the query to a dataset of geospatial information that stores imagery associated with the geographic area, wherein the dataset includes information that is sufficient to identify the geographic subregions, and wherein the imagery is derived from the high-resolution, remotely sensed imagery, which is characterized by having a resolution of three meters or less per pixel and wherein the dataset includes information indicative of an intensity of terrestrial change in each geographic subregion;

receiving a first results set that includes a first plurality of keys and corresponding change scores, wherein,
(1) each key is useable to identify a certain geographic subregion,
(2) each change score indicates an amount of terrestrial change in the certain geographic subregion from a first state to a second state, and
(3) the change scores collectively provide for ranking the geographic subregions according to a respective amount of change in each subregion;

presenting by way of a second user-interface portion at least a portion of the results set in a viewing application, wherein said results set includes imagery representative of a first state and representative of a second state of at least one geographic subregion, wherein the at least one geographic subregion is characterized by at least one aspect of terrestrial change that is similar to the one or more inputs.

16. The media of claim 15, wherein the presenting at least a portion of the results set includes transitioning images that depict the first state and the second state of the certain geographic subregion.

17. The media of claim 16, wherein the transitioning includes cycling that appears against a background that includes the geographic area.

18. One or more non-transitory computer-readable media having computer-useable instructions for performing a method of presenting aspects of a geographic area that has been captured by high-resolution, remotely sensed imagery, the method comprising:

receiving, by way of a first user-interface portion, a query that reflects a request to present a visualization of the aspects of the geographic area, wherein the query includes one or more inputs;

inspecting a stored dataset that includes indexed geospatial data that is useable to be searched to respond to the query,
(1) wherein the indexed geospatial data includes indexed information that describes the geographic area, and
(2) wherein the indexed information was derived from the high-resolution, remotely sensed imagery and includes indications of terrestrial change;

identifying from the dataset a first set of geographic subregions where each geographic subregion is within said given geographic region and is associated with data that indicates that a given subregion has exhibited terrestrial change from a first state to a second state, wherein each of the first set of geographic subregions is a portion of a larger geographic region;

respectively assigning a numerical ranking value to each geographic subregion of the first plurality of regions, wherein the ranking value includes at least one change score that indicates an amount of terrestrial change in a geographic subregion from a first state to a second state and is computed using imagery derived from high-resolution, remotely sensed imagery and wherein the ranking value is useable to accordingly rank each of the geographic subregions based on their relative amount of change, thereby providing a set of ranked geographic subregions; and presenting by way of a second user-interface portion one or more presentations respectively associated with a selection of the ranked geographic subregions, such that the one or more presentations are visually ordered based on the rank of the associated geographic subregion; and presenting a link associated with a given geographic subregion of the ranked geographic subregions, wherein the link, if acted on, presents an indication of another geographic subregion that is associated with data that indicates that the another geographic subregion has exhibited terrestrial change from a first state to a second state and that has features in common with the given geographic subregion.

19. The media of claim 18, wherein the identifying from the dataset a first set of geographic subregions includes identifying one or more items associated with one or more geographic subregions of the first set of geographic subregions.

20. The media of claim 19, wherein the indication of the another geographic subregion includes one or more of:
the another geographic subregion; and
a directional identifier that points to the another geographic subregion.

21. The media of claim 12, wherein at least one of the first, second, and third images associated with the one or more presentations are presented as part of the larger geographic area such that the one or more presentations are visually distinguishable within an overall presentation that includes the larger geographic area.

22. One or more non-transitory computer-readable media having computer-useable instructions for performing a method of presenting aspects of change associated with a geographic area that has been captured by high-resolution, remotely sensed imagery, the method comprising:

receiving a query by way of a first user-interface portion wherein said query reflects a request to present a visualization of terrestrial change associated with the geographic area and includes one or more user inputs including location-identification information that identifies a given geographic region;

inspecting a stored dataset that includes indexed geospatial data that is useable to be searched to respond to the query,
(1) wherein the indexed geospatial data includes indexed information that describes the geographic area, and
(2) wherein the indexed information was derived from the high-resolution, remotely sensed imagery;

identifying from the dataset a first set of geographic subregions that are within said given geographic region and that are each associated with data that indicates that a given subregion has exhibited terrestrial change from a first state to a second state;

presenting by way of a second user-interface portion one or more presentations respectively associated with a selection of the first set of geographic subregions such that the one or more presentations are presented in one or more visually distinguishable collections, and wherein the one or more presentations are grouped into the one or more visually distinguishable collections based on the similarity of the feature information derived from at least one of
(1) the first state of the associated geographic subregion,
(2) the second state of the associated geographic subregion, and
(3) the change from the first state of the associated geographic subregion to the second state of the associated geographic subregion.

* * * * *